(12) United States Patent
Bose et al.

(10) Patent No.: US 10,109,061 B2
(45) Date of Patent: *Oct. 23, 2018

(54) MULTI-SENSOR EVEN ANALYSIS AND TAGGING SYSTEM

(71) Applicant: Blast Motion Inc., Carlsbad, CA (US)

(72) Inventors: Bhaskar Bose, Carlsbad, CA (US); Piyush Gupta, Vista, CA (US); Juergen Haas, Poway, CA (US); Brian Estrem, Annandale, MN (US); Michael Bentley, Carlsbad, CA (US); Ryan Kaps, Mesa, AZ (US)

(73) Assignee: BLAST MOTION INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,398

(22) Filed: May 9, 2017

(65) Prior Publication Data

US 2017/0243359 A1    Aug. 24, 2017

Related U.S. Application Data

(63) Continuation of application No. 15/087,776, filed on Mar. 31, 2016, now Pat. No. 9,646,199, which is a
(Continued)

(51) Int. Cl.
*A63F 13/12* (2006.01)
*G06T 7/20* (2017.01)
(Continued)

(52) U.S. Cl.
CPC .............. *G06T 7/20* (2013.01); *A63F 13/211* (2014.09); *A63F 13/212* (2014.09);
(Continued)

(58) Field of Classification Search
CPC .......................... A63F 13/12; A63F 2300/1025
See application file for complete search history.

(56) References Cited

U.S. PATENT DOCUMENTS

| 1,712,537 A | 5/1929 | White |
| 3,182,508 A | 5/1965 | Varju |

(Continued)

FOREIGN PATENT DOCUMENTS

| EP | 2025369 A2 | 2/2009 |
| JP | 2002210055 A | 7/2002 |

(Continued)

OTHER PUBLICATIONS

Supplementary Extended European Search Report received in 15782595.1 dated Nov. 27, 2017, 5 pages.
(Continued)

*Primary Examiner* — Omkar Deodhar
(74) *Attorney, Agent, or Firm* — ARC IP Law, PC; Joseph J. Mayo

(57) ABSTRACT

A system that analyzes data from multiple sensors, potentially of different types, that track motions of players, equipment, and projectiles such as balls. Data from different sensors is combined to generate integrated metrics for events and activities. Illustrative sensors may include inertial sensors, cameras, radars, and light gates. As an illustrative example, a video camera may track motion of a pitched baseball, and an inertial sensor may track motion of a bat; the system may use the combined data to analyze the effectiveness of the swing in hitting the pitch. The system may also use sensor data to automatically select or generate tags for an event; tags may represent for example activity types, players, performance levels, or scoring results. The system may analyze social media postings to confirm or augment event tags. Users may filter and analyze saved events based on the assigned tags.

13 Claims, 62 Drawing Sheets

Related U.S. Application Data continuation-in-part of application No. 14/801,568, filed on Jul. 16, 2015, now Pat. No. 9,396,385, which is a continuation-in-part of application No. 14/549,422, filed on Nov. 20, 2014, now Pat. No. 9,235,765, which is a continuation-in-part of application No. 14/257,959, filed on Apr. 21, 2014, now Pat. No. 9,076,041, which is a continuation-in-part of application No. 13/914,525, filed on Jun. 10, 2013, now Pat. No. 8,702,516, which is a continuation-in-part of application No. 13/679,879, filed on Nov. 16, 2012, now Pat. No. 8,944,928, which is a continuation-in-part of application No. 13/298,158, filed on Nov. 16, 2011, now Pat. No. 8,905,855, which is a continuation-in-part of application No. 13/267,784, filed on Oct. 6, 2011, now Pat. No. 9,604,142, which is a continuation-in-part of application No. 13/219,525, filed on Aug. 26, 2011, now Pat. No. 8,941,723, which is a continuation-in-part of application No. 13/191,309, filed on Jul. 26, 2011, now Pat. No. 9,033,810, which is a continuation-in-part of application No. 13/048,850, filed on Mar. 15, 2011, now Pat. No. 8,465,376, which is a continuation-in-part of application No. 12/901,806, filed on Oct. 11, 2010, now Pat. No. 9,320,957, which is a continuation-in-part of application No. 12/868,882, filed on Aug. 26, 2010, now Pat. No. 8,994,826, said application No. 14/801,568 is a continuation-in-part of application No. 13/757,029, filed on Feb. 1, 2013, now Pat. No. 9,261,526.

(51) Int. Cl.
*A63F 13/212* (2014.01)
*A63F 13/211* (2014.01)
*A63F 13/213* (2014.01)
*G06K 9/00* (2006.01)
*G08B 21/04* (2006.01)
*G11B 27/022* (2006.01)
*G11B 27/031* (2006.01)
*G11B 27/10* (2006.01)
*G11B 27/17* (2006.01)
*G11B 31/00* (2006.01)
*H04N 7/18* (2006.01)

(52) U.S. Cl.
CPC ........ *A63F 13/213* (2014.09); *G06K 9/00342* (2013.01); *G06K 9/00711* (2013.01); *G08B 21/043* (2013.01); *G11B 27/022* (2013.01); *G11B 27/031* (2013.01); *G11B 27/10* (2013.01); *G11B 27/17* (2013.01); *G11B 31/006* (2013.01); *H04N 7/181* (2013.01); *A63F 2300/105* (2013.01); *A63F 2300/69* (2013.01)

(56) References Cited

U.S. PATENT DOCUMENTS

| | | |
|---|---|---|
| 3,226,704 A | 12/1965 | Petrash |
| 3,270,564 A | 9/1966 | Evans |
| 3,776,556 A | 12/1973 | McLaughlin |
| 3,788,647 A | 1/1974 | Evans |
| 3,792,863 A | 2/1974 | Evans |
| 3,806,131 A | 4/1974 | Evans |
| 3,945,646 A | 3/1976 | Hammond |
| 4,759,219 A | 7/1988 | Cobb et al. |
| 4,898,389 A | 2/1990 | Plutt |
| 4,902,014 A | 2/1990 | Bontomase et al. |
| 4,910,677 A | 3/1990 | Remedio et al. |
| 4,940,236 A | 7/1990 | Allen |
| 4,991,850 A | 2/1991 | Wilhlem |
| 5,056,783 A | 10/1991 | Matcovich et al. |
| 5,086,390 A | 2/1992 | Matthews |
| 5,111,410 A | 5/1992 | Nakayama et al. |
| 5,127,044 A | 6/1992 | Bonito et al. |
| 5,184,295 A | 2/1993 | Mann |
| 5,230,512 A | 7/1993 | Tattershall |
| 5,233,544 A | 8/1993 | Kobayashi |
| 5,249,967 A | 10/1993 | O'Leary et al. |
| 5,259,620 A | 11/1993 | Marocco |
| 5,283,733 A | 2/1994 | Colley |
| 5,298,904 A | 3/1994 | Olich |
| 5,332,225 A | 7/1994 | Ura |
| 5,333,061 A | 7/1994 | Nakashima et al. |
| 5,364,093 A | 11/1994 | Huston et al. |
| 5,372,365 A | 12/1994 | McTeigue et al. |
| 5,441,256 A | 8/1995 | Hackman |
| 5,441,269 A | 8/1995 | Henwood |
| 5,443,260 A | 8/1995 | Stewart et al. |
| 5,486,001 A | 1/1996 | Baker |
| 5,524,081 A | 6/1996 | Paul |
| 5,542,676 A | 8/1996 | Howe et al. |
| 5,592,401 A | 1/1997 | Kramer |
| 5,610,590 A | 3/1997 | Johnson et al. |
| 5,638,300 A | 6/1997 | Johnson |
| 5,665,006 A | 9/1997 | Pellegrini |
| 5,688,183 A | 11/1997 | Sabatino et al. |
| 5,694,340 A | 12/1997 | Kim |
| 5,707,299 A | 1/1998 | McKenna |
| 5,772,522 A | 6/1998 | Nesbit |
| 5,779,555 A | 7/1998 | Nomura et al. |
| 5,792,001 A | 8/1998 | Henwood |
| 5,819,206 A | 10/1998 | Horton |
| 5,826,578 A | 10/1998 | Curchod |
| 5,868,578 A | 2/1999 | Baum |
| 5,904,484 A | 5/1999 | Burns |
| 5,941,779 A | 8/1999 | Zeiner-Gundersen |
| 5,973,596 A | 10/1999 | French et al. |
| 5,993,333 A | 11/1999 | Heckaman |
| 5,998,968 A | 12/1999 | Pittman et al. |
| 6,012,995 A | 1/2000 | Martin |
| 6,030,109 A | 2/2000 | Lobsenz |
| 6,044,704 A | 4/2000 | Sacher |
| 6,073,086 A | 6/2000 | Marinelli |
| 6,224,493 B1 | 5/2001 | Lee et al. |
| 6,248,021 B1 | 6/2001 | Ognjanovic |
| 6,253,159 B1 | 6/2001 | Bett et al. |
| 6,254,492 B1 | 7/2001 | Taggett |
| 6,266,623 B1 | 7/2001 | Vock et al. |
| 6,293,802 B1 | 9/2001 | Ahlgren |
| 6,366,205 B1 | 4/2002 | Sutphen |
| 6,441,745 B1 | 8/2002 | Gates |
| 6,456,938 B1 | 9/2002 | Barnard |
| 6,537,076 B2 | 3/2003 | McNitt |
| 6,540,620 B1 | 4/2003 | Consiglio |
| 6,567,536 B2 | 5/2003 | McNitt |
| 6,582,328 B2 | 6/2003 | Kuta et al. |
| 6,611,141 B1 | 8/2003 | Schulz |
| 6,697,820 B1 | 2/2004 | Tarlie |
| 6,705,942 B1 | 3/2004 | Crook et al. |
| 6,746,336 B1 | 6/2004 | Brant et al. |
| 6,757,572 B1 | 6/2004 | Forest |
| 6,774,932 B1 | 8/2004 | Ewing et al. |
| 6,802,772 B1 | 10/2004 | Kunzle et al. |
| 6,868,338 B1 | 3/2005 | Elliott |
| 6,900,759 B1 | 5/2005 | Katayama |
| 6,908,404 B1 | 6/2005 | Gard |
| 6,923,729 B2 | 8/2005 | McGinty et al. |
| 7,004,848 B2 | 2/2006 | Konow |
| 7,021,140 B2 | 4/2006 | Perkins |
| 7,034,694 B2 | 4/2006 | Yamaguchi et al. |
| 7,037,198 B2 | 5/2006 | Hameen-Anttila |
| 7,092,846 B2 | 8/2006 | Vock et al. |
| 7,118,498 B2 | 10/2006 | Meadows et al. |
| 7,121,962 B2 | 10/2006 | Reeves |
| 7,143,639 B2 | 12/2006 | Gobush |
| 7,160,200 B2 | 1/2007 | Grober |

(56) References Cited

U.S. PATENT DOCUMENTS

| | | |
|---|---|---|
| 7,175,177 B2 | 2/2007 | Meifu et al. |
| 7,205,894 B1 | 4/2007 | Savage |
| 7,212,943 B2 | 5/2007 | Aoshima et al. |
| 7,219,033 B2 | 5/2007 | Kolen |
| 7,234,351 B2 | 6/2007 | Perkins |
| 7,264,554 B2 | 9/2007 | Bentley |
| 7,283,647 B2 | 10/2007 | Mcnitt |
| 7,421,369 B2 | 9/2008 | Clarkson |
| 7,433,805 B2 | 10/2008 | Vock et al. |
| 7,457,439 B1 | 11/2008 | Madsen et al. |
| 7,457,724 B2 | 11/2008 | Vock et al. |
| 7,492,367 B2 | 2/2009 | Mahajan et al. |
| 7,494,236 B2 | 2/2009 | Lim |
| 7,499,828 B2 | 3/2009 | Barton |
| 7,561,989 B2 | 7/2009 | Banks |
| 7,623,987 B2 | 11/2009 | Vock et al. |
| 7,627,451 B2 | 12/2009 | Vock et al. |
| 7,689,378 B2 | 3/2010 | Kolen |
| 7,713,148 B2 | 5/2010 | Sweeney |
| 7,731,598 B1 | 6/2010 | Kim et al. |
| 7,736,242 B2 | 6/2010 | Stites et al. |
| 7,771,263 B2 | 8/2010 | Telford |
| 7,780,450 B2 | 8/2010 | Tarry |
| 7,800,480 B1 | 9/2010 | Joseph et al. |
| 7,813,887 B2 | 10/2010 | Vock et al. |
| 7,831,212 B1 | 11/2010 | Balardeta et al. |
| 7,871,333 B1 | 1/2011 | Davenport et al. |
| 7,966,154 B2 | 6/2011 | Vock et al. |
| 7,983,876 B2 | 7/2011 | Vock et al. |
| 8,036,826 B2 | 10/2011 | MacIntosh et al. |
| 8,117,888 B2 | 2/2012 | Chan et al. |
| 8,172,722 B2 | 5/2012 | Molyneux et al. |
| 8,231,506 B2 | 7/2012 | Molyneux et al. |
| 8,249,831 B2 | 8/2012 | Vock et al. |
| 8,257,191 B2 | 9/2012 | Stites et al. |
| 8,282,487 B2 | 10/2012 | Wilson et al. |
| 8,314,840 B1 | 11/2012 | Funk |
| 8,352,211 B2 | 1/2013 | Vock et al. |
| 8,400,548 B2 | 3/2013 | Bilbrey et al. |
| 8,425,292 B2 | 4/2013 | Lui et al. |
| 8,477,027 B2 | 7/2013 | Givens |
| 8,527,228 B2 | 9/2013 | Panagas |
| 8,565,483 B2 | 10/2013 | Nakaoka |
| 8,589,114 B2 | 11/2013 | Papadourakis |
| 8,696,482 B1 | 4/2014 | Pedenko et al. |
| 8,723,986 B1 | 5/2014 | Merrill |
| 8,725,452 B2 | 5/2014 | Han |
| 8,764,576 B2 | 7/2014 | Takasugi |
| 8,781,610 B2 | 7/2014 | Han |
| 8,831,905 B2 | 9/2014 | Papadourakis |
| 8,876,621 B2 | 11/2014 | Shibuya |
| 8,888,603 B2 | 11/2014 | Sato et al. |
| 8,905,856 B2 | 12/2014 | Parke et al. |
| 8,929,709 B2 | 1/2015 | Lokshin |
| 8,944,932 B2 | 2/2015 | Sato et al. |
| 8,944,939 B2 | 2/2015 | Clark et al. |
| 8,956,238 B2 | 2/2015 | Boyd et al. |
| 8,988,341 B2 | 3/2015 | Lin et al. |
| 8,989,441 B2 | 3/2015 | Han et al. |
| 9,032,794 B2 | 5/2015 | Perkins et al. |
| 9,060,682 B2 | 6/2015 | Lokshin |
| 9,146,134 B2 | 9/2015 | Lokshin et al. |
| 9,656,122 B2 | 5/2017 | Papadourakis |
| 9,694,267 B1 | 7/2017 | Thornbrue et al. |
| 2001/0029207 A1 | 10/2001 | Cameron et al. |
| 2001/0035880 A1 | 11/2001 | Musatov et al. |
| 2001/0045904 A1 | 11/2001 | Silzer, Jr. |
| 2001/0049636 A1 | 12/2001 | Hudda et al. |
| 2002/0004723 A1 | 1/2002 | Meifu et al. |
| 2002/0019677 A1 | 2/2002 | Lee |
| 2002/0049507 A1 | 4/2002 | Hameen-Anttila |
| 2002/0052750 A1 | 5/2002 | Hirooka |
| 2002/0064764 A1 | 5/2002 | Fishman |
| 2002/0072815 A1 | 6/2002 | McDonough et al. |
| 2002/0077189 A1 | 6/2002 | Tuer et al. |
| 2002/0082775 A1 | 6/2002 | Meadows et al. |
| 2002/0115046 A1 | 8/2002 | McNitt et al. |
| 2002/0126157 A1 | 9/2002 | Farago et al. |
| 2002/0151994 A1 | 10/2002 | Sisco |
| 2002/0173364 A1 | 11/2002 | Boscha |
| 2002/0177490 A1 | 11/2002 | Yong et al. |
| 2002/0188359 A1 | 12/2002 | Morse |
| 2003/0008722 A1 | 1/2003 | Konow |
| 2003/0073518 A1 | 4/2003 | Marty |
| 2003/0074659 A1 | 4/2003 | Louzoun |
| 2003/0109322 A1 | 6/2003 | Funk et al. |
| 2003/0163287 A1 | 8/2003 | Vock et al. |
| 2003/0191547 A1 | 10/2003 | Morse |
| 2003/0208830 A1 | 11/2003 | Marmaropoulos |
| 2004/0028258 A1 | 2/2004 | Naimark et al. |
| 2004/0033843 A1 | 2/2004 | Miller |
| 2004/0044493 A1 | 3/2004 | Coulthard |
| 2004/0147329 A1 | 7/2004 | Meadows et al. |
| 2004/0227676 A1 | 11/2004 | Kim et al. |
| 2004/0248676 A1 | 12/2004 | Taylor |
| 2005/0021292 A1 | 1/2005 | Vock et al. |
| 2005/0023763 A1 | 2/2005 | Richardson |
| 2005/0032582 A1 | 2/2005 | Mahajan et al. |
| 2005/0054457 A1 | 3/2005 | Eyestone et al. |
| 2005/0156068 A1 | 7/2005 | Ivans |
| 2005/0203430 A1 | 9/2005 | Williams et al. |
| 2005/0213076 A1 | 9/2005 | Saegusa |
| 2005/0215340 A1 | 9/2005 | Stites et al. |
| 2005/0227775 A1 | 10/2005 | Cassady et al. |
| 2005/0261073 A1 | 11/2005 | Farrington, Jr. et al. |
| 2005/0268704 A1 | 12/2005 | Bissonnette et al. |
| 2005/0272516 A1 | 12/2005 | Gobush |
| 2005/0282650 A1 | 12/2005 | Miettinen et al. |
| 2005/0288119 A1 | 12/2005 | Wang et al. |
| 2006/0020177 A1 | 1/2006 | Seo et al. |
| 2006/0025229 A1 | 2/2006 | Mahajan et al. |
| 2006/0038657 A1 | 2/2006 | Denison et al. |
| 2006/0063600 A1 | 3/2006 | Grober |
| 2006/0068928 A1 | 3/2006 | Nagy |
| 2006/0084516 A1 | 4/2006 | Eyestone et al. |
| 2006/0109116 A1 | 5/2006 | Keays |
| 2006/0122002 A1 | 6/2006 | Konow |
| 2006/0166738 A1 | 7/2006 | Eyestone et al. |
| 2006/0189389 A1 | 8/2006 | Hunter et al. |
| 2006/0199659 A1 | 9/2006 | Caldwell |
| 2006/0247070 A1 | 11/2006 | Funk et al. |
| 2006/0250745 A1 | 11/2006 | Butler et al. |
| 2006/0270450 A1 | 11/2006 | Garratt et al. |
| 2006/0276256 A1 | 12/2006 | Storek |
| 2006/0284979 A1 | 12/2006 | Clarkson |
| 2006/0293112 A1 | 12/2006 | Yi |
| 2007/0052807 A1 | 3/2007 | Zhou et al. |
| 2007/0062284 A1 | 3/2007 | Machida |
| 2007/0081695 A1 | 4/2007 | Foxlin et al. |
| 2007/0087866 A1 | 4/2007 | Meadows et al. |
| 2007/0099715 A1 | 5/2007 | Jones et al. |
| 2007/0111811 A1 | 5/2007 | Grober |
| 2007/0129178 A1 | 6/2007 | Reeves |
| 2007/0135225 A1 | 6/2007 | Nieminen |
| 2007/0135237 A1 | 6/2007 | Reeves |
| 2007/0219744 A1 | 9/2007 | Kolen |
| 2007/0265105 A1 | 11/2007 | Barton |
| 2007/0270214 A1 | 11/2007 | Bentley |
| 2007/0298896 A1 | 12/2007 | Nusbaum |
| 2008/0027502 A1 | 1/2008 | Ransom |
| 2008/0085778 A1 | 4/2008 | Dugan |
| 2008/0090703 A1 | 4/2008 | Rosenberg |
| 2008/0108456 A1 | 5/2008 | Bonito |
| 2008/0164999 A1 | 7/2008 | Otto |
| 2008/0182685 A1 | 7/2008 | Marty et al. |
| 2008/0190202 A1 | 8/2008 | Kulach et al. |
| 2008/0234935 A1 | 9/2008 | Wolf et al. |
| 2008/0280642 A1 | 11/2008 | Coxhill et al. |
| 2008/0284979 A1 | 11/2008 | Yee et al. |
| 2008/0285805 A1 | 11/2008 | Luinge et al. |
| 2009/0002316 A1 | 1/2009 | Rofougaran |
| 2009/0017944 A1 | 1/2009 | Savarese et al. |
| 2009/0029754 A1 | 1/2009 | Slocum et al. |
| 2009/0033741 A1 | 2/2009 | Oh et al. |

(56) References Cited

U.S. PATENT DOCUMENTS

| | | |
|---|---|---|
| 2009/0036237 A1 | 2/2009 | Nipper et al. |
| 2009/0048044 A1 | 2/2009 | Oleson et al. |
| 2009/0055820 A1 | 2/2009 | Huang |
| 2009/0088276 A1 | 4/2009 | Solheim et al. |
| 2009/0111602 A1 | 4/2009 | Savarese et al. |
| 2009/0131190 A1 | 5/2009 | Kimber |
| 2009/0137333 A1 | 5/2009 | Lin et al. |
| 2009/0174676 A1 | 7/2009 | Westerman |
| 2009/0177097 A1 | 7/2009 | Ma et al. |
| 2009/0191846 A1 | 7/2009 | Shi |
| 2009/0209343 A1 | 8/2009 | Foxlin et al. |
| 2009/0209358 A1 | 8/2009 | Niegowski |
| 2009/0213134 A1 | 8/2009 | Stephanick et al. |
| 2009/0222163 A1 | 9/2009 | Plante |
| 2009/0233735 A1 | 9/2009 | Savarese et al. |
| 2009/0254276 A1 | 10/2009 | Faulkner et al. |
| 2009/0254971 A1 | 10/2009 | Herz et al. |
| 2009/0299232 A1 | 12/2009 | Lanfermann et al. |
| 2010/0049468 A1 | 2/2010 | Papadourakis |
| 2010/0062869 A1 | 3/2010 | Chung et al. |
| 2010/0063778 A1 | 3/2010 | Schrock et al. |
| 2010/0063779 A1 | 3/2010 | Schrock et al. |
| 2010/0091112 A1 | 4/2010 | Veeser et al. |
| 2010/0093458 A1 | 4/2010 | Davenport et al. |
| 2010/0099509 A1 | 4/2010 | Ahem et al. |
| 2010/0103269 A1 | 4/2010 | Wilson et al. |
| 2010/0113174 A1 | 5/2010 | Ahern |
| 2010/0121227 A1 | 5/2010 | Stirling et al. |
| 2010/0121228 A1 | 5/2010 | Stirling et al. |
| 2010/0130298 A1 | 5/2010 | Dugan et al. |
| 2010/0144414 A1 | 6/2010 | Edis et al. |
| 2010/0144456 A1 | 6/2010 | Ahern |
| 2010/0144457 A1 | 7/2010 | Kim et al. |
| 2010/0178994 A1 | 7/2010 | Do et al. |
| 2010/0201512 A1 | 8/2010 | Stirling et al. |
| 2010/0204616 A1 | 8/2010 | Shears et al. |
| 2010/0216564 A1 | 8/2010 | Stites et al. |
| 2010/0222152 A1 | 9/2010 | Jaekel et al. |
| 2010/0308105 A1 | 12/2010 | Savarese et al. |
| 2010/0309097 A1 | 12/2010 | Raviv et al. |
| 2010/0323794 A1 | 12/2010 | Su |
| 2011/0004871 A1 | 1/2011 | Liu |
| 2011/0029235 A1 | 2/2011 | Berry |
| 2011/0037778 A1 | 2/2011 | Deng et al. |
| 2011/0050864 A1 | 3/2011 | Bond |
| 2011/0052005 A1 | 3/2011 | Selner |
| 2011/0053688 A1 | 3/2011 | Crawford |
| 2011/0075341 A1 | 3/2011 | Lau et al. |
| 2011/0081981 A1 | 4/2011 | Okamoto |
| 2011/0126184 A1 | 5/2011 | Lisboa |
| 2011/0165998 A1 | 7/2011 | Lau et al. |
| 2011/0195780 A1 | 8/2011 | Lu |
| 2011/0230273 A1 | 9/2011 | Niegowski et al. |
| 2011/0230274 A1 | 9/2011 | Lafortune et al. |
| 2011/0230985 A1 | 9/2011 | Niegowski et al. |
| 2011/0230986 A1 | 9/2011 | Lafortune |
| 2011/0238308 A1 | 9/2011 | Miller et al. |
| 2011/0305369 A1 | 12/2011 | Bentley |
| 2012/0023354 A1 | 1/2012 | Chino |
| 2012/0052972 A1 | 3/2012 | Bentley |
| 2012/0115626 A1 | 5/2012 | Davenport |
| 2012/0115682 A1 | 5/2012 | Homsi |
| 2012/0116548 A1 | 5/2012 | Goree et al. |
| 2012/0120572 A1 | 5/2012 | Bentley |
| 2012/0157241 A1 | 6/2012 | Nomura et al. |
| 2012/0179418 A1 | 7/2012 | Takasugi et al. |
| 2012/0179742 A1 | 7/2012 | Acharya et al. |
| 2012/0191405 A1 | 7/2012 | Molyneux et al. |
| 2012/0295726 A1 | 11/2012 | Cherbini |
| 2012/0316004 A1 | 12/2012 | Shibuya |
| 2013/0029791 A1 | 1/2013 | Rose et al. |
| 2013/0095941 A1 | 4/2013 | Bentley et al. |
| 2013/0110415 A1 | 5/2013 | Davis et al. |
| 2013/0128022 A1 | 5/2013 | Bose et al. |
| 2013/0173212 A1 | 7/2013 | Saiki et al. |
| 2013/0178304 A1 | 7/2013 | Chan |
| 2013/0191063 A1 | 7/2013 | Nomura |
| 2013/0225309 A1 | 8/2013 | Bentley et al. |
| 2013/0267335 A1 | 10/2013 | Boyd et al. |
| 2013/0271602 A1 | 10/2013 | Bentley et al. |
| 2013/0298668 A1 | 11/2013 | Sato |
| 2013/0319113 A1 | 12/2013 | Mizuta |
| 2013/0330054 A1 | 12/2013 | Lokshin |
| 2013/0332004 A1 | 12/2013 | Gompert et al. |
| 2013/0346013 A1 | 12/2013 | Lokshin |
| 2014/0019083 A1 | 1/2014 | Nakaoka |
| 2014/0100048 A1 | 4/2014 | Ota et al. |
| 2014/0100049 A1 | 4/2014 | Ota et al. |
| 2014/0100050 A1 | 4/2014 | Ota et al. |
| 2014/0135139 A1 | 5/2014 | Shibuya et al. |
| 2014/0156214 A1 | 6/2014 | Nomura |
| 2014/0172873 A1 | 6/2014 | Varoglu et al. |
| 2014/0200092 A1 | 7/2014 | Parke et al. |
| 2014/0200094 A1 | 7/2014 | Parke et al. |
| 2014/0229135 A1 | 8/2014 | Nomura |
| 2014/0229138 A1 | 8/2014 | Goree et al. |
| 2014/0257743 A1 | 9/2014 | Lokshin et al. |
| 2014/0257744 A1 | 9/2014 | Lokshin et al. |
| 2014/0295982 A1 | 10/2014 | Shibuya |
| 2014/0376876 A1 | 12/2014 | Bentley et al. |
| 2014/0378239 A1 | 12/2014 | Sato et al. |
| 2014/0379293 A1 | 12/2014 | Sato |
| 2014/0379294 A1 | 12/2014 | Shibuya et al. |
| 2014/0379295 A1 | 12/2014 | Sato et al. |
| 2015/0007658 A1 | 1/2015 | Ishikawa et al. |
| 2015/0012240 A1 | 1/2015 | Sato |
| 2015/0042481 A1 | 2/2015 | Nomura |
| 2015/0098688 A1 | 4/2015 | Lokshin |
| 2015/0124048 A1 | 5/2015 | King |
| 2015/0131845 A1 | 5/2015 | Forouhar et al. |
| 2015/0154452 A1 | 6/2015 | Bentley et al. |
| 2015/0256689 A1 | 9/2015 | Erkkila et al. |
| 2015/0348591 A1 | 12/2015 | Kaps et al. |
| 2017/0061817 A1 | 3/2017 | Mettler |

FOREIGN PATENT DOCUMENTS

| | | |
|---|---|---|
| JP | 2004207985 | 7/2004 |
| JP | 2011000367 | 1/2011 |
| JP | 2012196241 | 10/2012 |
| KR | 10-20030085275 | 11/2003 |
| KR | 10-20060041060 | 5/2006 |
| KR | 10-20070119018 | 12/2007 |
| KR | 10-20100074068 | 7/2010 |
| KR | 101079319 | 6/2011 |
| KR | 10-20100020131 | 9/2011 |
| WO | 1994027683 | 12/1994 |
| WO | 2007130057 A1 | 11/2007 |
| WO | 2009056688 A1 | 5/2009 |
| WO | 2011057194 | 5/2011 |
| WO | 2014085744 A1 | 6/2014 |

OTHER PUBLICATIONS

International Search Report received in PCT/US2016/042668, dated Oct. 4, 2016, 21 pages.
International Search Report received in PCT/US2016/042671, dated Oct. 13, 2016, 17 pages.
International Search Report and Written Opinion received in PCT/US2016/042676, dated Oct. 24, 2016 (12 pages).
International Preliminary Report on Patentability received in PCT/US2015/026917, dated Nov. 3, 2016 (5 pages).
International Search Report received for PCT Application No. PCT/US2012/065716, dated Jan. 3, 2013, 10 pages.
MyCaddie, 2009, retrieved on Sep. 26, 2012 from http://www.iMakePars.com, 4 pages.
Swing it See it Fix it, Improve Gold Swing, SwingSmart Golf Analyzer, retrieved on Sep. 26, 2012 from http://www.SwingSmart.com, 2 pages.
Learn how Swingbyte can improve your game, retrieved on Sep. 26, 2012 from http://www.swingbyte.com, 2 pages.

(56) References Cited

OTHER PUBLICATIONS

International Search Report received for PCT Application No. PCT/US2011/055173, dated Mar. 6, 2012, 8 pages.
International Search Report received for PCT Application No. PCT/U52011/049461, dated Feb. 23, 2012, 14 pages.
PCT Search Report, PCT/US2012/029310, dated Sep. 28, 2012, 3 pages.
IPRP, PCT/US2011/049461, dated Mar. 7, 2013, 6 pages.
IPRP, PCT/US2011/058182, dated Apr. 30, 2013, 5 pages.
IPER, PCT/US2011/055173, dated Apr. 25, 2013, 5 pages, (2013).
IPRP, PCT/US2012/065716, dated May 20, 2014, 6 pages.
International Search Report for PCT Application No. PCT/US2013/021999, dated Apr. 30, 2013, 8 pages.
International Search Report for PCT Application No. PCT/US2012/066915, dated Mar. 29, 2013, 10 pages.
International Search Report for PCT Application No. PCT/US2015/26896, dated Jul. 28, 2015, 15 pages.
International Search Report for PCT Application No. PCTUS2015/26917, dated Jul. 30, 2015, 16 pages.
The Nike+FuelBand User's Guide, rev 14, 26 pages, 2012.
UP by Jawbone Extended User Guide, 10 pages, 2012.
Armour39, Under Armour Guarantee, Getting Started, retrieved from the Internet on Jul. 12, 2013, 7 pages.
Armour39 Module & Chest Strap, retrieved from the Internet on Jul. 12, 2013, 6 pages.
miCoach Pacer User Manual, 31 pages, (2009).
Foreman et al. "A Comparative Analysis for the Measurement of Head Accelerations in Ice Hockey Helmets using Non-Accelerometer Based Systems," Nov. 19, 2012, 13 pages.
Reebok-CCM and MC10 to Launch Revolutionary Sports Impact Indicator, MC10 News (http://www.mc10inc.com/news/), Oct. 24, 2012, 3 pages.
CheckLight MC10 Overview, Reebok International Limited, Nov. 20, 2012, 7 pages.
Reebok and MC10 Team Up to Build CheckLight, a Head Impact Indicator (Hands-on), MC10 News (http://wvvw.mc10inc.com/news/), Jan. 11, 2013, 1 pg.
Trace—The Most Advanced Activity Monitor for Action Sports, webpage, retrieved on Aug. 6, 2013, 22 pages.
CheckLight, Sports/Activity Impact Indicator, User Manual, 13 pages, 2013, Reebok International Limited.
King, The Design and Application of Wireless Mems Inertial Measurement Units for the Measurement and Analysis of Golf Swings, 2008.
Grober, An Accelerometer Based Instrumentation of the Golf Club: Comparative Analysis of Golf Swings, 2009.
Gehrig et al, Visual Golf Club Tracking for Enhanced Swing Analysis, Computer Vision Lab, Lausanne, Switzerland, 2003.
Pocketpro Golf Designs, PocketPro Full Swing Analysis in Your Pocket, www.PocketPro.org, (2011).
Clemson University, Golf Shot Tutorial, http://www.webnucleo.org/home/online_tools/newton/0.4/html/about_this_tool/tutorials/golf_1.shp.cgi, retrieved on Nov. 10, 2011.
miCoach Speed_Cell TM, User Manual, 23 pages, (2011).
Nike+iPod, User Guide, 32 pages (2010).
SureShotGPS SS9000X, Intelligent Touch, Instruction Manual, 25 page, 2011.
ActiveReplay, "TRACE—The Most Advanced Activity Monitor for Action Sports", http://www.kickstarter.com/projects/activereplay/trace-the-most-advanced-activity-monitor-for-actio, 13 pages, Oct. 1, 2013.
ZEPP Golfsense@Launch2011, https://www.youtube.com/watch?v=VnOcu8szjIk (video), Mar. 14, 2011.
Epson US Newsroom, "Epson America Enters Sports Wearables Market with Introduction of M-Tracer MT500GII Golf Swing Analyzer", www.news.epson.com, Jan. 5, 2015, 4 pages.
International Search Report and Written Opinion dated Dec. 22, 2015 received in PCTUS1561695, 7 pages.
Search Report Received in PCT2013021999 dated Jan. 21, 2016.
Patent Examination Report received in Australia Application No. 2011313952, dated Mar. 15, 2016, 5 pages.
"About Banjo"webpages retrieved from internet, dated 2015,
International Search Report and Written Opinion mailed in PCTUS1642674 dated Aug. 12, 2016, 9 pages.
International Search Report and Written Opinion received in PCT/US2017/52114, dated Oct. 3, 9 pages.
International Search Report and Written Opinion Received in PCT/US2017/37987, dated Nov. 9, 2017, 12 pages.
Supplementary Extended European Search Report received in 11820763.8 dated Nov. 13, 2017, 16 pages.
Supplementary Extended European Search Report received in 11833159.4 dated Nov. 6, 2017, 14 pages.
Supplementary Partial European Search Report received from EP Application Serial No. 11820763.8, dated Aug. 8, 2017, 15 pages.
Supplementary Partial European Search Report received from EP Application Serial No. 11833159.4, dated Aug. 8, 2017, 15 pages.
David E. Culler, et al., "Smart Sensors to Network the World", published in Scientific American Magazine, No. Jun. 2004, dated Jun. 1, 2004, pp. 85-91.
International Search Report and Written Opinion received in PCT/US2017/039209, dated Aug. 24, 2017, 7 pages.
International Preliminary Report on Patentability in PCTUS2015061695, dated Jun. 1, 2017, 5 pages.
European Search Report received in PCTUS2015026896 dated May 10, 2017, 13 pages.
Zepp Labs, Inc. v. Blast Motion, Inc. Petition for Inter Partes Review of U.S. Pat. No. 8,903,521 filed on Feb. 24, 2016, as IPR2016-00672, and accompanying Declaration of Dr. Steven M. Nesbit.
Zepp Labs, Inc. v. Blast Motion, Inc. Petition for Inter Partes Review of U.S. Pat. No. 9,039,527 filed on Feb. 24, 2016, as IPR2016-00674, and accompanying Declaration of Dr. Steven M. Nesbit.
Zepp Labs, Inc. v. Blast Motion, Inc. Petition for Inter Partes Review of U.S. Pat. No. 8,941,723 filed on Feb. 24, 2016, as IPR2016-00675, and accompanying Declaration of Dr. Steven M. Nesbit.
Zepp Labs, Inc. v. Blast Motion, Inc. Petition for Inter Partes Review of U.S. Pat. No. 8,905,855 filed on Feb. 24, 2016, as IPR2016-00676, and accompanying Declaration of Dr. Steven M. Nesbit.
Zepp Labs, Inc. v. Blast Motion, Inc. Petition for Inter Partes Review of U.S. Pat. No. 8,944,928 filed on Feb. 24, 2016, as IPR2016-00677, and accompanying Declaration of Dr. Steven M. Nesbit.
Chris Otto, et al, "System Architecture of a Wireless Body Area Sensor Network for Ubiquitous Health Monitoring", *Journal of Mobile Multimedia*, vol. 1, No. 4, Jan. 10, 2006, University of Alabama in Huntsville, 20 Pages.
Linx Technologies "High Performance RF Module: Hp3 Series Transmitter Module Data Guide Description", Jul. 27, 2011, 13 pages.
Roger Allan, "Wireless Sensor Architectures Uses Bluetooth Standard", www.electronicdesign.com/communications/wireless-sensor-architecture-uses-bluetooth-standard, Aug. 7, 2000, 5 pages.
Don Tuite, "Motion-Sensing MEMS Gyros and Accelerometers are Everywhere", www.electronicdesign.com/print/analog/motion-sensing-mems-gyros-and-accelerometers-are-everywehre, Jul. 9, 2009, 6 pages.
InvenSense News Release, "InvenSense Unveils World's $1^{st}$ IMU Solution for Consumer Applications", ir.invensense.com, 2016, 2 Pages.
Dean Takahashi, "Facebook, Twitter, Last.fm coming to Xbox Live this Fall", Jun. 1, 2009, Webpage printout, 5 pages.
The iClub System, Products pages, www.iclub.net, 2001-2005, 5 pages.
Websters New College Dictionary, Definition of "Virtual Reality", Third Edition, 2005, 3 Pages.
SmartSwing, "SmartSwing Introduces Affordable Intelligent Golf Club", www.smartswinggolf.com, Jan. 2006, 2 pages.
Henrick Arfwedson, et al., "Ericsson's Bluetooth modules", Ericsson Review No. 4, 1999, 8 pages.
ZigBees, "Zigbee information" www.zigbees.com , 2015, 4 pages.
SolidState Technology, "MEMS enable smart golf clubs", www.electroiq.com, 2005, 3 pages.
IGN, "Japanese WII Price Release Date Revealed", www.ign.com, 2006, 1 page.

(56) References Cited

OTHER PUBLICATIONS

First Annual Better Golf Through Technology Conference 2006 webpage, www.bettergolfthroughtechnology.com , Massachusetts Institute of Technology, Cambridge Massachusetts, Feb. 2006, 1 page.
Concept2Rowing, "Training" web content, www.concept2.com, 2009, 1 page.
Expresso, Products pages, www.expresso.com/products , 2009, 2 pages.
Manish Kalia, et al., "Efficient Policies for Increasing Capacity in Bluetooth: An Indoor Pico-Cellular Wireless System", IBM India Research Laboratory, Indian Institute of Technology, 2000, 5 pages.
R. Rao, et al., "Demand-Based Bluetooth Scheduling", Pennsylvania State University, 2001, 13 pages.

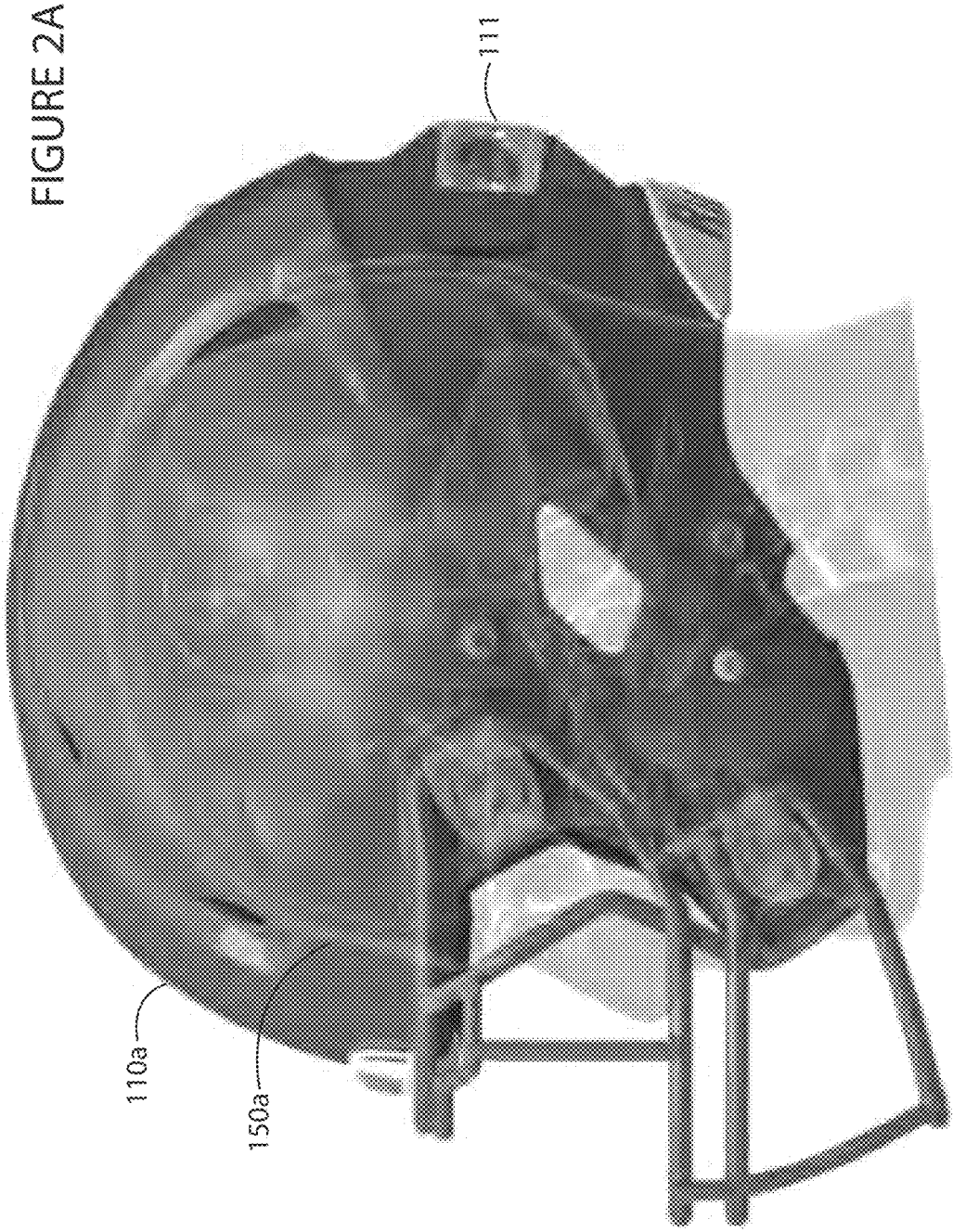

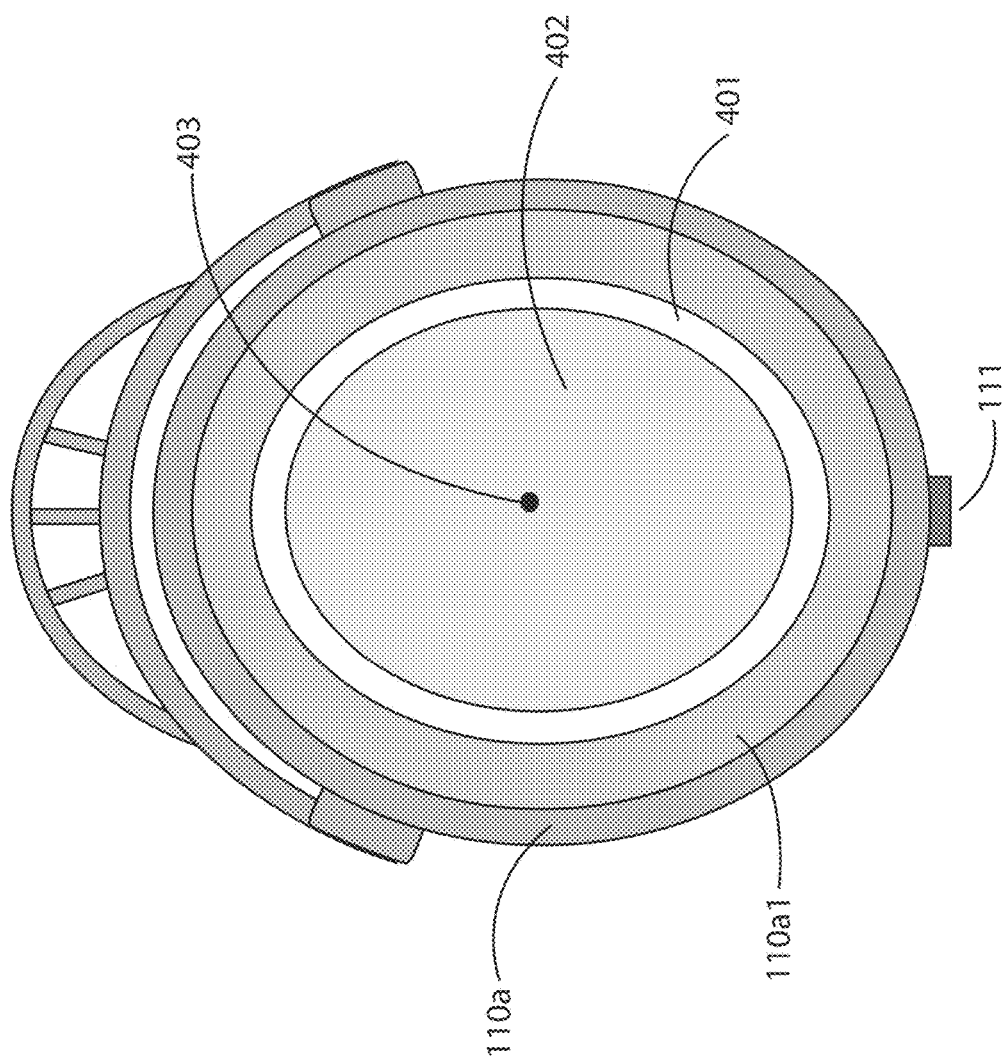

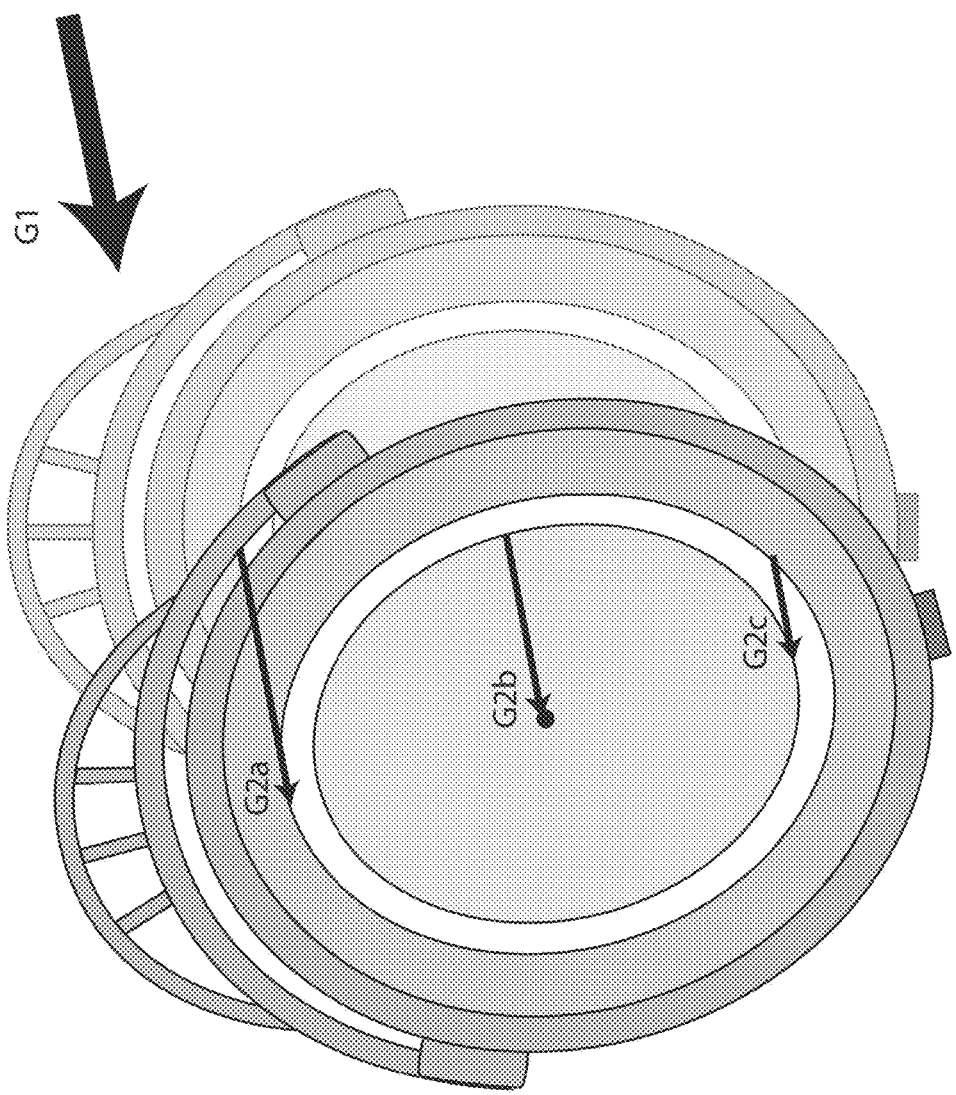

FIGURE 6
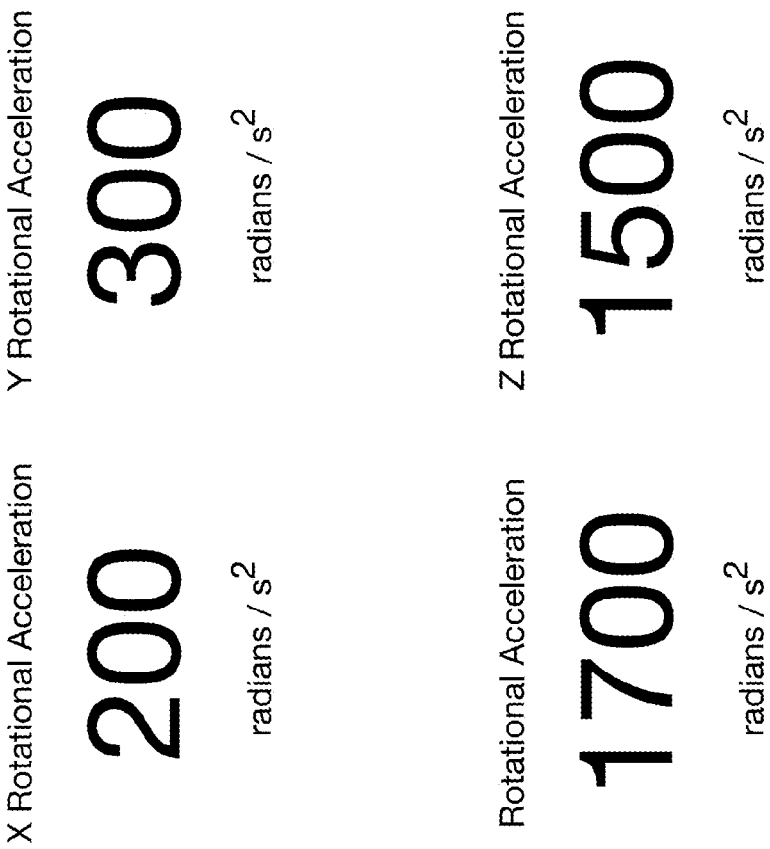
X Rotational Acceleration 200 radians / s²
Y Rotational Acceleration 300 radians / s²
Z Rotational Acceleration 1500 radians / s²
Rotational Acceleration 1700 radians / s²

FIGURE 7
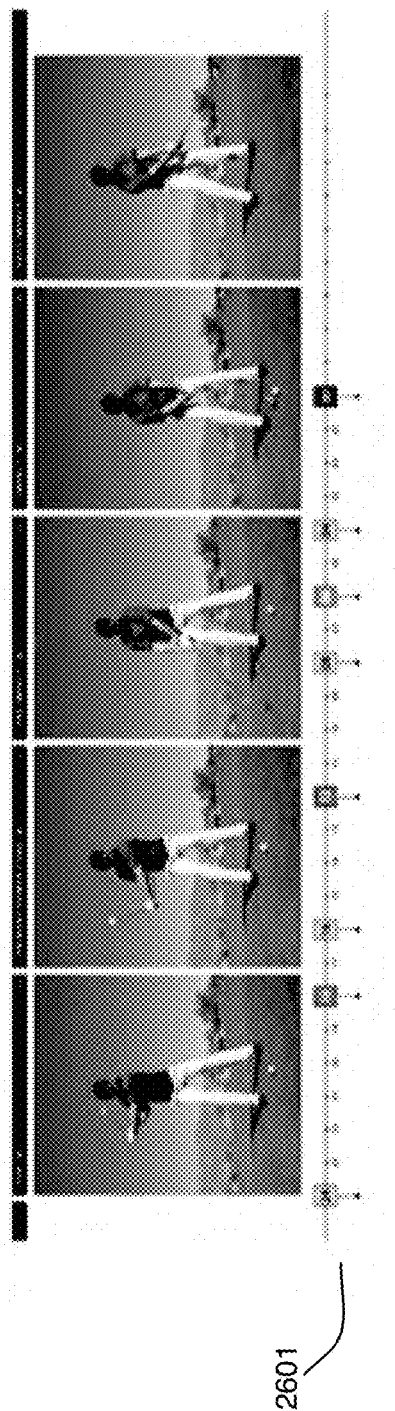
2601
2602
LEAD / DROOP
LAG / DRIFT

FIGURE 14
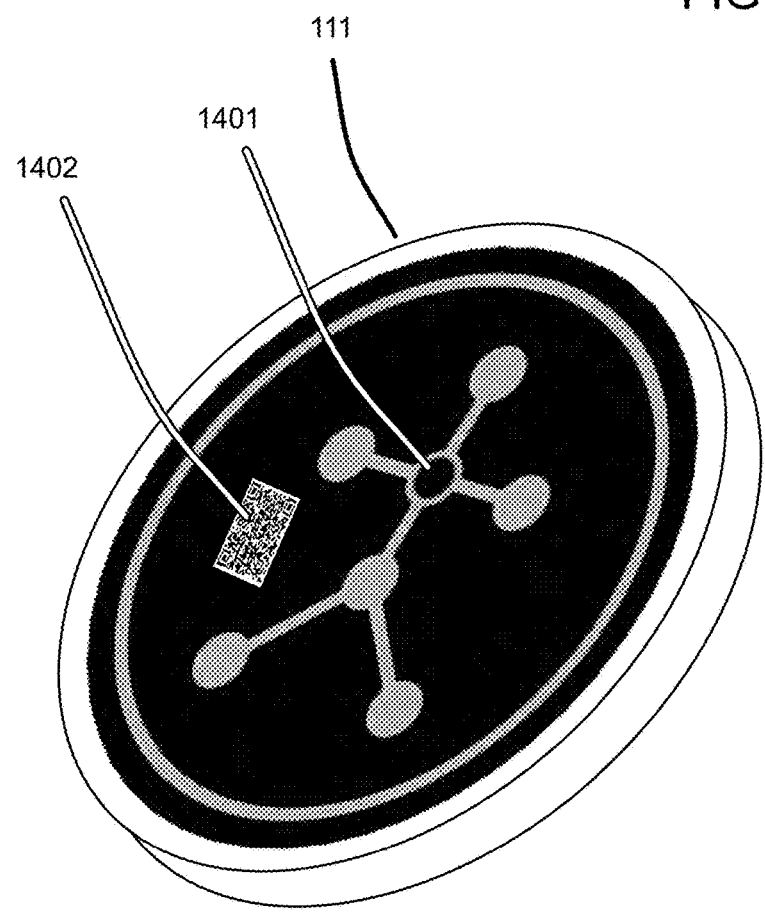

FIGURE 15
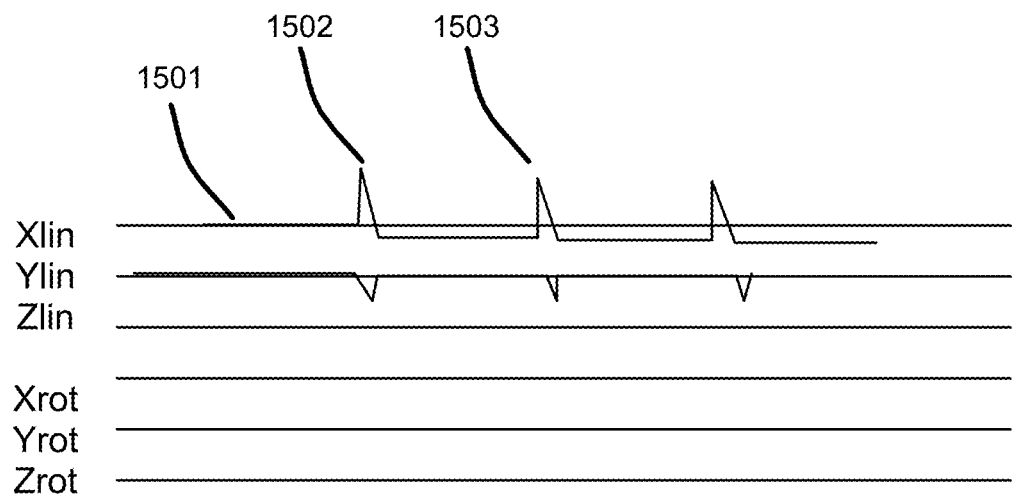
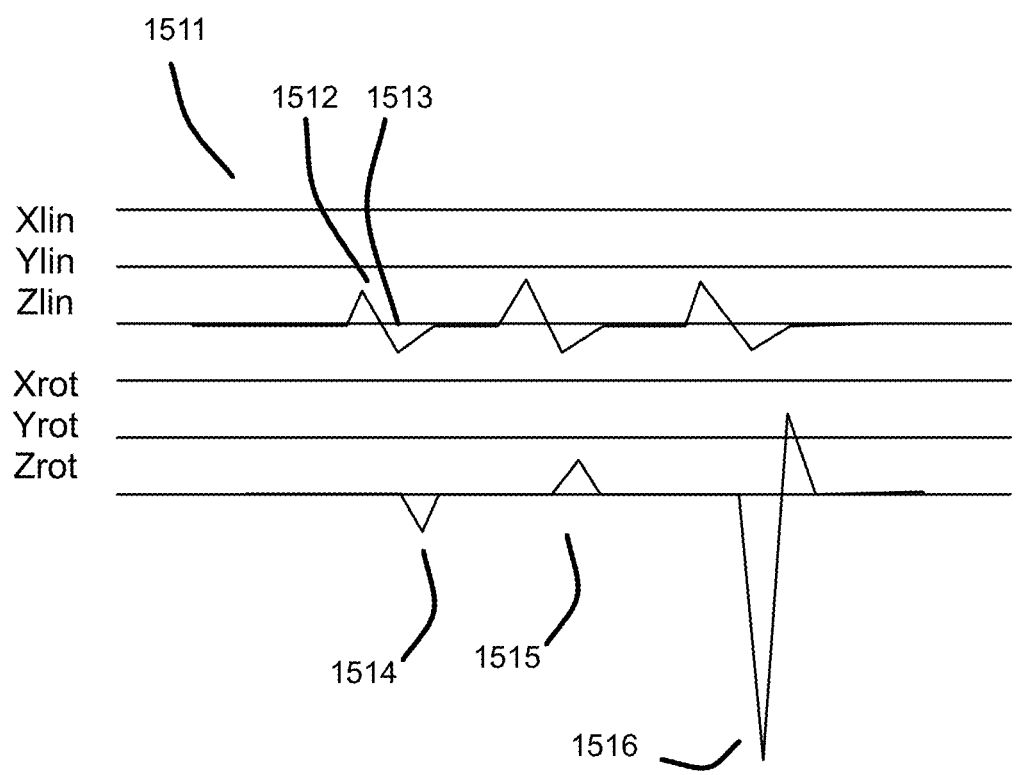

FIGURE 17
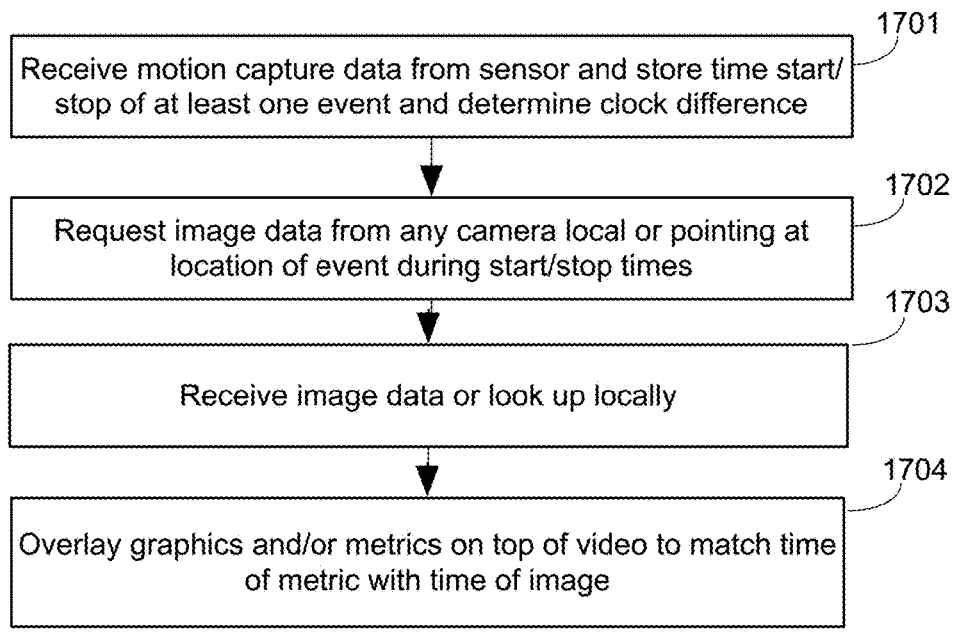

MULTI-SENSOR EVEN ANALYSIS AND TAGGING SYSTEM

This application is a continuation of U.S. Utility patent application Ser. No. 15/087,776 filed 31 Mar. 2016, which is a continuation in part of U.S. Utility patent application Ser. No. 14/801,568 filed 16 Jul. 2015, which is a continuation in part of U.S. Utility patent application Ser. No. 14/549,422 filed 20 Nov. 2014, which is a continuation in part of U.S. Utility patent application Ser. No. 14/257,959 filed 21 Apr. 2014, which is a continuation in part of U.S. Utility patent application Ser. No. 13/914,525, filed 10 Jun. 2013, now U.S. Pat. No. 8,702,516, which is a continuation in part of U.S. Utility patent application Ser. No. 13/679,879 filed 16 Nov. 2012, which is a continuation in part of U.S. Utility patent application Ser. No. 13/298,158 filed 16 Nov. 2011, which is a continuation in part of U.S. Utility patent application Ser. No. 13/267,784 filed 6 Oct. 2011, which is a continuation in part of U.S. Utility patent application Ser. No. 13/219,525 filed 26 Aug. 2011, which is a continuation in part of U.S. Utility patent application Ser. No. 13/191,309 filed 26 Jul. 2011, which is a continuation in part of U.S. Utility patent application Ser. No. 13/048,850 filed 15 Mar. 2011, which is a continuation in part of U.S. Utility patent application Ser. No. 12/901,806 filed 11 Oct. 2010, which is a continuation in part of U.S. Utility patent application Ser. No. 12/868,882 filed 26 Aug. 2010, the specifications of which are hereby incorporated herein by reference.

This application is a continuation of U.S. Utility patent application Ser. No. 15/087,776 filed 31 Mar. 2016, which is a continuation in part of U.S. Utility patent application Ser. No. 14/801,568 filed 16 Jul. 2015, which is also a continuation in part of U.S. Utility patent application Ser. No. 13/757,029, filed 1 Feb. 2013, the specification of which is hereby incorporated herein by reference.

BACKGROUND OF THE INVENTION

Field of the Invention

One or more embodiments of the invention are related to the field of motion capture data analysis using sensor data or video information or both sensor and video data. More particularly, but not by way of limitation, one or more embodiments of the invention enable a multi-sensor event analysis and tagging system that combines data from multiple types of sensors to analyze motion. Enables intelligent synchronization and transfer of generally concise event videos synchronized with motion data from motion capture sensor(s) coupled with a user or piece of equipment. Greatly saves storage and increases upload speed by either discarding non-event video or uploading event videos and avoiding upload of non-pertinent portions of large videos or both discarding non-event video and transferring event videos. Motion events may be correlated and/or otherwise synchronized with image(s) or video, as the events happen or at a later time based on location and/or time of the event or both, for example on the mobile device or on a remote server, and as captured from internal/external camera(s) or nanny cam, for example to enable saving video of the event, such as the first steps of a child, violent shaking events, sporting, military or other motion events including concussions, or falling events associated with an elderly person and for example discarding non-event related video data, to greatly reduce storage requirements for event videos. Sensor fusion may be used to combine sensor data and video data to create integrated motion metrics.

Description of the Related Art

Methods for analyzing motion of an object generally use one of two approaches: either motion sensors are attached to an object and sensor data is collected and analyzed, or stationary devices such as video cameras or radars are configured to observe moving objects. Generally, these approaches are not used in combination. For example, motion sensors may include inertial sensors that capture acceleration and gyroscope data, which is then integrated to measure an object's trajectory. Video analysis of motion may include traditional motion capture systems that use special reflective markers, or more sophisticated methods that use image processing to locate and track objects without markers.

Motion analysis methods based on a single type of sensor (such as a motion sensor, a video camera, or a radar) have limitations. For example, inertial sensor based methods typically require initialization, which is not always possible. They are also not very accurate over long timeframes. Video based methods on the other hand may lose objects due to occlusion, and they typically have relatively low video frame rates limiting their precision.

While there are some systems that perform simple overlays of motion sensor data onto or associated with video, current methods generally do not integrate sensor based motion analysis and video based motion analysis. Such integration offers the potential for more accurate and complete motion analysis by combining the strengths of sensor data analysis and the strengths of video motion analysis. Full integration presents many technical challenges, including for example time synchronization of sensor and video data sources, robust object identification in videos, coordinate system alignment, and sensor fusion of the different types of information. No known methods address all of these technical challenges to form a complete solution for sensor and video integration.

In addition, existing motion capture systems process and potentially store enormous amounts of data with respect to the actual events of interest. For example, known systems capture accelerometer data from sensors coupled to a user or piece of equipment and analyze or monitor movement. In these scenarios, thousands or millions of motion capture samples are associated with the user at rest or not moving in a manner that is related to a particular event that the existing systems are attempting to analyze. For example, if monitoring a football player, a large amount of motion data is not related to a concussion event, for a baby, a large amount of motion data is not related in general to a shaking event or non-motion event such as sudden infant death syndrome (SIDS), for a golfer, a large amount of motion data captured by a sensor mounted on the player's golf club is of low acceleration value, e.g., associated with the player standing or waiting for a play or otherwise not moving or accelerating in a manner of interest. Hence, capturing, transferring and storing non-event related data increases requirements for power, bandwidth and memory.

In addition, video capture of a user performing some type of motion may include even larger amounts of data, much of which has nothing to do with an actual event, such as a swing of a baseball bat or home run. There are no known systems that automatically trim video, e.g., save event related video or even discard non-event related video, for example by uploading for example only the pertinent event video as determined by a motion capture sensor, without uploading the entire raw videos, to generate smaller video segments that correspond to the events that occur in the video and for example as detected through analysis of the motion capture data.

Some systems that are related to monitoring impacts are focused on linear acceleration related impacts. These systems are unable to monitor rotational accelerations or velocities and are therefore unable to detect certain types of events that may produce concussions. In addition, many of these types of systems do not produce event related, connectionless messages for low power and longevity considerations. Hence, these systems are limited in their use based on their lack of robust characteristics.

Known systems also do not contemplate data mining of events within motion data to form a representation of a particular movement, for example a swing of an average player or average professional player level, or any player level based on a function of events recognized within previously stored motion data. Thus, it is difficult and time consuming and requires manual labor to find, trim and designate particular motion related events for use in virtual reality for example. Hence, current systems do not easily enable a particular user to play against a previously stored motion event of the same user or other user along with a historical player for example. Furthermore, known systems do not take into account cumulative impacts, and for example with respect to data mined information related to concussions, to determine if a series of impacts may lead to impaired brain function over time.

Other types of motion capture systems include video systems that are directed at analyzing and teaching body mechanics. These systems are based on video recording of an athlete and analysis of the recorded video of an athlete. This technique has various limitations including inaccurate and inconsistent subjective analysis based on video for example. Another technique includes motion analysis, for example using at least two cameras to capture three-dimensional points of movement associated with an athlete. Known implementations utilize a stationary multi-camera system that is not portable and thus cannot be utilized outside of the environment where the system is installed, for example during an athletic event such as a golf tournament, football game or to monitor a child or elderly person. In general video based systems do not also utilize digital motion capture data from sensors on the object undergoing motion since they are directed at obtaining and analyzing images having visual markers instead of electronic sensors. These fixed installations are extremely expensive as well. Such prior techniques are summarized in U.S. Pat. No. 7,264,554, filed 26 Jan. 2006, which claims the benefit of U.S. Provisional Patent Application Ser. No. 60/647,751 filed 26 Jan. 2005, the specifications of which are both hereby incorporated herein by reference. Both disclosures are to the same inventor of the subject matter of the instant application.

Regardless of the motion capture data obtained, the data is generally analyzed on a per user or per swing basis that does not contemplate processing on a mobile phone, so that a user would only buy a motion capture sensor and an "app" for a pre-existing mobile phone. In addition, existing solutions do not contemplate mobile use, analysis and messaging and/or comparison to or use of previously stored motion capture data from the user or other users or data mining of large data sets of motion capture data, for example to obtain or create motion capture data associated with a group of users, for example professional golfers, tennis players, baseball players or players of any other sport to provide events associated with a "professional level" average or exceptional virtual reality opponent. To summarize, motion capture data is generally used for immediate monitoring or sports performance feedback and generally has had limited and/or primitive use in other fields.

Known motion capture systems generally utilize several passive or active markers or several sensors. There are no known systems that utilize as little as one visual marker or sensor and an app that for example executes on a mobile device that a user already owns, to analyze and display motion capture data associated with a user and/or piece of equipment. The data is generally analyzed in a laboratory on a per user or per swing basis and is not used for any other purpose besides motion analysis or representation of motion of that particular user and is generally not subjected to data mining.

There are no known systems that allow for motion capture elements such as wireless sensors to seamlessly integrate or otherwise couple with a user or shoes, gloves, shirts, pants, belts, or other equipment, such as a baseball bat, tennis racquet, golf club, mouth piece for a boxer, football or soccer player, or protective mouthpiece utilized in any other contact sport for local analysis or later analysis in such a small format that the user is not aware that the sensors are located in or on these items. There are no known systems that provide seamless mounts, for example in the weight port of a golf club or at the end shaft near the handle so as to provide a wireless golf club, configured to capture motion data. Data derived from existing sensors is not saved in a database for a large number of events and is not used relative to anything but the performance at which the motion capture data was acquired.

In addition, for sports that utilize a piece of equipment and a ball, there are no known portable systems that allow the user to obtain immediate visual feedback regarding ball flight distance, swing speed, swing efficiency of the piece of equipment or how centered an impact of the ball is, i.e., where on the piece of equipment the collision of the ball has taken place. These systems do not allow for user's to play games with the motion capture data acquired from other users, or historical players, or from their own previous performances. Known systems do not allow for data mining motion capture data from a large number of swings to suggest or allow the searching for better or optimal equipment to match a user's motion capture data and do not enable original equipment manufacturers (OEMs) to make business decisions, e.g., improve their products, compare their products to other manufacturers, up-sell products or contact users that may purchase different or more profitable products.

In addition, there are no known systems that utilize motion capture data mining for equipment fitting and subsequent point-of-sale decision making for instantaneous purchasing of equipment that fits an athlete. Furthermore, no known systems allow for custom order fulfillment such as assemble-to-order (ATO) for custom order fulfillment of sporting equipment, for example equipment that is built to customer specifications based on motion capture data mining, and shipped to the customer to complete the point of sales process, for example during play or virtual reality play.

In addition, there are no known systems that use a mobile device and RFID tags for passive compliance and monitoring applications.

There are no known systems that enable data mining for a large number of users related to their motion or motion of associated equipment to find patterns in the data that allows for business strategies to be determined based on heretofore undiscovered patterns related to motion. There are no known systems that enable obtain payment from OEMs, medical professionals, gaming companies or other end users to allow data mining of motion data.

Known systems such as Lokshin, United States Patent Publication No. 20130346013, published 26 Dec. 2013 and 2013033054 published 12 Dec. 2013 for example do not contemplate uploading only the pertinent videos that occur during event, but rather upload large videos that are later synchronized. Both Lokshin references does not contemplate a motion capture sensor commanding a camera to alter camera parameters on-the-fly based on the event, to provide increased frame rate for slow motion for example during the event video capture, and do not contemplate changing playback parameters during a portion of a video corresponding to an event. The references also do not contemplate generation of highlight reels where multiple cameras may capture an event, for example from a different angle and do not contemplate automatic selection of the best video for a given event. In addition, the references do not contemplate a multi-sensor environment where other sensors may not observe or otherwise detect an event, while the sensor data is still valuable for obtaining metrics, and hence the references do not teach saving event data on other sensors after one sensor has identified an event.

Associating one or more tags with events is often useful for event analysis, filtering, and categorizing. Tags may for example indicate the players involved in an event, the type of action, and the result of an action (such as a score). Known systems rely on manual tagging of events by human operators who review event videos and event data. For example, there are existing system for coaches to tag videos of sporting events or practices, for example to review a team's performance or for scouting reports. There are also systems for sports broadcasting that manually tag video events with players or actions. There are no known systems that analyze data from motion sensors, video, radar, or other sensors to automatically select one or more tags for an event based on the data. An automatic event tagging system would provide a significant labor saving over the current manual tagging methods, and would provide valuable information for subsequent event retrieval and analysis.

For at least the limitations described above there is a need for a multi-sensor event analysis and tagging system.

BRIEF SUMMARY OF THE INVENTION

One or more embodiments described in the specification are related to multi-sensor event analysis and tagging system. Embodiments of the invention enable intelligent synchronization and transfer of generally concise event videos synchronized with motion data from motion capture sensor(s) coupled with a user or piece of equipment. Greatly saves storage and increases upload speed by uploading event videos and avoiding upload of non-pertinent portions of large videos. Provides intelligent selection of multiple videos from multiple cameras covering an event at a given time, for example selecting one with least shake. Enables near real-time alteration of camera parameters during an event determined by the motion capture sensor, and alteration of playback parameters and special effects for synchronized event videos. Creates highlight reels filtered by metrics and can sort by metric. Integrates with multiple sensors to save event data even if other sensors do not detect the event. Also enables analysis or comparison of movement associated with the same user, other user, historical user or group of users. At least one embodiment provides intelligent recognition of events within motion data including but not limited to motion capture data obtained from portable wireless motion capture elements such as visual markers and sensors, radio frequency identification tags and mobile device computer systems, or calculated based on analyzed movement associated with the same user, or compared against the user or another other user, historical user or group of users. Enables low memory utilization for event data and video data by trimming motion data and videos to correspond to the detected events. This may be performed on the mobile device or on a remote server and based on location and/or time of the event and based on the location and/or time of the video, and may optionally include the orientation of the camera to further limit the videos that may include the motion events. Embodiments enable event based viewing and low power transmission of events and communication with an app executing on a mobile device and/or with external cameras to designate windows that define the events. Enables recognition of motion events, and designation of events within images or videos, such as a shot, move or swing of a player, a concussion of a player, boxer, rider or driver, or a heat stroke, hypothermia, seizure, asthma attack, epileptic attack or any other sporting or physical motion related event including walking and falling. Events may be correlated with one or more images or video as captured from internal/external camera or cameras or nanny cam, for example to enable saving video of the event, such as the first steps of a child, violent shaking events, sporting events including concussions, or falling events associated with an elderly person. Concussion related events and other events may be monitored for linear acceleration thresholds and/or patterns as well as rotational acceleration and velocity thresholds and/or patterns and/or saved on an event basis and/or transferred over lightweight connectionless protocols or any combination thereof. Generates integrated motion metrics using sensor fusion of motion capture sensor data and motion data derived from video analysis.

Embodiments of the invention enable a user to purchase an application or "app" and a motion capture element and immediately utilize the system with their existing mobile computer, e.g., mobile phone. Embodiments of the invention may display motion information to a monitoring user, or user associated with the motion capture element or piece of equipment. Embodiments may also display information based on motion analysis data associated with a user or piece of equipment based on (via a function such as but not limited to a comparison) previously stored motion capture data or motion analysis data associated with the user or piece of equipment or previously stored motion capture data or motion analysis data associated with at least one other user. This enables sophisticated monitoring, compliance, interaction with actual motion capture data or pattern obtained from other user(s), for example to play a virtual game using real motion data obtained from the user with responses generated based thereon using real motion data capture from the user previously or from other users (or equipment). This capability provides for playing against historical players, for example a game of virtual tennis, or playing against an "average" professional sports person, and is unknown in the art until now.

For example, one or more embodiments include at least one motion capture element configured to couple with a user or piece of equipment or mobile device coupled with the user, wherein the at least one motion capture element includes a memory, a sensor configured to capture any combination of values associated with an orientation, position, velocity, acceleration (linear and/or rotational) of the at least one motion capture element, a radio, and a microcontroller coupled with the memory, the sensor and the radio. The microcontroller is configured to collect data that includes sensor values from the sensor, store the data in the memory, analyze the data and recognize an event within the data to determine event data and transmit the event data associated with the event via the radio. Embodiments of the system may also include an application configured to execute on a mobile device wherein the mobile device includes a computer, a wireless communication interface configured to communicate with the radio to obtain the event data associated with the event. The computer is coupled with wireless communication interface wherein the computer executes the application or "app" to configure the computer to receive the event data from the wireless communication interface, analyze the event data to form motion analysis data, store the event data, or the motion analysis data, or both the event data and the motion analysis data, and display information comprising the event data, or the motion analysis data, or both associated with the at least one user on a display.

One or more embodiments include at least one motion capture sensor that is configured to be placed near the user's head wherein the microcontroller is further configured to calculate of a location of impact on the user's head. Embodiments of the at least one motion capture sensor may be configured to be coupled on a hat or cap, within a protective mouthpiece, using any type of mount, enclosure or coupling mechanism. One or more embodiments of the at least one motion capture sensor may be configured to be coupled with a helmet on the user's head and wherein the calculation of the location of impact on the user's head is based on the physical geometry of the user's head and/or helmet. Embodiments may include a temperature sensor coupled with the at least one motion capture sensor or with the microcontroller for example.

Embodiments of the invention may also utilize an isolator configured to surround the at least one motion capture element to approximate physical acceleration dampening of cerebrospinal fluid around the user's brain to minimize translation of linear acceleration and rotational acceleration of the event data to obtain an observed linear acceleration and an observed rotational acceleration of the user's brain. Thus, embodiments may eliminate processing to translate forces or acceleration values or any other values from the helmet based acceleration to the observed brain acceleration values. Therefore, embodiments utilize less power and storage to provide event specific data, which in turn minimizes the amount of data transfer, which yields lower transmission power utilization and even lower total power utilization. Different isolators may be utilized on a football/hockey/lacrosse player's helmet based on the type of padding inherent in the helmet. Other embodiments utilized in sports where helmets are not worn, or occasionally worn may also utilize at least one motion capture sensor on a cap or hat, for example on a baseball player's hat, along with at least one sensor mounted on a batting helmet. Headband mounts may also be utilized in sports where a cap is not utilized, such as soccer to also determine concussions. In one or more embodiments, the isolator utilized on a helmet may remain in the enclosure attached to the helmet and the sensor may be removed and placed on another piece of equipment that does not make use of an isolator that matches the dampening of a user's brain fluids. Embodiments may automatically detect a type of motion and determine the type of equipment that the motion capture sensor is currently attached to based on characteristic motion patterns associated with certain types of equipment, i.e., surfboard versus baseball bat.

Embodiments of the invention may be configured to obtain/calculate a linear acceleration value or a rotational acceleration value or both. This enables rotational events to be monitored for concussions as well as linear accelerations. Other events may make use of the linear and/or rotational acceleration and/or velocity, for example as compared against patterns or templates to not only switch sensor personalities during an event to alter the capture characteristics dynamically, but also to characterize the type of equipment currently being utilized with the current motion capture sensor. This enables a single motion capture element purchase by a user to instrument multiple pieces of equipment or clothing by enabling the sensor to automatically determine what type of equipment or piece of clothing the sensor is coupled to based on the motion captured by the sensor when compared against characteristic patterns or templates of motion.

Embodiments of the invention may transmit the event data associated with the event using a connectionless broadcast message. In one or more embodiments, depending on the wireless communication employed, broadcast messages may include payloads with a limited amount of data that may be utilized to avoid handshaking and overhead of a connection based protocol. In other embodiments connectionless or connection based protocols may be utilized in any combination.

In one or more embodiments, the computer may access previously stored event data or motion analysis data associated with the user or piece of equipment, for example to determine the number of concussions or falls or other swings, or any other motion event. Embodiments may also present event data associated with the at least one user on a display based on the event data or motion analysis data associated with the user or piece of equipment and the previously stored event data or motion analysis data associated with the user or piece of equipment or with at least one other user or other piece of equipment. This enables comparison of motion events, in number or quantitative value, e.g., the maximum rotational acceleration observed by the user or other users in a particular game or historically. In addition, patterns or templates that define characteristic motion of particular pieces of equipment for typical events may be dynamically updated, for example on a central server or locally, and dynamically updated in motion capture sensors via the wireless interface in one or more embodiments. This enables sensors to improve over time.

Embodiments of the invention may transmit the information to a display on a visual display coupled with the computer or a remote computer, for example over broadcast television or the Internet for example. Embodiments of the display may also be configured to accept sub-event time locations to provide discrete scrolling along the timeline of the whole event. For example a golf swing may include sub-events such as an address, swing back, swing forward, strike, follow through. The system may display time locations for the sub-events and accept user input near the location to assert that the video should start or stop at that point in time, or scroll to or back to that point in time for ease of viewing sub-events for example.

Embodiments of the invention may also include an identifier coupled with the at least one motion capture sensor or the user or the piece of equipment. In one or more embodiments, the identifier may include a team and jersey number or student identifier number or license number or any other identifier that enables relatively unique identification of a particular event from a particular user or piece of equipment. This enables team sports or locations with multiple players or users to be identified with respect to the app that is configured to receive data associated with a particular player or user. One or more embodiments receive the identifier, for example a passive RFID identifier or MAC address or other serial number associated with the player or user and associate the identifier with the event data and motion analysis data.

One or more embodiments of the at least one motion capture element may further include a light emitting element configured to output light if the event occurs. This may be utilized to display a potential, mild or severe level of concussion on the outer portion of the helmet without any required communication to any external device for example. Different colors or flashing intervals may also be utilized to relay information related to the event. Alternatively, or in combination, the at least one motion capture element may further include an audio output element configured to output sound if the event occurs or if the at least one motion capture sensor is out of range of the computer or wherein the computer is configured to display and alert if the at least one motion capture sensor is out of range of the computer, or any combination thereof. Embodiments of the sensor may also utilize an LCD that outputs a coded analysis of the current event, for example in a Quick Response (QR) code or bar code for example so that a referee may obtain a snapshot of the analysis code on a mobile device locally, and so that the event is not viewed in a readable form on the sensor or wirelessly transmitted and intercepted by anyone else.

In one or more embodiments, the at least one motion capture element further includes a location determination element coupled with the microcontroller. This may include a GPS (Global Positioning System) device for example. Alternatively, or in combination, the computer may triangulate the location in concert with another computer, or obtain the location from any other triangulation type of receiver, or calculate the location based on images captured via a camera coupled with the computer and known to be oriented in a particular direction, wherein the computer calculates an offset from the mobile device based on the direction and size of objects within the image for example.

In one or more embodiments, the computer is further configured to request at least one image or video that contains the event from at least one camera proximal to the event. This may include a broadcast message requesting video from a particular proximal camera or a camera that is pointing in the direction of the event. In one or more embodiments, the computer is further configured to broadcast a request for camera locations proximal to the event or oriented to view the event, and optionally display the available cameras, or videos therefrom for the time duration around the event of interest. In one or more embodiments, the computer is further configured to display a list of one or more times at which the event has occurred, which enables the user obtain the desired event video via the computer, and/or to independently request the video from a third party with the desired event times.

In one or more embodiments, the at least one motion capture sensor is coupled with the mobile device and for example uses an internal motion sensor within or coupled with the mobile device. This enables motion capture and event recognition with minimal and ubiquitous hardware, e.g., using a mobile device with a built-in accelerometer. In one or more embodiments, a first mobile device may be coupled with a user recording motion data, while a second mobile device is utilized to record a video of the motion. In one or more embodiments, the user undergoing motion may gesture, e.g., tap N times on the mobile device to indicate that the second user's mobile device should start recording video or stop recording video. Any other gesture may be utilized to communicate event related or motion related indications between mobile devices.

Embodiments of the at least one motion capture sensor may include a temperature sensor, or the microcontroller may otherwise be coupled with a temperature sensor. In these embodiments, the microcontroller is configured to transmit a temperature obtained from the temperature sensor as a temperature event, for example as a potential indication of heat stroke or hypothermia.

Thus embodiments of the invention may recognize any type of motion event, including events related to motion associated with the at least one motion capture sensor coupled with any combination of the user, or the piece of equipment or the mobile device or motion that is indicative of standing, walking, falling, a heat stroke, seizure, violent shaking, a concussion, a collision, abnormal gait, abnormal or non-existent breathing or any combination thereof or any other type of event having a duration of time during with motion occurs.

Embodiments of the invention may utilize data mining on the motion capture data to obtain patterns for users, equipment, or use the motion capture data or events of a given user or other user in particular embodiments of the invention. Data mining relates to discovering new patterns in large databases wherein the patterns are previously unknown. Many methods may be applied to the data to discover new patterns including statistical analysis, neural networks and artificial intelligence for example. Due to the large amount of data, automated data mining may be performed by one or more computers to find unknown patterns in the data. Unknown patterns may include groups of related data, anomalies in the data, dependencies between elements of the data, classifications and functions that model the data with minimal error or any other type of unknown pattern. Displays of data mining results may include displays that summarize newly discovered patterns in a way that is easier for a user to understand than large amounts of pure raw data. One of the results of the data mining process is improved market research reports, product improvement, lead generation and targeted sales. Generally, any type of data that will be subjected to data mining must be cleansed, data mined and the results of which are generally validated. Businesses may increase profits using data mining. Examples of benefits of embodiments of the invention include customer relationship management to highly target individuals based on patterns discovered in the data. In addition, market basket analysis data mining enables identifying products that are purchased or owned by the same individuals and which can be utilized to offer products to users that own one product but who do not own another product that is typically owned by other users.

Other areas of data mining include analyzing large sets of motion data from different users to suggest exercises to improve performance based on performance data from other users. For example if one user has less rotation of the hips during a swing versus the average user, then exercises to improve flexibility or strength may be suggested by the system. In a golf course embodiment, golf course planners may determine over a large amount of users on a golf course which holes should be adjusted in length or difficulty to obtain more discrete values for the average number of shots per hole, or for determining the amount of time between golfers, for example at a certain time of day or for golfers of a certain age. In addition, sports and medical applications of data mining include determining morphological changes in user performance over time, for example versus diet or exercise changes to determine what improves performance the most, or for example what times of the day, temperatures, or other conditions produce swing events that result in the furthest drive or lowest score. Use of motion capture data for a particular user or with respect to other users enables healthcare compliance, for example to ensure a person with diabetes moves a certain amount during the day, and morphological analysis to determine how a user's motion or range of motion has changed over time. Games may be played with motion capture data that enables virtual reality play against historical greats or other users. For example, a person may play against a previous performance of the same person or against the motion capture data of a friend. This allows users to play a game in a historic stadium or venue in a virtual reality environment, but with motion capture data acquired from the user or other users previously for example. Military planners may utilize the motion capture data to determine which soldiers are most fit and therefore eligible for special operations, or which ones should retire, or by coaches to determine when a player should rest based on the concussion events and severity thereof sustained by a player for example and potentially based on a mined time period where other users have increased performance after a concussion related event.

Embodiments of the system perform motion capture and/or display with an application for example that executes on mobile device that may include a visual display and an optional camera and which is capable of obtaining data from at least one motion capture element such as a visual marker and/or a wireless sensor. The system can also integrate with standalone cameras, or cameras on multiple mobile devices. The system also enables the user to analyze and display the motion capture data in a variety of ways that provide immediate easy to understand graphical information associated with the motion capture data. Motion capture elements utilized in the system intelligently store data for example related to events associated with striking a ball, making a ski turn, jumping, etc., and eliminate false events, and greatly improve memory usage and minimize storage requirements. In addition, the data may be stored for example for more than one event associated with the sporting equipment, for example multiple bat swings or for an entire round of golf or more if necessary at least until the data is downloaded to a mobile device or to the Internet. Data compression of captured data may also be utilized to store more motion capture data in a given amount of memory. Motion capture elements utilized in the system may also be configured to intelligently power down portions of their circuitry to save power, for example power down transceivers until motion is detected of a certain type. Embodiments of the invention may also utilize flexible battery connectors to couple two or more batteries in parallel to increase the time the system may be utilized before replacing the batteries. Motion capture data is generally stored in memory such as a local database or in a network accessible database, any of which enables data mining described above. Any other type of data mining may be performed using embodiments of the invention, including searching for temporal changes of data related to one or more users and or simply searching for data related to a particular user or piece of equipment.

Other embodiments may display information such as music selections or music playlists to be played based on the motion related data. This for example enables a performance to be compared to another user's performance and select the type of music the other user plays, or to compare the performance relative to a threshold that determines what type of music selection to suggest or display.

Embodiments of the invention directed sports for example enable RFID or passive RFID tags to be placed on items that a user moves wherein embodiments of the system keep track of the motion. For example, by placing passive RFID tags on a particular helmet or cap, or protective mouthpiece for boxing, football, soccer or other contact sport, particular dumbbells at a gym, and by wearing motion capture elements such as gloves and with a pre-existing mobile device for example an IPHONE®, embodiments of the invention provide automatic safety compliance or fitness and/or healthcare compliance. This is achieved by keeping track of the motion, and via RFID or passive RFID, the weight that the user is lifting. Embodiments of the invention may thus add the number of repetitions multiplied by the amount of weight indicated by each RFID tag to calculate the number of calories burned by the user. In another example, an RFID tag coupled with a stationary bike, or wherein the stationary bike can mimic the identifier and/or communicate wirelessly to provide performance data and wherein the mobile computer includes an RFID reader, the number of rotations of the user's legs may be counted. Any other use of RFID or passive RFID is in keeping with the spirit of the invention. This enables doctors to remotely determine whether a user has complied with their medical recommendations, or exceeded linear or rotational acceleration indicative of a concussion for example. Embodiments may thus be utilized by users to ensure compliance and by doctors to lower their malpractice insurance rates since they are ensuring that their patients are complying with their recommendations, albeit remotely. Embodiments of the invention do not require RFID tags for medical compliance, but may utilize them. Embodiments of the invention directed at golf also enable golf shots for each club associated with a golfer to be counted through use of an identifier such as RFID tags on each club (or optionally via an identifier associated with motion capture electronics on a golf club or obtained remotely over the radio) and a mobile computer, for example an IPHONE® equipped with an RFID reader that concentrates the processing for golf shot counting on the mobile computer instead of on each golf club. Embodiments of the invention may also allow for the measurement of orientation (North/South, and/or two horizontal axes and the vertical axis) and acceleration using an inertial measurement unit, or accelerometers and/or magnetometers, and/or gyroscopes. This is not required for golf shot counting, although one or more embodiments may determine when the golf club has struck a golf ball through vibration analysis for example and then query a golfer whether to count a shot or not. This functionality may be combined with speed or acceleration threshold or range detection for example to determine whether the golf club was travelling within an acceptable speed or range, or acceleration or range for the "hit" to count. Wavelets may also be utilized to compare valid swing signatures to eliminate count shots or eliminate false strikes for example. This range may vary between different clubs, for example a driver speed range may be "greater than 30 mph" while a putter speed range may be "less than 20 mph", any range may be utilized with any club as desired, or the speed range may be ignored for example. Alternatively or in combination, the mobile computer may only query the golfer to count a shot if the golfer is not moving laterally, i.e., in a golf cart or walking, and/or wherein the golfer may have rotated or taken a shot as determined by a orientation or gyroscope sensor coupled with the mobile computer. The position of the stroke may be shown on a map on the mobile computer for example. In addition, GPS receivers with wireless radios may be placed within the tee markers and in the cups to give daily updates of distances and helps with reading putts and greens for example. The golfer may also wear virtual glasses that allow the golfer to see the golf course map, current location, distance to the hole, number of shots on the current hole, total number of shots and any other desired metric. If the user moves a certain distance, as determined by GPS for example, from the shot without counting the shot, the system may prompt the user on whether to count the shot or not. The system does not require a user to initiate a switch on a club to count a shot and does not require LED's or active or battery powered electronics on each club to count shots. The mobile computer may also accept gestures from the user to count a shot or not count a shot so that the golfer does not have to remove any gloves to operate the mobile computer. For embodiments that utilize position/orientation sensors, the system may only count shots when a club is oriented vertically for example when an impact is detected. The apparatus may also include identifiers that enable a specific apparatus to be identified. The identifiers may be a serial number for example. The identifier for example may originate from an RFID tag on each golf club, or optionally may include a serial number or other identifier associated with motion capture elements associated with a golf club. Utilizing this apparatus enables the identification of a specific golfer, specific club and also enables motion capture and/or display with a system that includes a television and/or mobile device having a visual display and an optional camera and capable of obtaining data from at least one motion capture element such as a visual marker and/or a wireless sensor. The system can also integrate with standalone cameras, or cameras on multiple mobile devices. The system also enables the user to analyze and display the motion capture data in a variety of ways that provide immediate and easy to understand graphical information associated with the motion capture data. The apparatus enables the system to also determine how "centered" an impact is with respect to a ball and a piece of equipment, such as a golf club for example. The system also allows for fitting of equipment including shoes, clubs, etc., and immediate purchasing of the equipment even if the equipment requires a custom assemble-to-order request from a vendor. Once the motion capture data, videos or images and shot count indications are obtained by the system, they may be stored locally, for example in a local database or sent over a telephonic or wireless interface to a remote database for example. Once in a database, the various elements including any data associated with the user, such as age, sex, height, weight, address, income or any other related information may be utilized in embodiments of the invention and/or subjected to data mining. One or more embodiments enable users or OEMs for example to pay for access to the data mining capabilities of the system.

For example, embodiments that utilize motion capture elements allow for analyzing the data obtained from the apparatus and enable the presentation of unique displays associated with the user, such as 3D overlays onto images of the body of the user to visually depict the captured motion data. In addition, these embodiments may also utilize active wireless technology such as BLUETOOTH® Low Energy for a range of up to 50 meters to communicate with a golfer's mobile computer. Embodiments of the invention also allow for display of queries for counting a stroke for example as a result of receiving a golf club ID, for example via an RFID reader or alternatively via wireless communication using BLUETOOTH® or IEEE 802.11 for example. Use of BLUETOOTH® Low Energy chips allows for a club to be in sleep mode for up to 3 years with a standard coin cell battery, thus reducing required maintenance. One or more embodiments of the invention may utilize more than one radio, of more than one technology for example. This allows for a level of redundancy that increases robustness of the system. For example, if one radio no longer functions, e.g., the BLUETOOTH® radio for example, then the IEEE 802.11 radio may be utilized to transfer data and warn the golfer that one of the radios is not functioning, while still allowing the golfer to record motion data and count shots associated with the particular club. For embodiments of the invention that utilize a mobile device (or more than one mobile device) without camera(s), sensor data may be utilized to generate displays of the captured motion data, while the mobile device may optionally obtain images from other cameras or other mobile devices with cameras. For example, display types that may or may not utilize images of the user may include ratings, calculated data and time line data. Ratings associated with the captured motion can also be displayed to the user in the form of numerical or graphical data with or without a user image, for example an "efficiency" rating. Other ratings may include linear acceleration and/or rotational acceleration values for the determination of concussions and other events for example. Calculated data, such as a predicted ball flight path data can be calculated and displayed on the mobile device with or without utilizing images of the user's body. Data depicted on a time line can also be displayed with or without images of the user to show the relative peaks of velocity for various parts of the equipment or user's body for example. Images from multiple cameras including multiple mobile devices, for example from a crowd of golf fans, may be combined into a BULLET TIME® visual effect characterized by slow motion of the golf swing shown from around the golfer at various angles at normal speed. All analyzed data may be displayed locally, or uploaded to the database along with the motion capture data, images/videos, shot count and location data where it may undergo data mining processes, wherein the system may charge a fee for access to the results for example.

In one or more embodiments, a user may play a golf course or hit tennis balls, or alternatively simply swing to generate motion capture data for example and when wearing virtual reality glasses, see an avatar of another user, whether virtual or real in an augmented reality environment. In other embodiments, the user moves a piece of equipment associated with any sport or simply move the user's own body coupled with motion capture sensors and view a virtual reality environment displayed in virtual reality glasses of the user's movement or movement of a piece of equipment so instrumented. Alternatively or in combination, a virtual reality room or other environment may be utilized to project the virtual reality avatars and motion data. Hence, embodiments of the system may allow a user on a real golf course to play along with another user at a different location that is not actually hitting balls along with a historical player whose motion data has been analyzed or a data mining constructed user based on one or more motion capture data sequences, and utilized by an embodiment of the system to project an avatar of the historical player. Each of the three players may play in turn, as if they were located in the same place.

Motion capture data and/or events can be displayed in many ways, for example tweeted, to a social network during or after motion capture. For example, if a certain amount of exercise or motion is performed, or calories performed, or a new sports power factor maximum has been obtained, the system can automatically tweet the new information to a social network site so that anyone connected to the Internet may be notified. Motion capture data, motion analyses, and videos may be transmitted in one or more embodiments to one or more social media sites, repositories, databases, servers, other computers, viewers, displays, other mobile devices, emergency services, or public agencies. The data uploaded to the Internet, i.e., a remote database or remote server or memory remote to the system may be viewed, analyzed or data mined by any computer that may obtain access to the data. This allows for remote compliance tweeting and/or compliance and/or original equipment manufacturers to determine for a given user what equipment for compliance or sporting equipment for sports related embodiments is working best and/or what equipment to suggest. Data mining also enables suggestions for users to improve their compliance and/or the planning of sports venues, including golf courses based on the data and/or metadata associated with users, such as age, or any other demographics that may be entered into the system. Remote storage of data also enables medical applications such as morphological analysis, range of motion over time, and diabetes prevention and exercise monitoring and compliance applications as stated. Other applications also allow for games that use real motion capture data from other users, or historical players whether alive or dead after analyzing videos of the historical players for example. Virtual reality and augmented virtual reality applications may also utilize the motion capture data or historical motion data. Military personnel such as commanders and/or doctors may utilize the motion and/or images in determine what type of G-forces a person has undergone from an explosion near an Improvised Explosive Device and automatically route the best type of medical aid automatically to the location of the motion capture sensor. One or more embodiments of the system may relay motion capture data over a G-force or velocity threshold, to their commanding officer or nearest medical personnel for example via a wireless communication link. Alternatively, embodiments of the invention may broadcast lightweight connectionless concussion related messages to any mobile devices listening, e.g., a referee's mobile phone to aid in the assistance of the injured player wherein the lightweight message includes an optional team/jersey number and an acceleration related number such as a potential/probable concussion warning or indicator.

In one or more embodiments of the invention, fixed cameras such as at a tennis tournament, football game, baseball game, car or motorcycle race, golf tournament or other sporting event can be utilized with a wireless interface located near the player/equipment having motion capture elements so as to obtain, analyze and display motion capture data. In this embodiment, real-time or near real-time motion data can be displayed on the video for augmented video replays. An increase in the entertainment level is thus created by visually displaying how fast equipment is moving during a shot, for example with rings drawn around a players hips and shoulders. Embodiments of the invention also allow images or videos from other players having mobile devices to be utilized on a mobile device related to another user so that users don't have to switch mobile phones for example. In one embodiment, a video obtained by a first user for a piece of sporting equipment in motion that is not associated with the second user having the video camera equipped mobile phone may automatically transfer the video to the first user for display with motion capture data associated with the first user. Video and images may be uploaded into the database and data mined through image analysis to determine the types/colors of clothing or shoes for example that users are wearing.

Based on the display of data, the user can determine the equipment that fits the best and immediately purchase the equipment, via the mobile device. For example, when deciding between two sets of skis, a user may try out both pairs that are instrumented with motion capture elements wherein the motion capture data is analyzed to determine which pair of skis enables more efficient movement. For golf embodiments, when deciding between two golf clubs, a user can take swings with different clubs and based on the analysis of the captured motion data and quantitatively determine which club performs better. Custom equipment may be ordered through an interface on the mobile device from a vendor that can assemble-to-order customer built equipment and ship the equipment to the user for example. Shaft lengths for putters for example that are a standard length can be custom made for a particular user based on captured motion data as a user putts with an adjustable length shaft for example. Based on data mining of the motion capture data and shot count data and distances for example allows for users having similar swing characteristics to be compared against a current user wherein equipment that delivers longer shots for a given swing velocity for a user of a particular size and age for example may be suggested or searched for by the user to improve performance. OEMs may determine that for given swing speeds, which make and model of club delivers the best overall performance as well. One skilled in the art will recognize that this applies to all activities involving motion, not just golf.

Embodiments of the system may utilize a variety of sensor types. In one or more embodiments of the invention, active sensors may integrate with a system that permits passive or active visual markers to be utilized to capture motion of particular points on a user's body or equipment. This may be performed in a simply two-dimensional manner or in a three-dimensional manner if the mobile device is configured with two or more cameras, or if multiple cameras or mobile devices are utilized to capture images such as video and share the images in order to create triangulated three-dimensional motion data from a set of two-dimensional images obtained from each camera. Another embodiment of the invention may utilize inertial measurement units (IMU) or any other sensors that can produce any combination of orientation, position, velocity and/or acceleration information to the mobile device. The sensors may thus obtain data that may include any combination of one or more values associated with orientation (vertical or North/South or both), position (either via through Global Positioning System, i.e., "GPS" or through triangulation), velocity (in all three axes), acceleration (in all three axes). All motion capture data obtained from the various sensor types may be saved in a database for analysis, monitoring, compliance, game playing or other use and/or data mining, regardless of the sensor type.

In one or more embodiments of the invention, a sensor may be utilized that includes a passive marker or active marker on an outside surface of the sensor, so that the sensor may also be utilized for visual tracking (either two-dimensional or three-dimensional) and for orientation, position, velocity, acceleration, angular velocity, angular acceleration or any other physical quantity produced by the sensor. Visual marker embodiments of the motion capture element(s) may be passive or active, meaning that they may either have a visual portion that is visually trackable or may include a light emitting element such as a light emitting diode (LED)

that allows for image tracking in low light conditions. This for example may be implemented with a graphical symbol or colored marker at the end of the shaft near the handle or at the opposing end of the golf club at the head of the club. Images or videos of the markers may be analyzed locally or saved in the database and analyzed and then utilized in data mining. In addition, for concussion related embodiments, the visual marker may emit a light that is indicative of a concussion, for example flashing yellow for a moderate concussion and fast flashing red for a sever concussion or any other visual or optional audio event indicators or both. As previously discussed, an LCD may output a local visual encoded message so that it is not intercepted or otherwise readable by anyone not having a mobile device local and equipped to read the code. This enables sensitive medical messages to only be read by a referee or local medical personnel for a concussion or paralysis related event for example.

Embodiments of the motion capture sensors may be generally mounted on or near one or more end or opposing ends of sporting equipment, for example such as a golf club and/or anywhere in between (for EI measurements) and may integrate with other sensors coupled to equipment, such as weapons, medical equipment, wristbands, shoes, pants, shirts, gloves, clubs, bats, racquets, balls, helmets, caps, mouthpieces, etc., and/or may be attached to a user in any possible manner. For example, a rifle to determine where the rifle was pointing when a recoil was detected by the motion capture sensor. This data may be transmitted to a central server, for example using a mobile computer such as a mobile phone or other device and analyzed for war games practice for example. In addition, one or more embodiments of the sensor can fit into a weight port of a golf club, and/or in the handle end of the golf club. Other embodiments may fit into the handle of, or end of, a tennis racquet or baseball bat for example. Embodiments that are related to safety or health monitoring may be coupled with a cap, helmet, and/or mouthpiece or in any other type of enclosure. One or more embodiments of the invention may also operate with balls that have integrated sensors as well. One or more embodiments of the mobile device may include a small mountable computer such as an IPOD® SHUFFLE® or IPOD® NANO® that may or may not have integrated displays, and which are small enough to mount on a shaft of a piece of sporting equipment and not affect a user's swing. Alternatively, the system may calculate the virtual flight path of a ball that has come in contact with equipment moved by a player. For example with a baseball bat or tennis racquet or golf club having a sensor integrated into a weight port of other portion of the end of the club striking the golf ball and having a second sensor located in the tip of the handle of the golf club, or in one or more gloves worn by the player, an angle of impact can be calculated for the club. By knowing the loft of the face of the club, an angle of flight may be calculated for the golf ball. In addition, by sampling the sensor at the end of the club at a high enough speed to determine oscillations indicative of where on the face of the club the golf ball was struck, a quality of impact may be determined. These types of measurements and the analysis thereof help an athlete improve, and for fitting purposes, allow an athlete to immediately purchase equipment that fits correctly. Centering data may be uploaded to the database and data mined for patterns related to the bats, racquets or clubs with the best centering on average, or the lowest torsion values for example on a manufacturer basis for product improvement. Any other unknown patterns in the data that are discovered may also be presented or suggested to users or search on by users, or paid for, for example by manufacturers or users.

One or more embodiments of the sensor may contain charging features such as mechanical eccentric weight, as utilized in some watches known as "automatic" or "self-winding" watches, optionally including a small generator, or inductive charging coils for indirect electromechanical charging of the sensor power supply. Other embodiments may utilize plugs for direct charging of the sensor power supply or electromechanical or microelectromechanical (MEMS) based charging elements. Any other type of power micro-harvesting technologies may be utilized in one or more embodiments of the invention. One or more embodiments of the sensor may utilize power saving features including gestures that power the sensor on or off. Such gestures may include motion, physical switches, contact with the sensor, wireless commands to the sensor, for example from a mobile device that is associated with the particular sensors. Other elements that may couple with the sensor includes a battery, low power microcontroller, antenna and radio, heat sync, recharger and overcharge sensor for example. In addition, embodiments of the invention allow for power down of some or all of the components of the system until an electronic signal from accelerometers or a mechanical switch determines that the club has moved for example.

One or more embodiments of the invention enable Elasticity Inertia or EI measurement of sporting equipment and even body parts for example. Placement of embodiments of the sensor along the shaft of a golf club, tennis racquet, baseball bat, hockey stick, shoe, human arm or any other item that is not perfectly stiff enables measurement of the amount of flex at points where sensors are located or between sensors. The angular differences in the each sensor over time allow for not only calculation of a flex profile, but also a flex profile that is dependent on time or force. For example, known EI machines use static weights between to support points to determine an EI profile. These machines therefore cannot detect whether the EI profile is dependent upon the force applied or is dependent on the time at which the force is applied, for example EI profiles may be non-linear with respect to force or time. Example materials that are known to have different physical properties with respect to time include Maxwell materials and non-Newtonian fluids.

A user may also view the captured motion data in a graphical form on the display of the mobile device or for example on a set of glasses that contains a video display. The captured motion data obtained from embodiments of the motion capture element may also be utilized to augment a virtual reality display of user in a virtual environment. Virtual reality or augmented reality views of patterns that are found in the database via data mining are also in keeping with the spirit of the invention. User's may also see augmented information such as an aim assist or aim guide that shows for example where a shot should be attempted to be placed for example based on existing wind conditions, or to account for hazards, e.g., trees that are in the way of a desired destination for a ball, i.e., the golf hole for example.

One or more embodiments of the invention include a motion event recognition and video synchronization system that includes at least one motion capture element configured to couple with a user or piece of equipment or mobile device coupled with the user. The at least one motion capture element may include a memory, a sensor configured to capture any combination of values associated with an orientation, position, velocity and acceleration of the at least one motion capture element, a radio, a microcontroller coupled with the memory, the sensor and the radio. The microcontroller may be configured to collect data that includes sensor values from the sensor, store the data in the memory, analyze the data and recognize an event within the data to determine event data, transmit the event data associated with the event via the radio. The system may also include a mobile device that includes a computer, a wireless communication interface configured to communicate with the radio to obtain the event data associated with the event, wherein the computer is coupled with wireless communication interface, wherein the computer is configured to receive the event data from the wireless communication interface. The computer may also analyze the event data to form motion analysis data, store the event data, or the motion analysis data, or both the event data and the motion analysis data, obtain an event start time and an event stop time from the event, request image data from camera that includes a video captured at least during a timespan from the event start time to the event stop time and display an event video on a display that includes both the event data, the motion analysis data or any combination thereof that occurs during the timespan from the event start time to the event stop time and the video captured during the timespan from the event start time to the event stop time.

Embodiments may synchronize clocks in the system using any type of synchronization methodology and in one or more embodiments the computer on the mobile device is further configured to determine a clock difference between the motion capture element and the mobile device and synchronize the motion analysis data with the video. For example, one or more embodiments of the invention provides procedures for multiple recording devices to synchronize information about the time, location, or orientation of each device, so that data recorded about events from different devices can be combined. Such recording devices may be embedded sensors, mobile phones with cameras or microphones, or more generally any devices that can record data relevant to an activity of interest. In one or more embodiments, this synchronization is accomplished by exchanging information between devices so that the devices can agree on a common measurement for time, location, or orientation. For example, a mobile phone and an embedded sensor may exchange messages with the current timestamps of their internal clocks; these messages allow a negotiation to occur wherein the two devices agree on a common time. Such messages may be exchanged periodically as needed to account for clock drift or motion of the devices after a previous synchronization. In other embodiments, multiple recording devices may use a common server or set of servers to obtain standardized measures of time, location, or orientation. For example, devices may use a GPS system to obtain absolute location information for each device. GPS systems may also be used to obtain standardized time. NTP (Network Time Protocol) servers may also be used as standardized time servers. Using servers allows devices to agree on common measurements without necessarily being configured at all times to communicate with one another.

In one or more embodiments of the invention, some of the recording devices are configured to detect the occurrence of various events of interest. Some such events may occur at specific moments in time; others may occur over a time interval, wherein the detection includes detection of the start of an event and of the end of an event. These devices are configured to record any combination of the time, location, or orientation of the recording device along with the event data, using the synchronized measurement bases for time, location, and orientation described above.

Embodiments of the computer on the mobile device may be further configured to discard at least a portion of the video outside of the event start time to the event stop. For example, in one or more embodiments of the invention, some of the recording devices capture data continuously to memory while awaiting the detection of an event. To conserve memory, some devices may be configured to store data to a more permanent local storage medium, or to a server, only when this data is proximate in time to a detected event. For example, in the absence of an event detection, newly recorded data may ultimately overwrite previously recorded data in memory. A circular buffer may be used in some embodiments as a typical implementation of such an overwriting scheme. When an event detection occurs, the recording device may store some configured amount of data prior to the start of the event, and some configured amount of data after the end of the event, in addition to storing the data captured during the event itself. Any pre or post time interval is considered part of the event start time and event stop time so that context of the event is shown in the video for example. Saving only the video for the event on the mobile device with camera or camera itself saves tremendous space and drastically reduces upload times.

Embodiments of the system may further comprise a server computer remote to the mobile device and wherein the server computer is configured to discard at least a portion of the video outside of the event start time to the event stop and return the video captured during the timespan from the event start time to the event stop time to the computer in the mobile device.

Embodiments of the at least one motion capture element may be configured to transmit the event to at least one other motion capture sensor or at least one other mobile device or any combination thereof, and wherein the at least one other motion capture sensor or the at least one other mobile device or any combination thereof is configured to save data associated with the event. For example, in embodiments with multiple recording devices operating simultaneously, one such device may detect an event and send a message to other recording devices that such an event detection has occurred. This message can include the timestamp of the start and/or stop of the event, using the synchronized time basis for the clocks of the various devices. The receiving devices, e.g., other motion capture sensors and/or cameras may use the event detection message to store data associated with the event to nonvolatile storage or to a server. The devices may be configured to store some amount of data prior to the start of the event and some amount of data after the end of the event, in addition to the data directly associated with the event. In this way all devices can record data simultaneously, but use an event trigger from only one of the devices to initiate saving of distributed event data from multiple sources.

Embodiments of the computer may be further configured to save the video from the event start time to the event stop time with the motion analysis data that occurs from the event start time to the event stop time or a remote server may be utilized to save the video. In one or more embodiments of the invention, some of the recording devices may not be in direct communication with each other throughout the time period in which events may occur. In these situations, devices can be configured to save complete records of all of the data they have recorded to permanent storage or to a server. Saving of only data associated with events may not be possible in these situations because some devices may not be able to receive event trigger messages. In these situations, saved data can be processed after the fact to extract only the relevant portions associated with one or more detected events. For example, multiple mobile devices may record video of a player or performer, and upload this video continuously to a server for storage. Separately the player or performer may be equipped with an embedded sensor that is able to detect events such as particular motions or actions. Embedded sensor data may be uploaded to the same server either continuously or at a later time. Since all data, including the video streams as well as the embedded sensor data, is generally timestamped, video associated with the events detected by the embedded sensor can be extracted and combined on the server.

Embodiments of the server or computer may be further configured while a communication link is open between the at least one motion capture sensor and the mobile device to discard at least a portion of the video outside of the event start time to the event stop and save the video from the event start time to the event stop time with the motion analysis data that occurs from the event start time to the event stop time. Alternatively, if the communication link is not open, embodiments of the computer may be further configured to save video and after the event is received after the communication link is open, then discard at least a portion of the video outside of the event start time to the event stop and save the video from the event start time to the event stop time with the motion analysis data that occurs from the event start time to the event stop time. For example, in some embodiments of the invention, data may be uploaded to a server as described above, and the location and orientation data associated with each device's data stream may be used to extract data that is relevant to a detected event. For example, a large set of mobile devices may be used to record video at various locations throughout a golf tournament. This video data may be uploaded to a server either continuously or after the tournament. After the tournament, sensor data with event detections may also be uploaded to the same server. Post-processing of these various data streams can identify particular video streams that were recorded in the physical proximity of events that occurred and at the same time. Additional filters may select video streams where a camera was pointing in the correct direction to observe an event. These selected streams may be combined with the sensor data to form an aggregate data stream with multiple video angles showing an event.

The system may obtain video from a camera coupled with the mobile device, or any camera that is separate from or otherwise remote from the mobile device. In one or more embodiments, the video is obtained from a server remote to the mobile device, for example obtained after a query for video at a location and time interval.

Embodiments of the server or computer may be configured to synchronize the video and the event data, or the motion analysis data via image analysis to more accurately determine a start event frame or stop event frame in the video or both, that is most closely associated with the event start time or the event stop time or both. In one or more embodiments of the invention, synchronization of clocks between recording devices may be approximate. It may be desirable to improve the accuracy of synchronizing data feeds from multiple recording devices based on the view of an event from each device. In one or more embodiments, processing of multiple data streams is used to observe signatures of events in the different streams to assist with fine-grained synchronization. For example, an embedded sensor may be synchronized with a mobile device including a video camera, but the time synchronization may be accurate only to within 100 milliseconds. If the video camera is recording video at 30 frames per second, the video frame corresponding to an event detection on the embedded sensor can only be determined within 3 frames based on the synchronized timestamps alone. In one embodiment of the device, video frame image processing can be used to determine the precise frame corresponding most closely to the detected event. For instance, a shock from a snowboard hitting the ground that is detected by an inertial sensor may be correlated with the frame at which the geometric boundary of the snowboard makes contact with the ground. Other embodiments may use other image processing techniques or other methods of detecting event signatures to improve synchronization of multiple data feeds.

Embodiments of the at least one motion capture element may include a location determination element configured to determine a location that is coupled with the microcontroller and wherein the microcontroller is configured to transmit the location to the computer on the mobile device. In one or more embodiments, the system further includes a server wherein the microcontroller is configured to transmit the location to the server, either directly or via the mobile device, and wherein the computer or server is configured to form the event video from portions of the video based on the location and the event start time and the event stop time. For example, in one or more embodiments, the event video may be trimmed to a particular length of the event, and transcoded to any or video quality, and overlaid or otherwise integrated with motion analysis data or event data, e.g., velocity or acceleration data in any manner. Video may be stored locally in any resolution, depth, or image quality or compression type to store video or any other technique to maximize storage capacity or frame rate or with any compression type to minimize storage, whether a communication link is open or not between the mobile device, at least one motion capture sensor and/or server. In one or more embodiments, the velocity or other motion analysis data may be overlaid or otherwise combined, e.g., on a portion beneath the video, that includes the event start and stop time, that may include any number of seconds before and/or after the actual event to provide video of the swing before a ball strike event for example. In one or more embodiments, the at least one motion capture sensor and/or mobile device(s) may transmit events and video to a server wherein the server may determine that particular videos and sensor data occurred in a particular location at a particular time and construct event videos from several videos and several sensor events. The sensor events may be from one sensor or multiple sensors coupled with a user and/or piece of equipment for example. Thus the system may construct short videos that correspond to the events, which greatly decreases video storage requirements for example.

In one or more embodiments, the microcontroller or the computer is configured to determine a location of the event or the microcontroller and the computer are configured to determine the location of the event and correlate the location, for example by correlating or averaging the location to provide a central point of the event, and/or erroneous location data from initializing GPS sensors may be minimized. In this manner, a group of users with mobile devices may generate videos of a golfer teeing off, wherein the event location of the at least one motion capture device may be utilized and wherein the server may obtain videos from the spectators and generate an event video of the swing and ball strike of the professional golfer, wherein the event video may utilize frames from different cameras to generate a BULLET TIME® video from around the golfer as the golfer swings. The resulting video or videos may be trimmed to the duration of the event, e.g., from the event start time to the event stop time and/or with any pre or post predetermined time values around the event to ensure that the entire event is captured including any setup time and any follow through time for the swing or other event.

In one or more embodiments, the computer on the mobile device may request at least one image or video that contains the event from at least one camera proximal to the event directly by broadcasting a request for any videos taken in the area by any cameras, optionally that may include orientation information related to whether the camera was not only located proximally to the event, but also oriented or otherwise pointing at the event. In other embodiments, the video may be requested by the computer on the mobile device from a remote server. In this scenario, any location and/or time associated with an event may be utilized to return images and/or video near the event or taken at a time near the event, or both. In one or more embodiments, the computer or server may trim the video to correspond to the event duration and again, may utilize image processing techniques to further synchronize portions of an event, such as a ball strike with the corresponding frame in the video that matches the acceleration data corresponding to the ball strike on a piece of equipment for example.

Embodiments of the computer on the mobile device or on the server may be configured to display a list of one or more times at which an event has occurred or wherein one or more events has occurred. In this manner, a user may find events from a list to access the event videos in rapid fashion.

Embodiments of the invention may include at least one motion capture sensor that is physically coupled with the mobile device. These embodiments enable any type of mobile phone or camera system with an integrated sensor, such as any type of helmet mounted camera or any mount that includes both a camera and a motion capture sensor to generate event data and video data.

In some embodiments the system may also include one or more computers with a wireless communication interface that can communicate with the radios of one or more motion capture elements to receive the event data associated with motion events. The computer may receive raw motion data, and it may analyze this data to determine events. In other embodiments the determination of events may occur in the motion capture element, and the computer may receive event data. Combinations of these two approaches are also possible in some embodiments.

In some embodiments the computer or computers may determine the start time and end time of a motion event from the event data. They may then request image data from a camera that has captured video or one or more images for some time interval at least within some portion of the time between this event start time and event end time. The term video in this specification will include individual images as well as continuous video, including the case of a camera that takes a single snapshot image during an event interval. This video data may then be associated with the motion data form a synchronized event video. Events may be gestured by a user by shaking or tapping a motion capture sensor a fixed number of times for example. Any type of predefined event including user gesture events may be utilized to control at least one camera to transfer generally concise event videos without requiring the transfer of huge raw video files.

In some embodiments the request of video from a camera may occur concurrently with the capture or analysis of motion data. In such embodiments the system will obtain or generate a notification that an event has begun, and it will then request that video be streamed from one or more cameras to the computer until the end of the event is detected. In other embodiments the request of video may occur after a camera has uploaded its video records to another computer, such as a server. In this case the computer will request video from the server rather than directly from the camera.

Various techniques may be used to perform synchronization of motion data and video data. Such techniques include clock synchronization methods well-known in the art, such as the network time protocol, that ensure that all devices—motion capture elements, computer, and cameras—use a common time base. In another technique the computer may compare its clock to an internal clock of the motion capture element and to an internal clock of a camera, by exchanging packets containing the current time as registered by each device. Other techniques analyze motion data and video data to align their different time bases for synchronization. For instance a particular video frame showing a contact with a ball may be aligned with a particular data frame from motion data showing a shock in an accelerometer; these frames can then be used effectively as key frames, to synchronize the motion data and the video data. The combined video data and motion data forms a synchronized event video with an integrated record of an event.

In one or more embodiments, a computer configured to receive or process motion data or video data may be a mobile device, including but not limited to a mobile telephone, a smartphone, a tablet, a PDA, a laptop, a notebook, or any other device that can be easily transported or relocated. In other embodiments, such a computer may integrated into a camera, and in particular it may be integrated into the camera from which video data is obtained. In other embodiments, such a computer may be a desktop computer or a server computer, including but not limited to virtual computers running as virtual machines in a data center or in a cloud-based service. In some embodiments, the system may include multiple computers of any of the above types, and these computers may jointly perform the operations described in this specification. As will be obvious to one skilled in the art, such a distributed network of computers can divide tasks in many possible ways and can coordinate their actions to replicate the actions of a single centralized computer if desired. The term computer in this specification is intended to mean any or all of the above types of computers, and to include networks of multiple such computers acting together.

In one or more embodiments, the computer may obtain or create a sequence of synchronized event videos. The computer may display a composite summary of this sequence for a user to review the history of the events. For the videos associated with each event, in some embodiments this summary may include one or more thumbnail images generated from the videos. In other embodiments the summary may include smaller selections from the full event video. The composite summary may also include display of motion analysis or event data associated with each synchronized event video. In some embodiments, the computer may obtain a metric and display the value of this metric for each event. The display of these metric values may vary in different embodiments. In some embodiments the display of metric values may be a bar graph, line graph, or other graphical technique to show absolute or relative values. In other embodiments color-coding or other visual effects may be used. In other embodiments the numerical values of the metrics may be shown. Some embodiments may use combinations of these approaches.

In one or more embodiments, the computer may accept selection criteria for a metric of interest associated with the motion analysis data or event data of the sequence of events. For example, a user may provide criteria such as metrics exceeding a threshold, or inside a range, or outside a range. Any criteria may be used that may be applied to the metric values of the events. In response to the selection criteria, the computer may display only the synchronized event videos or their summaries (such as thumbnails) that meet the selection criteria. As an example, a user capturing golf swing event data may wish to see only those swings with the swing speed above 100 mph.

In some embodiments of the invention, the computer may sort and rank synchronized event videos for display based on the value of a selected metric, in addition to the filtering based on selection criteria as described above. Continuing the example above, the user capturing golf swing data may wish to see only those swings with swing speed above 100 mph, sorted with the highest swing speed shown first.

In one or more embodiments, the computer may generate a highlight reel that combines the video for events that satisfy selection criteria. Such a highlight reel may include the entire video for the selected events, or a portion of the video that corresponds to the important moments in the event as determined by the motion analysis. In some embodiments the highlight reel may include overlays of data or graphics on the video or on selected frames showing the value of metrics from the motion analysis. Such a highlight reel may be generated automatically for a user once the user indicates which events to include by specifying selection criteria. In some embodiments the computer may allow the user to edit the highlight reel to add or remove events, to lengthen or shorten the video shown for each event, to add or remove graphic overlays for motion data, or to add special effects or soundtracks.

In embodiments with multiple cameras, motion data and multiple video streams may be combined into a single synchronized event video. Videos from multiple cameras may provide different angles or views of an event, all synchronized to motion data and to a common time base. In some embodiments one or more videos may be available on one or more computers (such as servers or cloud services) and may be correlated later with event data. In these embodiments a computer may search for stored videos that were in the correct location and orientation to view an event. The computer could then retrieve the appropriate videos and combine them with event data to form a composite view of the event with video from multiple positions and angles.

In some embodiments the computer may select a particular video from the set of possible videos associated with an event. The selected video may be the best or most complete view of the event based on various possible criteria. In some embodiments the computer may use image analysis of each of the videos to determine the best selection. For example, some embodiments may use image analysis to determine which video is most complete in that the equipment or people of interest are least occluded or are most clearly visible. In some embodiments this image analysis may include analysis of the degree of shaking of a camera during the capture of the video, and selection of the video with the most stable images. In some embodiments a user may make the selection of a preferred video, or the user may assist the computer in making the selection by specifying the most important criteria.

In some embodiments event data from a motion capture element may be used to send control messages to a camera that can record video for the event. In embodiments with multiple cameras, control messages could be broadcast or could be send to a set of cameras during the event. These control messages may modify the video recording parameters based on the data associated with the event, including the motion analysis data. For example, a camera may be on standby and not recording while there is no event of interest in progress. A computer may await event data, and once an event starts it may send a command to a camera to begin recording. Once the event has finished, the computer may then send a command to the camera to stop recording. Such techniques can conserve camera power as well as video memory.

More generally in some embodiments a computer may send control messages to a camera or cameras to modify any relevant video recording parameters in response to event data or motion analysis data. These recording parameters may for example include the frame rate, resolution, color depth, color or grayscale, compression method, and compression quality of the video, as well as turning recording on or off. As an example of where this may be useful, motion analysis data may indicate when a user or piece of equipment is moving rapidly; the frame rate of a video recording could be increased during periods of rapid motion in response, and decreased during periods of relatively slow motion. By using a higher frame rate during rapid motion, the user can slow the motion down during playback to observe high motion events in great detail. These techniques can allow cameras to conserve video memory and to use available memory efficiently for events of greatest interest.

In some embodiments, the computer may accept a sound track, for example from a user, and integrate this sound track into the synchronized event video. This integration would for example add an audio sound track during playback of an event video or a highlight reel. Some embodiments may use event data or motion analysis data to integrate the sound track intelligently into the synchronized event video. For example, some embodiments may analyze a sound track to determine the beats of the sound track based for instance on time points of high audio amplitude. The beats of the sound track may then be synchronized with the event using event data or motion analysis data. For example such techniques may automatically speed up or slow down a sound track as the motion of a user or object increases or decreases. These techniques provide a rich media experience with audio and visual cues associated with an event.

In one or more embodiments, a computer is configured to playback a synchronized event video on one or more displays. These displays may be directly attached to the computer, or may be remote on other devices. Using the event data or the motion analysis data, the computer may modify the playback to add or change various effects. These modifications may occur multiple times during playback, or even continuously during playback as the event data changes. For instance, during periods of low motion the playback may occur at normal speed, while during periods of high motion the playback may switch to slow motion to highlight the details of the motion. Modifications to playback speed may be made based on any observed or calculated characteristics of the event or the motion. For instance, event data may identify particular sub-events of interest, such as the striking of a ball, beginning or end of a jump, or any other interesting moments. The computer may modify the playback speed to slow down playback as the synchronized event video approaches these sub-events. This slowdown could increase continuously to highlight the sub-event in fine detail. Playback could even be stopped at the sub-event and await input from the user to continue. Playback slowdown could also be based on the value of one or more metrics from the motion analysis data or the event data. For example, motion analysis data may indicate the speed of a moving baseball bat or golf club, and playback speed could be adjusted continuously to be slower as the speed of such an object increases. Playback speed could be made very slow near the peak value of such metrics.

In other embodiments, modifications could be made to other playback characteristics not limited to playback speed. For example, the computer could modify any or all of playback speed, image brightness, image colors, image focus, image resolution, flashing special effects, or use of graphic overlays or borders. These modifications could be made based on motion analysis data, event data, sub-events, or any other characteristic of the synchronized event video. As an example, as playback approaches a sub-event of interest, a flashing special effect could be added, and a border could be added around objects of interest in the video such as a ball that is about to be struck by a piece of equipment.

In embodiments that include a sound track, modifications to playback characteristics can include modifications to the playback characteristics of the sound track. For example such modifications may include modifications to the volume, tempo, tone, or audio special effects of the sound track. For instance the volume and tempo of a sound track may be increased as playback approaches a sub-event of interest, to highlight the sub-event and to provide a more dynamic experience for the user watching and listening to the playback.

In one or more embodiments, a computer may use image analysis of a video to generate a metric from an object within the video. This metric may for instance measure some aspect of the motion of the object. Such metrics derived from image analysis may be used in addition to or in conjunction with metrics obtained from motion analysis of data from motion sensors. In some embodiments image analysis may use any of several techniques known in the art to locate the pixels associated with an object of interest. For instance, certain objects may be known to have specific colors, textures, or shapes, and these characteristics can be used to locate the objects in video frames. As an example, a tennis ball may be known to be approximately round, yellow, and of texture associate with the ball's materials. Using these characteristics image analysis can locate a tennis ball in a video frame. Using multiple video frames the approximate speed of the tennis ball could be calculated. For instance, assuming a stationary or almost stationary camera, the location of the tennis ball in three-dimensional space can be estimated based on the ball's location in the video frame and based on its size. The location in the frame gives the projection of the ball's location onto the image plane, and the size provides the depth of the ball relative to the camera. By using the ball's location in multiple frames, and by using the frame rate that gives the time difference between frames, the ball's velocity can be estimated. Vertical leap estimate may be performed near a known size object such as a basketball for example.

In one or more embodiments, the microcontroller coupled to a motion capture element is configured to communicate with other motion capture sensors to coordinate the capture of event data. The microcontroller may transmit a start of event notification to another motion capture sensor to trigger that other sensor to also capture event data. The other sensor may save its data locally for later upload, or it may transmit its event data via an open communication link to a computer while the event occurs. These techniques provide a type of master-slave architecture where one sensor can act as a master and can coordinate a network of slave sensors.

In one or more embodiments, a computer may obtain sensor values from other sensors in addition to motion capture sensors, where these other sensors are proximal to an event and provide other useful data associated with the event. For example, such other sensors may sense various combinations of temperature, humidity, wind, elevation, light, sound and physiological metrics (like a heartbeat). The computer may retrieve these other values and save them along with the event data and the motion analysis data to generate an extended record of the event during the timespan from the event start to the event stop.

One or more embodiments may obtain and process both sensor data and video to analyze the motion of objects and generate motion metrics describing this motion. Embodiments may employ various steps and techniques to align the data from sensors and cameras, both in time and in space. This aligned data may then be analyzed using sensor fusion techniques to combine sensor and video data into consistent and robust motion metrics.

One or more embodiments may obtain descriptions of one or more objects of interest, which may include persons, equipment, or both. They may then obtain video captured from one or more cameras, where the video may contain images of these objects in motion. Some or all of the objects of interest may have motion capture elements attached to them; these motion capture elements generate motion sensor data for the objects. One or more embodiments may then combine these three inputs—object descriptions, video, and sensor data—to generate an integrated motion analysis of the objects. The resulting motion metrics may include for example, without limitation, linear position, linear velocity, linear acceleration, trajectory, orientation, angular velocity, angular acceleration, time of motion, time elapsed between positions, time elapsed between start of motion and arriving at a position, and time of impact.

Video analysis of object motion may include identifying the objects of interest in a set of frames selected from the video for analysis. Object identification may use a set of distinguishing visual characteristics for each object, which allow the embodiment to identify the objects in the selected video frames. These distinguishing visual characteristics may include, for example, without limitation, shape, curvature, size, color, luminance, hue, saturation, texture, and pixel pattern. Some embodiments may search all pixels of all of the selected frames for the objects of interest; some embodiments may instead use various optimizations to search only in selected areas of frames likely to contain the objects of interest.

In one or more embodiments, a camera may be in motion during video capture. In order to analyze motion of the objects in the frames, it may therefore be desirable to distinguish this true object motion from the apparent motion of objects caused by camera motion. One or more embodiments therefore may use techniques to determine the pose (location or orientation) of the camera for each frame. True object motion may then be determined by determining the object pose relative to the camera pose in each frame, and then transforming this object pose to a common coordinate system, using the camera pose for each frame.

One or more embodiments may obtain motion capture data for one or more of the objects of interest from motion capture elements, for example from motion sensors attached to the objects. The motion capture data may then be synchronized with the video frames. Then motion capture data may be combined with video analysis data to form motion metrics for the objects. Embodiments may use various sensor fusion techniques to combine this data from different sources into integrated motion metrics.

One or more embodiments of the method may synchronize video frames and sensor data by finding a signature of the same event in both the video and the sensor data, and aligning the frame containing the video signature with the sensor timestamp of the sensor sample containing the sensor data signature. One or more embodiments may synchronize video frames and sensor data by calculating a motion metric for a selected reference object from both the video frames and the sensor data, and finding a time shift between the video motion metric and the sensor motion metric that best aligns the two motion metric graphs. In some embodiments a maximum clock difference between the sensor data and the video frames may be known in advance; in these embodiments the searches for matching event signatures or for time shifts to align motion metrics may optimized by searching only within the known clock difference.

In one or more embodiments, motion analysis may include finding one or more events of interest. Events may be located in video frames using video signatures, and in sensor data using sensor data signatures. Some activities may trigger one of these signatures erroneously, where the activity is not a true event but instead a false positive. One or more embodiments may combine a video signature and a sensor data signature to filter out false positives; for example, if an activity matches a sensor data signature but does not match the corresponding video signature, the activity can be classified as a false positive. True events may be determined when both the video signature and the sensor data signature are present. One or more embodiments may use multi-stage tests to signal a prospective event, and then use either a video signature or a sensor data signature, or both, to confirm that the prospective event is a valid event.

One or more embodiments may use visual markers as objects of interest, or may use visual markers that are attached to objects or to motion capture elements attached to objects. The patterns of the visual markers may form part of the distinguishing visual characteristics for the objects. The visual markers may be designed to have no rotational symmetries, so that different orientations of the markers can be differentiated using video analysis. The visual markers may also be configured with high visibility color.

One or more embodiments may preprocess the video frames to facilitate searching for objects of interest; preprocessing may include, for example, without limitation, noise removal, flicker removal, smoothing, color space conversion, color or brightness balancing, and shadow removal.

One or more embodiments may use sensors to measure the camera pose for the selected video frames. The measured camera pose may be used to transform object poses to a common coordinate system.

One or more embodiments may determine the pose of an identified object in a frame relative to the camera pose for that frame using one or more of the following techniques: a ray on which the object lies may be determined from the location of object in the frame; the relative distance of the object from the camera may be determined from the apparent size of object in the frame compared to the object's true size; the orientation the object relative to the camera may be determined by calculating a rotation that minimizes the difference between a reference pixel pattern for the object and the pixel pattern for the object in the frame. A reference pixel pattern for an object may be one of the distinguishing visual characteristics for the object, or it may be obtained from the object's appearance in a designated reference frame.

One or more embodiments may create or obtain a physical model of the probable trajectories of one or more objects, and use this physical model to estimate a high probability region within each frame for the location of object. Searching frames for the object may then be optimized by searching within these high probability regions.

In embodiments without camera sensors to determine camera pose, it may be desirable to estimate the camera pose for each frame by aligning each frame with the previous frame to compensate for camera motion. Once each frame is aligned with the previous frame, frame differences between can be calculated to determine high motion regions containing moving objects. Searching frames for objects of interest may then be optimized by searching within these high motion regions.

One or more embodiments may use the following technique to align a frame with the previous frame, to compensate for camera motion. First a frame translation may be determined to minimize the pixel differences between a center region of a frame and the center region of the previous frame after applying the frame translation. Then each frame may be divided into tiles, and a local tile translation may be determined for each tile that minimizes the pixel differences between the tile and the corresponding tile of the previous frame after applying the frame translation and the local tile translation.

One or more embodiments may calculate a time of impact for one or more objects of interest as one of the motion metrics. This time of impact may be calculated by detecting a discontinuity in a motion metric between successive frames. This technique may determine an impact frame, but it may not in some cases be able to determine a precise inter-frame impact time. One or more embodiments may determine a more precise impact time by extrapolating the trajectory of an object forward from the frames prior to impact, extrapolating the trajectory this object backwards from the frames after impact, and calculating the time of intersection these two trajectories as the precise impact time.

In one or more embodiments, there may be a desired trajectory for an object; for example, hitting golf ball so that its trajectory goes into the hole. One or more embodiments may compare this desired trajectory with an observed trajectory, and report the trajectory differences as a motion metric. One or more embodiments may determine the changes in the initial conditions of an object trajectory that would be needed to transform the observed trajectory into the desired trajectory. Initial conditions may for example include the initial speed and orientation of the object. For golf, as an example, initial conditions may include the speed and aim of a golf clubhead at the time of impact with the golf ball.

One or more embodiments may generate a set of highlight frames or fail frames from a video, where the highlight frames or fail frames include an activity of interest. The activity of interest may be identified with one or more activity signatures; for example, sensor data may be used to determine when certain motion metrics fall within or outside particular ranges that determine activities of interest. As an example, a jump may be determined by scanning accelerometer data to find accelerometer values near zero, which may indicate that an object is in free fall. An epic fail representing a crash may be determined by scanning velocity data looking for a sharp transition between a high velocity and a zero or very low velocity. Highlight or fail frames may also include certain frames before or after an activity of interest. Highlight or fail frames may be transmitted to one or more of a repository, a viewer, a server, a computer, a social media site, a mobile device, a network, and an emergency service. One or more embodiments may overlay highlight or fail frames with data or graphics representing the values of motion metrics. One or more embodiments may send messages to the camera that captured the video instructing the camera to discard portions the video other than the highlight or fail frames.

One or more embodiments may calculate an elapsed time for an activity as a motion metric. The starting time for the activity may for example be determined using motion capture data to detect a signature corresponding to the beginning the activity. The finishing time for the activity may for example be determined using video analysis to detect a signature corresponding to the completion of the activity; for example, a camera positioned at a finish line may detect an object crossing the finish line.

One or more embodiments of the method may create a synchronized event video for an event that synchronizes the video with event data received from motion capture elements. This synchronization may calculate event data or receive event data from the motion capture elements, and obtain an event start time and an event stop time from the event data. It may obtain a video start time and a video stop time associated with the video. It may then create a synchronized event video by associating aligning an event time between the event start time and the event stop time with a video time between the video start time and the video stop time. One or more embodiments may overlay event data onto the synchronized event video. One or more embodiments may command the camera to transfer the synchronized event video to another computer, without transferring a portion of the video outside of time interval between the event start time and the event stop time. One or more embodiments may also command the camera to discard a portion of the video outside of time interval between the event start time and the event stop time.

One or more embodiments may detect and eliminate false positive events by first identifying a prospective event using a first set of criteria, and then determine whether the prospective event is a valid event using a second set of criteria. The first set of criteria may for example include having a first value from motion capture data above a first threshold value, and also having a second value from the motion capture data above a second threshold value within a time window around the sample including the first value. The second set of criteria may for example compare the prospective event to a characteristic signal associated with a typical event, or compare the video during the prospective event with a characteristic image associated with this typical event, or both.

Embodiments of the invention may combine data from multiple sensors, possibly of different types or modalities, that track combinations of players, equipment, and projectiles such as balls. Sensor data may be transmitted to an event analysis and tagging system over wired or wireless communications interfaces. The event analysis and tagging system may include one or more processors that analyze the sensor data. Sensor data may be synchronized to a common time scale, and analyzed for event detection and for generation of metrics describing the event.

Sensors may include for example, without limitation, inertial motion sensors, video cameras, light gates, light curtains, and radars. Inertial motion sensors may include for example accelerometers, gyroscopes, magnetometers, or more generally any sensor that measures one or more of position, orientation, linear or angular velocity, or linear or angular acceleration. Combinations of sensor modalities may be used. For example, an embodiment of the system may track a player using a video camera, track the speed of a ball using a radar, and track a piece of equipment such as a bat using an inertial motion sensor. Another embodiment may for example track a piece of equipment with an inertial motion sensor on the equipment, and track a projectile (such as a ball) using another inertial motion sensor embedded in the projectile.

Sensors may be attached to or may otherwise measure or observe motion of pieces of equipment, including but not limited to sports equipment. Equipment may be worn by, attached to, carried by, or used by one or more players in an event. Equipment tracked by the sensors of the system may include for example, without limitation, a bat, a racquet, a paddle, a golf club, a bow, a gun, a slingshot, a sabre, a quarterstaff, a lacrosse stick, a hockey stick, a field hockey stick, a polo mallet, a croquet mallet, a pool cue, a shuffleboard cue, a glove, a shoe, a belt, a watch, a helmet, a cap, a ski, a snowboard, a skateboard, a surfboard, an ice skate, a sled, a luge, a windsurfing board, a hang glider, a roller skate, a roller blade, a vehicle, a snowmobile, a jet ski, a bicycle, a tricycle, a unicycle, a motorcycle, a snowmobile, and a mechanical bull.

Some sporting events or other activities involve projectiles such as balls. Projectiles may be thrown by, caught by, carried by, kicked by, or struck by players. In some activities players may use equipment to hit, catch, or carry a projectile. Projectiles tracked by the sensors of the system may include for example, without limitation, a ball, a football, a rugby ball, an Australian rules football, a soccer ball, a volleyball, a water polo ball, a polo ball, a basketball, a lacrosse ball, a field hockey ball, a croquet ball, a billiard ball, a horseshoe, a shuffleboard disc, a tennis ball, a ping pong ball, a racquet ball, a hand ball, a bocce ball, a lawn dart, a squash ball, a shuttlecock, a baseball, a softball, a golf ball, a bowling ball, a hockey puck, a dodgeball, a kick ball, a Wiffle™ ball, a javelin, a shot put, a discus, a marble, a bullet, an arrow, a knife, a throwing star, a bolas, a grenade, a water balloon, a boomerang, a Frisbee™, a caber, and a curling stone.

In many sports a player swings a piece of equipment in attempt to hit or otherwise contact a projectile. Examples include bats hitting baseballs, tennis rackets hitting tennis balls, and polo mallets hitting polo balls. Embodiments of the invention may measure a swing event by combining information on the motion of the projectile and the motion of the equipment hitting (or attempting to hit) the projectile. For example, in baseball or softball, one or more embodiments may combine sensor data on bat motion and sensor data on ball motion to calculate a reaction time metric, which may be defined for example as the elapsed time between a ball leaving a pitcher and the start of a forward swing of a bat to hit the ball.

One or more embodiments may analyze a swing event by calculating a trajectory over time of the projectile and a trajectory over time of the equipment as it hits or attempts to hit the projectile. The equipment trajectory may for example track the location over time of a preferred hitting location on the equipment, such as the sweet spot of a bat for example. Metrics may be calculated by analyzing the combination of the equipment and projectile trajectories. For example, one or more embodiments may first calculate a point on the projectile trajectory that represents an optimal hitting point. A projectile may reach this point at a particular point in time, which is the optimal hitting time. A swing accuracy metric may then be derived from the vector difference between the optimal hitting location and the location on the equipment trajectory at the optimal hitting time. A poor swing may be due to either spatial deviation (the swing did not go to the right location) or temporal deviation (the swing arrived at the right location, but too early or too late). One or more embodiments may calculate a spatial deviation metric derived from the vector difference between the optimal hitting location and the closest point on the equipment trajectory to this optimal hitting location. A temporal deviation metric may be derived from the difference in time between the optimal hitting time and the time that the equipment trajectory reached this closest approach point to the optimal hitting location.

Embodiments of the invention may automatically generate or select one more tags for events, based for example on analysis of sensor data. Event data with tags may be stored in an event database for subsequent retrieval and analysis. Tags may represent for example, without limitation, activity types, players, timestamps, stages of an activity, performance levels, or scoring results.

One or more embodiments may also analyze media such as text, audio, images, or videos from social media sites or other servers to generate, modify, or confirm event tags. Media analyzed may include for example, without limitation, email messages, voice calls, voicemails, audio recordings, video calls, video messages, video recordings, text messages, chat messages, postings on social media sites, postings on blogs, or postings on wikis. Sources of media for analysis may include for example, without limitation, an email server, a social media site, a photo sharing site, a video sharing site, a blog, a wiki, a database, a newsgroup, an RSS server, a multimedia repository, a document repository, and a text message server. Analysis may include searching of text for key words and phrases related to an event. Event tags and other event data may be published to social media sites or to other servers or information systems.

One or more embodiments may provide the capability for users to manually add tags to events, and to filter or query events based on the automatic or manual tags. Embodiments of the system may generate a video highlight reel for a selected set of events matching a set of tags. One or more embodiments may discard portions of video based on the event analysis and tagging; for example, analysis may indicate a time interval with significant event activity, and video outside this time interval may be discarded, e.g., to save tremendous amounts of memory, and/or not transferred to another computer to save significant time in uploading the relevant events without the non-event data for example.

BRIEF DESCRIPTION OF THE DRAWINGS

The above and other aspects, features and advantages of the invention will be more apparent from the following more particular description thereof, presented in conjunction with the following drawings wherein:

FIG. 2A illustrates a helmet based mount that surrounds the head of a user wherein the helmet based mount holds a motion capture sensor.

FIG. 4A illustrates a top cross sectional view of the helmet, padding, cranium, and brain of a user. FIG. 4B illustrates a rotational concussion event for the various elements shown in FIG. 4A.

FIG. 6 illustrates the rotational acceleration values of the 3 axes along with the total rotational vector amount along with video of the concussion event as obtained from a camera and displayed with the motion event data.

FIG. 7 illustrates a timeline display of a user along with peak and minimum angular speeds along the timeline shown as events along the time line. In addition, a graph showing the lead and lag of the golf club along with the droop and drift of the golf club is shown in the bottom display wherein these values determine how much the golf club shaft is bending in two axes as plotted against time.

FIG. 14 illustrates an embodiment of the motion capture element configured with optional LED visual indicator for local display and viewing of event related information and an optional LCD configured to display a text or encoded message associated with the event.

FIG. 15 illustrates an embodiment of templates characteristic of motion events associated with different types of equipment and/or instrumented clothing along with areas in which the motion capture sensor personality may change to more accurately or more efficiently capture data associated with a particular period of time and/or sub-event.

FIG. 17 illustrates an embodiment of the algorithm utilized by any computer in FIG. 1 that is configured to display motion images and motion capture data in a combined format.

FIG. 48A illustrates a miss where the trajectories do not intersect at all in space. FIG. 48B illustrates a different type of miss where the trajectories overlap, but they reach the intersecting point at different times.

DETAILED DESCRIPTION OF THE INVENTION

A multi-sensor event analysis and tagging system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
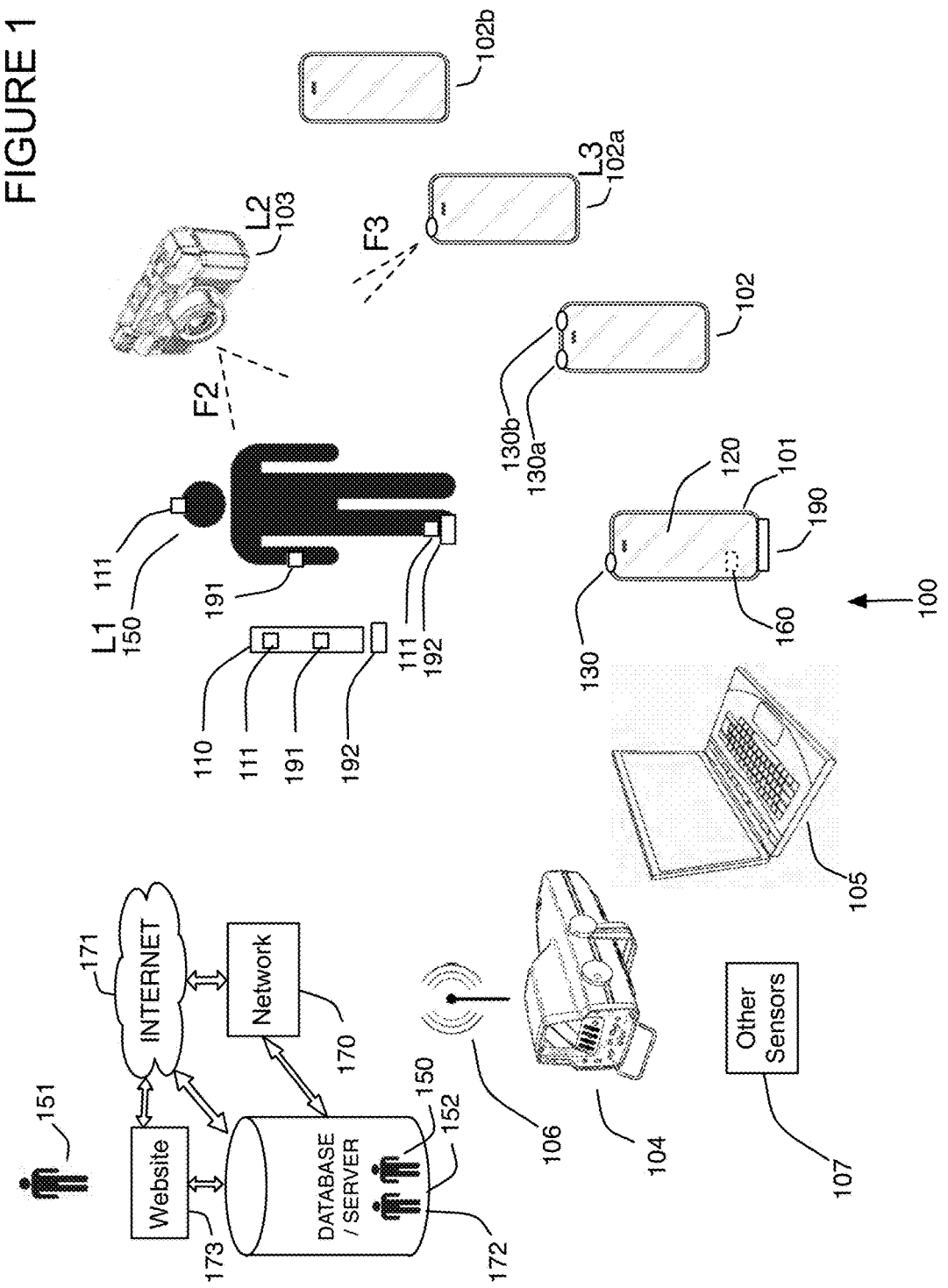
FIG. 1 illustrates an embodiment of a system that implements aspects of the invention.

FIG. 1 illustrates an embodiment 100 of a system that implements aspects of an integrated sensor and video motion analysis method. Embodiments enable event based viewing and low power transmission of events and communication with an app executing on a mobile device and/or with external cameras to designate windows that define the events. Enables recognition of motion events, and designation of events within images or videos, such as a shot, move or swing of a player, a concussion of a player, boxer, rider or driver, or a heat stroke, hypothermia, seizure, asthma attack, epileptic attack or any other sporting or physical motion related event including walking and falling. Events may be correlated with one or more images or video as captured from internal/external camera or cameras or nanny cam, for example to enable saving video of the event, such as the first steps of a child, violent shaking events, sporting events including concussions, or falling events associated with an elderly person. As shown, embodiments of the system generally include a mobile device 101 and applications that execute thereon, that includes computer 160, shown as located internally in mobile device 101 as a dotted outline, (i.e., also see functional view of computer 160 in FIG. 1A), display 120 coupled to computer 160 and a wireless communications interface (generally internal to the mobile device, see element 164 in FIG. 1A) coupled with the computer. Since mobile phones having mobile computers are ubiquitous, users of the system may purchase one or more motion capture elements and an application, a.k.a., "app", that they install on their pre-existing phone to implement an embodiment of the system. Motion capture capabilities are thus available at an affordable price for any user that already owns a mobile phone, tablet computer, music player, etc., which has never been possible before.

Each mobile device 101, 102, 102a, 102b may optionally include an internal identifier reader 190, for example an RFID reader, or may couple with an identifier reader or RFID reader (see mobile device 102) to obtain identifier 191. Alternatively, embodiments of the invention may utilize any wireless technology in any of the devices to communicate an identifier that identifies equipment 110 to the system. Embodiments of the invention may also include any other type of identifier coupled with the at least one motion capture sensor or the user or the piece of equipment. In one or more embodiments, the identifier may include a team and jersey number or student identifier number or license number or any other identifier that enables relatively unique identification of a particular event from a particular user or piece of equipment. This enables team sports or locations with multiple players or users to be identified with respect to the app that is configured to receive data associated with a particular player or user. One or more embodiments receive the identifier, for example a passive RFID identifier or MAC address or other serial number associated with the player or user and associate the identifier with the event data and motion analysis data.

The system generally includes at least one motion capture element 111 that couples with user 150 or with piece of equipment 110, via mount 192, for example to a golf club, or baseball bat, tennis racquet, hockey stick, weapon, stick, sword, or any other piece of equipment for any sport, or other sporting equipment such as a shoe, belt, gloves, glasses, hat, or any other item. The at least one motion capture element 111 may be placed at one end, both ends, or anywhere between both ends of piece of equipment 110 or anywhere on user 150, e.g., on a cap, headband, helmet, mouthpiece or any combination thereof, and may also be utilized for EI measurements of any item. The motion capture element may optionally include a visual marker, either passive or active, and/or may include a wireless sensor, for example any sensor capable of providing any combination of one or more values associated with an orientation (North/South and/or up/down), position, velocity and/or acceleration of the motion capture element. The computer may be configured to obtain data associated with an identifier unique to each piece of equipment 110, e.g., clothing, bat, etc., for example from an RFID coupled with club 110, i.e., identifier 191, and optionally associated with the at least one motion capture element, either visually or wirelessly, analyze the data to form motion analysis data and display the motion analysis data on display 120 of mobile device 101. Motion capture element 111 may be mounted on or near the equipment or on or near the user via motion capture mount 192. Motion capture element 111 mounted on a helmet for example may include an isolator comprising a material that is configured to surround the motion capture element to approximate physical acceleration dampening of cerebrospinal fluid around the user's brain to minimize translation of linear acceleration and rotational acceleration of event data to obtain an observed linear acceleration and an observed rotational acceleration of the user's brain. This lowers processing requirements on the motion capture element microcontroller for example and enables low memory utilization and lower power requirements for event based transmission of event data. The motion capture data from motion capture element 111, any data associated with the piece of equipment 110, such as identifier 191 and any data associated with user 150, or any number of such users 150, such as second user 152 may be stored in locally in memory, or in a database local to the computer or in a remote database, for example database 172 for example that may be coupled with a server. Data may be stored in database 172 from each user 150, 152 for example when a network or telephonic network link is available from motion capture element 111 to mobile device 101 and from mobile device 101 to network 170 or Internet 171 and to database 172. Data mining is then performed on a large data set associated with any number of users and their specific characteristics and performance parameters. For example, in a golf embodiment of the invention, a club ID is obtained from the golf club and a shot is detected by the motion capture element. Mobile computer 101 stores images/video of the user and receives the motion capture data for the events/hits/shots/motion and the location of the event on the course and subsequent shots and determines any parameters for each event, such as distance or speed at the time of the event and then performs any local analysis and display performance data on the mobile device. When a network connection from the mobile device to network 170 or Internet 171 is available or for example after a round of golf, the images/video, motion capture data and performance data is uploaded to database 172, for later analysis and/or display and/or data mining. In one or more embodiments, users 151, such as original equipment manufacturers pay for access to the database, for example via a computer such as computer 105 or mobile computer 101 or from any other computer capable of communicating with database 172 for example via network 170, Internet 171 or via website 173 or a server that forms part of or is coupled with database 172. Data mining may execute on database 172, for example that may include a local server computer, or may be run on computer 105 or mobile device 101, 102, 102*a* or 102*b* and access a stand-alone embodiment of database 172 for example. Data mining results may be displayed on mobile device 101, computer 105, television broadcast or web video originating from camera 130, 130*a* and 103*b*, or 104 or accessed via website 173 or any combination thereof.

One or more embodiments of the at least one motion capture element may further include a light emitting element configured to output light if the event occurs. This may be utilized to display a potential, mild or severe level of concussion on the outer portion of the helmet without any required communication to any external device for example. Different colors or flashing intervals may also be utilized to relay information related to the event. Alternatively, or in combination, the at least one motion capture element may further include an audio output element configured to output sound if the event occurs or if the at least one motion capture sensor is out of range of the computer or wherein the computer is configured to display and alert if the at least one motion capture sensor is out of range of the computer, or any combination thereof. Embodiments of the sensor may also utilize an LCD that outputs a coded analysis of the current event, for example in a Quick Response (QR) code or bar code for example so that a referee may obtain a snapshot of the analysis code on a mobile device locally, and so that the event is not viewed in a readable form on the sensor or wirelessly transmitted and intercepted by anyone else.

One or more embodiments of the system may utilize a mobile device that includes at least one camera 130, for example coupled to the computer within the mobile device. This allows for the computer within mobile device 101 to command the camera 130 to obtain an image or images, for example of the user during an athletic movement. The image(s) of the user may be overlaid with displays and ratings to make the motion analysis data more understandable to a human for example. Alternatively, detailed data displays without images of the user may also be displayed on display 120 or for example on the display of computer 105. In this manner two-dimensional images and subsequent display thereof is enabled. If mobile device 101 contains two cameras, as shown in mobile device 102, i.e., cameras 130*a* and 130*b*, then the cameras may be utilized to create a three-dimensional data set through image analysis of the visual markers for example. This allows for distances and positions of visual markers to be ascertained and analyzed. Images and/or video from any camera in any embodiments of the invention may be stored on database 172, for example associated with user 150, for data mining purposes. In one or more embodiments of the invention image analysis on the images and/or video may be performed to determine make/models of equipment, clothes, shoes, etc., that is utilized, for example per age of user 150 or time of day of play, or to discover any other pattern in the data.

Alternatively, for embodiments of mobile devices that have only one camera, multiple mobile devices may be utilized to obtain two-dimensional data in the form of images that is triangulated to determine the positions of visual markers. In one or more embodiments of the system, mobile device 101 and mobile device 102*a* share image data of user 150 to create three-dimensional motion analysis data. By determining the positions of mobile devices 101 and 102 (via position determination elements such as GPS chips in the devices as is common, or via cell tower triangulation and which are not shown for brevity but are generally located internally in mobile devices just as computer 160 is), and by obtaining data from motion capture element 111 for example locations of pixels in the images where the visual markers are in each image, distances and hence speeds are readily obtained as one skilled in the art will recognize.

Camera 103 may also be utilized either for still images or as is now common, for video. In embodiments of the system that utilize external cameras, any method of obtaining data from the external camera is in keeping with the spirit of the system including wireless communication of the data, or via wired communication as when camera 103 is docked with computer 105 for example, which then may transfer the data to mobile device 101.

In one or more embodiments of the system, the mobile device on which the motion analysis data is displayed is not required to have a camera, i.e., mobile device 102*b* may display data even though it is not configured with a camera. As such, mobile device 102*b* may obtain images from any combination of cameras on mobile device 101, 102, 102*a*, camera 103 and/or television camera 104 so long as any external camera may communicate images to mobile device 102*b*. Alternatively, no camera is required at all to utilize the system. See also FIG. 17.

For television broadcasts, motion capture element 111 wirelessly transmits data that is received by antenna 106. The wireless sensor data thus obtained from motion capture element 111 is combined with the images obtained from television camera 104 to produce displays with augmented motion analysis data that can be broadcast to televisions, computers such as computer 105, mobile devices 101, 102, 102*a*, 102*b* or any other device configured to display images. The motion analysis data can be positioned on display 120 for example by knowing the location of a camera (for example via GPS information), and by knowing the direction and/or orientation that the camera is pointing so long as the sensor data includes location data (for example GPS information). In other embodiments, visual markers or image processing may be utilized to lock the motion analysis data to the image, e.g., the golf clubhead can be tracked in the images and the corresponding high, middle and low position of the club can be utilized to determine the orientation of user 150 to camera 130 or 104 or 103 for example to correctly plot the augmented data onto the image of user 150. By time stamping images and time stamping motion capture data, for example after synchronizing the timer in the microcontroller with the timer on the mobile device and then scanning the images for visual markers or sporting equipment at various positions, simplified motion capture data may be overlaid onto the images. Any other method of combining images from a camera and motion capture data may be utilized in one or more embodiments of the invention. Any other algorithm for properly positioning the motion analysis data on display 120 with respect to a user (or any other display such as on computer 105) may be utilized in keeping with the spirit of the system. For example, when obtaining events or groups of events via the sensor, after the app receives the events and/or time ranges to obtain images, the app may request image data from that time span from it's local memory, any other mobile device, any other type of camera that may be communicated with and/or post event locations/times so that external camera systems local to the event(s) may provide image data for the times of the event(s).

One such display that may be generated and displayed on mobile device 101 include a BULLET TIME® view using two or more cameras selected from mobile devices 101, 102, 102*a*, camera 103, and/or television camera 104 or any other external camera. In this embodiment of the system, the computer is configured to obtain two or more images of user 150 and data associated with the at least one motion capture element (whether a visual marker or wireless sensor), wherein the two or more images are obtained from two or more cameras and wherein the computer is configured to generate a display that shows slow motion of user 150 shown from around the user at various angles at normal speed. Such an embodiment for example allows a group of fans to create their own BULLET TIME® shot of a golf pro at a tournament for example. The shots may be sent to computer 105 and any image processing required may be performed on computer 105 and broadcast to a television audience for example. In other embodiments of the system, the users of the various mobile devices share their own set of images, and or upload their shots to a website for later viewing for example. Embodiments of the invention also allow images or videos from other players having mobile devices to be utilized on a mobile device related to another user so that users don't have to switch mobile phones for example. In one embodiment, a video obtained by a first user for a piece of equipment in motion that is not associated with the second user having the video camera mobile phone may automatically transfer the video to the first user for display with motion capture data associated with the first user. Alternatively, the first user's mobile phone may be utilized as a motion sensor in place of or in addition to motion capture element 111 and the second user's mobile phone may be utilized to capture video of the first user while in motion. The first user may optionally gesture on the phone, tap/shake, etc., to indicate that the second mobile phone should start/stop motion capture for example.

Figure 1A:
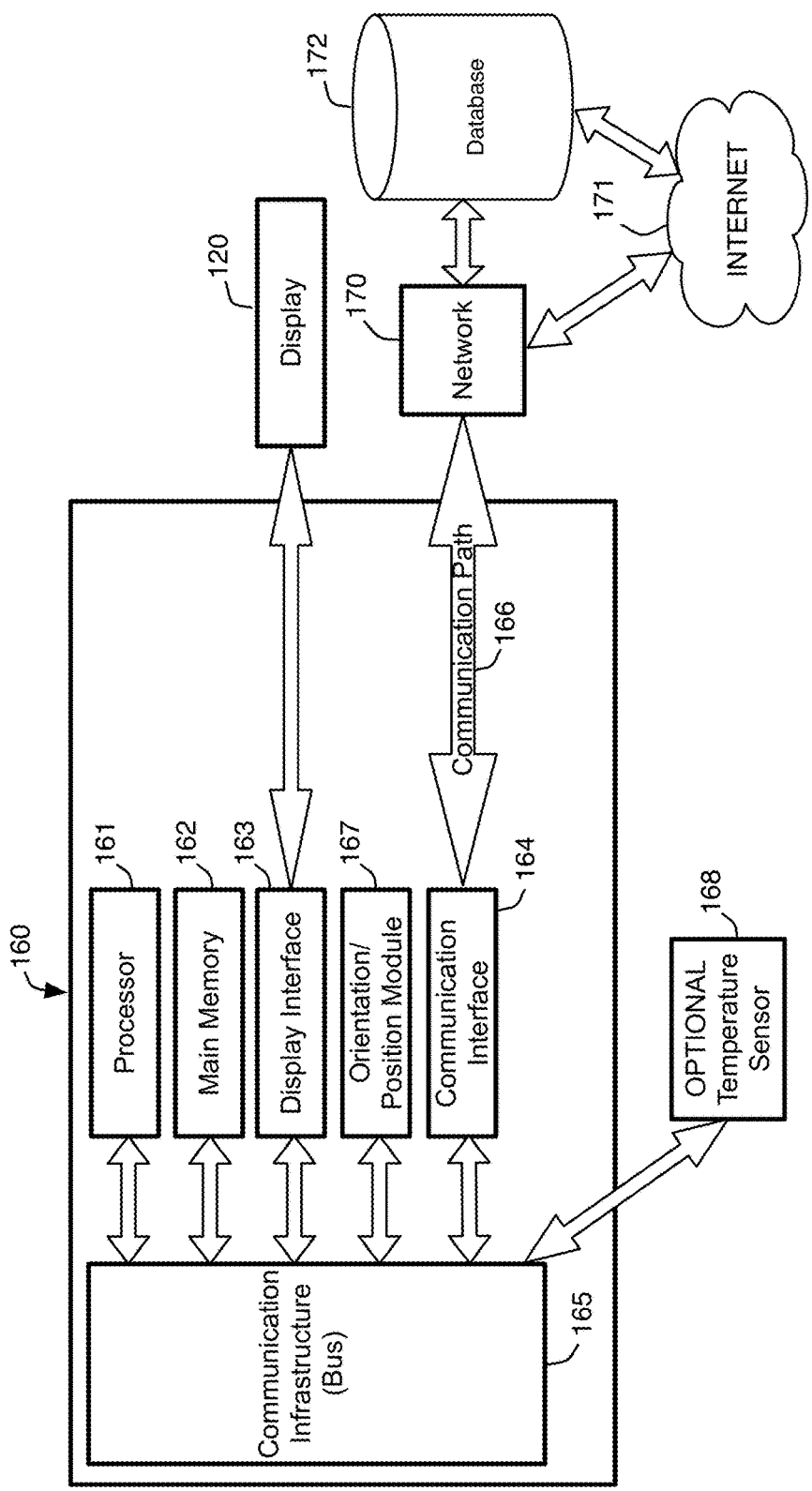
FIG. 1A illustrates a logical hardware block diagram of an embodiment of the computer.

FIG. 1A shows an embodiment of computer 160. In computer 160 includes processor 161 that executes software modules, commonly also known as applications, generally stored as computer program instructions within main memory 162. Display interface 163 drives display 120 of mobile device 101 as shown in FIG. 1. Optional orientation/position module 167 may include a North/South or up/down orientation chip or both. In one or more embodiments, the orientation/position module may include a location determination element coupled with the microcontroller. This may include a GPS device for example. Alternatively, or in combination, the computer may triangulate the location in concert with another computer, or obtain the location from any other triangulation type of receiver, or calculate the location based on images captured via a camera coupled with the computer and known to be oriented in a particular direction, wherein the computer calculates an offset from the mobile device based on the direction and size of objects within the image for example. Optional temperature sensor may coupled with processor 161 via a wired or wireless link and may be utilized for example as an indicator of hypothermia or heat stroke alone or in combination with any motion detected that may be indicative of shaking or unconsciousness for example. Communication interface 164 may include wireless or wired communications hardware protocol chips and/or an RFID reader or an RFID reader may couple to computer 160 externally or in any other manner for example. In one or more embodiments of the system communication interface may include telephonic and/or data communications hardware. In one or more embodiments communication interface 164 may include a Wi-Fi™ or other IEEE 802.11 device and/or BLUETOOTH® wireless communications interface or ZigBee® wireless device or any other wireless technology. BLUETOOTH® class 1 devices have a range of approximately 100 meters, class 2 devices have a range of approximately 10 meters. BLUETOOTH® Low Power devices have a range of approximately 50 meters. Any wireless network protocol or type may be utilized in embodiments of the system so long as mobile device 101 and motion capture element 111 can communicate with one another. Processor 161, main memory 162, display interface 163, communication interface 164 and orientation/position module 167 along with any optional sensors 168 such as temperature, humidity, wind, elevation, light, sound and physiological metrics (such as a heartbeat sensors), may communicate with one another over communication infrastructure 165, which is commonly known as a "bus". Communications path 166 may include wired or wireless medium that allows for communication with other wired or wireless devices over network 170. Network 170 may communicate with Internet 171 and/or database 172. Database 172 may be utilized to save or retrieve images or videos of users, or motion analysis data, or users displayed with motion analysis data in one form or another. The data uploaded to the Internet, i.e., a remote database or remote server or memory remote to the system may be viewed, analyzed or data mined by any computer that may obtain access to the data. This allows for original equipment manufacturers to determine for a given user what sporting equipment is working best and/or what equipment to suggest. Data mining also enables the planning of golf courses based on the data and/or metadata associated with users, such as age, or any other demographics that may be entered into the system. Remote storage of data also enables medical applications such as morphological analysis, range of motion over time, and diabetes prevention and exercise monitoring and compliance applications. Data mining based applications also allow for games that use real motion capture data from other users, one or more previous performances of the same user, or historical players whether alive or dead after analyzing motion pictures or videos of the historical players for example. Virtual reality and augmented virtual reality applications may also utilize the motion capture data or historical motion data. The system also enables uploading of performance related events and/or motion capture data to database 172, which for example may be implemented as a social networking site. This allows for the user to "tweet" high scores, or other metrics during or after play to notify everyone on the Internet of the new event. For example, one or more embodiments include at least one motion capture element 111 configured to couple with a user or piece of equipment or mobile device coupled with the user, wherein the at least one motion capture element includes a memory, a sensor configured to capture any combination of values associated with an orientation, position, velocity, acceleration of the at least one motion capture element, a radio, and a microcontroller coupled with the memory, the sensor and the radio. The microcontroller is configured to collect data that includes sensor values from the sensor, store the data in the memory, analyze the data and recognize an event within the data to determine event data and transmit the event data associated with the event via the radio. Embodiments of the system may also include an application configured to execute on a mobile device wherein the mobile device includes a computer, a wireless communication interface configured to communicate with the radio to obtain the event data associated with the event. The computer is coupled with wireless communication interface wherein the computer executes the application or "app" to configure the computer to receive the event data from the wireless communication interface, analyze the event data to form motion analysis data, store the event data, or the motion analysis data, or both the event data and the motion analysis data, and display information comprising the event data, or the motion analysis data, or both associated with the at least one user on a display.

Figure 1B:
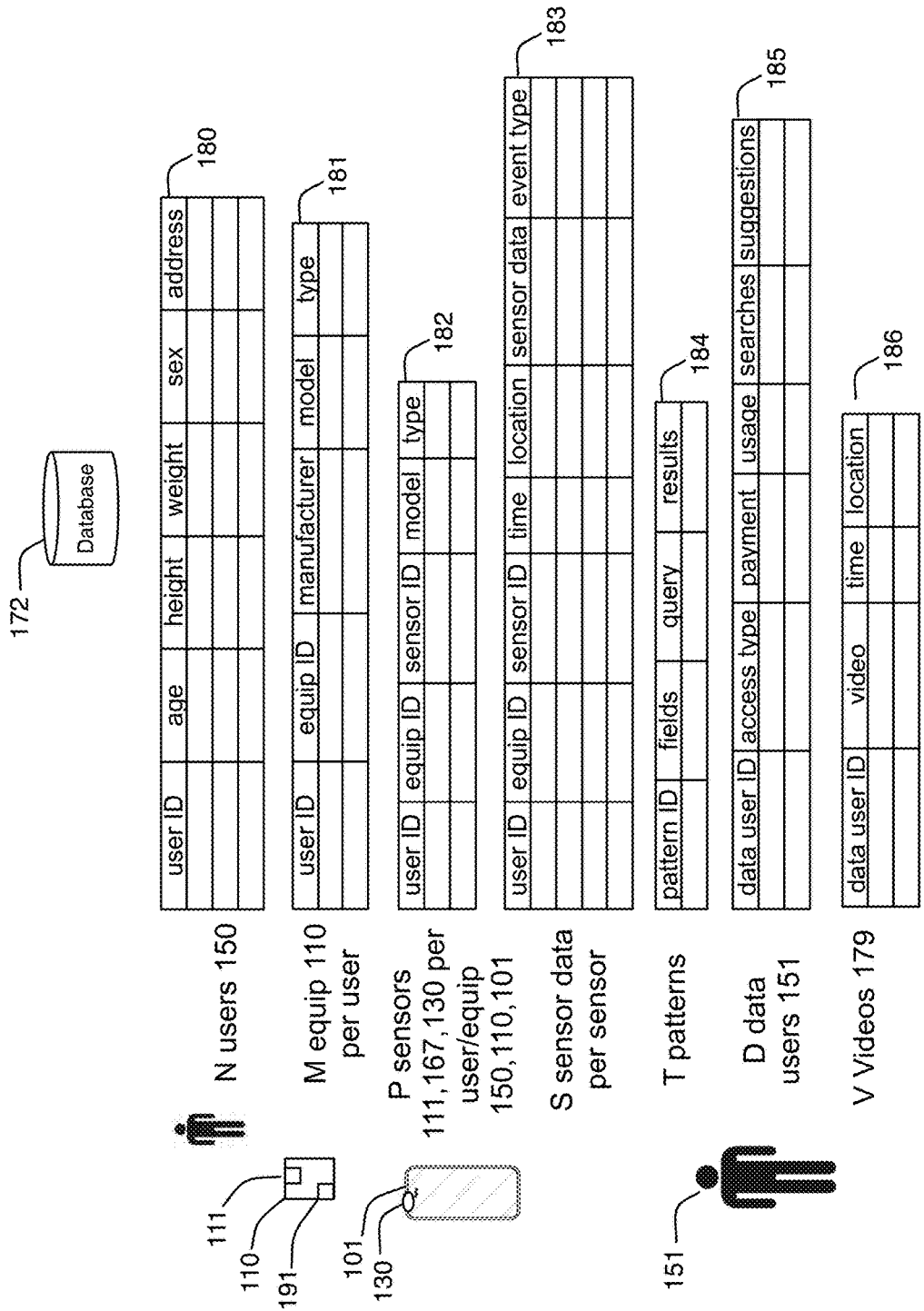
FIG. 1B illustrates an architectural view of an embodiment of the database utilized in embodiments of the system.

FIG. 1B illustrates an architectural view of an embodiment of database 172 utilized in embodiments of the system. As shown tables 180-186 include information related to N number of users, M pieces of equipment per user, P number of sensors per user or equipment, S number of sensor data per sensor, T number of patterns found in the other tables, D number of data users and V videos. All tables shown in FIG. 1B are exemplary and may include more or less information as desired for the particular implementation. Specifically, table 180 includes information related to user 150 which may include data related to the user such as age, height, weight, sex, address or any other data. Table 181 include information related to M number of pieces of equipment 110, which may include clubs, racquets, bats, shirts, pants, shoes, gloves, helmets, etc., for example the manufacturer of the equipment, model of the equipment, and type of the equipment. For example, in a golf embodiment, the manufacturer may be the name of the manufacturer, the model may be a name or model number and the type may be the club number, i.e., 9 iron, the equipment ID may be identifier 191 in one or more embodiments of the invention. Table 182 may include information related to P number of sensors 111 on user 150 or equipment 110 or mobile computer 101. The sensors associated with user 150 may include clothing, clubs, helmets, caps, headbands, mouthpieces, etc., the sensors associated with equipment 110 may for example be motion capture data sensors, while the sensors associated with mobile computer 101 may include sensors 167 for position/orientation and sensors 130 for images/video for example. Table 183 may include information related to S number of sensor data per user per equipment, wherein the table may include the time and location of the sensor data, or any other metadata related to the sensor data such as temperature, weather, humidity, as obtained locally via the temperature sensor shown in FIG. 1A, or via wireless communications or in any other manner for example, or the sensor data may include this information or any combination thereof. The table may also contain a myriad of other fields, such as ball type, i.e., in a golf embodiment the type of golf ball utilized may be saved and later data mined for the best performing ball types, etc. This table may also include an event type as calculated locally, for example a potential concussion event. Table 184 may include information related to T number of patterns that have been found in the data mining process for example. This may include fields that have been searched in the various tables with a particular query and any resulting related results. Any data mining results table type may be utilized in one or more embodiments of the invention as desired for the particular implementation. This may include search results of any kind, including EI measurements, which also may be calculated on computer 160 locally, or any other search value from simple queries to complex pattern searches. Table 185 may include information related to D number of data mining users 151 and may include their access type, i.e., full database or pattern table, or limited to a particular manufacturer, etc., the table may also include payment requirements and/or receipts for the type of usage that the data mining user has paid for or agreed to pay for and any searches or suggestions related to any queries or patterns found for example. Any other schema, including object oriented database relationships or memory based data structures that allow for data mining of sensor data including motion capture data is in keeping with the spirit of the invention. Although exemplary embodiments for particular activities are given, one skilled in the art will appreciate that any type of motion based activity may be captured and analyzed by embodiments of the system using a motion capture element and app that runs on a user's existing cell phone 101, 102 or other computer 105 for example. Embodiments of the database may include V number of videos 179 as held in table 186 for example that include the user that generated the video, the video data, time and location of the video. The fields are optional and in one or more embodiments, the videos may be stored on any of the mobile devices in the system or any combination of the mobile devices and server/DB 172. In one or more embodiments, the videos may be broken into a subset of videos that are associated with the "time" field of the sensor data table 183, wherein the time field may include an event start time and event stop time. In this scenario, large videos may be trimmed into one or more smaller event videos that correspond to generally smaller time windows associated with events of the event type held in table 183 to greatly reduce video storage requirements of the system.

There are a myriad of applications that benefit and which are enabled by embodiments of the system that provide for viewing and analyzing motion capture data on the mobile computer or server/database, for example for data mining database 172 by users 151. For example, users 151 may include compliance monitors, including for example parents, children or elderly, managers, doctors, insurance companies, police, military, or any other entity such as equipment manufacturers that may data mine for product improvement. For example in a tennis embodiment by searching for top service speeds for users of a particular size or age, or in a golf embodiment by searching for distances, i.e., differences in sequential locations in table 183 based on swing speed in the sensor data field in table 183 to determine which manufacturers have the best clubs, or best clubs per age or height or weight per user, or a myriad of other patterns. Other embodiments related to compliance enable messages from mobile computer 101 or from server/database to be generated if thresholds for G-forces, (high or zero or any other levels), to be sent to compliance monitors, managers, doctors, insurance companies, etc., as previously described. Users 151 may include marketing personnel that determine which pieces of equipment certain users own and which related items that other similar users may own, in order to target sales at particular users. Users 151 may include medical personnel that may determine how much movement a sensor for example coupled with a shoe, i.e., a type of equipment, of a diabetic child has moved and how much this movement relates to the average non-diabetic child, wherein suggestions as per table 185 may include giving incentives to the diabetic child to exercise more, etc., to bring the child in line with healthy children. Sports physicians, physiologists or physical therapists may utilize the data per user, or search over a large number of users and compare a particular movement of a user or range of motion for example to other users to determine what areas a given user can improve on through stretching or exercise and which range of motion areas change over time per user or per population and for example what type of equipment a user may utilize to account for changes over time, even before those changes take place. Data mining motion capture data and image data related to motion provides unique advantages to users 151. Data mining may be performed on flex parameters measured by the sensors to determine if sporting equipment, shoes, human body parts or any other item changes in flexibility over time or between equipment manufacturers or any combination thereof.

To ensure that analysis of user 150 during a motion capture includes images that are relatively associated with the horizon, i.e., not tilted, the system may include an orientation module that executes on computer 160 within mobile device 101 for example. The computer is configured to prompt a user to align the camera along a horizontal plane based on orientation data obtained from orientation hardware within mobile device 101. Orientation hardware is common on mobile devices as one skilled in the art will appreciate. This allows the image so captured to remain relatively level with respect to the horizontal plane. The orientation module may also prompt the user to move the camera toward or away from the user, or zoom in or out to the user to place the user within a graphical "fit box", to somewhat normalize the size of the user to be captured. Images may also be utilized by users to prove that they have complied with doctors orders for example to meet certain motion requirements.

Embodiments of the system are further configured to recognize the at least one motion capture element associated with user 150 or piece of equipment 110 and associate at least one motion capture element 111 with assigned locations on user 150 or piece of equipment 110. For example, the user can shake a particular motion capture element when prompted by the computer within mobile device 101 to acknowledge which motion capture element the computer is requesting an identity for. Alternatively, motion sensor data may be analyzed for position and/or speed and/or acceleration when performing a known activity and automatically classified as to the location of mounting of the motion capture element automatically, or by prompting the user to acknowledge the assumed positions. Sensors may be associated with a particular player by team name and jersey number for example and stored in the memory of the motion capture sensor for transmission of events. Any computer shown in FIG. 1 may be utilized to program the identifier associated with the particular motion capture sensor in keeping with the spirit of the invention.

One or more embodiments of the computer in mobile device 101 is configured to obtain at least one image of user 150 and display a three-dimensional overlay onto the at least one image of user 150 wherein the three-dimensional overlay is associated with the motion analysis data. Various displays may be displayed on display 120. The display of motion analysis data may include a rating associated with the motion analysis data, and/or a display of a calculated ball flight path associated with the motion analysis data and/or a display of a time line showing points in time along a time axis where peak values associated with the motion analysis data occur and/or a suggest training regimen to aid the user in improving mechanics of the user. These filtered or analyzed data sensor results may be stored in database 172, for example in table 183, or the raw data may be analyzed on the database (or server associated with the database or in any other computer or combination thereof in the system shown in FIG. 1 for example), and then displayed on mobile computer 101 or on website 173, or via a television broadcast from camera 104 for example. Data mining results may be combined in any manner with the unique displays of the system and shown in any desired manner as well.

Embodiments of the system may also present an interface to enable user 150 to purchase piece of equipment 110 over the wireless interface of mobile device 101, for example via the Internet, or via computer 105 which may be implemented as a server of a vendor. In addition, for custom fitting equipment, such as putter shaft lengths, or any other custom sizing of any type of equipment, embodiments of the system may present an interface to enable user 150 to order a customer fitted piece of equipment over the wireless interface of mobile device 101. Embodiments of the invention also enable mobile device 101 to suggest better performing equipment to user 150 or to allow user 150 to search for better performing equipment as determined by data mining of database 172 for distances of golf shots per club for users with swing velocities within a predefined range of user 150. This allows for real life performance data to be mined and utilized for example by users 151, such as OEMs to suggest equipment to user 150, and be charged for doing so, for example by paying for access to data mining results as displayed in any computer shown in FIG. 1 or via website 173 for example. In one or more embodiments of the invention database 172 keeps track of OEM data mining and is configured to bill users 151 for the amount of access each of users 151 has purchased and/or used for example over a giving billing period. See FIG. 1B for example.

Embodiments of the system are configured to analyze the data obtained from at least one motion capture element and determine how centered a collision between a ball and the piece of equipment is based on oscillations of the at least one motion capture element coupled with the piece of equipment and display an impact location based on the motion analysis data. This performance data may also be stored in database 172 and used by OEMs or coaches for example to suggest clubs with higher probability of a centered hit as data mined over a large number of collisions for example.

While FIG. 1A depicts a physical device, the scope of the systems and methods set forth herein may also encompass a virtual device, virtual machine or simulator embodied in one or more computer programs executing on a computer or computer system and acting or providing a computer system environment compatible with the methods and processes implementing the disclosed ideas. Where a virtual machine, process, device or otherwise performs substantially similarly to that of a physical computer system of the system, such a virtual platform will also fall within the scope of a system of the disclosure, notwithstanding the description herein of a physical system such as that in FIG. 1A.

Figure 1C:
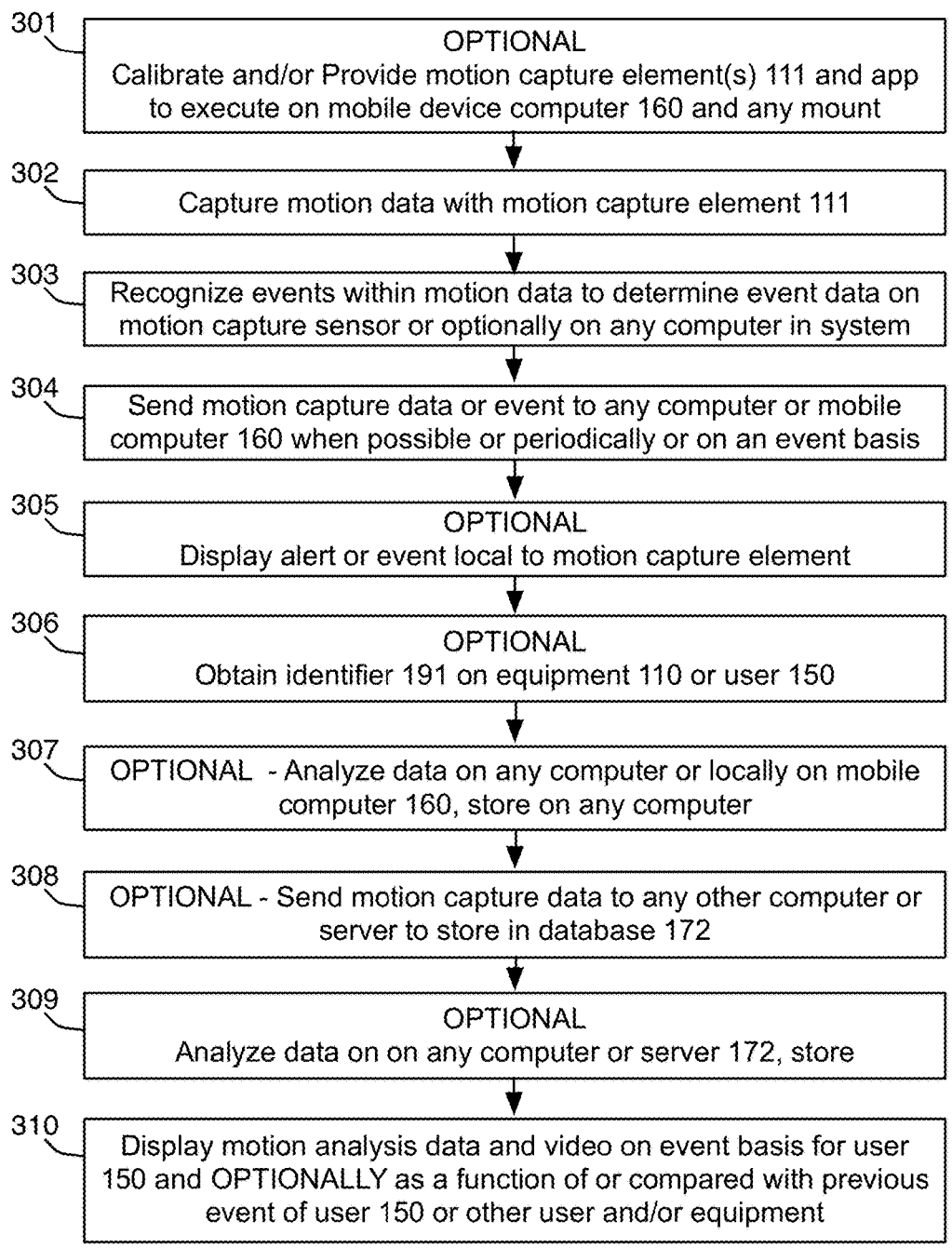
FIG. 1C illustrates a flow chart for an embodiment of the processing performed by embodiments of the computers in the system as shown in FIGS. 1 and 1A.

FIG. 1C illustrates a flow chart for an embodiment of the processing performed and enabled by embodiments of the computers utilized in the system. In one or more embodiments of the system, a plurality of motion capture elements are optionally calibrated at 301. In some embodiments this means calibrating multiple sensors on a user or piece of equipment to ensure that the sensors are aligned and/or set up with the same speed or acceleration values for a given input motion. In other embodiments of the invention, this means placing multiple motion capture sensors on a calibration object that moves and calibrates the orientation, position, speed, acceleration, or any combination thereof at the same time. This step general includes providing motion capture elements and optional mount (or alternatively allowing a mobile device with motion capture sensing capabilities to be utilized), and an app for example that allows a user with an existing mobile phone or computer to utilize embodiments of the system to obtain motion capture data, and potentially analyze and/or send messages based thereon. In one or more embodiments, users may simply purchase a motion capture element and an app and begin immediately using the system. The system captures motion data with motion capture element(s) at 302, recognized any events within the motion capture data, i.e., a linear and/or rotational acceleration over a threshold indicative of a concussion for example at 303, and sends the motion capture data to a mobile computer 101, 102 or 105 for example, which may include an IPOD®, ITOUCH®, IPAD®, IPHONE®, ANDROID® Phone or any other type of computer that a user may utilize to locally collect data at 304. In one or more embodiments the sensor may transmit an event to any other motion capture sensor to start an event data storage process on the other sensors for example. In other embodiments, the sensor may transmit the event to other mobile devices to signify that videos for the event should be saved with unneeded portions of the video discarded for example, to enable the video to be trimmed either near the point in time of the event or at a later time. In one or more embodiments, the system minimizes the complexity of the sensor and offloads processing to extremely capable computing elements found in existing mobile phones and other electronic devices for example. The transmitting of data from the motion capture elements to the user's computer may happen when possible, periodically, on an event basis, when polled, or in any other manner as will be described in various sections herein. This saves great amount of power compared to known systems that continuously send raw data in two ways, first data may be sent in event packets, within a time window around a particular motion event which greatly reduces the data to a meaningful small subset of total raw data, and secondly the data may be sent less than continuously, or at defined times, or when asked for data so as to limit the total number of transmissions. In one or more embodiments, the event may displayed locally, for example with an LED flashing on the motion capture sensor 111, for example yellow slow flashing for potential concussion or red fast flashing for probably concussion at 305. Alternatively, or in combination, the alert or event may be transmitted and displayed on any other computer or mobile device shown in FIG. 1 for example.

The main intelligence in the system is generally in the mobile computer or server where more processing power may be utilized and so as to take advantage of the communications capabilities that are ubiquitous in existing mobile computers for example. In one or more embodiments of the system, the mobile computer may optionally obtain an identifier from the user or equipment at 306, or this identifier may be transmitted as part of step 305, such as a passive RFID or active RFID or other identifier such as a team/jersey number or other player ID, which may be utilized by the mobile computer to determine what user has just been potentially injured, or what weight as user is lifting, or what shoes a user is running with, or what weapon a user is using, or what type of activity a user is using based on the identifier of the equipment. The mobile computer may analyze the motion capture data locally at 307 and display, i.e., show or send information such as a message for example when a threshold is observed in the data, for example when too many G-forces have been registered by a player, soldier or race car driver, or when not enough motion is occurring (either at the time or based on the patterns of data in the database as discussed below based on the user's typical motion patterns or other user's motion patterns for example.) In other embodiments, once a user has performed a certain amount of motion, a message may be sent to safety or compliance monitor(s) at 307 to store or otherwise display the data, including for example referees, parents, children or elderly, managers, doctors, insurance companies, police, military, or any other entity such as equipment manufacturers. The message may be an SMS message, or email, or tweet or any other type of electronic communication. If the particular embodiment is configured for remote analysis or only remote analysis, then the motion capture data may be sent to the server/database at 308. If the implementation does not utilize a remote database, the analysis on the mobile computer is local. If the implementation includes a remote database, then the analysis may be performed on the mobile computer or server/database or both at 309. Once the database obtains the motion capture data, then the data may be analyzed and a message may be sent from the server/database to compliance personnel or business entities as desired to display the event alone or in combination or with respect to previous event data associated with the user or other users at 310.

Embodiments of the invention make use of the data from the mobile computer and/or server for gaming, morphological comparing, compliance, tracking calories burned, work performed, monitoring of children or elderly based on motion or previous motion patterns that vary during the day and night, safety monitoring for players, troops when G-forces exceed a threshold or motion stops, local use of running, jumping throwing motion capture data for example on a cell phone including virtual reality applications that make use of the user's current and/or previous data or data from other users, or play music or select a play list based on the type of motion a user is performing or data mining. For example if motion is similar to a known player in the database, then that user's playlist may be sent to the user's mobile computer 101. The processing may be performed locally so if the motion is fast, fast music is played and if the motion is slow, then slow music may be played. Any other algorithm for playing music based on the motion of the user is in keeping with the spirit of the invention. Any use of motion capture data obtained from a motion capture element and app on an existing user's mobile computer is in keeping with the spirit of the invention, including using the motion data in virtual reality environments to show relative motion of an avatar of another player using actual motion data from the user in a previous performance or from another user including a historical player for example. Display of information is generally performed via three scenarios, wherein display information is based on the user's motion analysis data or related to the user's piece of equipment and previous data, wherein previous data may be from the same user/equipment or one or more other users/equipment. Under this scenario, a comparison of the current motion analysis data with previous data associated with this user/equipment allows for patterns to be analyzed with an extremely cost effective system having a motion capture sensor and app. Under another scenario, the display of information is a function of the current user's performance, so that the previous data selected from the user or another user/equipment is based on the current user's performance. This enables highly realistic game play, for example a virtual tennis game against a historical player wherein the swings of a user are effectively responded to by the capture motion from a historical player. This type of realistic game play with actual data both current and previously stored data, for example a user playing against an average pattern of a top 10 player in tennis, i.e., the speed of serves, the speed and angle of return shots, for a given input shot of a user makes for game play that is as realistic as is possible. Television images may be for example analyzed to determine swing speeds and types of shots taken by historical players that may no longer be alive to test one's skills against a master, as if the master was still alive and currently playing the user. Compliance and monitoring by the user or a different user may be performed in a third scenario without comparison to the user's previous or other user's previous data wherein the different user does not have access to or own for example the mobile computer. In other words, the mobile phone is associated with the user being monitored and the different user is obtaining information related to the current performance of a user for example wearing a motion capture element, such as a baby, or a diabetes patient.

Figure 1D:
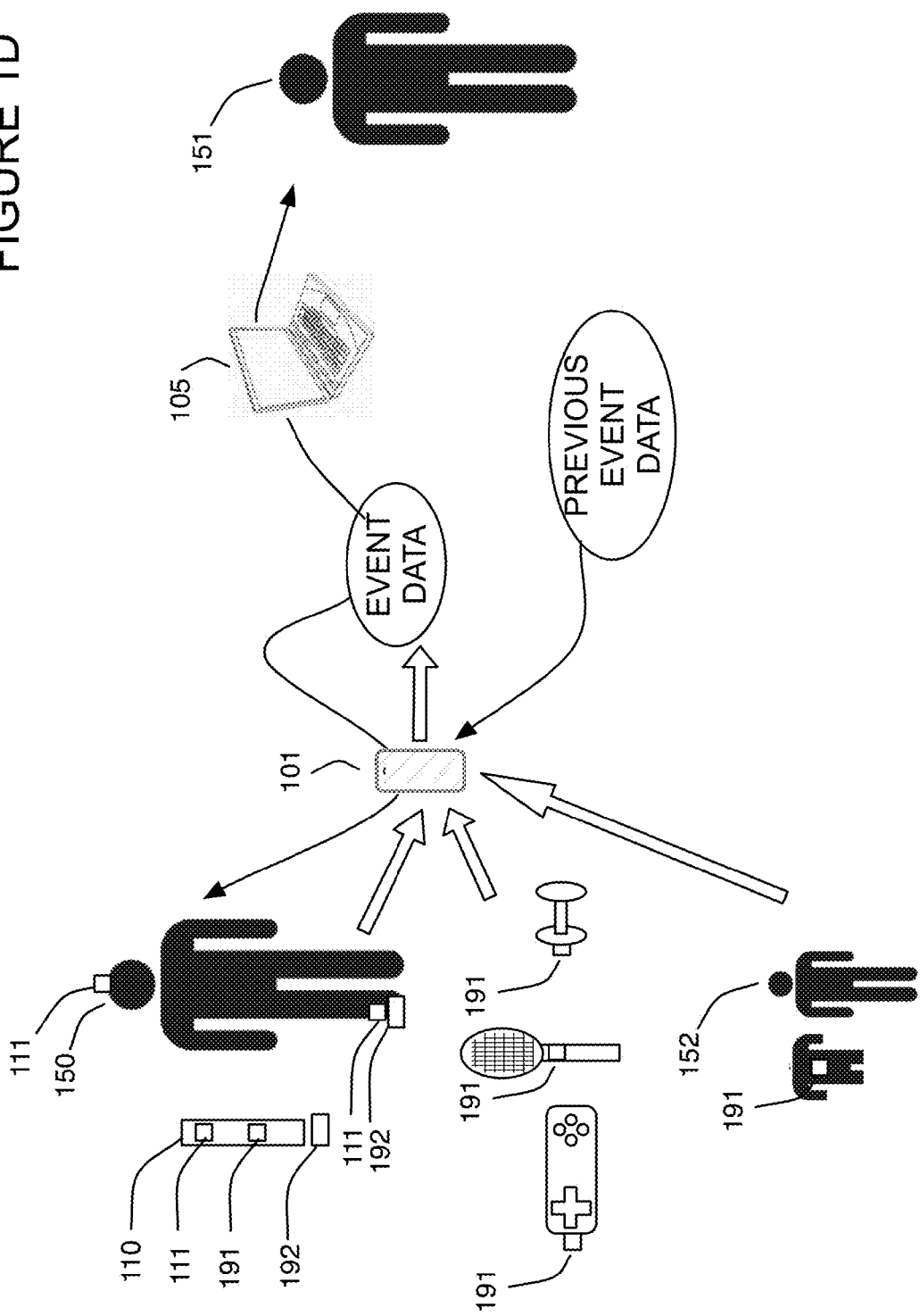
FIG. 1D illustrates a data flow diagram for an embodiment of the system.

FIG. 1D illustrates a data flow diagram for an embodiment of the system. As shown motion capture data is sent from a variety of motion capture elements 111 on many different types of equipment 110 or associated with user 150, for example on clothing, a helmet, headband, cap, mouthpiece or anywhere else coupled with the user. The equipment or user may optionally have an identifier 191 that enables the system to associate a value with the motion, i.e., the weight being lifted, the type of racquet being used, the type of electronic device being used, i.e., a game controller or other object such as baby pajamas associated with second user 152, e.g., a baby. In one or more embodiments, elements 191 in the figure may be replaced or augmented with motion capture elements 111 as one skilled in the art will appreciate. In one or more embodiments of the system, mobile computer 101 receives the motion capture data, for example in event form and for example on an event basis or when requested by mobile computer 101, e.g., after motion capture elements 111 declares that there is data and turns on a receiver for a fix amount of time to field requests so as to not waste power, and if no requests are received, then turn the receiver off for a period of time. Once the data is in mobile computer 101, then the data is analyzed, for example to take raw or event based motion capture data and for example determine items such as average speed, etc., that are more humanly understandable in a concise manner. The data may be stored, shown to the right of mobile computer 101 and then the data may be displayed to user 150, or 151, for example in the form of a monitor or compliance text or email or on a display associated with mobile computer 101 or computer 105. This enables users not associated with the motion capture element and optionally not even the mobile computer potentially to obtain monitor messages, for example saying that the baby is breathing slowly, or for example to watch a virtual reality match or performance, which may include a user supplying motion capture data currently, a user having previously stored data or a historical player, such as a famous golfer, etc., after analysis of motion in video from past tournament performance(s). In gaming scenarios, where the data obtained currently, for example from user 150 or equipment 110, the display of data, for example on virtual reality glasses may make use of the previous data from that user/equipment or another user/equipment to respond to the user's current motion data, i.e., as a function of the user's input. The previous data may be stored anywhere in the system, e.g., in the mobile computer 101, computer 105 or on the server or database 172 (see FIG. 1). The previous data may be utilized for example to indicate to user 151 that user 150 has undergone a certain number of potential concussion events, and therefore must heal for a particular amount of time before playing again. Insurance companies may demand such compliance to lower medical expenses for example. Video may be stored and retrieved from mobile device 101, computer 105 or as shown in FIG. 1, on server or in database coupled with server 172 to form event videos that include the event data and the video of the event shown simultaneously for example on a display, e.g., overlaid or shown in separate portions of the display of mobile computer 101 or computer 105 generally.

Figure 2B:
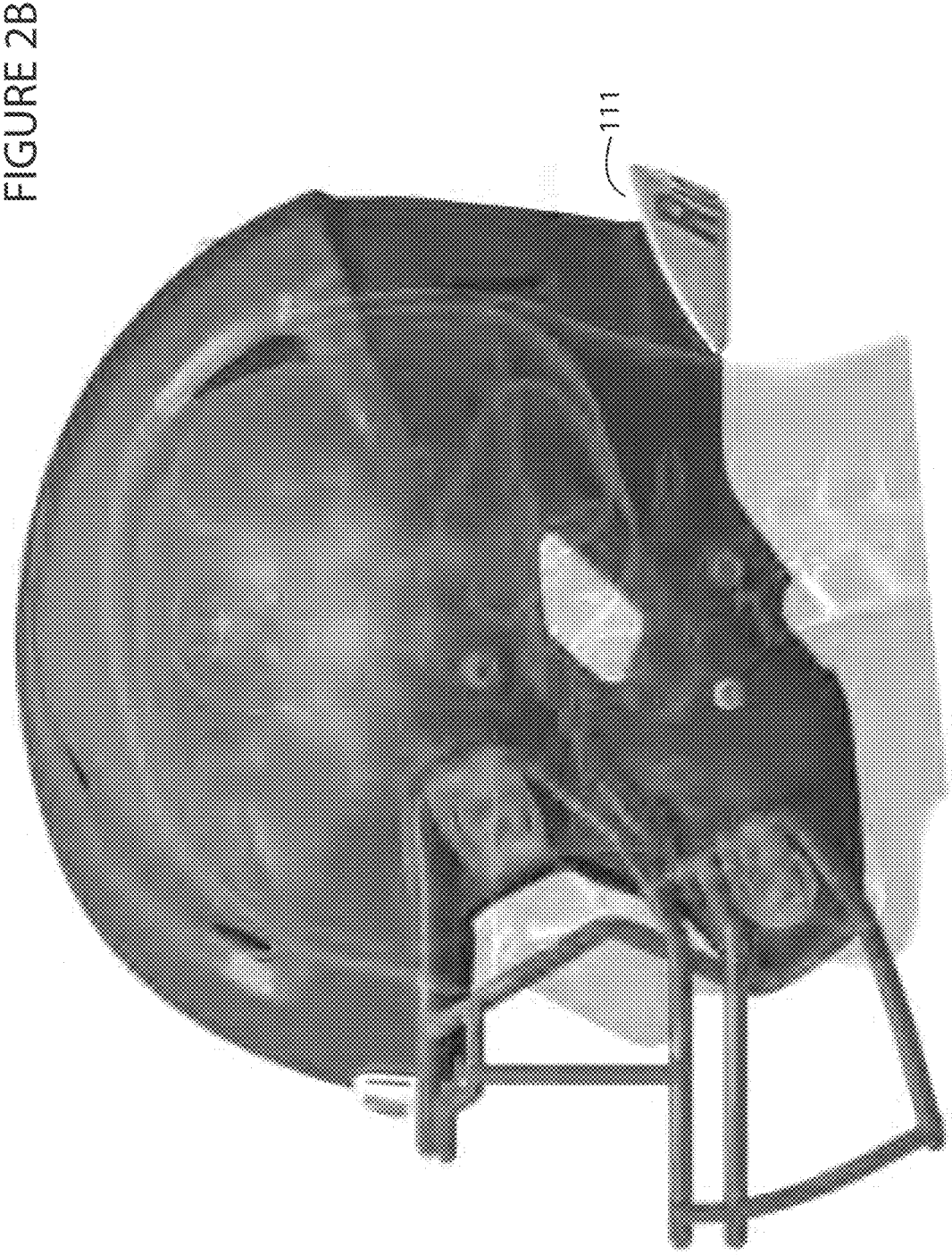
FIG. 2B illustrates a neck insert based mount that enables retrofitting existing helmets with a motion capture sensor.

FIG. 2A illustrates a helmet 110a based mount that surrounds the head 150a of a user wherein the helmet based mount holds a motion capture sensor 111, for example as shown on the rear portion of the helmet. FIG. 2B illustrates a neck insert based mount, shown at the bottom rear portion of the helmet, that enables retrofitting existing helmets with a motion capture sensor 111. In embodiments that include at least one motion capture sensor that is configured to be coupled with or otherwise worn near the user's head 150a, the microcontroller may be further configured to calculate of a location of impact on the user's head. The calculation of the location of impact on the user's head is based on the physical geometry of the user's head and/or helmet. For example, if motion capture element 111 indicates a rearward acceleration with no rotation (to the right in the figure as shown), then the location of impact may be calculated by tracing the vector of acceleration back to the direction of the outside perimeter of the helmet or user's head. This non-rotational calculation effectively indicates that the line of force passes near or through the center of gravity of the user's head/helmet, otherwise rotational forces are observed by motion capture element 111. If a sideward vector is observed at the motion capture element 111, then the impact point is calculated to be at the side of the helmet/head and through the center of gravity. Hence, any other impact that does not impart a rotational acceleration to the motion capture sensor over at least a time period near the peak of the acceleration for example, or during any other time period, may be assumed to be imparted in a direction to the helmet/head that passes through the center of gravity. Hence, the calculation of the point of impact is calculated as the intersection of the outer perimeter of the helmet/head that a vector of force is detected and traversed backwards to the point of impact by calculating the distance and angle back from the center of gravity. For example, if the acceleration vector is at 45 degrees with no rotation, then the point of impact is 45 degrees back from the center of gravity of the helmet/head, hence calculating the sine of 45, approximately 0.7 multiplied by the radius of the helmet or 5 inches, results in an impact about 3.5 inches from the front of the helmet. Alternatively, the location of impact may be kept in angular format to indicate that the impact was at 45 degrees from the front of the helmet/head. Conversely, if rotational acceleration is observed without linear acceleration, then the helmet/head is rotating about the sensor. In this scenario, the force required to rotate the brain passes in front of the center of gravity and is generally orthogonal to a line defined as passing through the center of gravity and the sensor, e.g., a side impact, otherwise translation linear acceleration would be observed. In this case, the location of impact then is on the side of the helmet/head opposite the direction of the acceleration. Hence, these two calculations of location of impact as examples of simplified methods of calculations that may be utilized although any other vector based algorithm that takes into account the mass of the head/helmet and the size of the head/helmet may be utilized. One such algorithm may utilize any mathematical equations such as F=m*a, i.e., Force equal mass times acceleration, and Torque=r×F, where r is the position vector at the outer portion of the head/helmet, X is the cross product and F is the Force vector, to calculate the force vector and translate back to the outer perimeter of the helmet/head to calculate the Force vector imparted at that location if desired. Although described with respect to a helmet, other embodiments of the at least one motion capture sensor may be configured to be coupled with a hat or cap, within a protective mouthpiece, using any type of mount, enclosure or coupling mechanism. Similar calculations may be utilized for the hat/cap/mouthpiece to determine a location/direction of impact, linear or rotational forces from the accelerations or any other quantities that may be indicative of concussion related events for example. Embodiments may include a temperature sensor coupled with the at least one motion capture sensor or with the microcontroller for example as shown in FIG. 1A. The temperature sensor may be utilized alone or in combination with the motion capture element, for example to determine if the body or head is shivering, i.e., indicative of hypothermia, or if no movement is detected and the temperature for example measure wirelessly or via a wire based temperature sensor indicates that the body or brain is above a threshold indicative of heat stroke.

Embodiments of the invention may also utilize an isolator configured to surround the at least one motion capture element to approximate physical acceleration dampening of cerebrospinal fluid around the user's brain to minimize translation of linear acceleration and rotational acceleration of the event data to obtain an observed linear acceleration and an observed rotational acceleration of the user's brain. Thus embodiments do not have to translate forces or acceleration values or any other values from the helmet based acceleration to the observed brain acceleration values and thus embodiments of the invention utilize less power and storage to provide event specific data, which in turn minimizes the amount of data transfer which yields lower transmission power utilization. Different isolators may be utilized on a football/hockey/lacrosse player's helmet based on the type of padding inherent in the helmet. Other embodiments utilized in sports where helmets are not worn, or occasionally worn may also utilize at least one motion capture sensor on a cap or hat, for example on a baseball player's hat, along with at least one sensor mounted on a batting helmet. Headband mounts may also be utilized in sports where a cap is not utilized, such as soccer to also determine concussions. In one or more embodiments, the isolator utilized on a helmet may remain in the enclosure attached to the helmet and the sensor may be removed and placed on another piece of equipment that does not make use of an isolator that matches the dampening of a user's brain fluids. Embodiments may automatically detect a type of motion and determine the type of equipment that the motion capture sensor is currently attached to based on characteristic motion patterns associated with certain types of equipment, i.e., surfboard versus baseball bat. In one or more embodiments an algorithm that may be utilized to calculate the physical characteristics of an isolator may include mounting a motion capture sensor on a helmet and mounting a motion capture sensor in a headform in a crash test dummy head wherein the motion capture sensor in the headform is enclosed in an isolator. By applying linear and rotational accelerations to the helmet and observing the difference in values obtained by the helmet sensor and observed by the sensor in the headform for example with respect to a sensor placed in a cadaver head within a helmet, the isolator material of the best matching dampening value may be obtained that most closely matches the dampening effect of a human brain.

Figure 3:
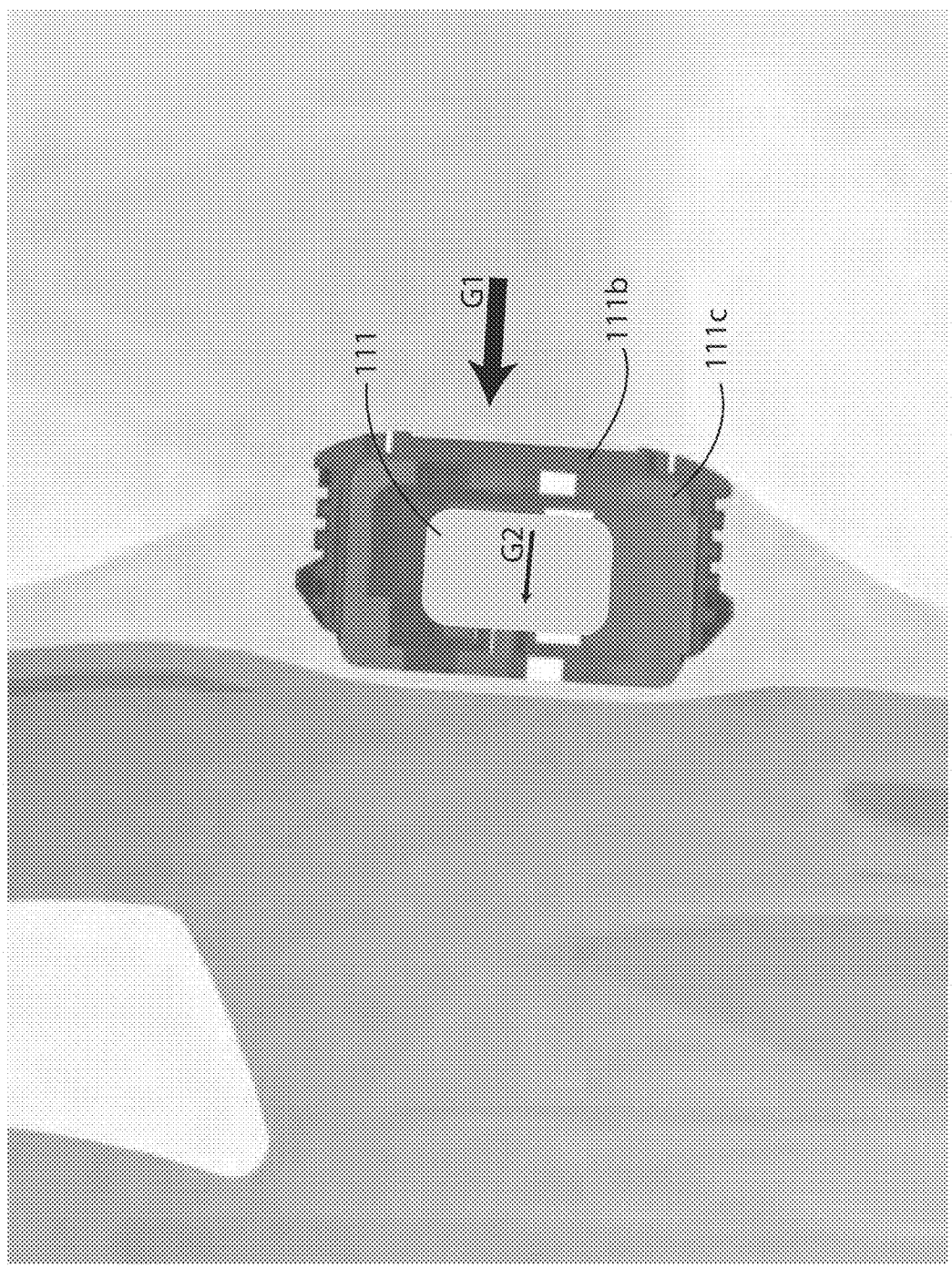
FIG. 3 illustrates a close-up of the mount of FIGS. 2A-B showing the isolator between the motion capture sensor and external portion of the helmet.

FIG. 3 illustrates a close-up of the mount of FIGS. 2A-B showing the isolator between the motion capture sensor and external portion of the helmet. Embodiments of the invention may be configured to obtain/calculate a linear acceleration value or a rotational acceleration value or both. This enables rotational events to be monitored for concussions as well as linear accelerations. As shown, an external acceleration G1 may impart a lower acceleration more associated with the acceleration observed by the human brain, namely G2 on sensor 111 by utilizing isolator 111*c* within sensor mount 111*b*. This enables rotational events to be monitored for concussions as well as linear accelerations. Other events may make use of the linear and/or rotational acceleration and/or velocity, for example as compared against patterns or templates to not only switch sensor personalities during an event to alter the capture characteristics dynamically, but also to characterize the type of equipment currently being utilized with the current motion capture sensor. This enables a single motion capture element purchase by a user to instrument multiple pieces of equipment or clothing by enabling the sensor to automatically determine what type of equipment or piece of clothing the sensor is coupled to based on the motion captured by the sensor when compared against characteristic patterns or templates of motion.

FIG. 4A illustrates a top cross sectional view of the motion capture element 111 mounted on helmet 110*a* having padding 110*a*1 that surrounds cranium 401, and brain 402 of a user. FIG. 4B illustrates a rotational concussion event for the various elements shown in FIG. 4A. As shown, different acceleration values may be imparted on the human brain 402 and cranium 401 having center of gravity 403 and surrounded by padding 110*a*1 in helmet 110*a*. As shown, to move within a unit time period, the front portion of the brain must accelerate at a higher rate G2a, than the rear portion of the brain at G2c or at G2b at the center of gravity. Hence, for a given rotational acceleration value different areas of the brain may be affected differently. One or more embodiments of the invention may thus transmit information not only related to linear acceleration, but also with rotational acceleration.

Figure 5:
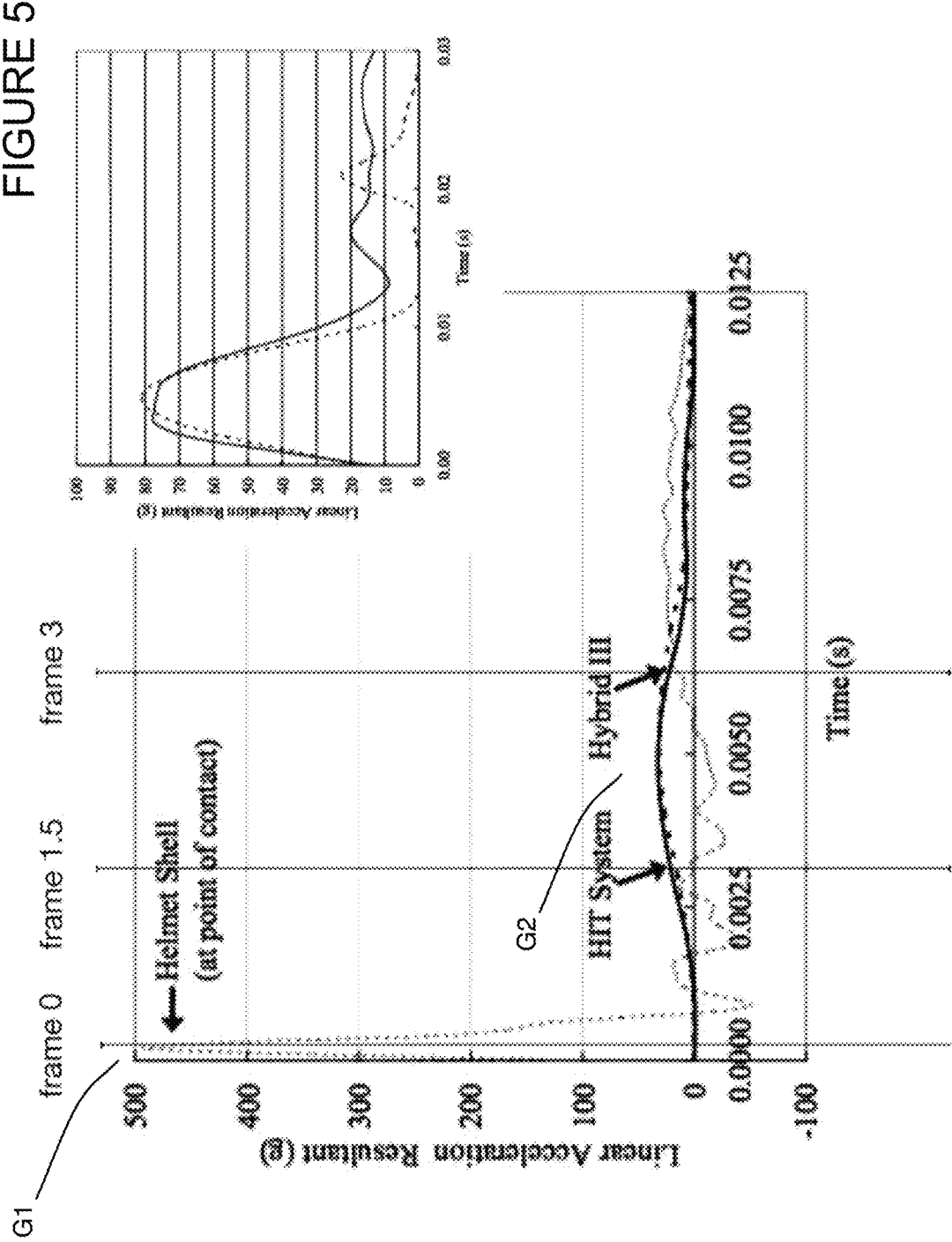
FIG. 5 illustrates the input force to the helmet, G1, versus the observed force within the brain and as observed by the sensor when mounted within the isolator.

FIG. 5 illustrates the input force to the helmet, G1, e.g., as shown at 500 g, versus the observed force within the brain G2, and as observed by the sensor when mounted within the isolator and as confirmed with known headform acceleration measurement systems. The upper right graph shows that two known headform systems confirm acceleration values observed by an isolator based motion capture element 111 shown in FIG. 4A with respect to headform mounted accelerometers.

FIG. 6 illustrates the rotational acceleration values of the 3 axes along with the total rotational vector amount along with video of the concussion event as obtained from a camera and displayed with the motion event data. In one or more embodiments, the acceleration values from a given sensor may be displayed for rotational (as shown) or linear values, for example by double tapping a mobile device screen, or in any other manner. Embodiments of the invention may transmit the event data associated with the event using a connectionless broadcast message. In one or more embodiments, depending on the wireless communication employed, broadcast messages may include payloads with a limited amount of data that may be utilized to avoid handshaking and overhead of a connection based protocol. In other embodiments connectionless or connection based protocols may be utilized in any combination. In this manner, a referee may obtain nearly instantaneous readouts of potential concussion related events on a mobile device, which allows the referee to obtain medical assistance in rapid fashion.

In one or more embodiments, the computer may access previously stored event data or motion analysis data associated with the user or piece of equipment, for example to determine the number of concussions or falls or other swings, or any other motion event. Embodiments may also present event data associated with the at least one user on a display based on the event data or motion analysis data associated with the user or piece of equipment and the previously stored event data or motion analysis data associated with the user or piece of equipment or with at least one other user or other piece of equipment. This enables comparison of motion events, in number or quantitative value, e.g., the maximum rotational acceleration observed by the user or other users in a particular game or historically. In addition, patterns or templates that define characteristic motion of particular pieces of equipment for typical events may be dynamically updated, for example on a central server or locally, and dynamically updated in motion capture sensors via the wireless interface in one or more embodiments. This enables sensors to improve over time. Hence, the display shown in FIG. 6 may also indicate the number of concussions previously stored for a given boxer/player and enable the referee/doctor to make a decision as to whether or not the player may keep playing or not.

Embodiments of the invention may transmit the information to a display on a visual display coupled with the computer or a remote computer, for example over broadcast television or the Internet for example. Hence, the display in FIG. 6 may be also shown to a viewing audience, for example in real-time to indicate the amount of force imparted upon the boxer/player/rider, etc.

FIG. 7 illustrates a timeline display 2601 of a user along with peak and minimum angular speeds along the timeline shown as events along the time line. In addition, a graph showing the lead and lag of the golf club 2602 along with the droop and drift of the golf club is shown in the bottom display wherein these values determine how much the golf club shaft is bending in two axes as plotted against time. An embodiment of the display is shown in FIG. 8 with simplified time line and motion related event (maximum speed of the swing) annotated on the display.

Figure 8:
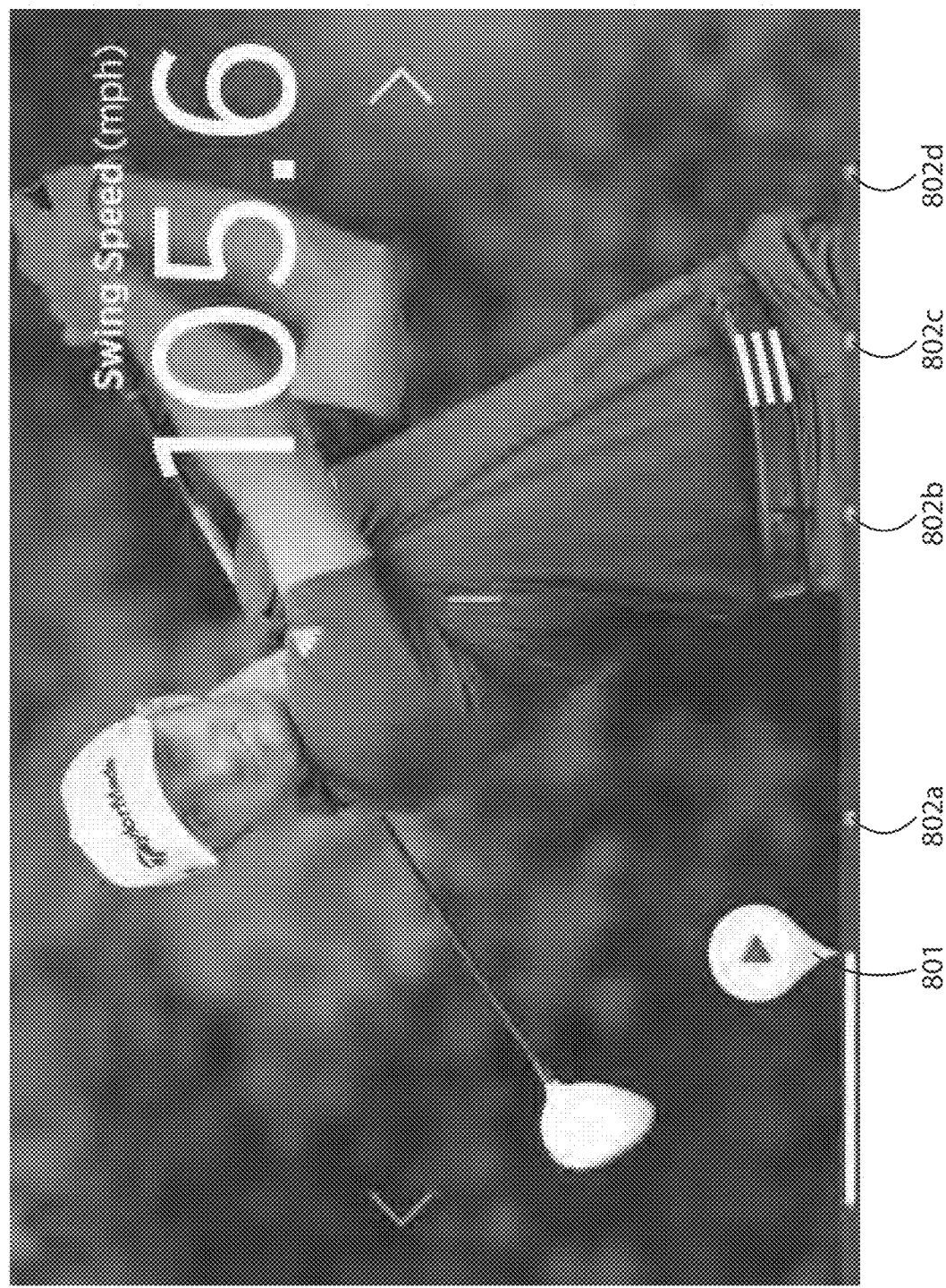
FIG. 8 illustrates a sub-event scrub timeline that enables inputs near the start/stop points in time associated with sub-events to be scrolled to, played to or from, to easily enable viewing of sub-events.

FIG. 8 illustrates a sub-event scrub timeline that enables inputs near the start/stop points 802a-d in time, i.e., sub-event time locations shown in FIG. 7 and associated with sub-events to be scrolled to, played to or from, to easily enable viewing of sub-events. For example a golf swing may include sub-events such as an address, swing back, swing forward, strike, follow through. The system may display time locations for the sub-events 802a-d and accept user input near the location to assert that the video should start or stop at that point in time, or scroll to or back to that point in time for ease of viewing sub-events for example. User input element 801 may be utilized to drag the time to a nearby sub-event for example to position the video at a desired point in time. Alternatively, or in combination a user input such as asserting a finger press near another sub-event point in time while the video is playing, may indicate that the video should stop at the next sub-event point in time. The user interface may also be utilized to control-drag the points to more precisely synchronize the video to the frame in which a particular sub-event or event occurs. For example, the user may hold the control key and drag a point 802b to the left or right to match the frame of the video to the actual point in time where the velocity of the clubhead is zero for example to more closely synchronize the video to the actual motion analysis data shown, here Swing Speed in miles per hour. Any other user gesture may be utilized in keeping with the spirit of the invention to synchronize a user frame to the motion analysis data, such as voice control, arrow keys, etc.

Figure 9:
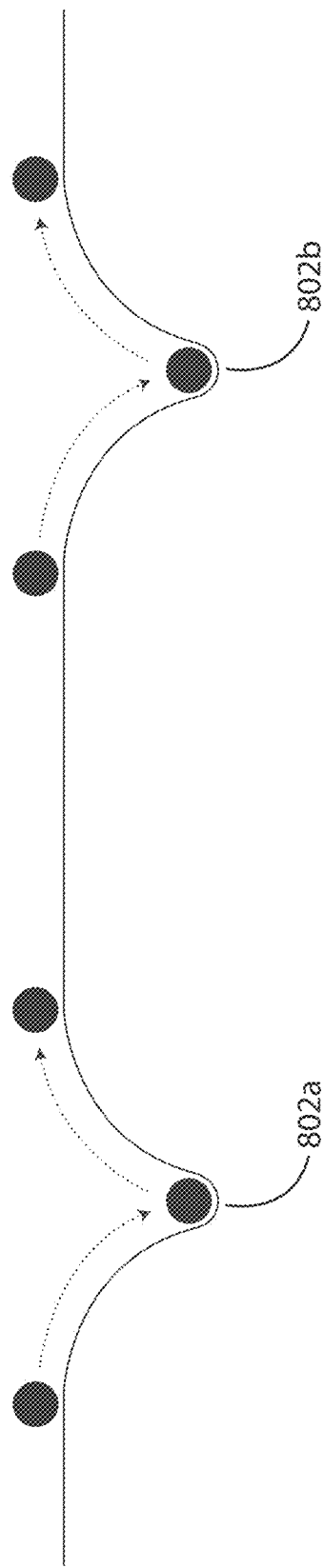
FIG. 9 illustrates the relative locations along the timeline where sub-events start and stop and the gravity associated with the start and stop times, which enable user inputs near those points to gravitate to the start and stop times.

FIG. 9 illustrates the relative locations along the timeline where sub-events 802a and 802b start and stop and the gravity associated with the start and stop times, which enable user inputs near those points to gravitate to the start and stop times. For example, when dragging the user interface element 801 left and right along the time line, the user interface element may appear to move toward the potential well 802a and 802b, so that the user interface element is easier to move to the start/stop point of a sub-event.

In one or more embodiments, the computer is further configured to request at least one image or video that contains the event from at least one camera proximal to the event. This may include a broadcast message requesting video from a particular proximal camera or a camera that is pointing in the direction of the event. In one or more embodiments, the computer is further configured to broadcast a request for camera locations proximal to the event or oriented to view the event, and optionally display the available cameras, or videos therefrom for the time duration around the event of interest. In one or more embodiments, the computer is further configured to display a list of one or more times at which the event has occurred, which enables the user obtain the desired event video via the computer, and/or to independently request the video from a third party with the desired event times. The computer may obtain videos from the server 172 as well and locally trim the video to the desired events. This may be utilized to obtain third party videos or videos from systems that do not directly interface with the computer, but which may be in communication with the server 172.

Figure 10:
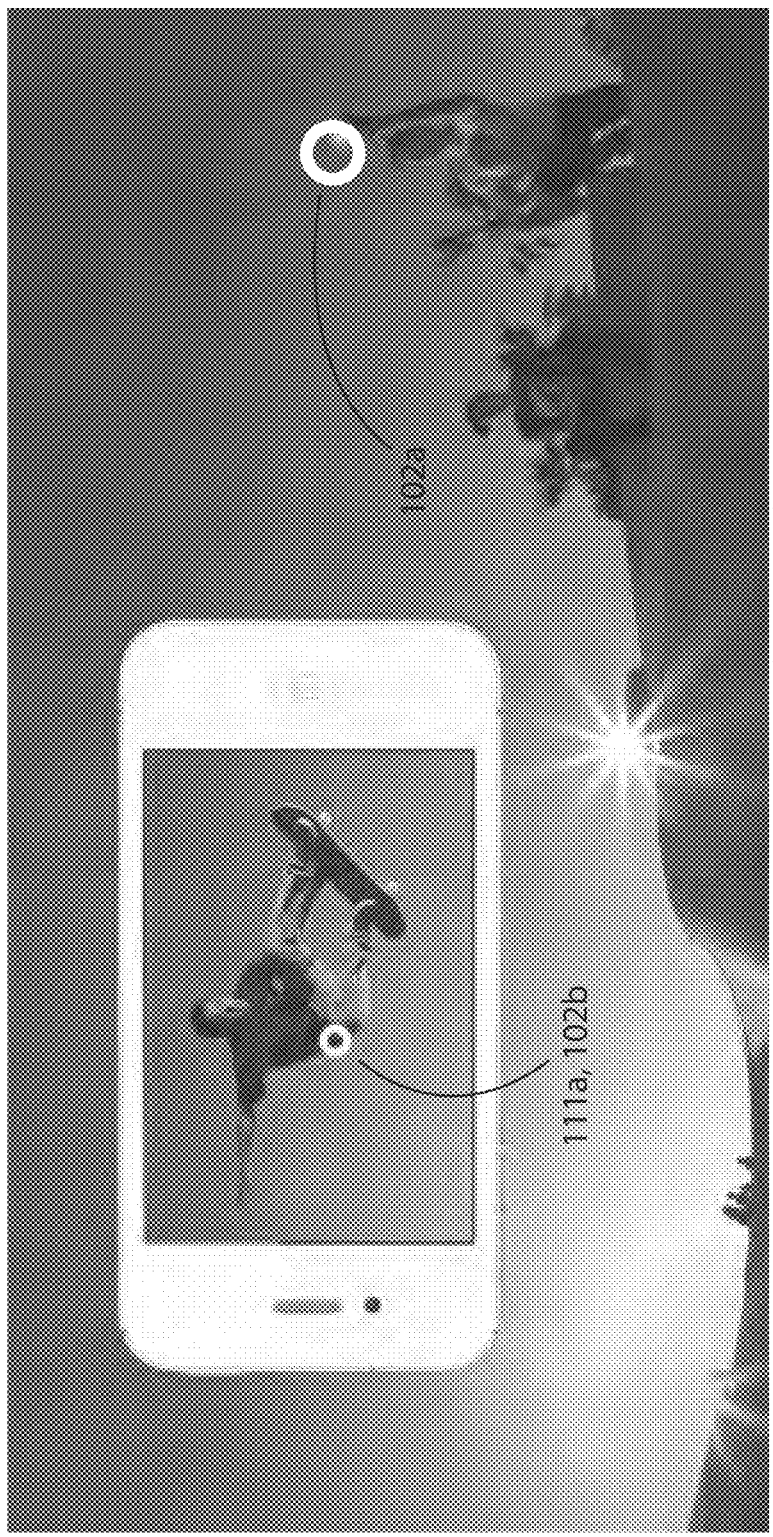
FIG. 10 illustrates an embodiment that utilizes a mobile device as the motion capture element and another mobile device as the computer that receives the motion event data and video of the first user event.

FIG. 10 illustrates an embodiment that utilizes a mobile device 102b as the motion capture element 111a and another mobile device 102a as the computer that receives the motion event data and video of the first user event. The view from mobile device 102a is shown in the left upper portion of the figure. In one or more embodiments, the at least one motion capture sensor is coupled with the mobile device and for example uses an internal motion sensor 111a within or coupled with the mobile device. This enables motion capture and event recognition with minimal and ubiquitous hardware, e.g., using a mobile device with a built-in accelerometer. In one or more embodiments, a first mobile device 102b may be coupled with a user recording motion data, here shown skateboarding, while a second mobile device 102a is utilized to record a video of the motion. In one or more embodiments, the user undergoing motion may gesture, e.g., tap N times on the mobile device to indicate that the second user's mobile device should start recording video or stop recording video. Any other gesture may be utilized to communicate event related or motion related indications between mobile devices.

Thus embodiments of the invention may recognize any type of motion event, including events related to motion that is indicative of standing, walking, falling, a heat stroke, seizure, violent shaking, a concussion, a collision, abnormal gait, abnormal or non-existent breathing or any combination thereof or any other type of event having a duration of time during with motion occurs. Events may also be of any granularity, for example include sub-events that have known signatures, or otherwise match a template or pattern of any type, including amplitude and/or time thresholds in particular sets of linear or rotational axes. For example, events indicating a skateboard push-off or series of pushes may be grouped into a sub-event such as "prep for maneuver", while rotational axes in X for example may indicate "skateboard flip/roll". In one or more embodiments, the events may be grouped and stored/sent.

Figure 11:
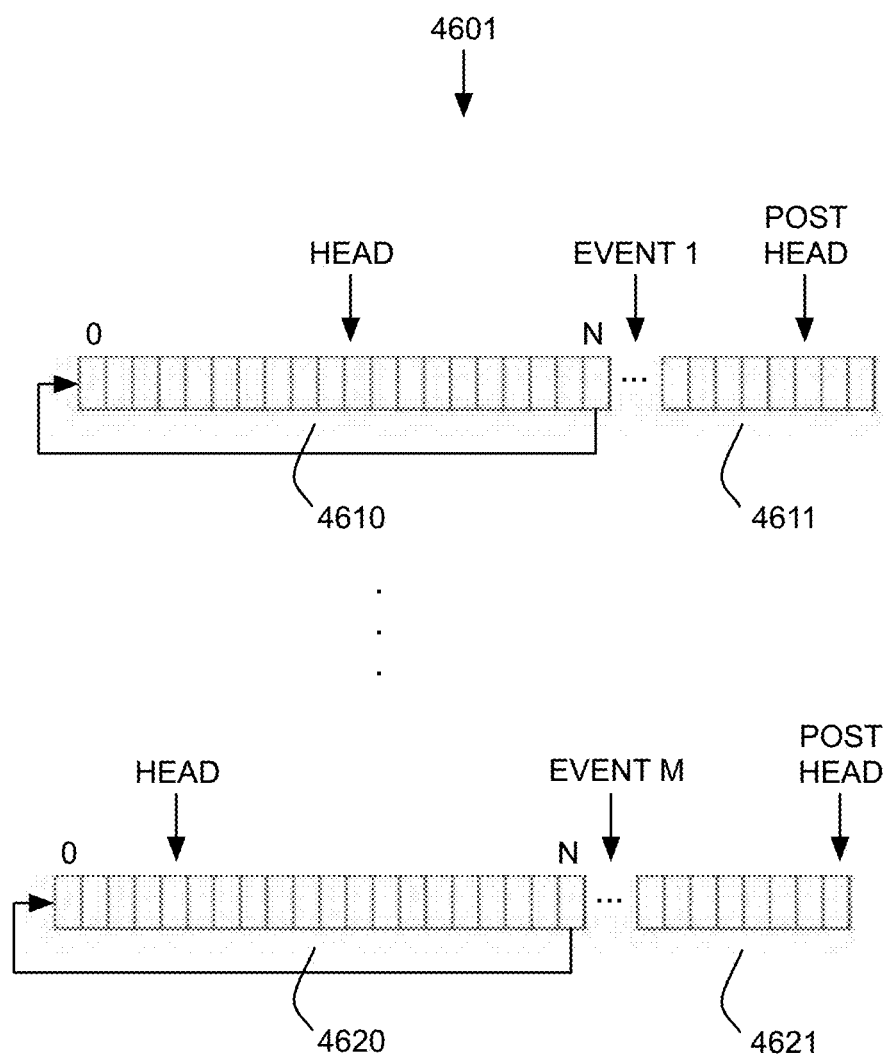
FIG. 11 illustrates an embodiment of the memory utilized to store data related to a potential event.

FIG. 11 illustrates an embodiment of the memory utilized to store data. Memory 4601 may for example be integral to the microcontroller in motion capture element 111 or may couple with the microcontroller, as for example a separate memory chip. Memory 4601 as shown may be configured to include one or more memory buffer 4610, 4611 and 4620, 4621 respectively. One embodiment of the memory buffer that may be utilized is a ring buffer. The ring buffer may be implemented to be overwritten multiple times until an event occurs. The length of the ring buffer may be from 0 to N memory units. There may for example be M ring buffers, for M strike events for example. The number M may be any number greater than zero. In one or more embodiments, the number M may be equal to or greater than the number of expected events, e.g., number of hits, or shots for a round of golf, or any other number for example that allows all motion capture data to be stored on the motion capture element until downloaded to a mobile computer or the Internet after one or more events. In one embodiment, a pointer, for example called HEAD keeps track of the head of the buffer. As data is recorded in the buffer, the HEAD is moved forward by the appropriate amount pointing to the next free memory unit. When the buffer becomes full, the pointer wraps around to the beginning of the buffer and overwrites previous values as it encounters them. Although the data is being overwritten, at any instance in time (t), there is recorded sensor data from time (t) back depending on the size of the buffer and the rate of recording. As the sensor records data in the buffer, an "Event" in one or more embodiments stops new data from overwriting the buffer. Upon the detection of an Event, the sensor can continue to record data in a second buffer 4611 to record post Event data, for example for a specific amount of time at a specific capture rate to complete the recording of a prospective shot. Memory buffer 4610 now contains a record of data for a desired amount of time from the Event backwards, depending on the size of the buffer and capture rate along with post Event data in the post event buffer 4611. Video may also be stored in a similar manner and later trimmed, see FIG. 19 for example.

For example, in a golf swing, the event can be the impact of the clubhead with the ball. Alternatively, the event can be the impact of the clubhead with the ground, which may give rise to a false event. In other embodiments, the event may be an acceleration of a user's head which may be indicative of a concussion event, or a shot fired from a weapon, or a ball striking a baseball bat or when a user moves a weight to the highest point and descends for another repetition. The Pre-Event buffer stores the sensor data up to the event of impact, the Post-Event buffer stores the sensor data after the impact event. One or more embodiments of the microcontroller are configured to analyze the event and determine if the event is a repetition, firing or event such as a strike or a false strike. If the event is considered a valid event according to a pattern or signature or template (see FIGS. 13 and 15), and not a false event, then another memory buffer 4620 is used for motion capture data up until the occurrence of a second event. After that event occurs, the post event buffer 4621 is filled with captured data.

Specifically, the motion capture element 111 may be implemented as one or more MEMs sensors. The sensors may be commanded to collect data at specific time intervals. At each interval, data is read from the various MEMs devices, and stored in the ring buffer. A set of values read from the MEMs sensors is considered a FRAME of data. A FRAME of data can be 0, 1, or multiple memory units depending on the type of data that is being collected and stored in the buffer. A FRAME of data is also associated with a time interval. Therefore frames are also associated with a time element based on the capture rate from the sensors. For example, if each Frame is filled at 2 ms intervals, then 1000 FRAMES would contain 2000 ms of data (2 seconds). In general, a FRAME does not have to be associated with time.

Data can be constantly stored in the ring buffer and written out to non-volatile memory or sent over a wireless or wired link over a radio/antenna to a remote memory or device for example at specified events, times, or when communication is available over a radio/antenna to a mobile device or any other computer or memory, or when commanded for example by a mobile device, i.e., "polled", or at any other desired event.

Figure 12:
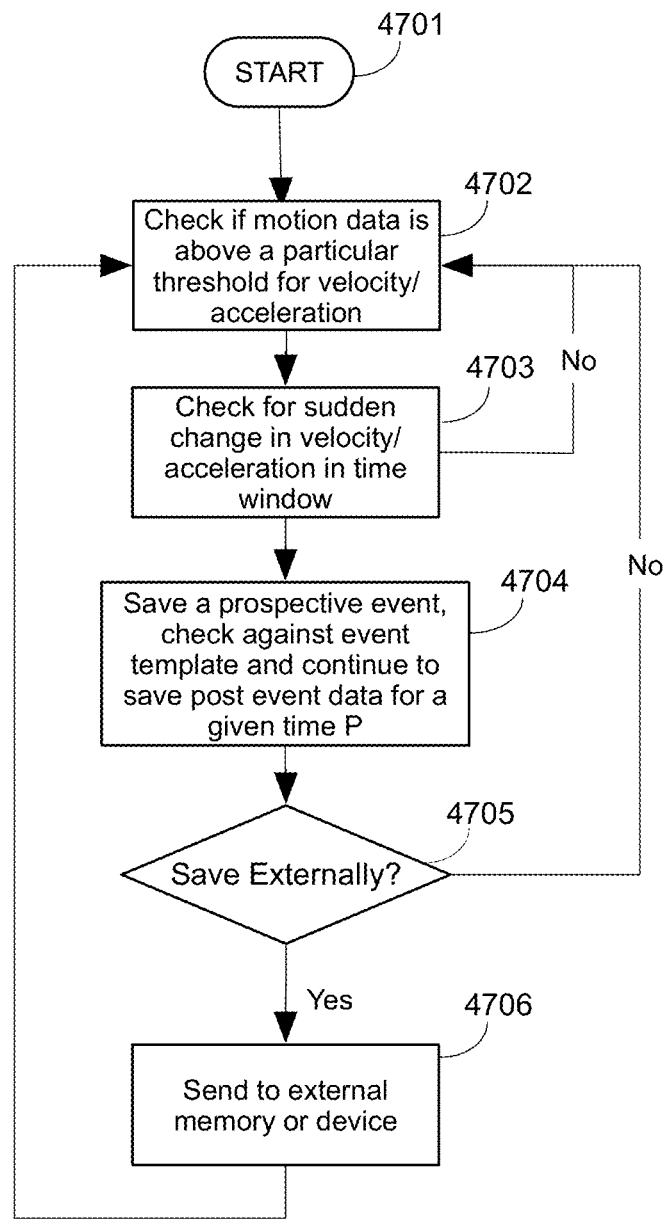
FIG. 12 shows a flow chart of an embodiment of the functionality specifically programmed into the microcontroller to determine whether a prospective event has occurred.

FIG. 12 shows a flow chart of an embodiment of the functionality specifically programmed into the microcontroller to determine whether an event that is to be transmitted for the particular application, for example a prospective event or for example an event has occurred. The motion, acceleration or shockwave that occurs from an impact to the sporting equipment is transmitted to the sensor in the motion capture element, which records the motion capture data as is described in FIG. 11 above. The microcontroller is configured to then analyze the event and determine whether the event is a prospective event or not.

One type of event that occurs is acceleration or a head/helmet/cap/mouthpiece based sensor over a specified linear or rotational value, or the impact of the clubface when it impacts a golf ball. In other sports that utilize a ball and a striking implement, the same analysis is applied, but tailored to the specific sport and sporting equipment. In tennis a prospective strike can be the racquet hitting the ball, for example as opposed to spinning the racquet before receiving a serve. In other applications, such as running shoes, the impact detection algorithm can detect the shoe hitting the ground when someone is running. In exercise it can be a particular motion being achieved, this allows for example the counting of repetitions while lifting weights or riding a stationary bike.

In one or more embodiments of the invention, processing starts at 4701. The microcontroller compares the motion capture data in memory 4610 with linear velocity over a certain threshold at 4702, within a particular impact time frame and searches for a discontinuity threshold where there is a sudden change in velocity or acceleration above a certain threshold at 4703. If no discontinuity in velocity or for example acceleration occurs in the defined time window, then processing continues at 4702. If a discontinuity does occur, then the prospective impact is saved in memory and post impact data is saved for a given time P at 4704. For example, if the impact threshold is set to 12G, discontinuity threshold is set to 6G, and the impact time frames is 10 frames, then microcontroller 3802 signals impact, after detection of a 12G acceleration in at least one axis or all axes within 10 frames followed by a discontinuity of 6G. In a typical event, the accelerations build with characteristic accelerations curves. Impact is signaled as a quick change in acceleration/velocity. These changes are generally distinct from the smooth curves created by an incrementally increasing or decreasing curves of a particular non-event. For concussion based events, linear or rotational acceleration in one or more axes is over a threshold. For golf related events, if the acceleration curves are that of a golf swing, then particular axes have particular accelerations that fit within a signature, template or other pattern and a ball strike results in a large acceleration strike indicative of a hit. If the data matches a given template, then it is saved, if not, it processing continues back at 4702. If data is to be saved externally as determined at 4705, i.e., there is a communication link to a mobile device and the mobile device is polling or has requested impact data when it occurs for example, then the event is transmitted to an external memory, or the mobile device or saved externally in any other location at 4706 and processing continues again at 4702 where the microcontroller analyzes collected motion capture data for subsequent events. If data is not to be saved externally, then processing continues at 4702 with the impact data saved locally in memory 4601. If sent externally, the other motion capture devices may also save their motion data for the event detected by another sensor. This enables sensors with finer resolution or more motion for example to alert other sensors associated with the user or piece of equipment to save the event even if the motion capture data does not reach a particular threshold or pattern, for example see FIG. 15. This type of processing provides more robust event detection as multiple sensors may be utilized to detect a particular type of event and notify other sensors that may not match the event pattern for one reason or another. In addition, cameras may be notified and trim or otherwise discard unneeded video and save event related video, which may lower memory utilization not only of events but also for video. In one or more embodiments of the invention, noise may be filtered from the motion capture data before sending, and the sample rate may be varied based on the data values obtained to maximize accuracy. For example, some sensors output data that is not accurate under high sampling rates and high G-forces. Hence, by lowering the sampling rate at high G-forces, accuracy is maintained. In one or more embodiments of the invention, the microcontroller associated with motion capture element 111 may sense high G forces and automatically switch the sampling rate. In one or more embodiments, instead of using accelerometers with 6G/12G/24G ranges or 2G/4G/8G/16G ranges, accelerometers with 2 ranges, for example 2G and 24G may be utilized to simplify the logic of switching between ranges.

One or more embodiments of the invention may transmit the event to a mobile device and/or continue to save the events in memory, for example for a round of golf or until a mobile device communication link is achieved.

Figure 13:
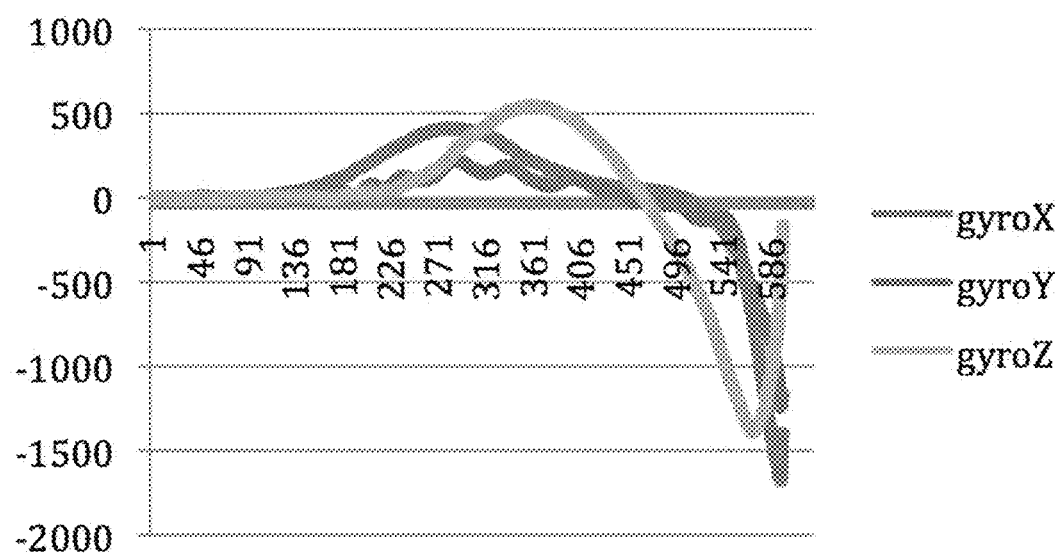
FIG. 13 illustrates a typical event signature or template, which is compared to motion capture data to eliminate false positive events.

For example, with the sensor mounted in a particular mount, a typical event signature is shown in FIG. 13, also see FIG. 15 for comparison of two characteristic motion types as shown via patterns or templates associated with different pieces of equipment or clothing for example. In one or more embodiments, the microcontroller is configured to execute a pattern matching algorithm to follow the curves for each of the axis and use segments of 1 or more axis to determine if a characteristic swing has taken place, in either linear or rotational acceleration or any combination thereof. If the motion capture data in memory 4601 is within a range close enough to the values of a typical swing as shown in FIG. 13, then the motion is consistent with an event. Embodiments of the invention thus reduce the number of false positives in event detection, after first characterizing the angular and/or linear velocity signature of the movement, and then utilizing elements of this signature to determine if similar signatures for future events have occurred.

The motion capture element collects data from various sensors. The data capture rate may be high and if so, there are significant amounts of data that is being captured. Embodiments of the invention may use both lossless and lossy compression algorithms to store the data on the sensor depending on the particular application. The compression algorithms enable the motion capture element to capture more data within the given resources. Compressed data is also what is transferred to the remote computer(s). Compressed data transfers faster. Compressed data is also stored in the Internet "in the cloud", or on the database using up less space locally.

FIG. 14 illustrates an embodiment of the motion capture element 111 configured with optional LED visual indicator 1401 for local display and viewing of event related information and an optional LCD 1402 configured to display a text or encoded message associated with the event. In one or more embodiments, the LED visual indicator may flash slow yellow for a moderate type of concussion, and flash fast red for a severe type of concussion to give a quick overall view of the event without requiring any wireless communications. In addition, the LED may be asserted with a number of flashes or other colors to indicate any temperature related event or other event. One or more embodiments may also employ LCD 1402 for example that may show text, or alternatively may display a coded message for sensitive health related information that a referee or medical personnel may read or decode with an appropriate reader app on a mobile device for example. In the lower right portion of the figure, the LCD display may produce an encoded message that states "Potential Concussion 1500 degree/s/s rotational event detect—alert medical personnel immediately". Other paralysis diagnostic messages or any other type of message that may be sensitive may be encoded and displayed locally so that medical personnel may immediately begin assessing the user/player/boxer without alarming other players with the diagnostic message for example, or without transmitting the message over the air wirelessly to avoid interception.

FIG. 15 illustrates an embodiment of templates characteristic of motion events associated with different types of equipment and/or instrumented clothing along with areas in which the motion capture sensor personality may change to more accurately or more efficiently capture data associated with a particular period of time and/or sub-event. As shown, the characteristic push off for a skateboard is shown in acceleration graphs 1501 that display the X, Y and Z axes linear acceleration and rotational acceleration values in the top 6 timelines, wherein time increases to the right. As shown, discrete positive x-axis acceleration captured is shown at 1502 and 1503 while the user pushes the skateboard with each step, followed by negative acceleration as the skateboard slows between each push. In addition, y-axis wobbles during each push are also captured while there is no change in the z axis linear acceleration and no rotational accelerations in this characteristic template or pattern of a skateboard push off or drive. Alternatively, the pattern may include a group of threshold accelerations in x at predefined time windows with other thresholds or no threshold for wobble for example that the captured data is compared against to determine automatically the type of equipment that the motion capture element is mounted to or that the known piece of equipment is experiencing currently. This enables event based data saving and transmission for example.

The pattern or template in graphs 1511 however show a running event as the user slightly accelerates up and down during a running event. Since the user's speed is relatively constant there is relatively no acceleration in x and since the user is not turning, there is relatively no acceleration in y (left/right). This pattern may be utilized to compare within ranges for running for example wherein the pattern includes z axis accelerations in predefined time windows. Hence, the top three graphs of graphs 1511 may be utilized as a pattern to notate a running event. The bottom three graphs may show captured data that are indicative of the user looking from side to side when the motion capture element is mounted in a helmet and/or mouthpiece at 1514 and 1515, while captured data 1516 may be indicative of a moderate or sever concussion observed via a rotational motion of high enough angular degrees per second squared. In addition, the sensor personality may be altered dynamically at 1516 or at any other threshold for example to change the motion capture sensor rate of capture or bit size of capture to more accurately in amplitude or time capture the event. This enables dynamic alteration of quality of capture and/or dynamic change of power utilization for periods of interest, which is unknown in the art. In one or more embodiments, a temperature timeline may also be recorded for embodiments of the invention that utilize temperature sensors, either mounted within a helmet, mouthpiece or in any other piece of equipment or within the user's body for example.

Figure 16:
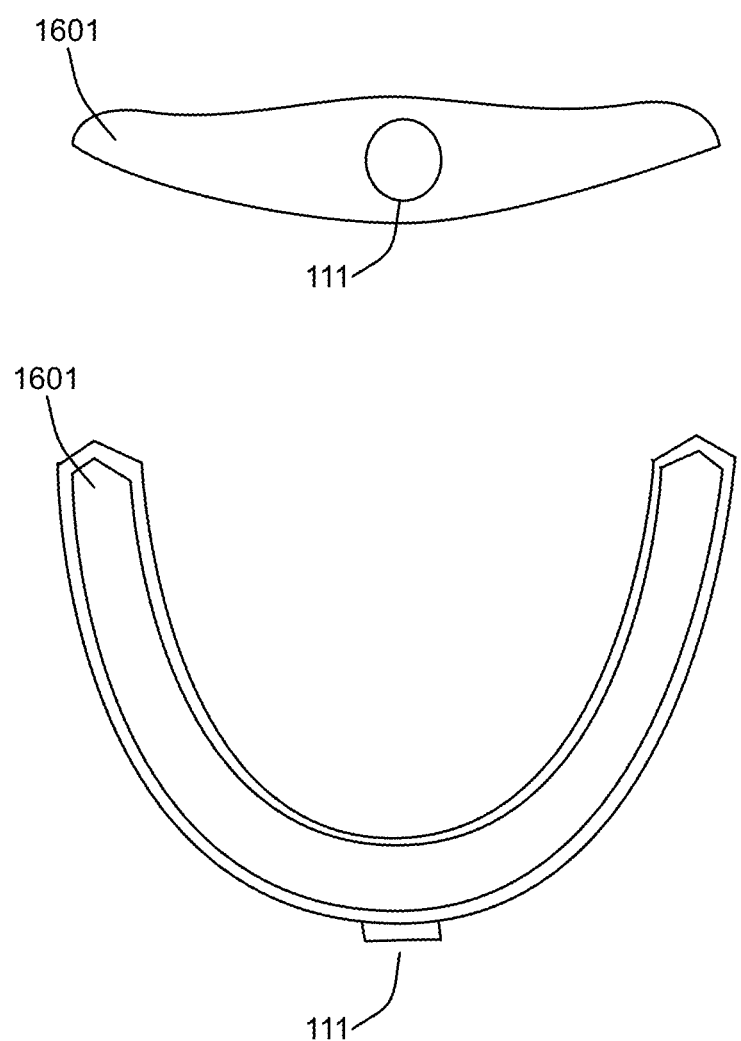
FIG. 16 illustrates an embodiment of a protective mouthpiece in front view and at the bottom portion of the figure in top view, for example as worn in any contact sport such as, but not limited to soccer, boxing, football, wrestling or any other sport for example.

FIG. 16 illustrates an embodiment of a protective mouthpiece 1601 in front view and at the bottom portion of the figure in top view, for example as worn in any contact sport such as, but not limited to soccer, boxing, football, wrestling or any other sport for example. Embodiments of the mouthpiece may be worn in addition to any other headgear with or without a motion capture element to increase the motion capture data associated with the user and correlate or in any other way combine or compare the motion data and or events from any or all motion capture elements worn by the user. Embodiments of the mouthpiece and/or helmet shown in FIGS. 2A-B or in any other piece of equipment may also include a temperature sensor for example and as previously discussed.

FIG. 17 illustrates an embodiment of the algorithm utilized by any computer in FIG. 1 that is configured to display motion images and motion capture data in a combined format. In one or more embodiments, the motion capture data and any event related start/stop times may be saved on the motion capture element 111. One or more embodiments of the invention include a motion event recognition and video synchronization system that includes at least one motion capture element configured to couple with a user or piece of equipment or mobile device coupled with the user. The at least one motion capture element may include a memory, a sensor configured to capture any combination of values associated with an orientation, position, velocity and acceleration of the at least one motion capture element, a radio, a microcontroller coupled with the memory, the sensor and the radio. The microcontroller may be configured to collect data that includes sensor values from the sensor, store the data in the memory, analyze the data and recognize an event within the data to determine event data, transmit the event data associated with the event via the radio. The system may also include a mobile device that includes a computer, a wireless communication interface configured to communicate with the radio to obtain the event data associated with the event, wherein the computer is coupled with wireless communication interface, wherein the computer is configured to receive the event data from the wireless communication interface. The computer may also analyze the event data to form motion analysis data, store the event data, or the motion analysis data, or both the event data and the motion analysis data, obtain an event start time and an event stop time from the event, request image data from camera that includes a video captured at least during a timespan from the event start time to the event stop time and display an event video on a display that includes both the event data, the motion analysis data or any combination thereof that occurs during the timespan from the event start time to the event stop time and the video captured during the timespan from the event start time to the event stop time.

When a communication channel is available, motion capture data and any event related start/stop times are pushed to, or obtained by or otherwise received by any computer, e.g., 101, 102, 102*a*, 102*b*, 105 at 1701. The clock difference between the clock on the sensor and/or in motion capture data times may also be obtained. This may be performed by reading a current time stamp in the incoming messages and comparing the incoming message time with the current time of the clock of the local computer, see also FIG. 18 for example for more detail on synchronization. The difference in clocks from the sensor and computer may be utilized to request images data from any camera local or pointing at the location of the event for the adjusted times to take into account any clock difference at 1702. For example, the computer may request images taken at the time/location by querying all cameras 103, 104, or on devices 101, 102 and/or 102*a* for any or all such devices having images taken nearby, e.g., based on GPS location or wireless range, and/or pointed at the event obtained from motion capture element 111. If a device is not nearby, but is pointing at the location of the event, as determined by its location and orientation when equipped with a magnetometer for example, then it may respond as well with images for the time range. Any type of camera that may communicate electronically may be queried, including nanny cameras, etc. For example, a message may be sent by mobile computer 101 after receiving events from motion capture sensor 111 wherein the message may be sent to any cameras for example within wireless range of mobile device 101. Alternatively, or in combination, mobile device 101 may send a broadcast message asking for any cameras identities that are within a predefined distance from the location of the event or query for any cameras pointed in the direction of the event even if not relatively close. Upon receiving the list of potential cameras, mobile device 101 may query them for any images obtained in a predefined window around the event for example. The computer may receive image data or look up the images locally if the computer is coupled with a camera at 1703. In one or more embodiments, the server 172 may iterate through videos and events to determine any that correlate and automatically trim the videos to correspond to the durations of the event start and stop times. Although wireless communications may be utilized, any other form of transfer of image data is in keeping with the spirit of the invention. The data from the event whether in numerical or graphical overlay format or any other format including text may be show with or otherwise overlaid onto the corresponding image for that time at 1704. This is shown graphically at time 1710, i.e., the current time, which may be scrollable for example, for image 1711 showing a frame of a motion event with overlaid motion capture data 1712. See FIG. 6 for combined or simultaneously non-overlaid data for example.

Figure 18:
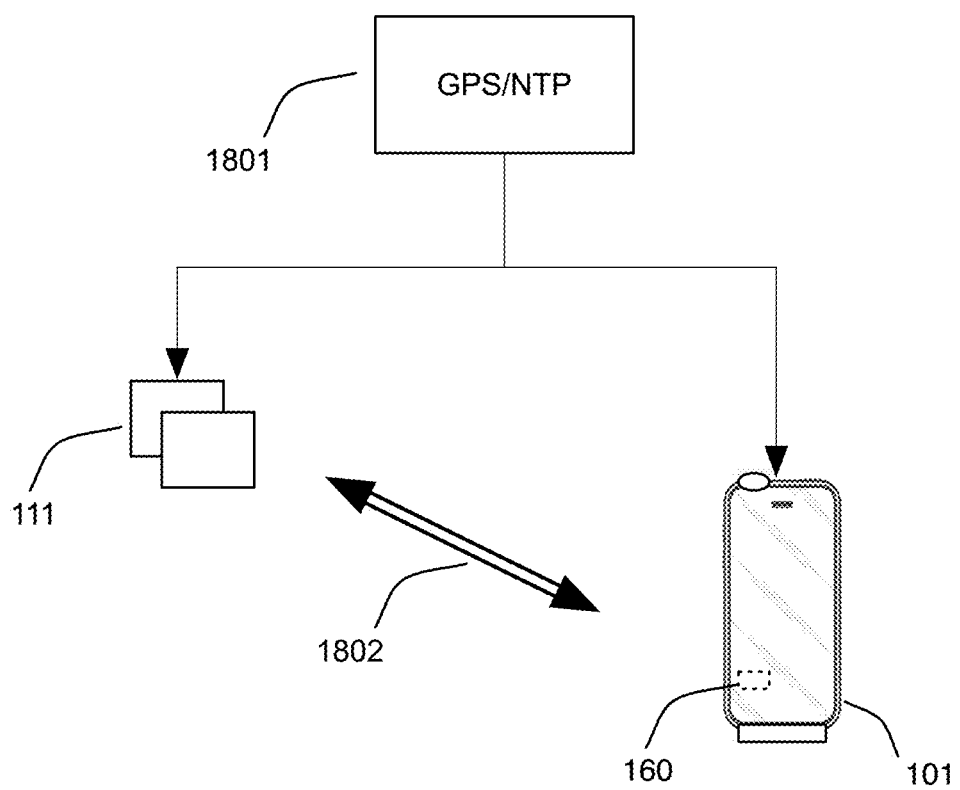
FIG. 18 illustrates an embodiment of the synchronization architecture that may be utilized by one or more embodiments of the invention.

FIG. 18 illustrates an embodiment of the synchronization architecture that may be utilized by one or more embodiments of the invention. Embodiments may synchronize clocks in the system using any type of synchronization methodology and in one or more embodiments the computer 160 on the mobile device 101 is further configured to determine a clock difference between the motion capture element 111 and the mobile device and synchronize the motion analysis data with the video. For example, one or more embodiments of the invention provides procedures for multiple recording devices to synchronize information about the time, location, or orientation of each device, so that data recorded about events from different devices can be combined. Such recording devices may be embedded sensors, mobile phones with cameras or microphones, or more generally any devices that can record data relevant to an activity of interest. In one or more embodiments, this synchronization is accomplished by exchanging information between devices so that the devices can agree on a common measurement for time, location, or orientation. For example, a mobile phone and an embedded sensor may exchange messages across link 1802, e.g., wirelessly, with the current timestamps of their internal clocks; these messages allow a negotiation to occur wherein the two devices agree on a common time. Such messages may be exchanged periodically as needed to account for clock drift or motion of the devices after a previous synchronization. In other embodiments, multiple recording devices may use a common server or set of servers 1801 to obtain standardized measures of time, location, or orientation. For example, devices may use a GPS system to obtain absolute location information for each device. GPS systems may also be used to obtain standardized time. NTP (Network Time Protocol) servers may also be used as standardized time servers. Using servers allows devices to agree on common measurements without necessarily being configured at all times to communicate with one another.

Figure 19:
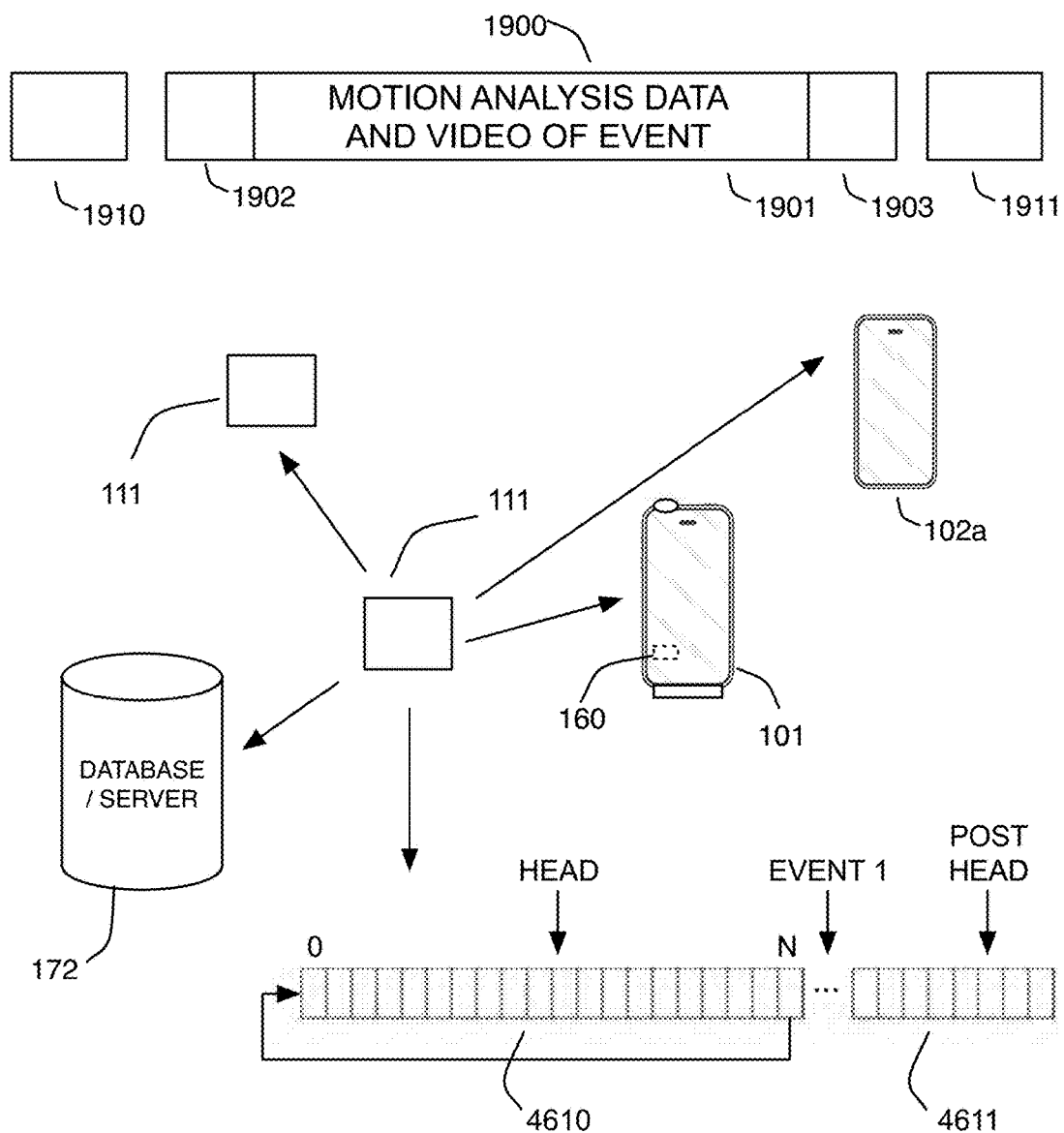
FIG. 19 illustrates the detection of an event by one of the motion capture sensors, transmission of the event detection to other motion capture sensors and/or cameras, saving of the event motion data and trimming of the video to correspond to the event.

FIG. 19 illustrates the detection of an event by one of the motion capture sensors 111, transmission of the event detection, here shown as arrows emanating from the centrally located sensor 111 in the figure, to other motion capture sensors 111 and/or cameras, e.g., on mobile device 101, saving of the event motion data and trimming of the video to correspond to the event. In one or more embodiments of the invention, some of the recording devices are configured to detect the occurrence of various events of interest. Some such events may occur at specific moments in time; others may occur over a time interval, wherein the detection includes detection of the start of an event and of the end of an event. These devices are configured to record any combination of the time, location, or orientation of the recording device, for example included in memory buffer 4610 for example along with the event data, or in any other data structure, using the synchronized measurement bases for time, location, and orientation described above.

Embodiments of the computer on the mobile device may be further configured to discard at least a portion of the video outside of the event start time to the event stop, for example portions 1910 and 1911 before and after the event or event with predefined pre and post intervals 1902 and 1903. For example, in one or more embodiments of the invention, some of the recording devices capture data continuously to memory while awaiting the detection of an event. To conserve memory, some devices may be configured to store data to a more permanent local storage medium, or to server 172, only when this data is proximate in time to a detected event. For example, in the absence of an event detection, newly recorded data may ultimately overwrite previously recorded data in memory, depending on the amount of memory in each device that is recording motion data or video data. A circular buffer may be used in some embodiments as a typical implementation of such an overwriting scheme. When an event detection occurs, the recording device may store some configured amount of data prior to the start of the event, near start of pre interval 1902 and some configured amount of data after the end of the event, near 1903, in addition to storing the data captured during the event itself, namely 1901. Any pre or post time interval is considered part of the event start time and event stop time so that context of the event is shown in the video for example. This gives context to the event, for example the amount of pre time interval may be set per sport for example to enable a setup for a golf swing to be part of the event video even though it occurs before the actual event of striking the golf ball. The follow through may be recorded as per the amount of interval allotted for the post interval as well.

Embodiments of the system may further comprise a server computer remote to the mobile device and wherein the server computer is configured to discard at least a portion of the video outside of the event start time to the event stop and return the video captured during the timespan from the event start time to the event stop time to the computer in the mobile device. The server or mobile device may combine or overlay the motion analysis data or event data, for example velocity or raw acceleration data with or onto the video to form event video 1900, which may thus greatly reduce the amount of video storage required as portions 1910 and 1911 may be of much larger length in time that the event in general.

Embodiments of the at least one motion capture element may be configured to transmit the event to at least one other motion capture sensor or at least one other mobile device or any combination thereof, and wherein the at least one other motion capture sensor or the at least one other mobile device or any combination thereof is configured to save data associated with the event. For example, in embodiments with multiple recording devices operating simultaneously, one such device may detect an event and send a message to other recording devices that such an event detection has occurred. This message can include the timestamp of the start and/or stop of the event, using the synchronized time basis for the clocks of the various devices. The receiving devices, e.g., other motion capture sensors and/or cameras may use the event detection message to store data associated with the event to nonvolatile storage, for example within motion capture element 111 or mobile device 101 or server 172. The devices may be configured to store some amount of data prior to the start of the event and some amount of data after the end of the event, 1902 and 1903 respectively, in addition to the data directly associated with the event 1901. In this way all devices can record data simultaneously, but use an event trigger from only one of the devices to initiate saving of distributed event data from multiple sources.

Embodiments of the computer may be further configured to save the video from the event start time to the event stop time with the motion analysis data that occurs from the event start time to the event stop time or a remote server may be utilized to save the video. In one or more embodiments of the invention, some of the recording devices may not be in direct communication with each other throughout the time period in which events may occur. In these situations, devices can be configured to save complete records of all of the data they have recorded to permanent storage or to a server. Saving of only data associated with events may not be possible in these situations because some devices may not be able to receive event trigger messages. In these situations, saved data can be processed after the fact to extract only the relevant portions associated with one or more detected events. For example, multiple mobile devices may record video of a player or performer, and upload this video continuously to server 172 for storage. Separately the player or performer may be equipped with an embedded sensor that is able to detect events such as particular motions or actions. Embedded sensor data may be uploaded to the same server either continuously or at a later time. Since all data, including the video streams as well as the embedded sensor data, is generally timestamped, video associated with the events detected by the embedded sensor can be extracted and combined on the server. Embodiments of the server or computer may be further configured while a communication link is open between the at least one motion capture sensor and the mobile device to discard at least a portion of the video outside of the event start time to the event stop and save the video from the event start time to the event stop time with the motion analysis data that occurs from the event start time to the event stop time. Alternatively, if the communication link is not open, embodiments of the computer may be further configured to save video and after the event is received after the communication link is open, then discard at least a portion of the video outside of the event start time to the event stop and save the video from the event start time to the event stop time with the motion analysis data that occurs from the event start time to the event stop time. For example, in some embodiments of the invention, data may be uploaded to a server as described above, and the location and orientation data associated with each device's data stream may be used to extract data that is relevant to a detected event. For example, a large set of mobile devices may be used to record video at various locations throughout a golf tournament. This video data may be uploaded to a server either continuously or after the tournament. After the tournament, sensor data with event detections may also be uploaded to the same server. Post-processing of these various data streams can identify particular video streams that were recorded in the physical proximity of events that occurred and at the same time. Additional filters may select video streams where a camera was pointing in the correct direction to observe an event. These selected streams may be combined with the sensor data to form an aggregate data stream with multiple video angles showing an event.

The system may obtain video from a camera coupled with the mobile device, or any camera that is separate from or otherwise remote from the mobile device. In one or more embodiments, the video is obtained from a server remote to the mobile device, for example obtained after a query for video at a location and time interval.

Embodiments of the server or computer may be configured to synchronize the video and the event data, or the motion analysis data via image analysis to more accurately determine a start event frame or stop event frame in the video or both, that is most closely associated with the event start time or the event stop time or both. In one or more embodiments of the invention, synchronization of clocks between recording devices may be approximate. It may be desirable to improve the accuracy of synchronizing data feeds from multiple recording devices based on the view of an event from each device. In one or more embodiments, processing of multiple data streams is used to observe signatures of events in the different streams to assist with fine-grained synchronization. For example, an embedded sensor may be synchronized with a mobile device including a video camera, but the time synchronization may be accurate only to within 100 milliseconds. If the video camera is recording video at 30 frames per second, the video frame corresponding to an event detection on the embedded sensor can only be determined within 3 frames based on the synchronized timestamps alone. In one embodiment of the device, video frame image processing can be used to determine the precise frame corresponding most closely to the detected event. See FIG. 8 and description thereof for more detail. For instance, a shock from a snowboard hitting the ground as shown in FIG. 17, that is detected by an inertial sensor may be correlated with the frame at which the geometric boundary of the snowboard makes contact with the ground. Other embodiments may use other image processing techniques or other methods of detecting event signatures to improve synchronization of multiple data feeds.

Embodiments of the at least one motion capture element may include a location determination element configured to determine a location that is coupled with the microcontroller and wherein the microcontroller is configured to transmit the location to the computer on the mobile device. In one or more embodiments, the system further includes a server wherein the microcontroller is configured to transmit the location to the server, either directly or via the mobile device, and wherein the computer or server is configured to form the event video from portions of the video based on the location and the event start time and the event stop time. For example, in one or more embodiments, the event video may be trimmed to a particular length of the event, and transcoded to any or video quality for example on mobile device 101 or on server 172 or on computer 105 or any other computer coupled with the system, and overlaid or otherwise integrated with motion analysis data or event data, e.g., velocity or acceleration data in any manner. Video may be stored locally in any resolution, depth, or image quality or compression type to store video or any other technique to maximize storage capacity or frame rate or with any compression type to minimize storage, whether a communication link is open or not between the mobile device, at least one motion capture sensor and/or server. In one or more embodiments, the velocity or other motion analysis data may be overlaid or otherwise combined, e.g., on a portion beneath the video, that includes the event start and stop time, that may include any number of seconds before and/or after the actual event to provide video of the swing before a ball strike event for example. In one or more embodiments, the at least one motion capture sensor and/or mobile device(s) may transmit events and video to a server wherein the server may determine that particular videos and sensor data occurred in a particular location at a particular time and construct event videos from several videos and several sensor events. The sensor events may be from one sensor or multiple sensors coupled with a user and/or piece of equipment for example. Thus the system may construct short videos that correspond to the events, which greatly decreases video storage requirements for example.

In one or more embodiments, the microcontroller or the computer is configured to determine a location of the event or the microcontroller and the computer are configured to determine the location of the event and correlate the location, for example by correlating or averaging the location to provide a central point of the event, and/or erroneous location data from initializing GPS sensors may be minimized. In this manner, a group of users with mobile devices may generate videos of a golfer teeing off, wherein the event location of the at least one motion capture device may be utilized and wherein the server may obtain videos from the spectators and generate an event video of the swing and ball strike of the professional golfer, wherein the event video may utilize frames from different cameras to generate a BULLET TIME® video from around the golfer as the golfer swings. The resulting video or videos may be trimmed to the duration of the event, e.g., from the event start time to the event stop time and/or with any pre or post predetermined time values around the event to ensure that the entire event is captured including any setup time and any follow through time for the swing or other event.

In one or more embodiments, the computer on the mobile device may request at least one image or video that contains the event from at least one camera proximal to the event directly by broadcasting a request for any videos taken in the area by any cameras, optionally that may include orientation information related to whether the camera was not only located proximally to the event, but also oriented or otherwise pointing at the event. In other embodiments, the video may be requested by the computer on the mobile device from a remote server. In this scenario, any location and/or time associated with an event may be utilized to return images and/or video near the event or taken at a time near the event, or both. In one or more embodiments, the computer or server may trim the video to correspond to the event duration and again, may utilize image processing techniques to further synchronize portions of an event, such as a ball strike with the corresponding frame in the video that matches the acceleration data corresponding to the ball strike on a piece of equipment for example.

Embodiments of the computer on the mobile device or on the server may be configured to display a list of one or more times at which an event has occurred or wherein one or more events has occurred. In this manner, a user may find events from a list to access the event videos in rapid fashion.

Embodiments of the invention may include at least one motion capture sensor that is physically coupled with the mobile device. These embodiments enable any type of mobile phone or camera system with an integrated sensor, such as any type of helmet mounted camera or any mount that includes both a camera and a motion capture sensor to generate event data and video data.

In one or more embodiments of the invention, a system is configured to enable integration of motion event data and video event data. FIG. 1 illustrates core elements of embodiments of such a system. Motion event data may be provided by one or more motion capture elements 111, which may be configured to be attached to user 150 at location L1, to a piece of equipment 110, or to a mobile device 130. These motion capture elements may include one or more sensors that measure motion values such as orientation, position, velocity and acceleration. The motion capture elements may also include a memory, for storing capture data, and a microprocessor for analyzing this data. They may also include a radio for communicating with other devices and for transferring motion capture data.

In some embodiments the microprocessor coupled with the motion capture element may collect data from the sensor, store the data in its memory, and possibly analyze the data to recognize an event within the data. It may then transmit the raw motion data or the event data via the attached radio. This raw motion data or event data may include other information such an identifier of the motion capture element, the user, or the equipment, and an identifier of the type of event detected by the motion capture element.

In some embodiments the system may also include one or more computers 105 (a laptop or desktop computer), 160 (a mobile phone CPU), or other computers in communication with sensors or cameras. FIG. 1A illustrates possible components of an embodiment of a computer processor or "computer" 160 integrated into a mobile device. Computers may have a wireless communication interface 164 that can communicate with the radios of one or more motion capture elements 111 to receive the event data associated with motion events. The computer may receive raw motion data, and it may analyze this data to determine events. In other embodiments the determination of events may occur in the motion capture element 111, and the computer (such as 105 or 160) may receive event data. Combinations of these two approaches are also possible in some embodiments.

In some embodiments the computer or computers may further analyze event data to generate motion analysis data. This motion analysis data may include characteristics of interest for the motion recorded by the motion capture element or elements. One or more computers may store the motion data, the event data, the motion analysis data, or combinations thereof for future retrieval and analysis. Data may be stored locally, such as in memory 162, or remotely as in database 172. In some embodiments the computer or computers may determine the start time and end time of a motion event from the event data. They may then request image data from a camera, such as 103, 130, 130a, or 130b, that has captured video or one or more images for some time interval at least within some portion of the time between this event start time and event end time. The term video in this specification will include individual images as well as continuous video, including the case of a camera that takes a single snapshot image during an event interval. This video data may then be associated with the motion data to form a portion of a video and motion capture integration system. As shown camera 103 at location L2 has field of view F2, while camera on mobile device 102a at position L3 has field of view F3. For cameras whose field of view overlaps an event, intelligent selection of the best video is achieved in at least one embodiment via image analysis. Sensors 107, such as environmental sensors may also be utilized to trigger events or at least be queried for values to combine with event videos, for example wind speed, humidity, temperature, sound, etc. In other embodiments, the system may query for video and events within a predefined area around location L1, and may also use field of view of each camera at L2 and L3 to determine if the video has potentially captured the event.

In some embodiments the request of video from a camera may occur concurrently with the capture or analysis of motion data. In such embodiments the system will obtain or generate a notification that an event has begun, and it will then request that video be streamed from one or more cameras to the computer until the end of the event is detected. In other embodiments, the user may gesture by tapping or moving a motion capture sensor a predefined number of time to signify the start of an event, for example tapping a baseball bat twice against the batter's shoes may signify the start of an at bat event.

In other embodiments the request of video may occur after a camera (such as 103) has uploaded its video records to another computer, such as a server 172. In this case the computer will request video from the server 172 rather than directly from the camera.

Figure 1E:
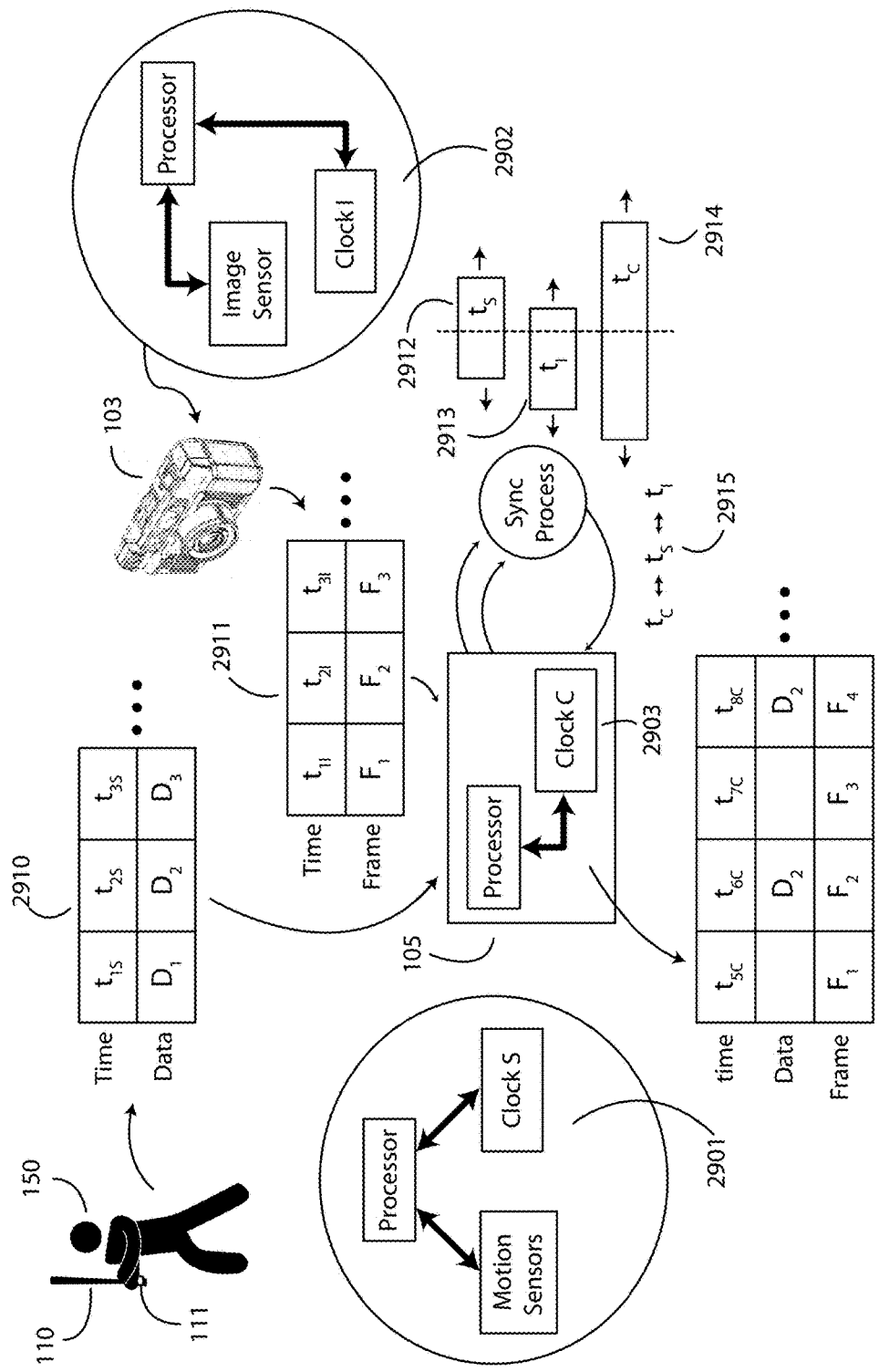
FIG. 1E illustrates a synchronization chart that details the shifting of motion event times and/or video event times to align correctly in time.

In some embodiments the computer or computers may perform a synchronization of the motion data and the video data. Various techniques may be used to perform this synchronization. FIG. 1E illustrates an embodiment of this synchronization process. Motion capture element 111 includes a clock 2901, designated as "Clock S". When an event occurs, the motion capture element generates timestamped data 2910, with times $t_{1S}$, $t_{2S}$, $t_{3S}$, etc. from Clock S. Camera 103 captures video or images of some portion of the event. The camera also includes a clock 2902, designated as "Clock I". The camera generates timestamped image data 2911, with times $t_{1I}$, $t_{2I}$, $t_{3I}$, etc. from Clock I. Computer 105 receives the motion data and the image data. The computer contains another clock 2903, designated as "Clock C". The computer executes a synchronization process that consists of aligning the various time scales from the three clocks 2912, 2913, and 2914. The result of this synchronization is a correspondence between the clocks 2915. In general the alignment of clocks may require generating clock differences as well as stretching or shrinking timescales to reflect different clock rates. In some embodiments individual data frames or image frames may not be timestamped, but instead the first or last frame may be associated with a time and there may be a known clock rate for frame capture. In other embodiments data may not include a timestamp, but may be transmitted immediately upon capture so that the computer can estimate the time of capture based on time of receipt and possible network latency.

In the embodiment illustrated in FIG. 1E, the computer generates a synchronized event video 2920, which will include at least some of the motion data, event data, or motion analysis data obtained or calculated between the event start time and the event end time, and some of the video or images obtained from the camera within this start time and end time. This synchronized event video provides an augmented, integrated record of the event that incorporates both motion data and image data. In the example shown the synchronization process has assigned the first image frame $F_1$ to time $t_{5C}$, and the first motion data frame $D_1$ to time $t_{6C}$. In this example the image frame capture rate is twice the data frame capture rate.

One or more embodiments of the invention may also obtain at least one video start time and at least one video stop time associated with at least one video from at least one camera. One of the computers on the system may optionally synchronize the event data, the motion analysis data or any combination thereof with the at least one video based on a first time associated with the data or the event data obtained from the at least one motion capture element coupled with the user or the piece of equipment or the mobile device coupled with the user and at least one time associated the at least one video to create at least one synchronized event video. Embodiments command at least one camera to transfer the at least one synchronized event video captured at least during a timespan from within the event start time to the event stop time to another computer without transferring at least a portion of the video that occurs outside of the at least one video that occurs outside of the timespan from within the event start time to the event stop time to the another computer. One or more embodiments also may be configured to overlay a synchronized event video comprising both of the event data, the motion analysis data or any combination thereof that occurs during the timespan from the event start time to the event stop time and the video captured during the timespan from the event start time to the event stop time.

In one or more embodiments of the invention, a computer may discard video that is outside of the time interval of an event, measured from the start time of an even to the stop time of an event. This discarding may save considerable storage resources for video storage by saving only the video associated with an event of interest. FIG. 19 illustrates an embodiment of this process. Synchronized event video 1900 comprises motion and image data during an event, 1901, and for some predefined pre and post intervals 1902 and 1903. Portions 1910 and 1911 before and after the pre and post intervals are discarded.

In one or more embodiments, a computer configured to receive or process motion data or video data may be a mobile device, including but not limited to a mobile telephone, a smartphone 120, a tablet, a PDA, a laptop 105, a notebook, or any other device that can be easily transported or relocated. In other embodiments, such a computer may integrated into a camera 103, 104, and in particular it may be integrated into the camera from which video data is obtained. In other embodiments, such a computer may be a desktop computer or a server computer 152, including but not limited to virtual computers running as virtual machines in a data center or in a cloud-based service. In some embodiments, the system may include multiple computers of any of the above types, and these computers may jointly perform the operations described in this specification. As will be obvious to one skilled in the art, such a distributed network of computers can divide tasks in many possible ways and can coordinate their actions to replicate the actions of a single centralized computer if desired. The term computer in this specification is intended to mean any or all of the above types of computers, and to include networks of multiple such computers acting together.

In one or more embodiments, a microcontroller associated with a motion capture element 111, and a computer 105, are configured to obtain clock information from a common clock and to set their internal local clocks 2901 and 2903 to this common value. This methodology may be used as well to set the internal clock of a camera 2902 to the same common clock value. The common clock value may be part of the system, or it may be an external clock used as a remote time server. Various techniques may be used to synchronize the clocks of individual devices to the common clock, including Network Time Protocol or other similar protocols. FIG. 18 illustrates an embodiment of the invention that uses an NTP or GPS server 1801 as a common time source. By periodically synchronizing clocks of the devices to a common clock 1801, motion capture data and video data can be synchronized simply by timestamping them with the time they are recorded.

Figure 20:
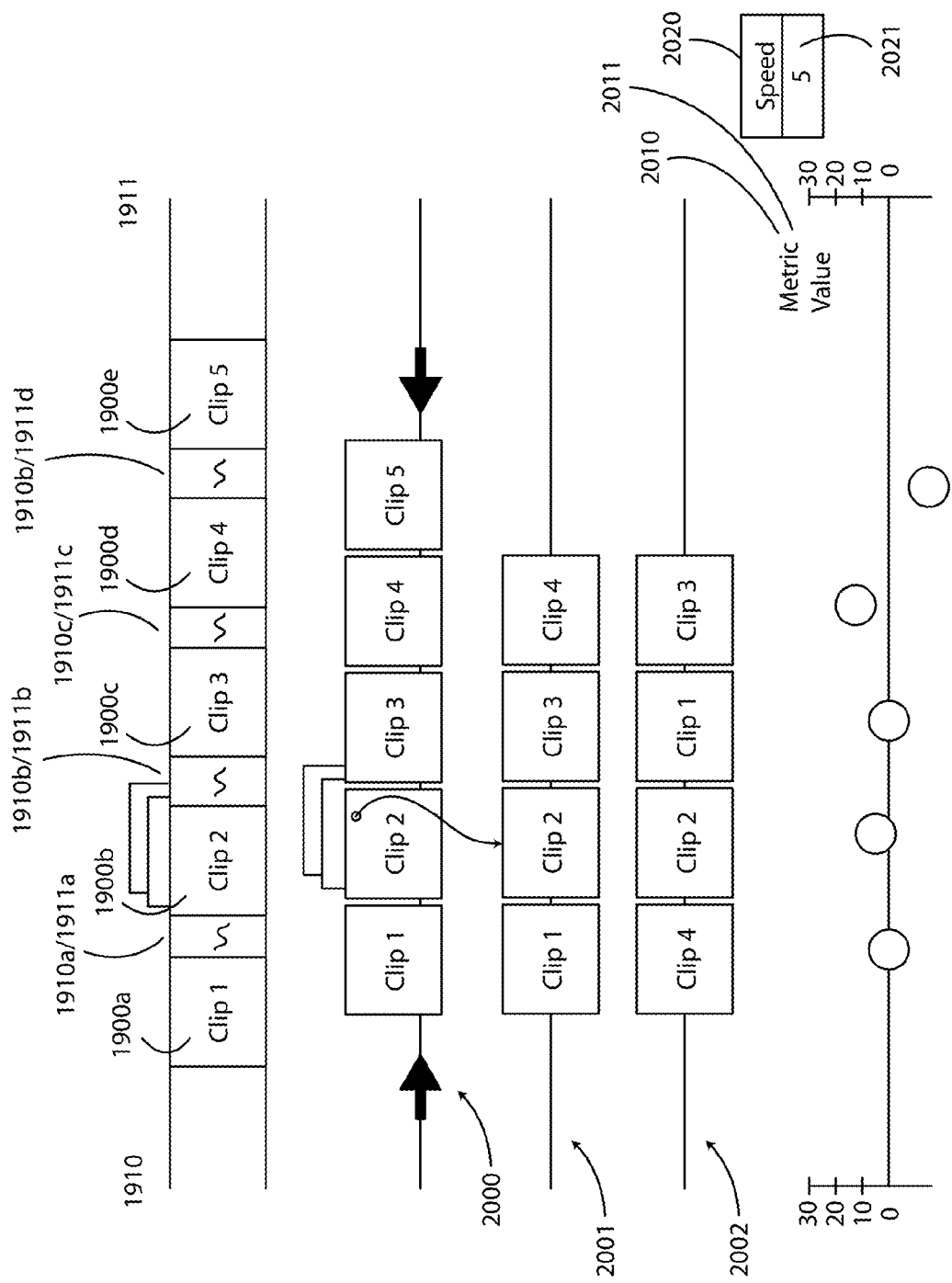
FIG. 20 illustrates the process of culling a video for event videos, and selection of a best video clip for an event period where multiple cameras captured videos of the same event, along with a selected sequence of synchronized event videos based on a selected metric, along with event videos sorted by selection criteria.

In one or more embodiments, the computer may obtain or create a sequence of synchronized event videos. The computer may display a composite summary of this sequence for a user to review the history of the events. FIG. 20 illustrates an embodiment of this process. Video clips 1900a, 1900b, 1900c, 1900d, and 1900e are obtained at different times corresponding to different events. Video or motion data prior to these events, 1910 and 1911, and between these events,

1910a, 1901b, 1910c, and 1910d, is removed. The result is composite summary 2000. In some embodiments this summary may include one or more thumbnail images generated from the videos. In other embodiments the summary may include smaller selections from the full event video. The composite summary may also include display of motion analysis or event data associated with each synchronized event video. In some embodiments, the computer may obtain a metric and display the value of this metric for each event. The display of these metric values may vary in different embodiments. In some embodiments the display of metric values may be a bar graph, line graph, or other graphical technique to show absolute or relative values. In other embodiments color-coding or other visual effects may be used. In other embodiments the numerical values of the metrics may be shown. Some embodiments may use combinations of these approaches. In the example illustrated in FIG. 20 the metric value for Speed associated with each event is shown as a graph with circles for each value.

In one or more embodiments, the computer may accept selection criteria for a metric of interest associated with the motion analysis data or event data of the sequence of events. For example, a user may provide criteria such as metrics exceeding a threshold, or inside a range, or outside a range. Any criteria may be used that may be applied to the metric values of the events. In response to the selection criteria, the computer may display only the synchronized event videos or their summaries (such as thumbnails) that meet the selection criteria. FIG. 20 illustrates an embodiment of this process. A selection criterion 2010 has been provided specifying that Speed should be at least 5. The computer responds by displaying 2001 with Clips 1 through Clip 4; Clip 5 has been excluded based on its associated speed.

In some embodiments of the invention, the computer may sort and rank synchronized event videos for display based on the value of a selected metric. This sorting and ranking may occur in some embodiments in addition to the filtering based on selection criteria as described above. The computer may display an ordered list of metric values, along with videos or thumbnails associated with the events. Continuing the example above as illustrated in FIG. 20, if a sorted display based on Speed is specified, the computer generates 2002 with clips reordered from highest speed to lowest speed. In one or more embodiments, the computer may generate a highlight reel that combines the video for events that satisfy selection criteria. Such a highlight reel may include the entire video for the selected events, or a portion of the video that corresponds to the important moments in the event as determined by the motion analysis. In some embodiments the highlight reel may include overlays of data or graphics on the video or on selected frames showing the value of metrics from the motion analysis. Such a highlight reel may be generated automatically for a user once the user indicates which events to include by specifying selection criteria. In some embodiments the computer may allow the user to edit the highlight reel to add or remove events, to lengthen or shorten the video shown for each event, to add or remove graphic overlays for motion data, or to add special effects or soundtracks.

In one or more embodiments, a video and motion integration system may incorporate multiple cameras, such as cameras 103, 104, 130, 130a, and 130b. In such embodiments, a computer may request video corresponding to an event timeframe from multiple cameras that captured video during this timeframe. Each of these videos may be synchronized with the event data and the motion analysis data as described above for the synchronization of a single video. Videos from multiple cameras may provide different angles or views of an event, all synchronized to motion data and to a common time base.

Figure 21:
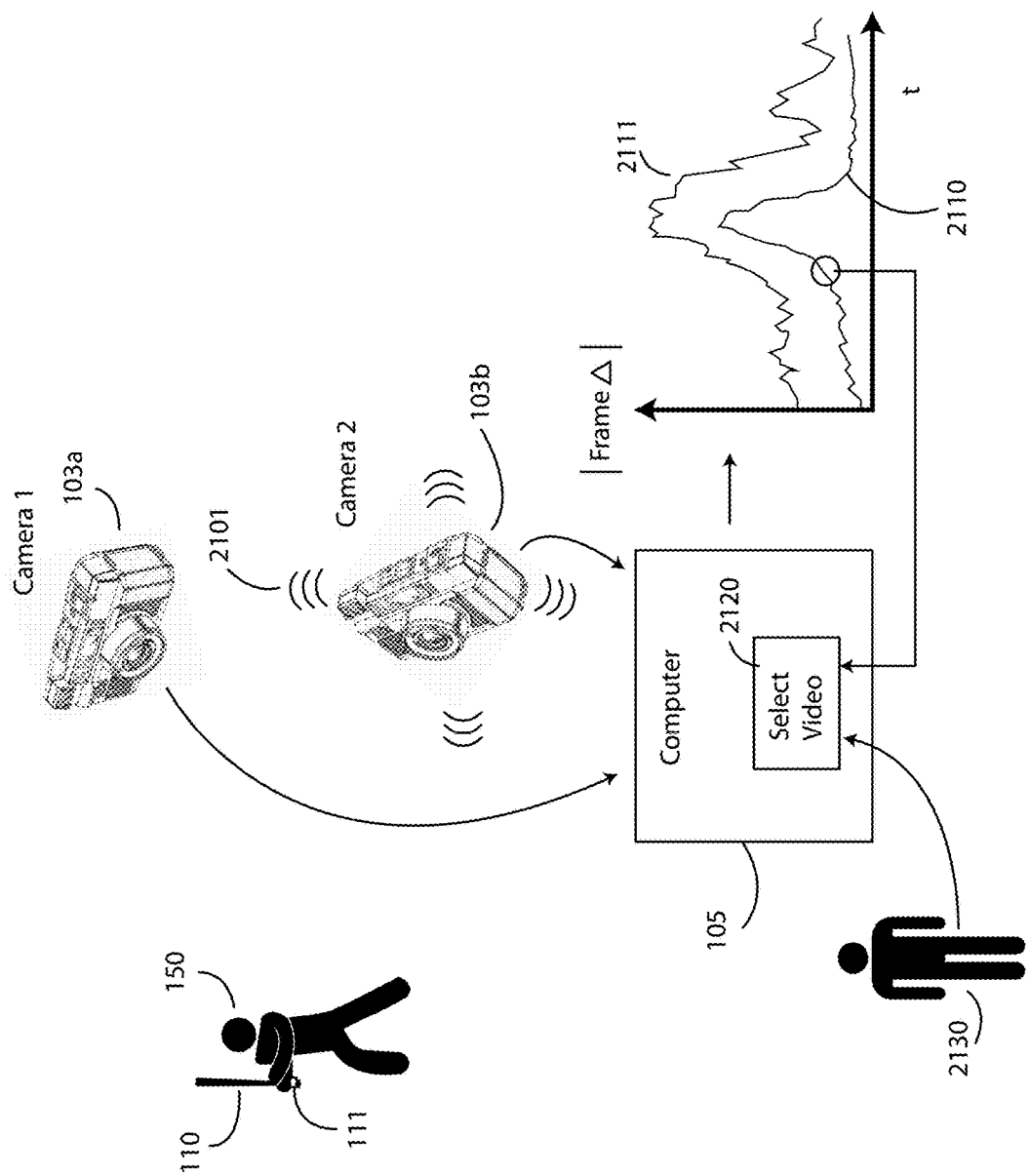
FIG. 21 illustrates image analysis to select a particular event video based on the degree of shaking of a camera during the capture of the video, and selection of the video with the most stable images.

In one or more embodiments with multiple cameras, the computer may select a particular video from the set of possible videos associated with an event. The selected video may be the best or most complete view of the event based on various possible criteria. In some embodiments the computer may use image analysis of each of the videos to determine the best selection. For example, some embodiments may use image analysis to determine which video is most complete in that the equipment or people of interest are least occluded or are most clearly visible. In some embodiments this image analysis may include analysis of the degree of shaking of a camera during the capture of the video, and selection of the video with the most stable images. FIG. 21 illustrates an embodiment of this process. Motion capture element 111 indicates an event, which is recorded by cameras 103a and 103b. Computer 105 retrieves video from both cameras. Camera 103b has shaking 2101 during the event. To determine the video with least shaking, Computer 105 calculates an inter-frame difference for each video. For example, this difference may include the sum of the absolute value of differences in each pixel's RGB values across all pixels. This calculation results in frame differences 2111 for camera 103b and 2110 for camera 103a. The inter-frame differences in both videos increase as the event occurs, but they are consistently higher in 2111 because of the increased shaking. The computer is thus able to automatically select video 2110 in process 2120. In some embodiments a user 2130 may make the selection of a preferred video, or the user may assist the computer in making the selection by specifying the most important criteria.

In one or more embodiments of the invention, the computer may obtain or generate notification of the start of an event, and it may then monitor event data and motion analysis data from that point until the end of the event. For example, the microcontroller associated with the motion capture element may send event data periodically to the computer once the start of an event occurs; the computer can use this data to monitor the event as it occurs. In some embodiments this monitoring data may be used to send control messages to a camera that can record video for the event. In embodiments with multiple cameras, control messages could be broadcast or could be send to a set of cameras during the event.

Figure 22:
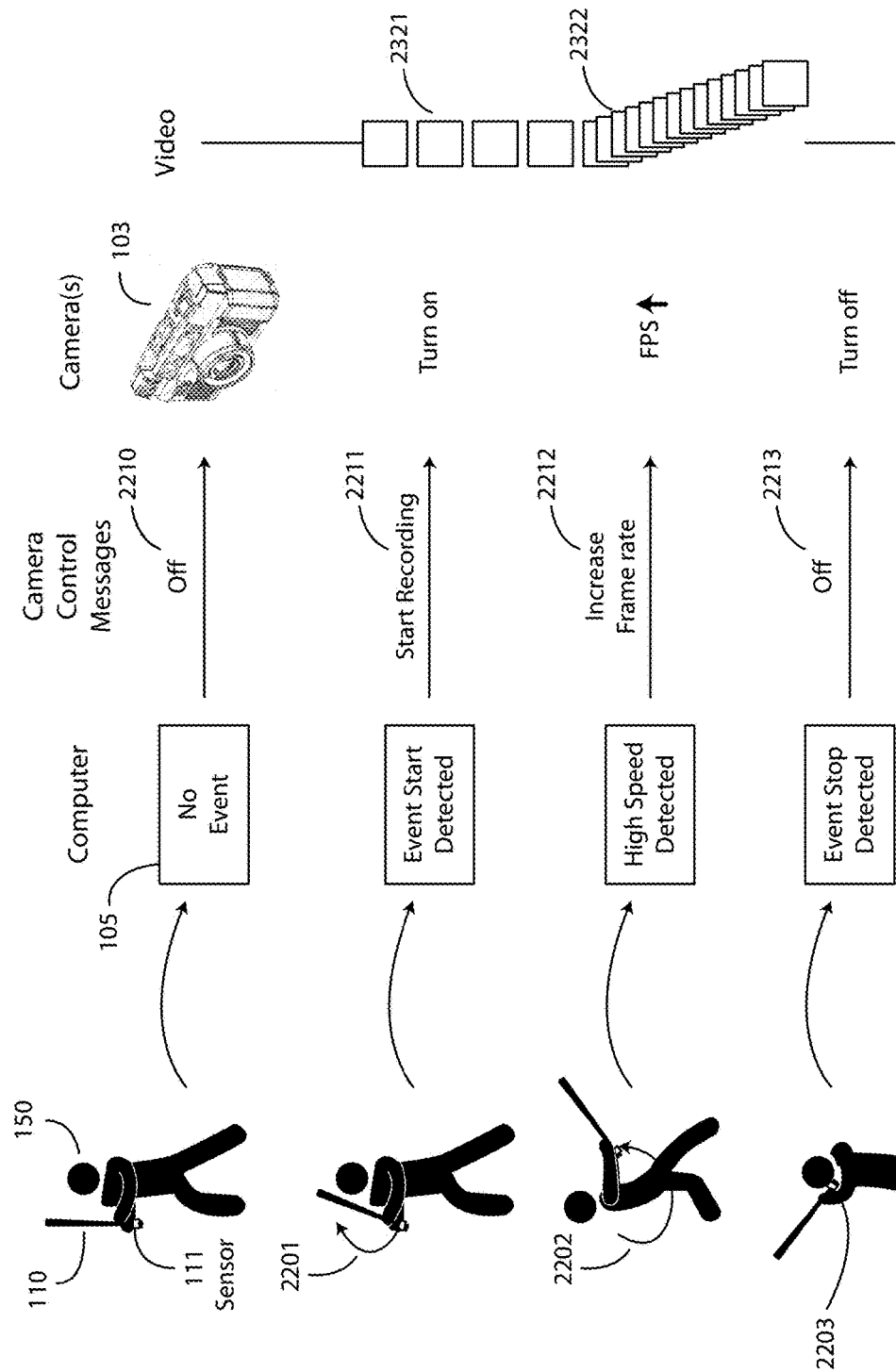
FIG. 22 illustrates control messages sent to the camera or cameras to modify the video recording parameters based on the data associated with the event, including the motion analysis data, for example while the event is occurring.

In some embodiments these control messages sent to the camera or cameras may modify the video recording parameters based on the data associated with the event, including the motion analysis data. FIG. 22 illustrates an embodiment of this process. Motion capture sensor 111 transmits motion data to computer 105, which then sends control messages to camera 103. In the example shown, equipment 110 is initially at rest prior to an event. The computer detects that there is no active event, and sends message 2210 to the camera instructing it to turn off recording and await events. Motion 2201 begins and the computer detects the start of the event; it sends message 2211 to the camera to turn on recording, and the camera begins recording video frames 2321 at a normal rate. Motion increases rapidly at 2202 and the computer detects high speed; it sends message 2212 to the camera to increase its frame rate to capture the high speed event. The camera generates video frames 2322 at a high rate. By using a higher frame rate during rapid motion, the user can slow the motion down during playback to observe high motion events in great detail. At 2203 the event completes, and the computer sends message 2213 to the camera to stop recording. This conserves camera power as well as video memory between events.

More generally in some embodiments a computer may send control messages to a camera or cameras to modify any relevant video recording parameters in response to event data or motion analysis data. These recording parameters may for example include the frame rate, resolution, color depth, color or grayscale, compression method, and compression quality of the video, as well as turning recording on or off.

In one or more embodiments of the invention, the computer may accept a sound track, for example from a user, and integrate this sound track into the synchronized event video. This integration would for example add an audio sound track during playback of an event video or a highlight reel. Some embodiments may use event data or motion analysis data to integrate the sound track intelligently into the synchronized event video. For example, some embodiments may analyze a sound track to determine the beats of the sound track based for instance on time points of high audio amplitude. The beats of the sound track may then be synchronized with the event using event data or motion analysis data. For example such techniques may automatically speed up or slow down a sound track as the motion of a user or object increases or decreases. These techniques provide a rich media experience with audio and visual cues associated with an event.

In one or more embodiments, a computer is configured to playback a synchronized event video on one or more displays. These displays may be directly attached to the computer, or may be remote on other devices. Using the event data or the motion analysis data, the computer may modify the playback to add or change various effects. These modifications may occur multiple times during playback, or even continuously during playback as the event data changes.

As an example, in some embodiments the computer may modify the playback speed of a synchronized event video based on the event data or the motion analysis data. For instance, during periods of low motion the playback may occur at normal speed, while during periods of high motion the playback may switch to slow motion to highlight the details of the motion. Modifications to playback speed may be made based on any observed or calculated characteristics of the event or the motion. For instance, event data may identify particular sub-events of interest, such as the striking of a ball, beginning or end of a jump, or any other interesting moments. The computer may modify the playback speed to slow down playback as the synchronized event video approaches these sub-events. This slowdown could increase continuously to highlight the sub-event in fine detail. Playback could even be stopped at the sub-event and await input from the user to continue. Playback slowdown could also be based on the value of one or more metrics from the motion analysis data or the event data. For example, motion analysis data may indicate the speed of a moving baseball bat or golf club, and playback speed could be adjusted continuously to be slower as the speed of such an object increases. Playback speed could be made very slow near the peak value of such metrics.

Figure 23:
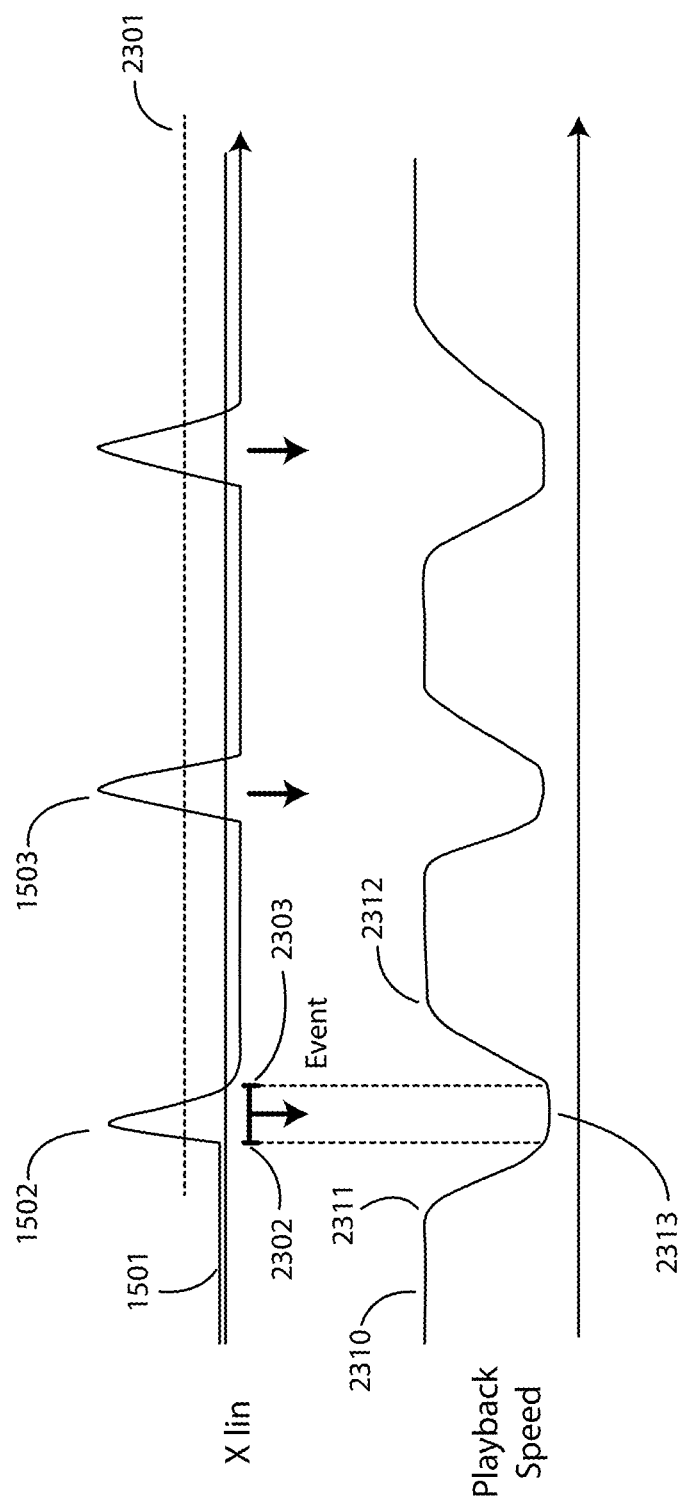
FIG. 23 illustrates an embodiment of variable speed playback using motion data.

FIG. 23 illustrates an embodiment of variable speed playback using motion data. Motion capture element 111 records motion sensor information including linear acceleration on the x-axis 1501. (In general many additional sensor values may be recorded as well; this example uses a single axis for simplicity.) Event threshold 2301 defines events of interest when the x-axis linear acceleration exceeds this threshold. Events are detected at 1502 and 1503. Event 1502 begins at 2302 and completes at 2303. On playback, normal playback speed 2310 is used between events. As the beginning of event 1502 approaches, playback speed is reduced starting at 2311 so the user can observe pre-event motion in greater detail. During the event playback speed is very slow at 2313. After the event end at 2303 playback speed increases gradually back to normal speed at 2312.

In other embodiments, modifications could be made to other playback characteristics not limited to playback speed. For example, the computer could modify any or all of playback speed, image brightness, image colors, image focus, image resolution, flashing special effects, or use of graphic overlays or borders. These modifications could be made based on motion analysis data, event data, sub-events, or any other characteristic of the synchronized event video. As an example, as playback approaches a sub-event of interest, a flashing special effect could be added, and a border could be added around objects of interest in the video such as a ball that is about to be struck by a piece of equipment.

In embodiments that include a sound track, modifications to playback characteristics can include modifications to the playback characteristics of the sound track. For example such modifications may include modifications to the volume, tempo, tone, or audio special effects of the sound track. For instance the volume and tempo of a sound track may be increased as playback approaches a sub-event of interest, to highlight the sub-event and to provide a more dynamic experience for the user watching and listening to the playback.

In one or more embodiments of the invention, a computer may use event data or motion analysis data to selectively save only portions of video stream or recorded video. This is illustrated in FIG. 19 where video portions 1910 and 1911 are discarded to save only the event video 1901 with a pre-event portion 1902 and a post-event portion 1903. Such techniques can dramatically reduce the requirements for video storage by focusing on events of interest. In some embodiments, a computer may have an open communication link to a motion capture sensor while an event is in progress. The computer may then receive or generate a notification of a start of an event, and begin saving video at that time; it may then continue saving video until it receives or generates a notification of the end of the event. The computer may also send control messages to a camera or cameras during the event to initiate and terminate saving of video on the cameras, as illustrated in FIG. 22.

In other embodiments the computer may save or receive videos and event data after the event has completed, rather than via a live communication link open through the event. In these embodiments the computer can truncate the saved video to discard a portion of the video outside the event of interest. For example, a server computer 152 may be used as a repository for both video and event data. The server could correlate the event data and the video after upload, and truncate the saved video to only the timeframes of interest as indicated by the event data.

Figure 24:
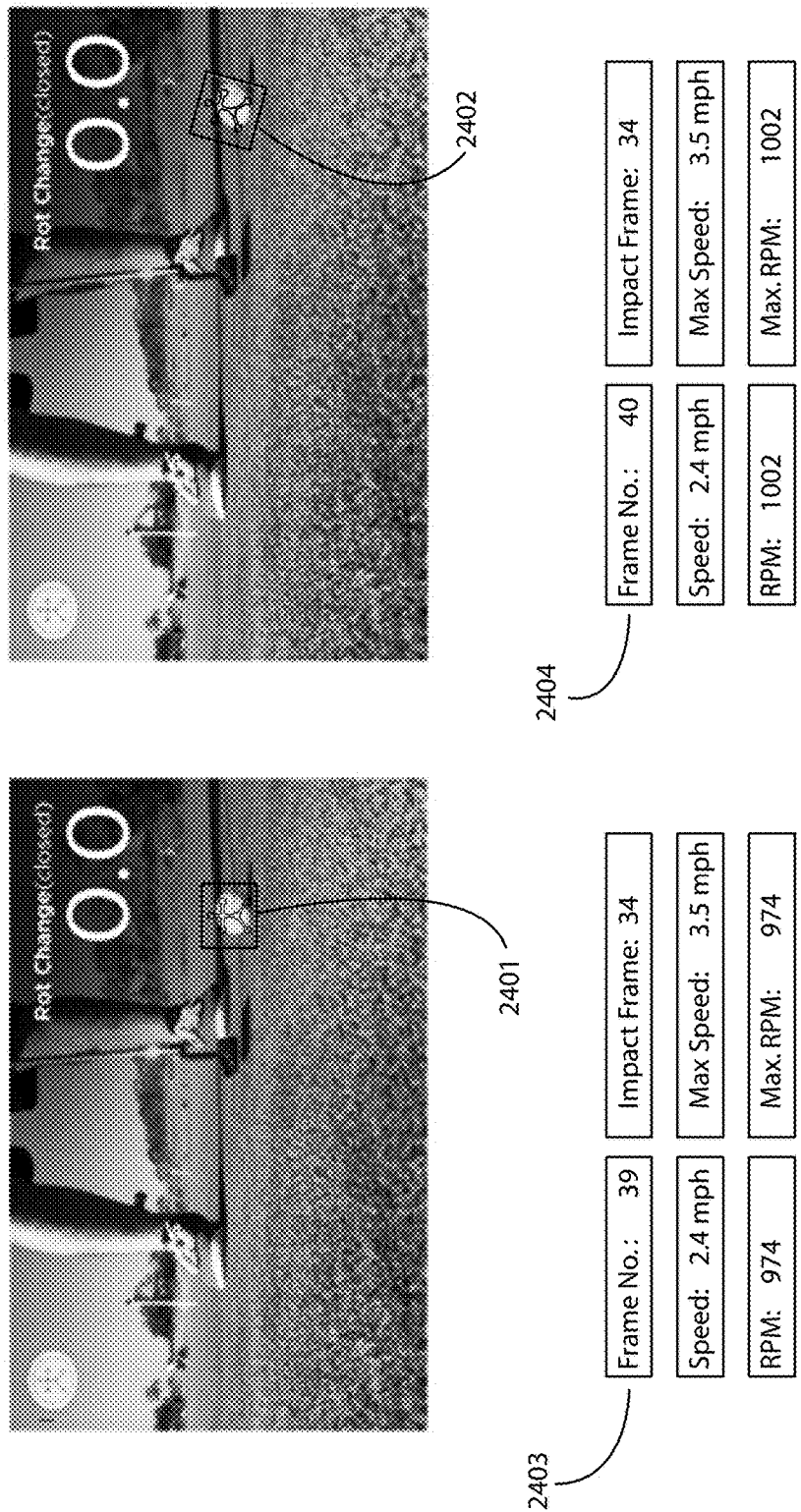
FIG. 24 illustrates image analysis of a video to assist with synchronization of the video with event data and motion analysis data and/or determine a motion characteristic of an object in the video not coupled with a motion capture sensor.

In one or more embodiments a computer may use image analysis of a video to assist with synchronization of the video with event data and motion analysis data. For example, motion analysis data may indicate a strong physical shock (detected, for instance, using accelerometers) that comes for instance from the striking of a ball like a baseball or a golf ball, or from the landing of a skateboard after a jump. The computer may analyze the images from a video to locate the frame where this shock occurs. For example, a video that records a golf ball may use image analysis to detect in the video stream when the ball starts moving; the first frame with motion of the golf ball is the first frame after the impact with the club, and can then be synchronized with the shock in the corresponding motion analysis data. This is illustrated in FIG. 24 where image analysis of the video identifies golf ball 2401. The frame where ball 2401 starts moving, indicated in the example as Impact Frame 34, can be matched to a specific point in the motion analysis data that shows the shock of impact. These video and motion data frames can be used as key frames; from these key frames the video frames that correspond most closely to the start and end of an event can be derived.

In one or more embodiments, a computer may use image analysis of a video to generate a metric from an object within the video. This metric may for instance measure some aspect of the motion of the object. Such metrics derived from image analysis may be used in addition to or in conjunction with metrics obtained from motion analysis of data from motion sensors. In some embodiments image analysis may use any of several techniques known in the art to locate the pixels associated with an object of interest. For instance, certain objects may be known to have specific colors, textures, or shapes, and these characteristics can be used to locate the objects in video frames. As an example, a golf ball may be known to be approximately round, white, and of texture associate with the ball's materials. Using these characteristics image analysis can locate a golf ball in a video frame. Using multiple video frames the approximate speed and rotation of the golf ball could be calculated. For instance, assuming a stationary or almost stationary camera, the location of the golf ball in three-dimensional space can be estimated based on the ball's location in the video frame and based on its size. The location in the frame gives the projection of the ball's location onto the image plane, and the size provides the depth of the ball relative to the camera. By using the ball's location in multiple frames, and by using the frame rate which gives the time difference between frames, the ball's velocity can be estimated.

FIG. 24 illustrates this process where golf ball is at location 2401 in frame 2403, and location 2402 in frame 2404. The golf ball has an icon that can be used to measure the ball's distance from the camera and its rotation. The velocity of the ball can be calculated using the distance moved between frames and the time gap between frames. As a simple example if the ball's size does not change appreciably between frames, the pixel difference between the ball's locations 2402 and 2401 can be translated to distance using the camera's field of view and the ball's apparent size. The frame difference shown in the example is 2 frames (Frame 39 to Frame 41), which can be converted to time based on the frame rate of the camera. Velocity can then be calculated as the ratio of distance to time.

In one or more embodiments, a computer can access previously stored event data or motion analysis data to display comparisons between a new event and one or more previous events. These comparisons can be for the same user and same equipment over time, or between different users and different equipment. These comparisons can provide users with feedback on their changes in performance, and can provide benchmarks against other users or users of other types or models of equipment. As an illustration, FIG. 1D shows device 101 receiving event data associated with users 150 and 152. This data is transmitted to computer 105 for display and comparison. A user 151 can compare performance of user 150 and 152, and can track performance of each user over time.

In one or more embodiments, the microcontroller coupled to a motion capture element is configured to communicate with other motion capture sensors to coordinate the capture of event data. The microcontroller may transmit a start of event notification to another motion capture sensor to trigger that other sensor to also capture event data. The other sensor may save its data locally for later upload, or it may transmit its event data via an open communication link to a computer while the event occurs. These techniques provide a type of master-slave architecture where one sensor can act as a master and can coordinate a network of slave sensors.

In one or more embodiments of the invention, a computer may use event data to discover cameras that can capture or may have captured video of the event. Such cameras need to be proximal to the location of the event, and they need to be oriented in the correct direction to view the event. In some systems the number, location, and orientation of cameras is not known in advance and must be determined dynamically. As an event occurs, a computer receiving event data can broadcast a request to any cameras in the vicinity of the event or oriented to view the event. This request may for example instruct the cameras to record event video and to save event video. The computer may then request video from these proximal and correctly oriented cameras after the event. This is illustrated in FIG. 1 where computer 160 may receive notification of an event start from motion capture element 111. Computer 160 may broadcast a request to all cameras in the vicinity such as 103, 104, 130, 130a, and 130b. As an example, cameras 103 and 130 may be proximal and correctly oriented to view the event; they will record video. Camera 104 may be too far away, and cameras 130a and 130b may be close enough but not aiming at the event; these cameras will not record video.

In some embodiments one or more videos may be available on one or more computers (such as servers 152, or cloud services) and may be correlated later with event data. In these embodiments a computer such as 152 may search for stored videos that were in the correct location and orientation to view an event. The computer could then retrieve the appropriate videos and combine them with event data to form a composite view of the event with video from multiple positions and angles.

In one or more embodiments, a computer may obtain sensor values from other sensors in addition to motion capture sensors, where these other sensors are proximal to an event and provide other useful data associated with the event. For example, such other sensors may sense various combinations of temperature, humidity, wind, elevation, light, sound and physiological metrics (like a heartbeat). The computer may retrieve these other values and save them along with the event data and the motion analysis data to generate an extended record of the event during the timespan from the event start to the event stop.

In one or more embodiments, the types of events detected, monitored, and analyzed by the microprocessor, the computer, or both, may include various types of important motion events for a user, a piece of equipment, or a mobile device. These important events may include critical or urgent medical conditions or indicators of health. Some such event types may include motions indicative of standing, walking, falling, heat stroke, a seizure, violent shaking, a concussion, a collision, abnormal gait, and abnormal or non-existent breathing. Combinations of these event types may also be detected, monitored, or analyzed.

Figure 25:
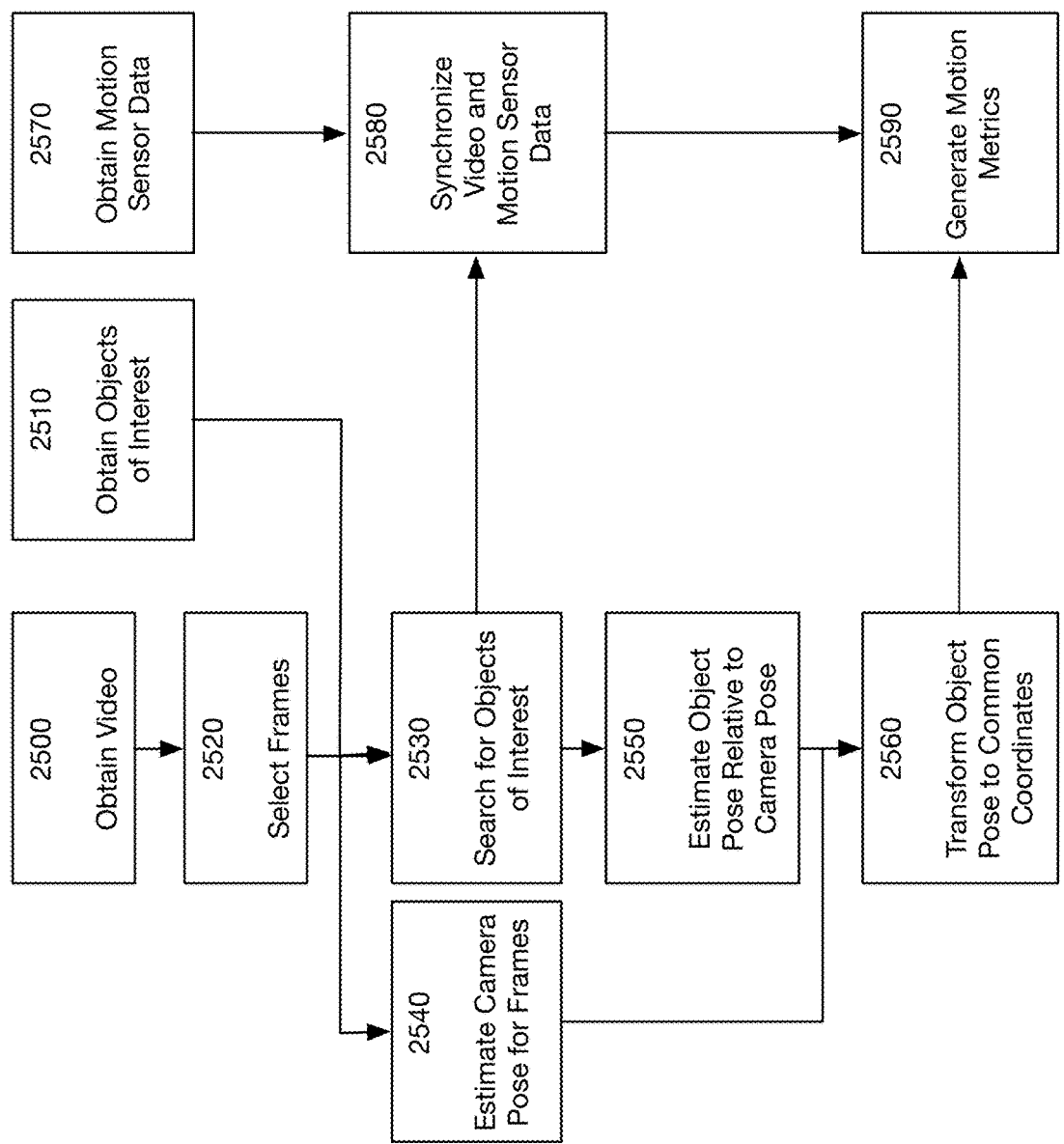
FIG. 25 illustrates a flowchart of an embodiment of a method for integrated sensor and video motion analysis, showing the major input, processing, and output steps of the method.

FIG. 25 shows a flowchart of an embodiment of a method for integrated sensor and video motion analysis. The flowchart shows illustrative dependencies between the steps. The dependencies are for illustration only; embodiments of the method may use different steps and may carry out the steps in any desired order. The input is obtained at 2500, Obtain Video, at 2510, Obtain Objects of Interest, and at 2570, Obtain Motion Sensor Data; the output is performed at 2590, Generate Motion Metrics. Video may be obtained from one or more cameras and may include raw video or event based videos as determined in each camera or sensor or combination thereof. Transfer of event based videos and any discarding of non-event video provides for faster and more pertinent video processing and storage. Video may include single images captured by a camera. Motion sensor data is obtained from one or more motion capture elements. Sensors may communicate with other sensors to communicate that an event has occurred so that even if some sensors do not register an event the sensor and any associated camera may save a predetermined amount of motion data and/or image data before and after the event, even if not detected locally by the sensor or camera that receives the event. These motion capture elements may include one or more sensors that measure any aspect of the motion of an object. Such sensors may include for example, without limitation, accelerometers, gyroscopes, magnetometers, strain gauges, altimeters, speedometers, GPS, optical or sonic rangefinders, flow meters, pressure meters, radar, or sonar, and any other types of sensors such as temperature, humidity, wind, elevation, light, sound and physiological metrics, such as heartbeat sensors. Groups of sensors may be utilized to signify an event as well, so that if the heart rates or sound increases above a predefined threshold, then a group event may be designated and published or otherwise broadcast, for example if filtered by location and time. In addition, social media sites may be sampled to correlate or augment the event or group event. Quantities measured by these sensors may include for example, without limitation, any combination of linear position, linear velocity, linear acceleration, trajectory, orientation, angular velocity, angular acceleration, time of motion, time elapsed between positions, time elapsed between start of motion and arriving at a position, and time of impact, or any quantity or value associated with the specific type of sensor, e.g., blood pressure, heart rate, altitude, etc. Motion sensor data and video may be obtained in any manner, including via wired or wireless network communication, for example with cameras containing an internal motion or other sensor, as well as coupled externally or wirelessly to a camera for example. Sensor data and video may be obtained synchronously during activities, or they may be retrieved and analyzed after activities.

Objects of interest may include persons, equipment, or any combinations thereof. These objects may be specific, such as a particular item with a designated serial number, or they may be general categories of objects, any of which may be of interest. General categories may for example include categories such as "people running" or "golf balls" or "skateboards." The particular objects of interest will depend on the application for each embodiment of the method. Illustrative equipment of interest may include for example, without limitation, balls, bats, clubs, rackets, gloves, protective gear, goals, nets, skateboards, skis, surfboards, roller skates, ice skates, cars, motorcycles, bicycles, helmets, shoes, medical devices, crutches, canes, walking sticks, walkers, and wheelchairs.

At 2520, Select Frames obtains a set of frames from the video or videos. In some embodiments or applications the entire video or videos may be selected. In some embodiments portions of the video or videos may be selected for analysis. Selection of relevant frames may be made on any basis. For example, in one or more embodiments there may be external information that indicates that only frames captured in particular time range or captured from a particular viewpoint include activities of interest. In one or more embodiments frames may be down sampled to reduce processing requirements. In one or more embodiments a preprocessing step may be used to scan frames for potentially relevant activities, and to select only those frames for subsequent analysis.

Associated with each object of interest there are one or more distinguishing visual characteristics for that object. At 2510, in one or more embodiments, the method may include obtaining these distinguishing visual characteristics for each object. These distinguishing visual characteristics assist in locating and orienting the objects of interest in the video frames. Examples of distinguishing visual characteristics may include, without limitation, shape, curvature, size, color, luminance, hue, saturation, texture, and pixel pattern. Any visual characteristic that may assist in locating or orienting an object in a video frame may be used as a distinguishing visual characteristic. As a simple example, a golf ball may be distinguished by its shape (spherical), its color (typically white), and its size (typically about 43 mm in diameter); any one of these characteristics, or any combination of them, may be used to identify one or more golf balls in video frames.

At 2530, Search for Objects of Interest, the method uses the distinguishing visual characteristics to find the objects of interest in the selected video frames. One or more embodiments may employ any desired search strategy to scan the pixels of the video frames for the distinguishing visual characteristics. Below we will describe some search strategies that may be employed in one or more embodiments to limit the search areas to specific regions of the frames. However, one or more embodiments may conduct exhaustive searches to scan all pixels of all frames to locate the objects of interest. Because pixel regions in video frames may in some cases contain noise, occlusions, shadows, or other artifacts, these regions may not precisely match the distinguishing visual characteristics even when an object of interest is present; one or more embodiments may therefore use any desired approximate matching techniques to estimate the probability that a pixel region represents an object of interest. Such approximate matching techniques may for example include scoring of regions based on correlations of pixels with patterns expected based on the distinguishing visual characteristics.

The result of 2530, Search for Objects of Interest, includes a list of identified objects that have been located in one or more of the frames, along with the pixel regions in those frames that contain those identified objects. At 2550, Estimate Object Pose Relative to Camera Pose, the method generates an estimate of the position or orientation (or both) of each identified object, relative to the position and orientation of the camera when the camera captured the video frame. The term "pose" in this specification refers to the position and orientation of an object relative to some coordinate system, or to partial information about the position, the orientation, or both. This usage of "pose" is standard in the art for robotics and computer graphics, for example.

One or more embodiments of the method include techniques to estimate object locations and orientations even when the camera or cameras used to capture the video are moving during video capture. Moving cameras create a significant challenge because apparent motion of objects may be due to camera motion, to object motion, or to a combination of these two factors. The embodiment shown in FIG. 25 addresses this issue in three ways: at 2550, the method estimates the pose of an identified object relative to the camera; at 2540, the method estimates the pose of the camera relative to some fixed coordinate system (for example a coordinate system associated with the scene or scenes captured by the camera); at 2560, the method transforms the object pose to the common coordinate system. One or more embodiments may use any techniques to separate camera movement from object movement; the steps shown here are simply illustrative. Moreover in one or more embodiments of the method, it may be known (or inferred) that the camera was not moving during video capture (or during a portion of video capture); in these embodiments, step 2540 is optional and may be unnecessary, and steps 2550 and 2560 may be combined, for example.

At 2560, objects of interest have been identified, and the pose of each object relative to a common coordinate system has been determined. From this pose data it is then possible to generate various motion metrics for each identified object. For example, the trajectory of an object is obtained simply by tracking its location (in the common coordinate system) over time. The velocity of an object may be obtained by dividing the inter-frame change in location by the time between frames. Various other motion metrics may be calculated for each identified object, including for example, without limitation, position, orientation, trajectory, velocity, acceleration, angular velocity, and angular acceleration.

The embodiment shown in FIG. 25 obtains additional information about object movements at 2570, Obtain Motion Sensor Data. In one or more embodiments, one or more of the objects of interest may have motion capture elements attached to or otherwise observing motions of the objects. These motion capture elements have sensors that collect data about object movements. In one or more embodiments, this sensor data is integrated with the motion metrics derived from video analysis to form integrated motion metrics. In order to combine sensor data and video information, one or more embodiments first synchronize this data to a common time scale. This synchronization occurs at 2580, Synchronize Video and Motion Sensor Data. In some embodiments the clocks of cameras and motion capture elements may be synchronized prior to data and video capture; in these situations synchronization may be unnecessary or trivial. In other embodiments the clocks of the various devices (cameras and sensors) may not be synchronized, and a post-capture synchronization step at 2580 may be necessary.

After video frames and motion sensor data are synchronized, the data may be integrated at 2590 to Generate Motion Metrics. This data integration is a "sensor fusion" process, which combines information from different kinds of sensors to create an integrated view of the motion of the identified objects. Embodiments may use any desired techniques for sensor fusion, including for example, without limitation, Kalman filters, extended Kalman filters, complementary filters, Bayesian networks, multiple hypothesis testing, and particle filters. In some embodiments sensor fusion may include simple weighted averaging of estimates from different data sources, for example with weights inversely proportional to the error variance of each data source. One or more embodiments may for example use video information for absolute positioning, and use sensor data for tracking changes in position (for example using inertial sensors).

Figure 26:
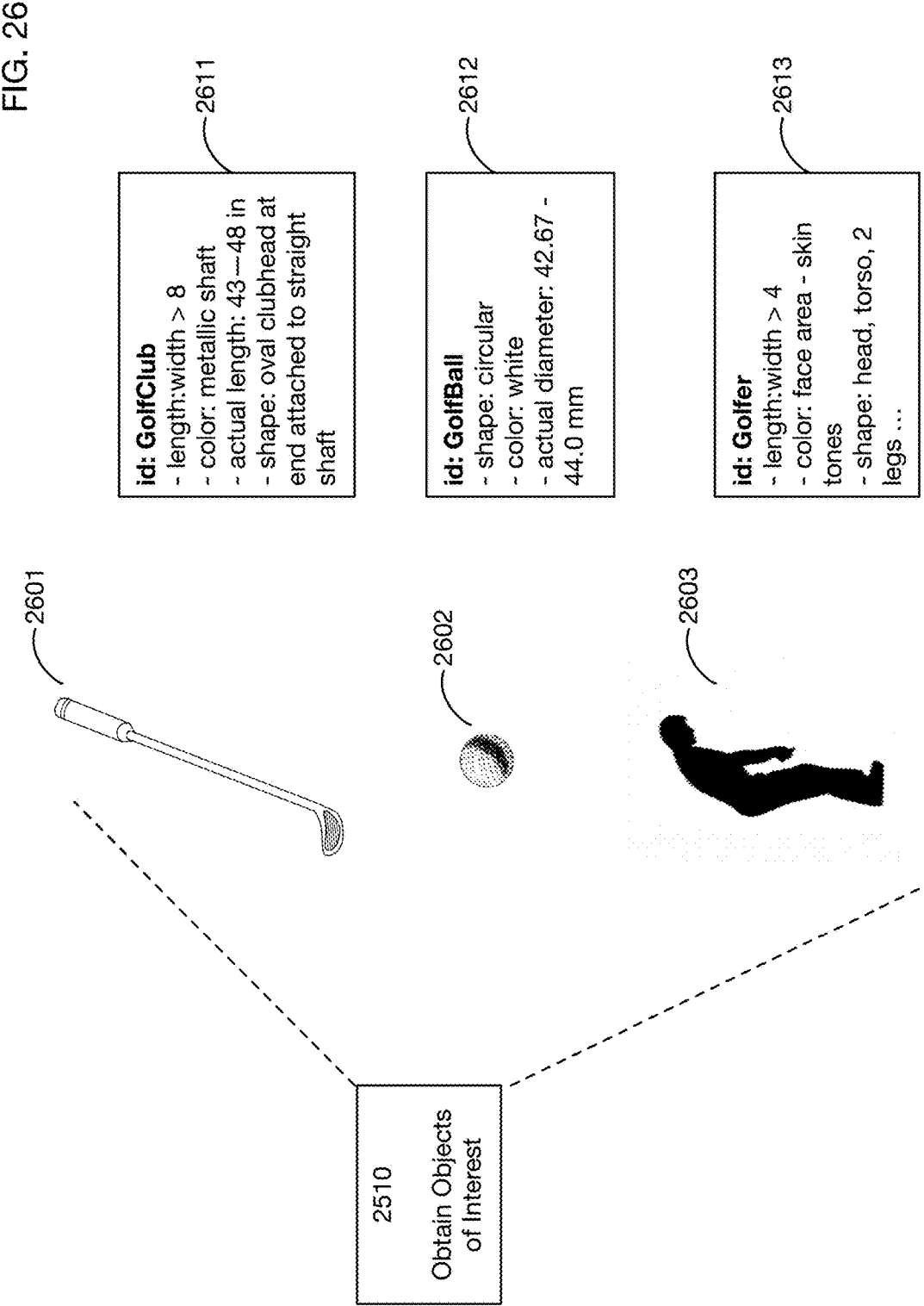
FIG. 26 shows examples of objects of interest and of distinguishing visual characteristics associated with these objects.

The specific steps shown in FIG. 25 are described in greater detail as per FIG. 26, which illustrates examples of 2510, Obtain Objects of Interest, which includes obtaining the distinguishing visual characteristics of these objects. In this illustrative example, three objects of interest are obtained: golf club 2601, golf ball 2602, and golfer 2603. As discussed above, these objects may be specific items, or they may represent general categories. For example, golf club 2601 may represent a specific driver belonging to a particular golfer, or it may be a general category for all drivers, or for all clubs. Distinguishing visual characteristics 2611, 2612, and 2613 illustrate possible characteristics for items 2601, 2602, and 2603, respectively. These examples are simply illustrative; embodiments may use any desired characteristics to identify objects of interest. For golf club 2601, possible distinguishing characteristics 2611 include the long length of the club relative to its width, the shape of the clubhead, and the metallic color of the shaft. For golf ball 2602, possible distinguishing characteristics 2612 include the circular shape of the ball and its typically white color. Characteristics for golfer 2603 may be more complex, since unlike the golf club and the golf ball, the golfer is not a rigid body; hence the golfer's shape may change. Nevertheless certain possible characteristics 2613 may include a relatively large height compared to width, the general body shape of having a torso with an attached head, legs, and arms, and possibly skin tone colors for the face or other exposed areas.

The illustrative distinguishing visual characteristics 2611 and 2612 also include information on the size of the objects. This size information may be helpful in locating the objects in video frames; in addition, known object sizes provide a reference that allows for estimation of the distance of the object from the camera, since apparent size is inversely proportional to distance.

Figure 27:
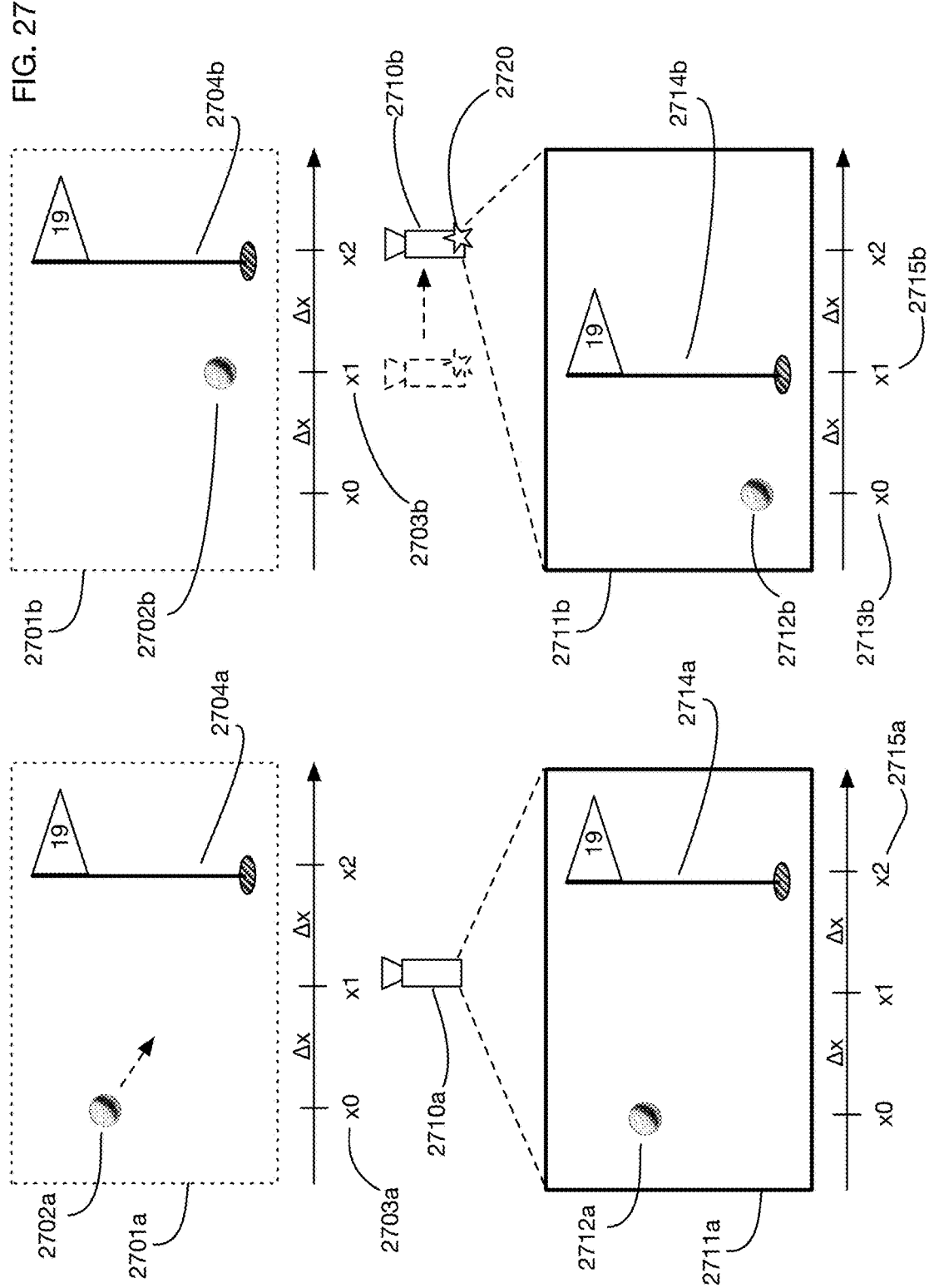
FIG. 27 illustrates an example with a moving object and a moving camera, illustrating the issue of distinguishing true objection motion when the camera is also moving.

The issue of camera motion and how one or more embodiments of the method may identify and compensate for camera motion is shown in FIG. 27, which illustrates an example with a moving object and a moving camera. A camera at initial location 2710a views scene 2701a, which contains moving golf ball 2702a and stationary flag 2704a. The frame captured at this point in time is 2711a. Golf ball 2702a is moving to the right along the horizontal x-axis and downwards on the vertical y-axis. Using a coordinate system fixed to the initial camera pose 2710a, golf ball 2702a is at x coordinate 2703a (x0) in the scene, and the image 2712a of the ball in frame 2711a is also at x0. The image of the flag 2714a in 2711a is at x coordinate 2715a (x2).

The camera then moves to the right by amount Δx, to location 2710b. In this time, the golf ball also moves rightward by Δx to location 2702b, at x coordinate 2703b (x1). In the image 2711b of the camera at 2710b, it appears that the golf ball is at location 2712b, with x coordinate 2713b unchanged; and it appears that the flag has moved to the left to 2714b, at x coordinate 2715b (x1). Without accounting for camera motion, analysis of the frames 2711a and 2711b would indicate that the flag is moving left, and the ball is dropping but not moving horizontally.

In this example, detecting the change in camera pose is straightforward because the analysis can use the fact that the true position of the flag has not changed. Therefore it is straightforward to deduce that the camera has moved to the right by Δx. In general camera motion may involve movement in any direction, as well as changes in camera orientation, so the analysis may be more complex. However the principle of using stationary objects to deduce changes in camera pose can be used in one or more embodiments even in these more complex situations.

One or more embodiments may use camera sensors to determine the pose of the camera during the capture of each of the video frames. If this sensor data is available, image analysis to deduce camera pose, such as the analysis described above, may not be necessary, because the camera pose may be available directly. For example, in FIG. 27 the camera 2710b may be equipped with sensor 2720, which detects changes in camera pose. Such a camera pose sensor may for example include inertial sensors, GPS, or any other sensor or sensors that track position, orientation, or changes thereof.

Figure 28:
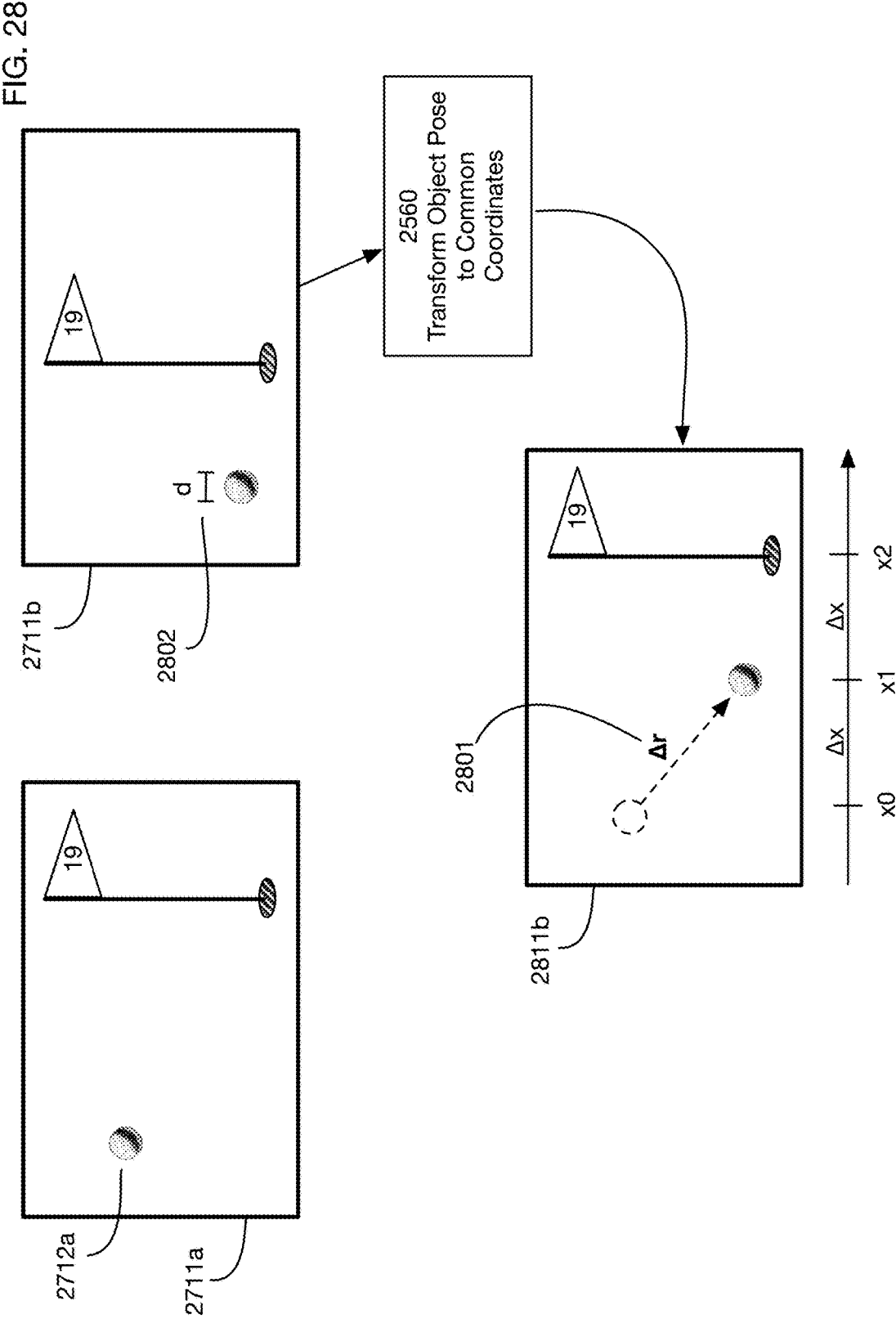
FIG. 28 continues the example of FIG. 27, showing how true object motion may be determined after correcting for changes in camera pose.

FIG. 28 illustrates an example of using the deduced change in camera pose to convert object pose changes to common coordinates. In this example, step 2560 transforms frame 2711b to frame 2811b, which shifts all objects to the right by Δx. Frame 2811b is now in the same coordinate system as frame 2711a, and object motion can be determined directly. The change 2801 in ball position can be calculated from these two frames. Moreover using the apparent size 2802 ($d$) in pixels of the golf ball in frame 2711b and the ball's actual size s, it is possible to convert the position change 2801 (Δr) from pixels to distance units, for example as $\Delta r' = (\Delta r)(s/d)$. (This conversion presumes that the apparent size of the ball 2712a is the same in frames 2711a and 2711b; if the ball's apparent size changes, and additional analysis would be required to account for the movement of the ball perpendicular to the video frames.) From the frame rate for the video, it is possible to determine the time difference Δt between frames, and thus to calculate the ball's velocity vector as $v = \Delta r'/\Delta t$.

Figure 29:
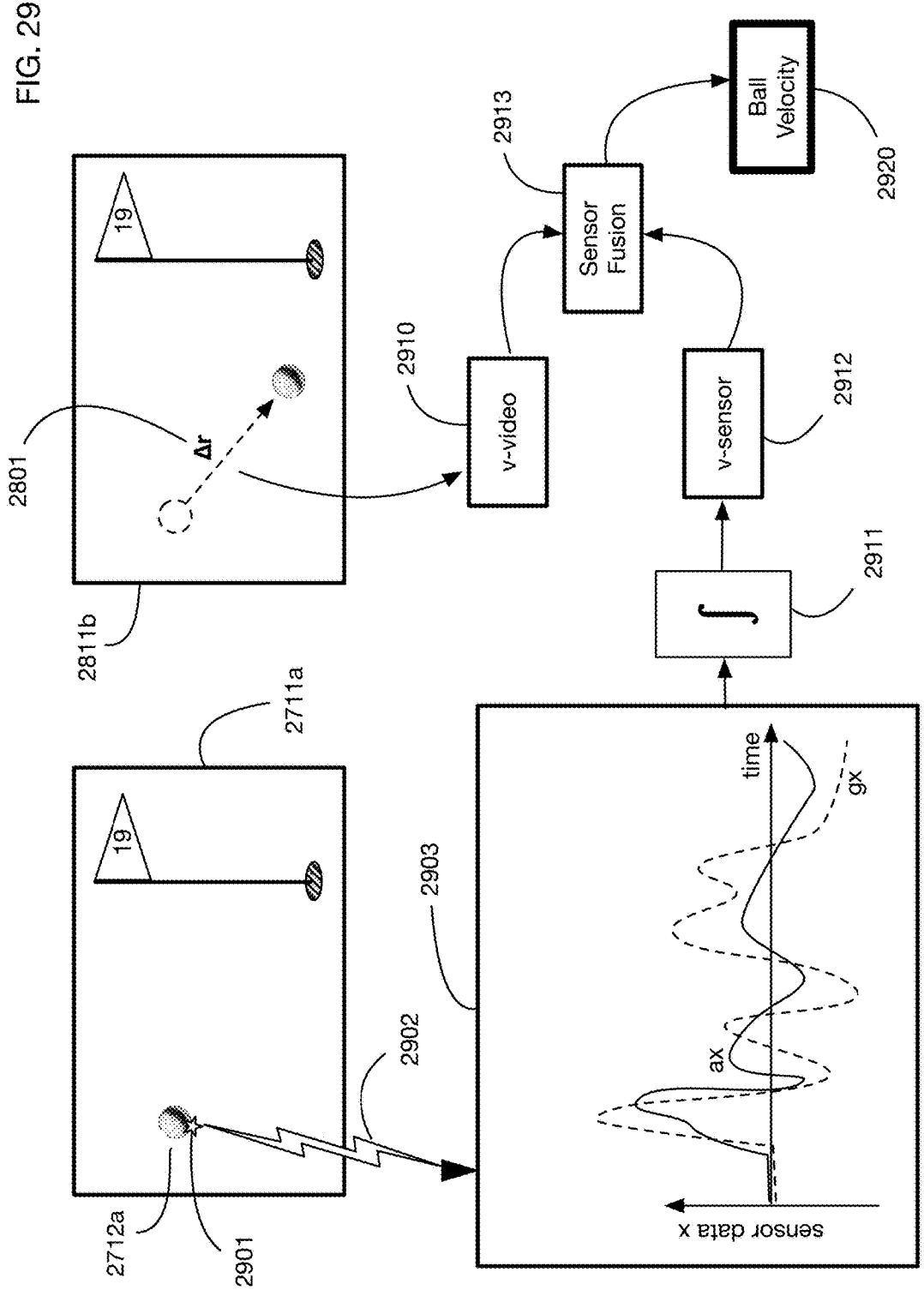
FIG. 29 illustrates an example of sensor fusion that combines motion metrics generated from video analysis with corresponding metrics generated from motion capture data.

The illustrative example continues in FIG. 29 by presuming that the ball 2712a has an attached motion capture element 2901, shown as a star symbol. In this example, the motion capture element includes an inertial sensor with a 3-axis accelerometer and a 3-axis gyroscope, and possible other sensors as well. Sensor data is transmitted wirelessly over channel 2902 to receiver 2903, with only x-axis data shown in the figure. Using inertial navigation techniques known in the art, accelerometer and gyro data are integrated at step 2911, yielding motion metrics in a fixed coordinate system, including the linear velocity estimate 2912 from sensor data. From video frame analysis, the shift in ball position 2801 in video frame 2811b is translated to a linear velocity estimate 2910. The sensor velocity estimate 2912 and the video velocity estimate 2910 are combined by sensor fusion module 2913, forming a final ball velocity estimate 2920. For example, one simple illustrative sensor fusion technique is to take a weighted average $v = \alpha v_{video} + (1-\alpha) v_{sensor}$ where the weighting factor $\alpha$ may depend on the relative error variances of the video estimate and the sensor estimate.

Figure 30:
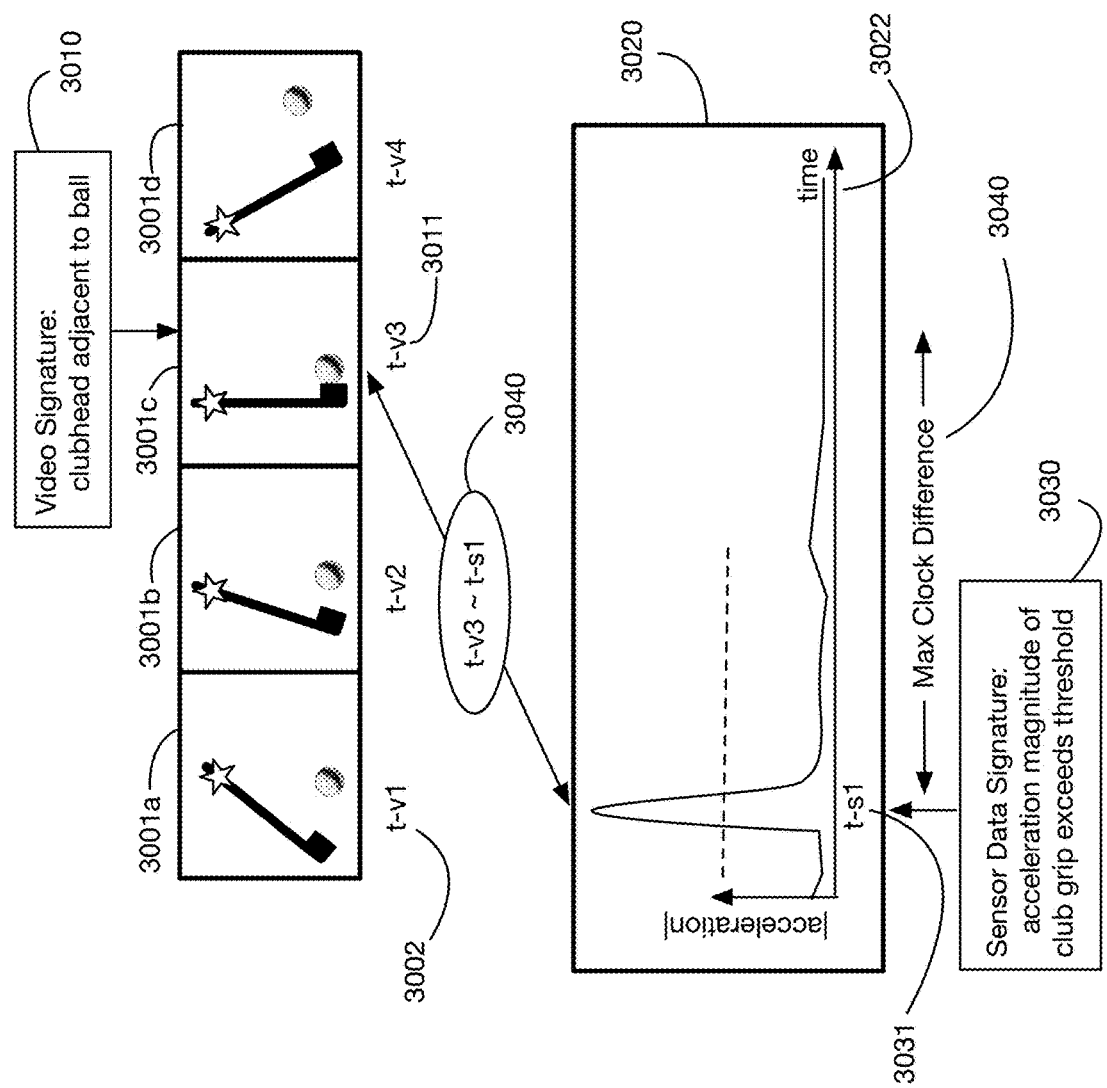
FIG. 30 illustrates an embodiment that synchronizes video frames and sensor data using event signatures to find a common event in both the video frames and the sensor data.

We now discuss some possible approaches to step 2580, synchronizing video and motion sensor data. FIG. 30 illustrates an embodiment that synchronizes video and sensor data using events. In one or more embodiments, certain types of events may be identified along with signatures for the events in both the sensor data and the video data. Synchronization may then be performed by scanning video frames for a video event signature, scanning sensor data for the corresponding sensor data signature, and aligning the sensor clock and video clock at the time of the event. In the embodiment shown in FIG. 30, the event used for synchronization is the impact of a golf clubhead with a golf ball. In this embodiment a sensor with an accelerometer is attached to the grip of the golf club to detect the shock from the impact of the clubhead with the ball. The sensor or an analysis system receiving data from the sensor monitors the magnitude of the acceleration 3020 received from the accelerometer. A video camera captures video showing the swing of the club, shown as frames 3001a, 3001b, 3001c, and 3001d. The sensor data signature 3030 for the impact event is that the magnitude of the acceleration exceeds a designated threshold value; this corresponds to the impact shock. In this example, this sensor signature is detected at 3031 at time t-s1 relative to the sensor clock time 3022. The video signature 3010 for the impact event is that the clubhead is directly adjacent to the ball. Other signatures are possible as well; for example in one or more embodiments the beginning of ball movement may be used as a video signature for an impact. The video signature 3010 is detected at 3011 at time t-v3 relative to the camera's clock time. Synchronization of the sensor clock and the camera clock then consists of aligning the time 3031 of the sensor data signature with the time 3011 of the video signature, at step 3040.

Figure 31:
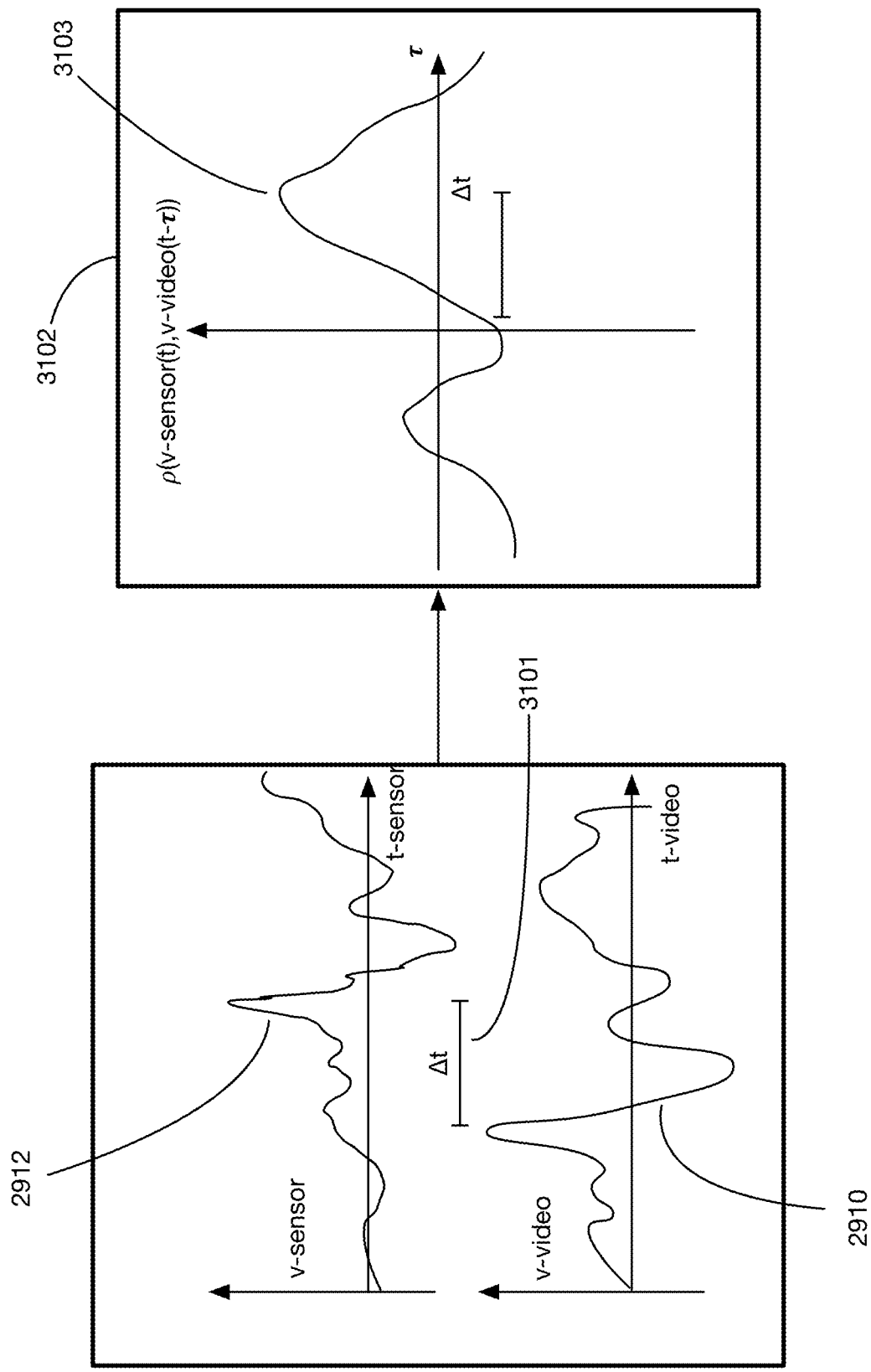
FIG. 31 illustrates an embodiment that synchronizes video frames and sensor data by calculating a motion metric from video and from sensor data, and finding the time shift that matches the motion metric graphs from these two sources.

FIG. 31 illustrates another approach to synchronization that may be used by one or more embodiments. This approach uses comparable motion metrics derived from sensor data and from video frames. In the embodiment shown in FIG. 31, velocity of a selected object as measured by sensor data 2912 is compared to the velocity 2910 of this object as measured by video frame analysis. It is apparent that the two velocity graphs have approximately the same shape, but they are offset by a time difference 3101 representing the difference in the sensor clock and the camera clock. To determine the time difference, a signal correlation graph 3102 may be used; the peak correlation 3103 shows the time offset needed to synchronize the clocks.

Figure 32:
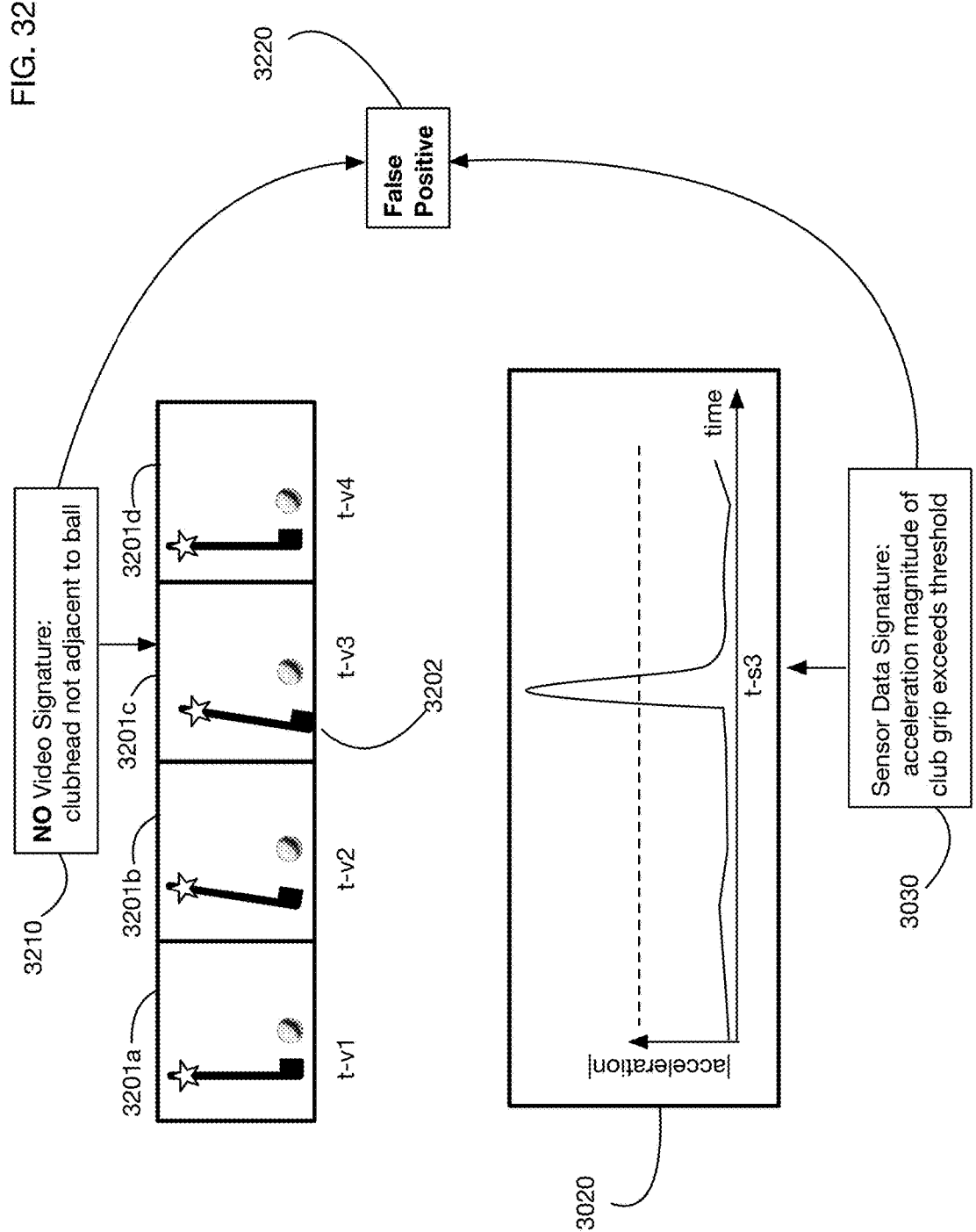
FIG. 32 illustrates an embodiment that combines a sensor data signature and a video signature of an event to distinguish false positive events from true events.

One or more embodiments may use methods to identify false positive events. These false positives have signatures that are similar to those of desired events, but they are caused by spurious actions. FIG. 32 illustrates an example where the desired event is the impact of a golf clubhead with a golf ball. This impact may be detected by an accelerometer attached to the golf club since the shock of impact causes a spike in acceleration. The sensor data signature 3030 for the event is that the magnitude of acceleration exceeds a specified threshold value. However this sensor data signature may be a false positive, in that shocks to the club other than impact with the ball may also produce the signature. For example, as shown at 3202, tapping the club on the ground may produce an acceleration signature which is a false positive. In one or more embodiments, a false positive may be distinguished from a true event by combining a sensor data signature and a video signature. In FIG. 32, the video signature for the event of the clubhead impacting the ball is, for example, that the video shows the clubhead adjacent to the ball. Analysis of video frames 3201a, 3201b, 3201c, and 3201d does not show this video signature. Thus the apparent event signature 3030 may be combined with the non-signature 3210 from the video to classify the event as a false positive 3220. The converse situation may also occur where video analysis shows an apparent event via a video signature, but the sensor data shows this apparent event to be a false positive.

Figure 32A:
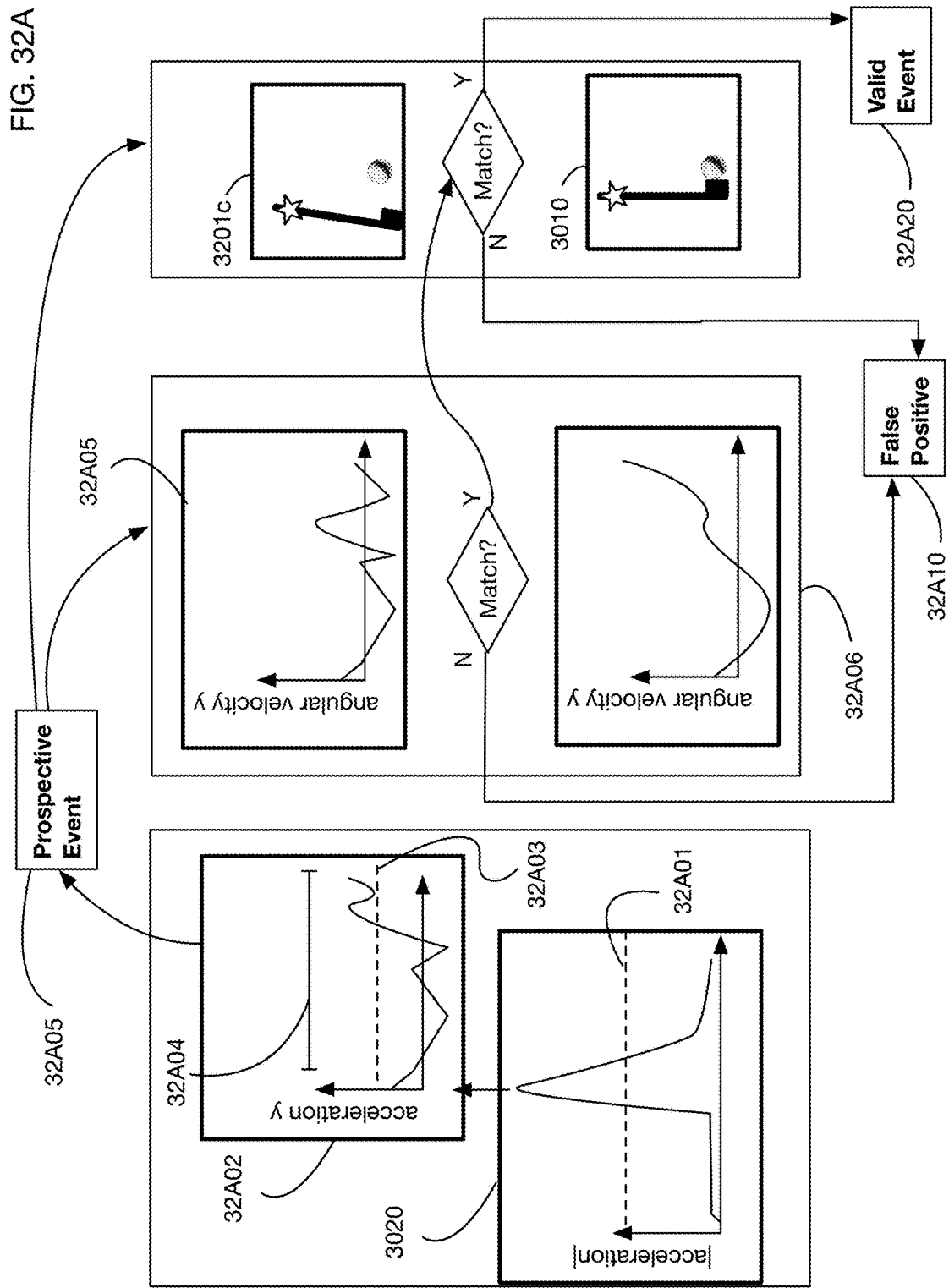
FIG. 32A illustrates an embodiment that uses a two-stage threshold comparison to determine a prospective event, and then classifies that prospective event as either a false positive or a valid event based on both video signatures and sensor data signatures of typical events.

One or more embodiments may use multi-stage tests to distinguish between false positive events and valid events. FIG. 32A illustrates an embodiment that monitors sensor data using a two-stage detection process to find prospective events. First acceleration magnitude 3020 is monitored against threshold value 32A01. When the acceleration magnitude exceeds the threshold, a second stage of threshold testing is initiated, here on the value 32A02 of the y-axis of acceleration. If this value exceeds the second threshold value 32A03 during time interval 32A04, the embodiment signals a prospective event 32A05. This prospective event triggers two additional event validation steps. First another motion metric 32A05 from the motion capture sensor, here the y-axis of angular velocity, is compared to a typical sensor data signature 32A06 for this metric. If the metric does not matches the sensor data signature, the event is declared to be a false positive 32A10. Otherwise a second validation check is performed using video analysis. Image 3201c is compared to an expected video signature 3010 to validate the event. If these images match, a valid event 32A20 is declared; otherwise the prospective event is classified as a false positive 32A10. The specific metrics, thresholds, and tests shown in FIG. 32A are for illustration only; embodiments may use any combinations of any metrics for detection and validation of events, and may combine sensor data and video data in any desired manner to perform this detection and validation. For example, in one or more embodiments, a valid event may require only one of the sensor data signature and the video signature, rather than requiring both as shown in FIG. 32A.

Figure 33:
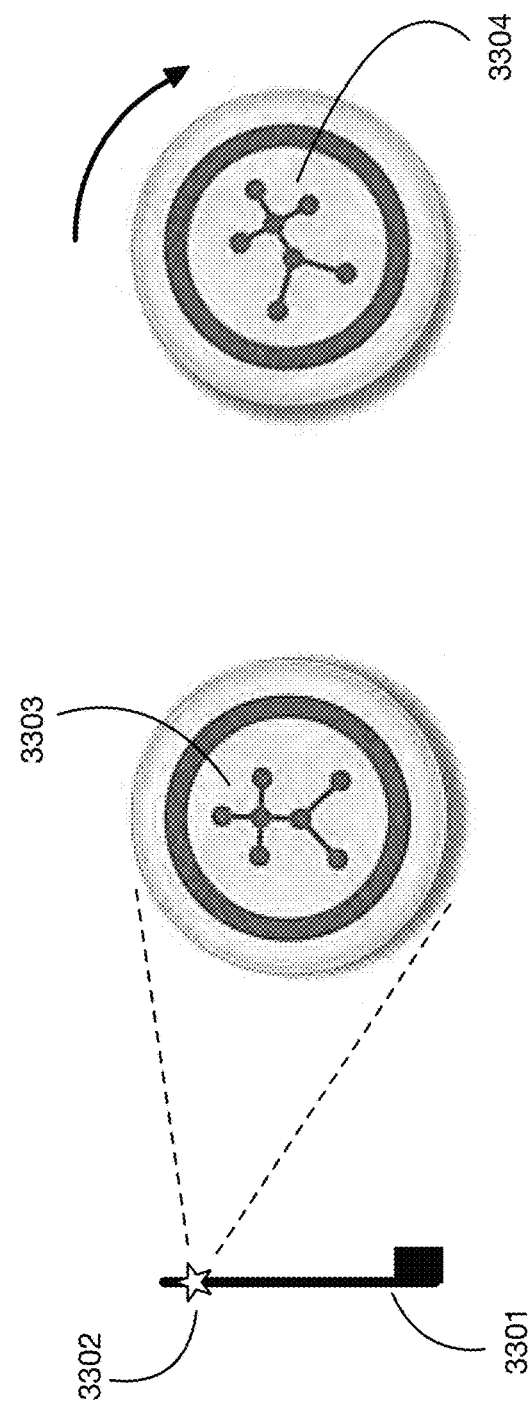
FIG. 33 illustrates an embodiment that uses a visual marker on a motion capture element, which has no rotational symmetries in order to facilitate determination of orientation.

In one or more embodiments, objects of interest may include motion capture elements with visual markers. A visual marker may have a distinctive pattern or color, for example, that forms part of the distinguishing visual characteristics for that object. FIG. 33 illustrates an example with motion capture element 3302 attached to golf club 3301; the pattern 3303 on the motion capture element is a visual marker. In one or more embodiments, the pattern of the visual marker may be designed to assist in determining the orientation of the associated object; this is facilitated by using a visual marker with a pattern like 3303 that has no rotational symmetries: any rotation produces a distinct pattern like 3304 which is not identical to the unrotated pattern 3303.

Figure 34:
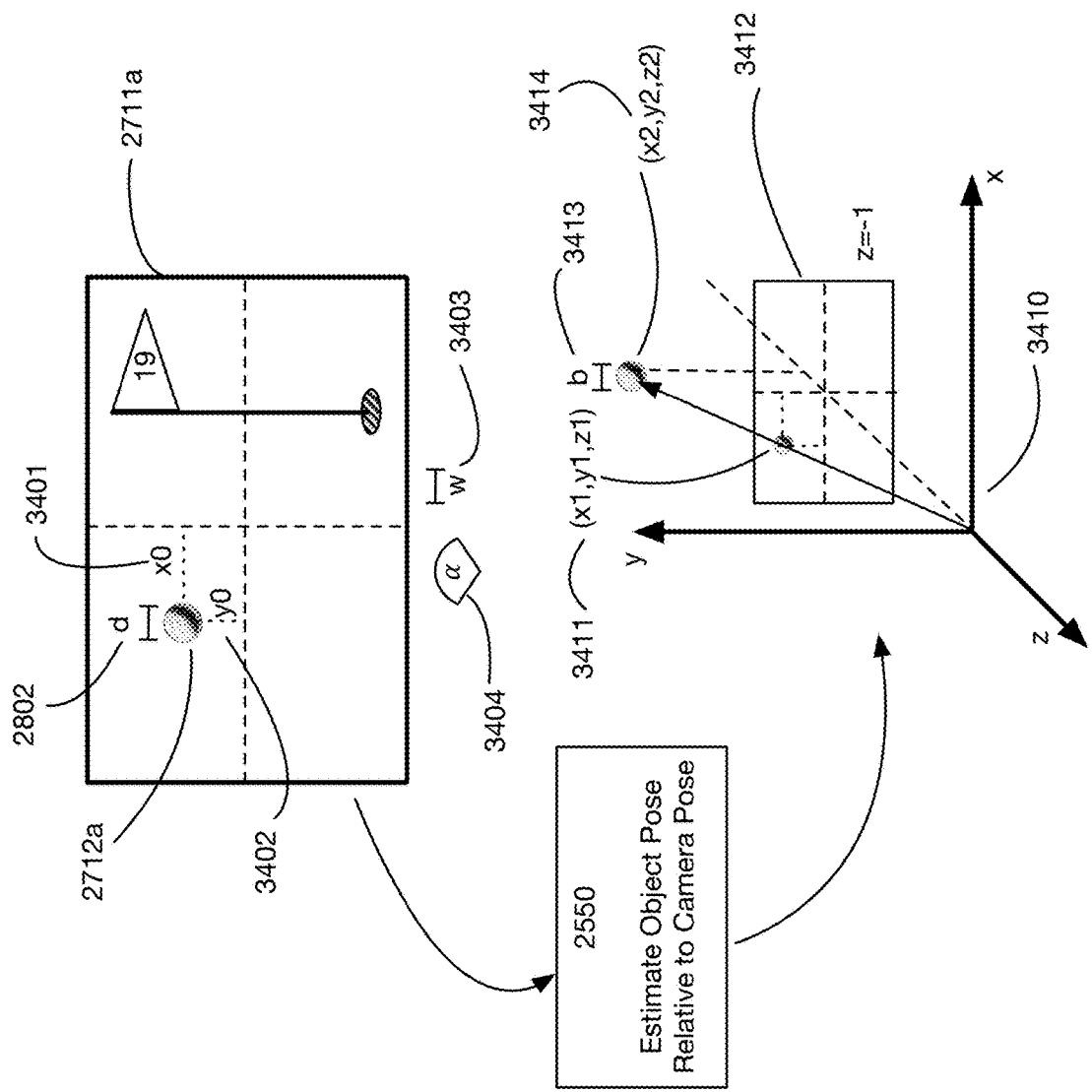
FIG. 34 illustrates an example of calculating the location of an object in three-dimensional space from its location and apparent size in a video frame.

We now discuss illustrative embodiments of step 2550, determining the pose of an identified object relative to the camera pose. Pose consists of location, orientation, or both. FIG. 34 illustrates an example of determining the location of an identified object. The object of interest is golf ball 2712a in frame 2711a. The frame has width 3403 (w) in pixels, and horizontal field of view 3404 (α. The two-dimensional location of the ball in the frame is at x coordinate 3401 (x0) and y coordinate (y0) relative to the center of the frame. These coordinates are in the pixel space of the frame, rather than in a three-dimensional space determined by the camera. The ball 2712a has an apparent size 2802 (d) in pixel space. We define xyz coordinate system 3410 with the z-axis pointing towards the camera, and the origin at the focal point of the camera. We take the frame 2711a to be a projection onto the image plane 3412 with z=−1, rescaled to pixels via the factor $$s = w/2\tan\left(\frac{\alpha}{2}\right).$$

In this image plane, the ball is at coordinates 3411, with (x1, y1, z1)=(x0/s, y0/s, −1). Assuming that the actual size of the ball is known, the distance of the ball from the camera can be determined, as discussed above. Using the apparent size 2802 (d) and actual size 3413 (b) of the ball, the ball is at location 3414 with (x2, y2, z2)=(bx0/d, by0/d, −bs/d).

Figure 35:
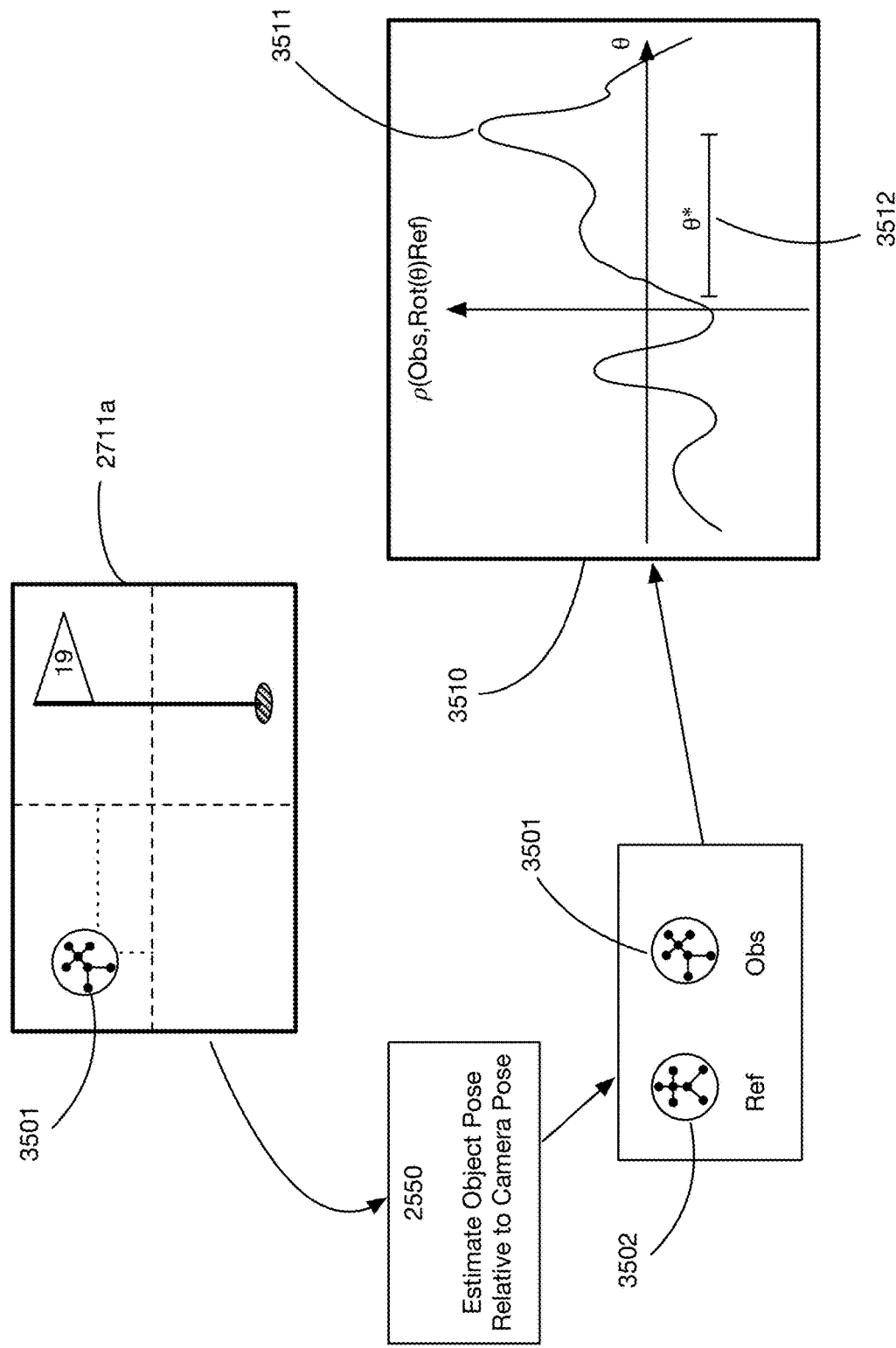
FIG. 35 illustrates an example of calculating the orientation of an object from the orientation of a visual marker in a video frame.

FIG. 35 illustrates an example of determining the orientation of an identified object. The object of interest is golf ball 3501 in frame 2711a. The golf ball is equipped with a visual marker that has no rotational symmetry. Step 2550 of estimating the object's pose relative to the camera pose compares the observed visual marker pattern 3501 to a reference pattern 3502 that represents the unrotated orientation of the object. One or more embodiments may obtain a reference pattern for an object from the distinguishing visual characteristics for the object; for example, an embodiment may define a natural baseline orientation that is used as a reference pattern. One or more embodiments may instead or in addition obtain a reference pattern from another video frame, in order to determine the change in orientation between frames. One method that may be used by one or more embodiments to determine the object's rotation is to search for an angle of rotation that maximizes the correlation (or minimizes the difference) between the observed pattern 3501 and the reference pattern 3502 after the rotation is applied. For example graph 3510 shows the spatial correlation between these patterns for various angles of rotation; the peak correlation 3511 occurs at angle 3512, which represents the orientation of the object 3501. This example illustrates finding a single rotation angle; in some embodiments it may be desired to find a rotation that may have up to three degrees of freedom. A similar approach may be used in these embodiments to search for a rotation that minimizes the differences between the observed pattern and the rotated reference pattern.

One or more embodiments may use only location information about an identified object, in which case the step of determining object orientation is not necessary. One or more embodiments may use only orientation information about an object, in which case the step of determining object location is not necessary. One or more embodiments may use only partial information about location or orientation, in which case the steps may be simplified; for example, in some applications it may be necessary only to determine vertical location (height) rather than complete xyz location.

Figure 36:
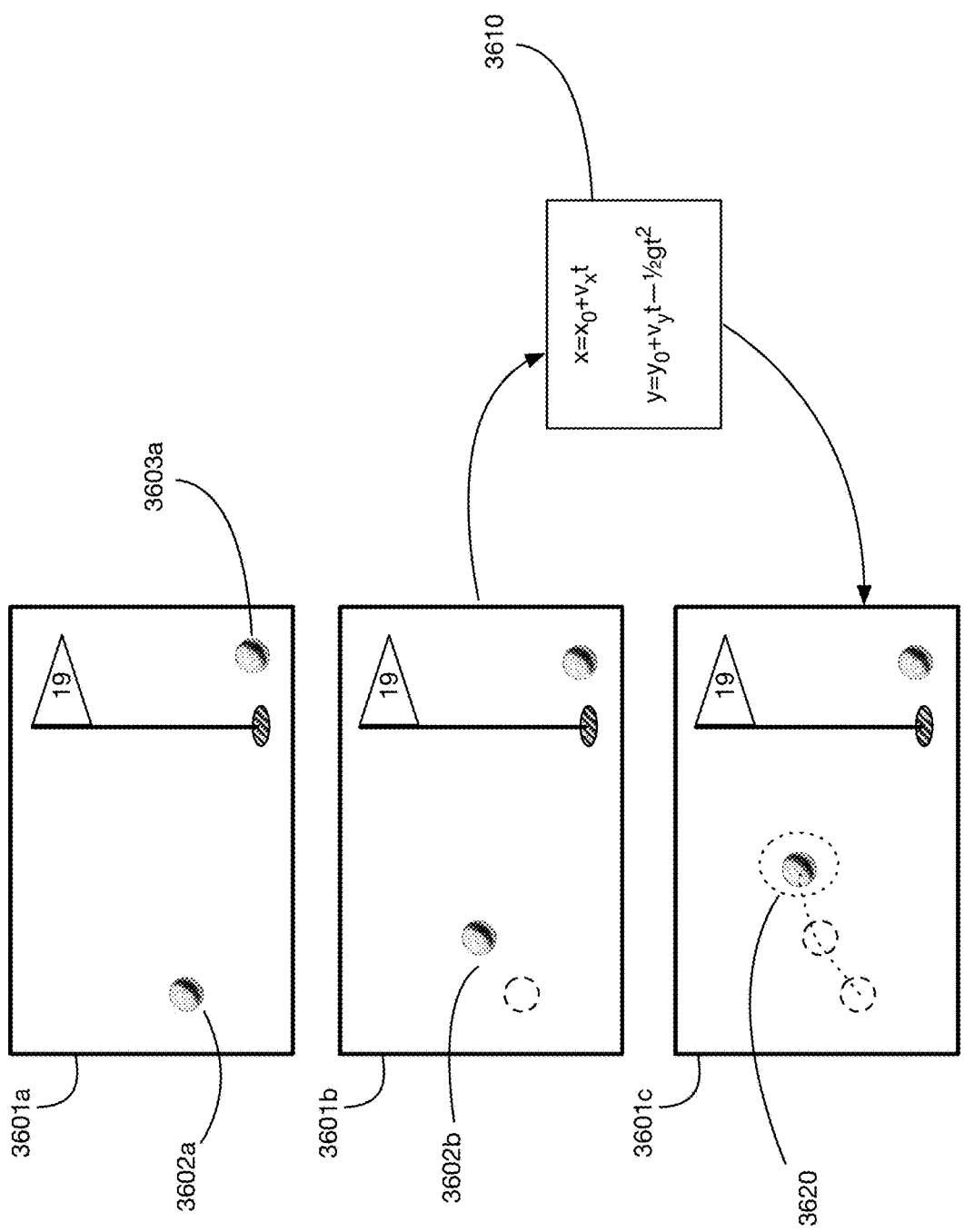
FIG. 36 illustrates an embodiment that uses a physical model of an object trajectory to generate a probable region where the object appears in successive video frames.

We return now to the issue of locating an object of interest in a video frame. As discussed above, one approach used in one or more embodiments is to conduct an exhaustive search of all pixels looking for a match to the distinguishing visual characteristics of the object. However in some embodiments there may be additional information available that can limit the area that needs to be searched. For example, in some embodiments it may be possible to create a physical model of the possible or probable trajectories of an object. Such a physical model will depend on the specific object and on the application for the embodiment. Using such a physical model, it may be possible to predict regions with a high probability of finding an object, based for example on the object's position in previous frames. FIG. 36 illustrates an embodiment that uses a physical model. Golf ball 3602a appears in frames 3601a, 3601b, and 3601c. We presume for illustration that the locations of the ball in frames 3601a and 3601b have been found, and that it is desired to find the location of the ball in frame 3601c. The embodiment uses physical model 3610 for the trajectory of the ball; this model presumes that the only force on the ball while it is in flight is the downward force of gravity. (Air resistance is neglected here; other embodiments may use more complex physical models that take air resistance into account, for example. This model also shows movement only in the x-y plane for ease of illustration; other embodiments may use models that consider movement in all three axes, for example.) Using the locations 3602a and 3602b of the ball in frames 3601a and 3601b, respectively, the parameters of the model 3610 ($x_0$, $y_0$, $v_x$, $v_y$) can be determined. The location 3620 of the ball in frame 3601c can then be predicted by extrapolating the trajectory forward in time. Here we show the region as an area rather than a single point; this reflects that in one or more embodiments the physical model may take into account uncertainties in model parameters to generate probable regions for trajectories rather than simple point estimates.

Use of physical models as illustrated in FIG. 36 may also assist in disambiguating objects in frames. For example, in FIG. 36, frame 3601a has two golf balls, 3602a, and 3603a. Two balls also appear in subsequent frames. A simple search for pixel patterns of a golf ball may identify the relevant areas, but may not easily determine which areas correspond to which of the two golf balls over time. As shown in FIG. 36, the physical model makes it clear that the ball 3603 is stationary and that region 3620 contains the location of the moving ball in the third frame.

Figure 37:
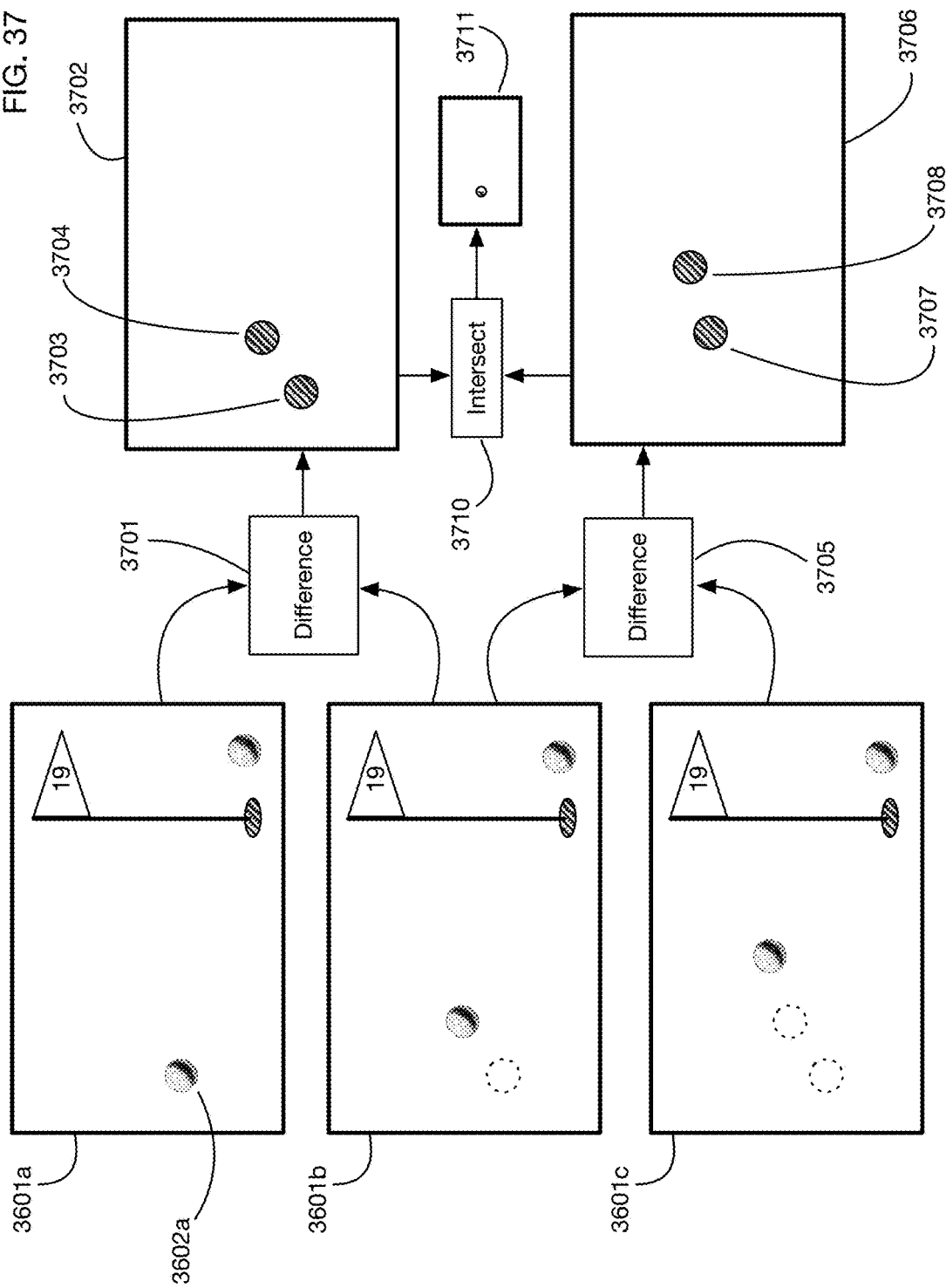
FIG. 37 illustrates an embodiment that uses frame differencing to determine frame regions with motion, in order to locate moving objects.

Another technique that may be used in one or more embodiments to reduce the search area for objects of interest is to use frame differencing to identify regions with moving object. An example of this technique is illustrated in FIG. 37. As in FIG. 36, there are three frames 3601a, 3601b, and 3601c, with one moving golf ball and one stationary golf ball. Frame differences are calculated at 3701 and 3705, yielding 3702 that shows areas that differ between frames 3601a and 3601b, and 3706 that shows areas that differ between frames 3601b and 3601c. The search for a moving golf ball may focus for example on these areas of difference, 3703, 3704, 3707, and 3708. A further optimization may be made by using intersection 3710 to find common areas of difference 3711 for the frame 3601b between the forward difference 3706 and the backward difference 3702. In this example the intersection 3711 has only a single region, which is the likely location of the moving golf ball in frame 3601b.

Figure 38:
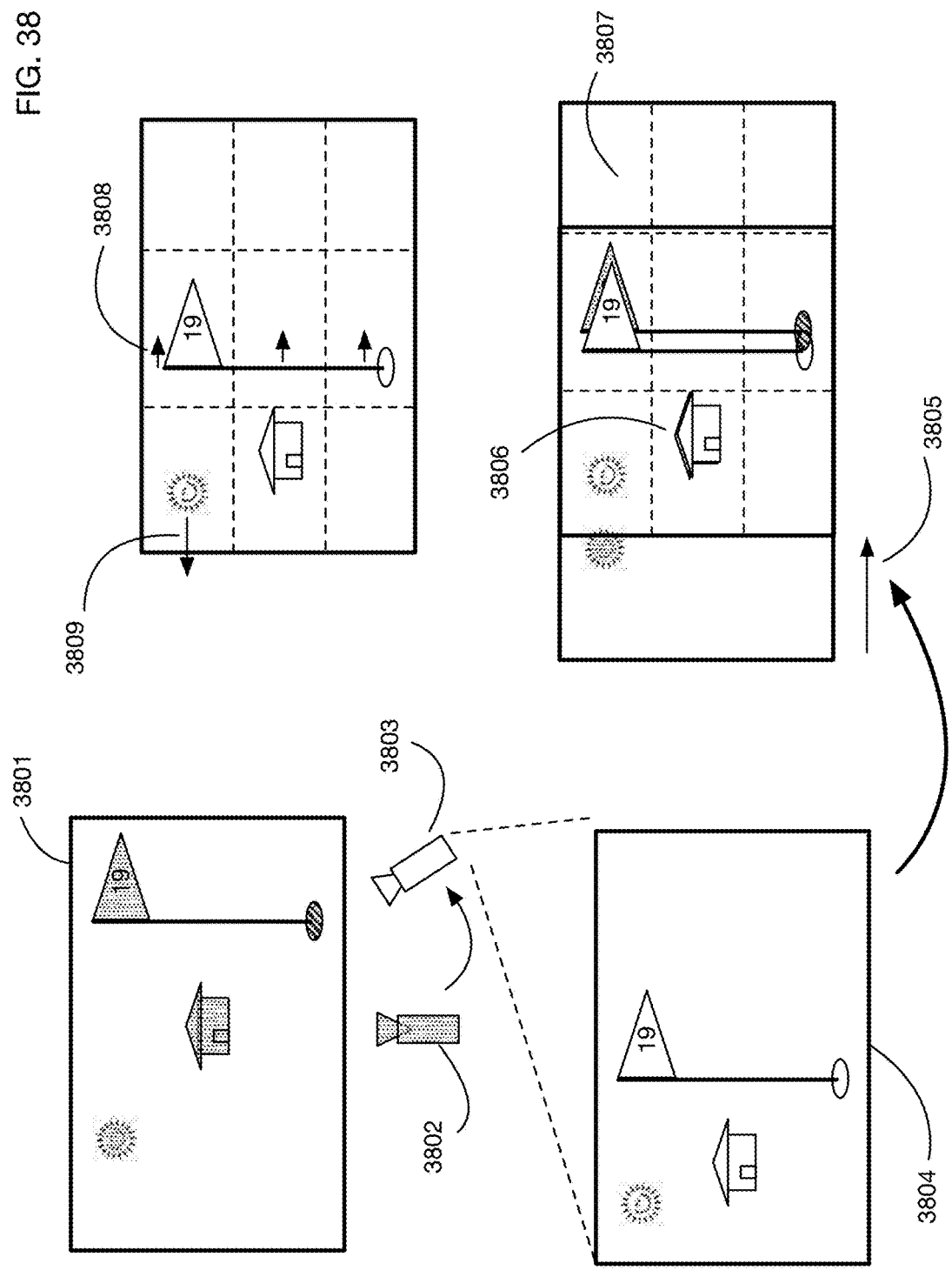
FIG. 38 illustrates an embodiment that uses a two-stage process to align frames with previous frames to compensate for camera motion; this process first calculates an overall frame translation, and then a local translation for tiles within the frame.

We now discuss a technique that may be used in one or more embodiments to transform frames to a common coordinate system. As discussed above, such transformations may be needed when there is camera motion in addition to object motion. In FIG. 38, a camera initially at pose 3802 captures frame 3801. The camera then moves to pose 3803, generating frame 3804. (Note that objects are shown shaded in 3801 and not shaded in 3804; this is simply for ease of illustration of the technique explained below.) It is desired to transform frame 3804 to the original camera pose 3802, so that moving objects of interest (not shown here) may be identified. One or more embodiments may use the following technique, or variants thereof: First an overall frame translation 3805 is determined between the frames, where this frame translation aligns a center region of the first frame 3801 with the corresponding center region of the translated frame from 3804. The center region may be of any desired shape and size. In the example shown, the center region of 3801 contains an image of a house. Frame 3804 is therefore shifted by frame translation 3805 to align the house in the two frames, as shown at 3806. This frame translation does not completely align the two frames, because the change in camera pose does not (in this illustrative case) result in a uniform translation of all objects in the frames. Therefore the method proceeds to make additional local alignments. The frame 3804 is divided into tiles. In FIG. 38 the frame is divided into 9 tiles using a 3×3 grid; one or more embodiments may use any desired number and arrangement of tiles, including nonrectangular tiles or tiles of any shape and size. Each tile is then translated by a local tile translation to align it with the corresponding tile of the previous frame. For example, the upper left tile containing the sun is shifted left by local translation 3809. The middle tiles containing the flag are shifted right by local translation 3808. In general the alignment created by the overall frame translation and the local tile translations may not result in a perfect match between pixels of the previous frame and the translated subsequent frame; one or more embodiments may use heuristics to find a best alignment, for example by minimizing pixel differences after the frame translation and the local tile translations.

Figure 39:
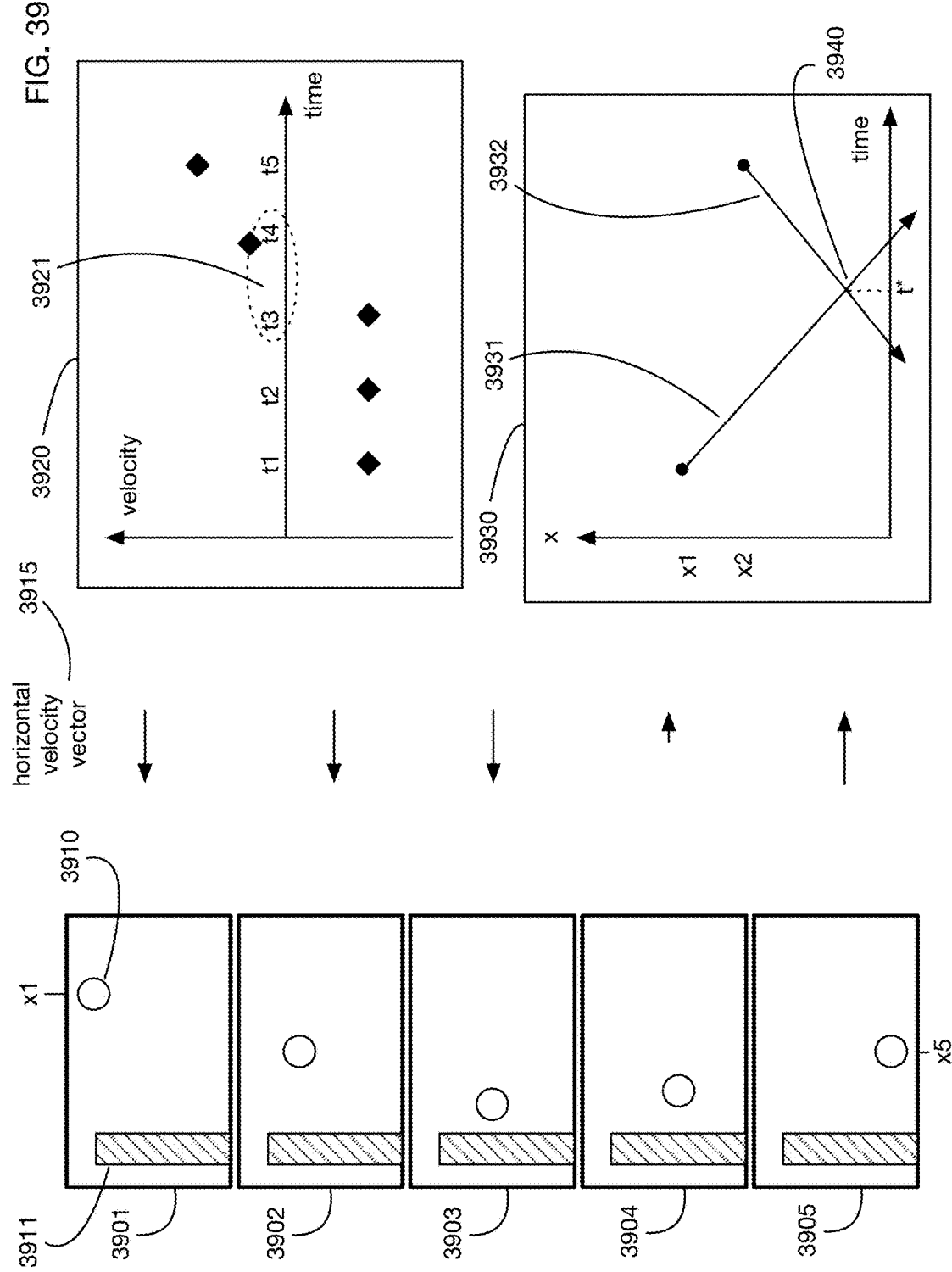
FIG. 39 illustrates an embodiment that detects the time of an impact by finding a discontinuity in a motion metric, and that generates a precise inter-frame time of impact using trajectories before and after impact.

One or more embodiments may calculate motion metrics that include a time of impact for an object of interest. For example, as discussed above, an embodiment that focuses on golf may calculate the time of impact between a golf clubhead and a golf ball; similar impact times may be useful for example in other sports applications such as baseball, tennis, hockey, or cricket. A technique used by one or more embodiments to determine impact time is to look for a discontinuity in an associated motion metric. For example, without limitation, an impact may result in a rapid, discontinuous change in velocity, acceleration, angular velocity, or angular acceleration. FIG. 39 illustrates an embodiment that uses a discontinuity in velocity to detect an impact. Ball 3901 is moving towards wall 3911. Five video frames 3901, 3902, 3903, 3904, and 3905 are captured. Using techniques similar for example to those discussed above, the horizontal velocity vector is determined for each of the five frames. The graph 3920 of horizontal velocity over time shows an obvious discontinuity between time t3 and time t4; thus the embodiment determines that the impact of the ball with the wall occurred somewhere in the time interval 3921 between t3 and t4.

One or more embodiments may use techniques to determine more precise estimates of impact times. The method illustrated above is only able to determine the impact time within a range between a sample (here a video frame) prior to impact and a sample after impact. An inter-sample estimate for impact time may be developed by estimating a forward trajectory for the object prior to impact, and a backward trajectory for the object after impact, and calculating the time of intersection of these two trajectories. This technique is illustrated in graph 3930. Forward trajectory 3931 shows the horizontal position (x) decreasing over time prior to impact. Backward trajectory 3932 shows the horizontal position (x) increasing over time after impact. The intersection point 3940 of these two trajectories gives an estimate for the time of impact, which is between the sample times t3 and t4.

Figure 40:
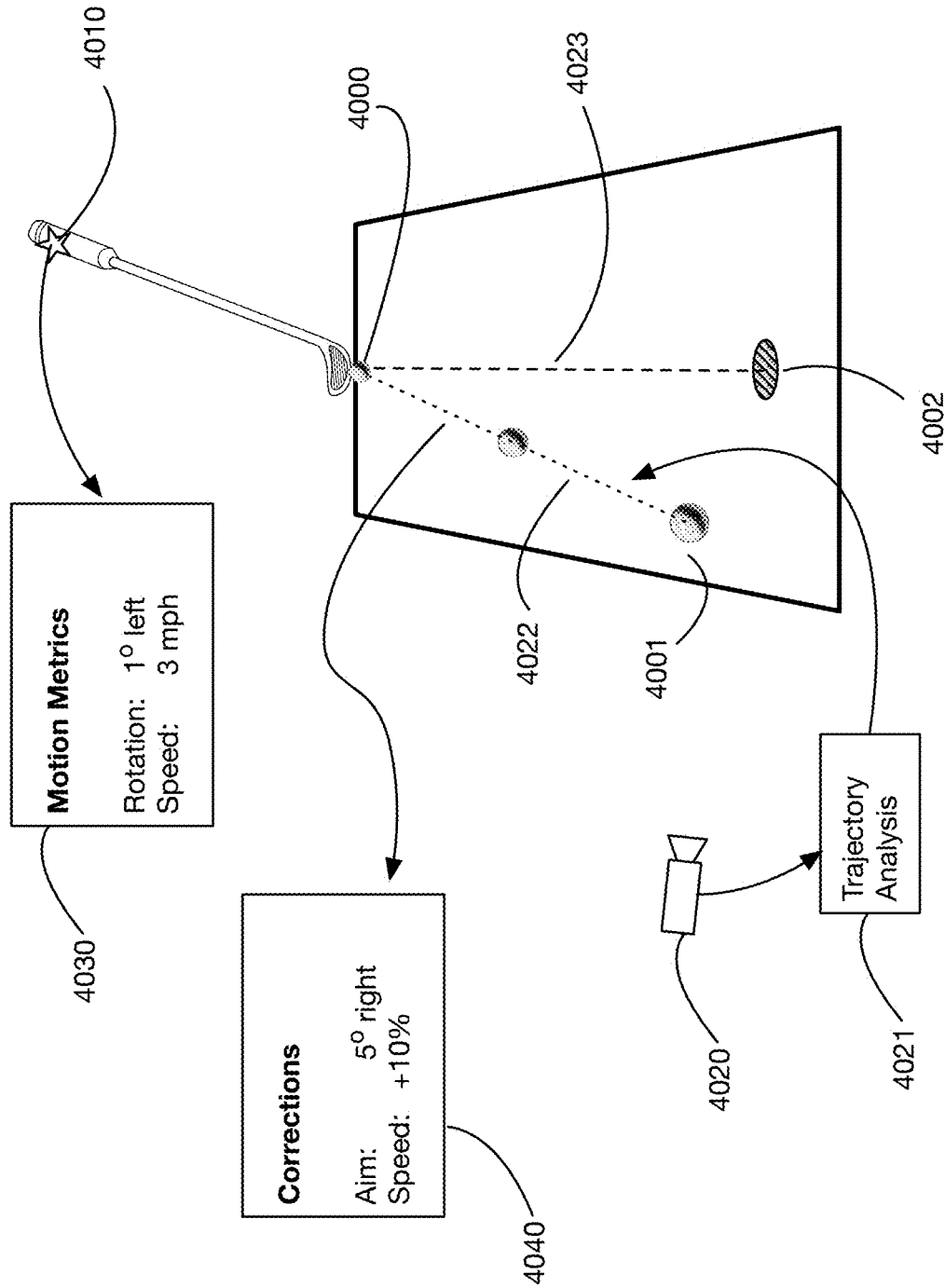
FIG. 40 illustrates an embodiment that compares an observed trajectory, here of a golf ball, to a desired trajectory, and that calculates changes in initial conditions necessary to achieve the desired trajectory.

In one or more embodiments of the method, a desired trajectory for an object is known or may be estimated. For example, in an embodiment that measures golf swings, the desired trajectory for the golf ball is towards the hole. In baseball, for example, the desired trajectory for a baseball hit by a batter may be for the baseball to be hit fair and deep. Using video analysis sensor data, or both, one or more embodiments may measure the actual trajectory of an object of interest, and compare this actual trajectory to the desired trajectory. This comparison generates a motion metric for the object. Moreover, one or more embodiments may further measure the initial conditions that generated the observed trajectory. For example, in golf, the orientation, location, and velocity of the clubhead at the time of impact with the ball determines the subsequent ball trajectory. Similarly in baseball the orientation, location, and velocity of the bat at the time of impact with the ball determines the subsequent ball trajectory (along with the velocity of the ball as thrown by the pitcher). These initial conditions may be measured as motion metrics as well, again using sensor data, video analysis, or both. One or more embodiments may further calculate the changes that would be necessary in these initial conditions to generate the desired trajectory instead of the observed trajectory, and report these changes as additional motion metrics. FIG. 40 illustrates an example with an embodiment that measures putting. The putter has a sensor 4010 on the grip, which measures the motion of the putter. In addition video camera 4020 records the trajectory of the ball after it is hit. The desired trajectory 4023 for the ball is towards and into the hole 4002. In this example, the ball 4000 is hit at an angle, and the ball travels on actual trajectory 4022, coming to rest at 4001. This trajectory is observed by camera 4020 and analyzed by analysis module 4021. The resulting motion metrics 4030 and 4040 provide feedback to the golfer about the putt. Metrics 4030 are calculated from the sensor on the putter; they show for example that the speed of the putter at impact was 3 mph, and that the putter face rotated 1 degree to the left from the backstroke to the forward stroke. Analysis of the trajectory 4022 determines that the required correction to the putt to put the ball in the hole requires aiming 5 degrees more to the right, and increasing the putter speed by 10%. The analysis of changes in initial conditions needed to change a trajectory to a desired trajectory may for example take into account any other factors that may influence the trajectory, such as in this case the speed or the slope of the putting green.

Figure 41:
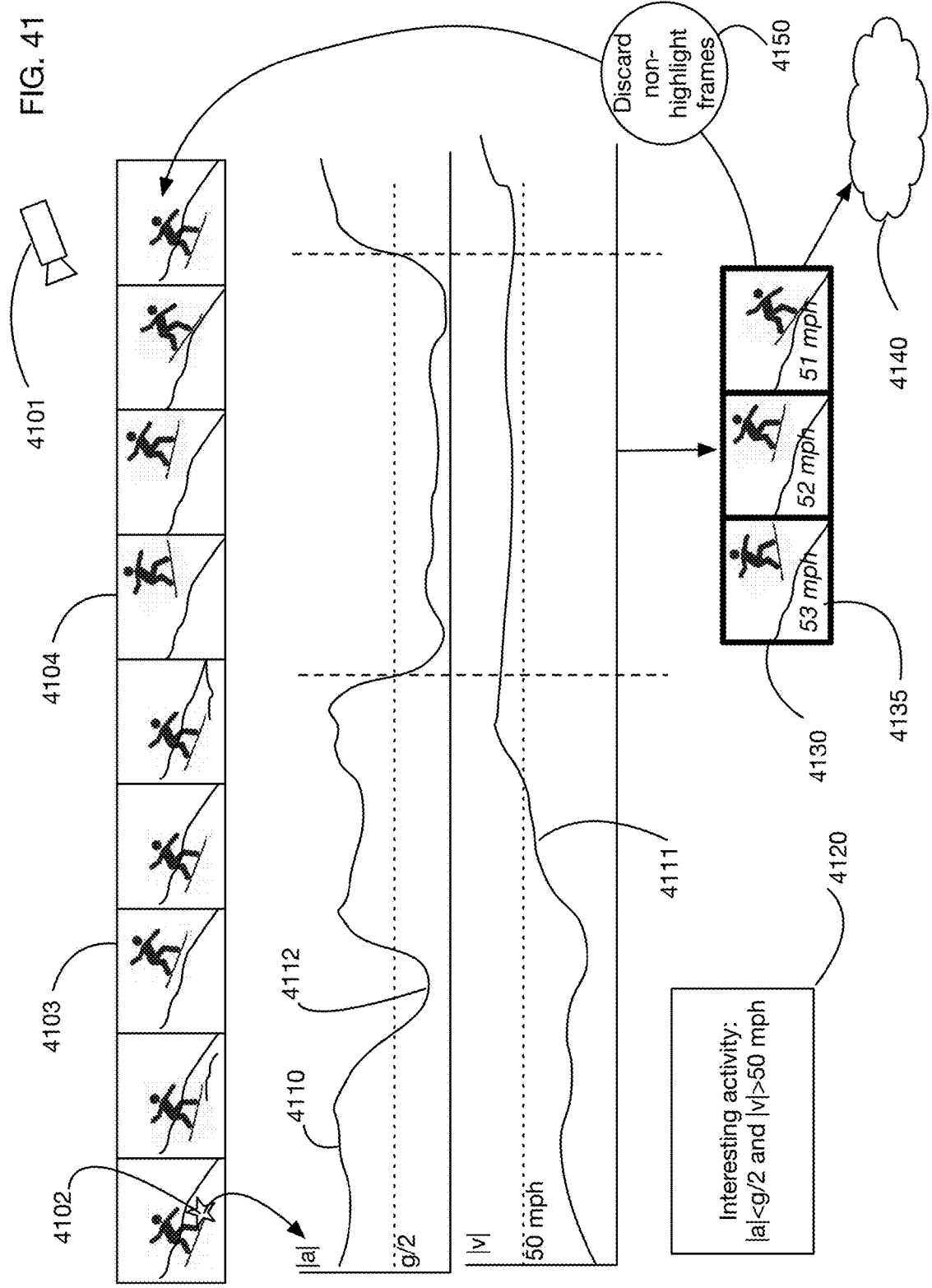
FIG. 41 illustrates an embodiment that uses sensor data to identify highlight frames, displays highlight frames with motion metrics, and discards frames outside the highlighted timeframe.

In one or more embodiments, sensor or video data may be collected over long periods of time, where only certain portions of those time periods contain interesting activities. One or more embodiments may therefore receive signatures of activities of interest, and use these signatures to filter the sensor and video data to focus on those activities of interest. For example, in one or more embodiments, a set of highlight frames may be selected from a video that show specifically the activities of interest. FIG. 41 illustrates an example of an embodiment that generates highlight frames using sensor data to locate activities of interest. A snowboard has an attached sensor 4102, which includes an accelerometer. In addition video camera 4101 captures video of the snowboarder. In one or more embodiments, the video camera 4101 may be attached to the user, and the camera may include the sensor 4102. The embodiment obtains signature 4120 for activities of interest. In this illustrative example, one activity of interest is a jump at high speed. The signature for a jump is that the magnitude of the acceleration drops below g/2, indicating that the snowboard is in free fall, and that the magnitude of the velocity is above 50 mph. Acceleration magnitude 4110 received from sensor 4102 is compared to the acceleration threshold value over time. The accelerometer is integrated (along with data from other inertial sensors such as a gyro) to form velocity data 4111. The acceleration magnitude drops below the threshold at frame 4103 because the snowboarder makes a small jump; however the velocity at that time is not sufficiently fast to match the activity signature 4120. The acceleration magnitude drops again below the threshold at time corresponding to video frame 4104; at this time the velocity also exceeds the required threshold, so the data matches the activity signature 4120. Three highlight video frames 4130 are selected to show the jump activity that was detected by comparing the acceleration motion metric to the threshold. One or more embodiments may select highlight frames during an activity of interest that include all of the frames captured during the activity time period. One or more embodiments may add additional frames to the highlight frames that are before or after the activity time period. One or more embodiments may sample only selected frames during the activity time period, for example to generate a small set of highlight images rather than a complete video. In the example illustrated in FIG. 41, the speed of the snowboard is overlaid with graphic overlay 4135 onto the highlight frames; this speed may be calculated for example from the sensor data, from the video analysis, or by sensor fusion of both data sources. One or more embodiments may overlay any desired metrics or graphics onto highlight frames. Highlight frames 4130 with overlays 4135 are then distributed over network 4140 to any set of consumers of the highlight frames. In one or more embodiments that generate highlight frames, consumers of highlight frames may include for example, without limitation: any video or image viewing device; repositories for video, images, or data; a computer of any type, such as a server, desktop, laptop, or tablet; any mobile device such as a phone; a social media site; any network; and an emergency service. An example of an embodiment that may send video highlights to an emergency service is a crash detection system, for example for a bicycle or a motorcycle. This embodiment may monitor a user using for example an accelerometer to detect a crash, and an onboard camera to capture video continuously. When a crash is detected, information about the location and severity of the crash may be sent directly to an emergency service, along with video showing the crash. Any cameras local to the event, whether a highlight event or crash or any other type of event may be queried to determine if they have video from that location and time, for example using a field of view that would envelope the location of the event for example. The videos that cover the event, or any other sensors near the event and near the time may also be queried and sent out to define a group event. Other sensor data, including heart rate and sound or sound levels may also be indicative of an event that is worthy of a highlight or other type of event, such as a fail. Members of any group associated with the user may subscribe to the event or group event and obtain the highlights or fails of the day.

Figure 41A:
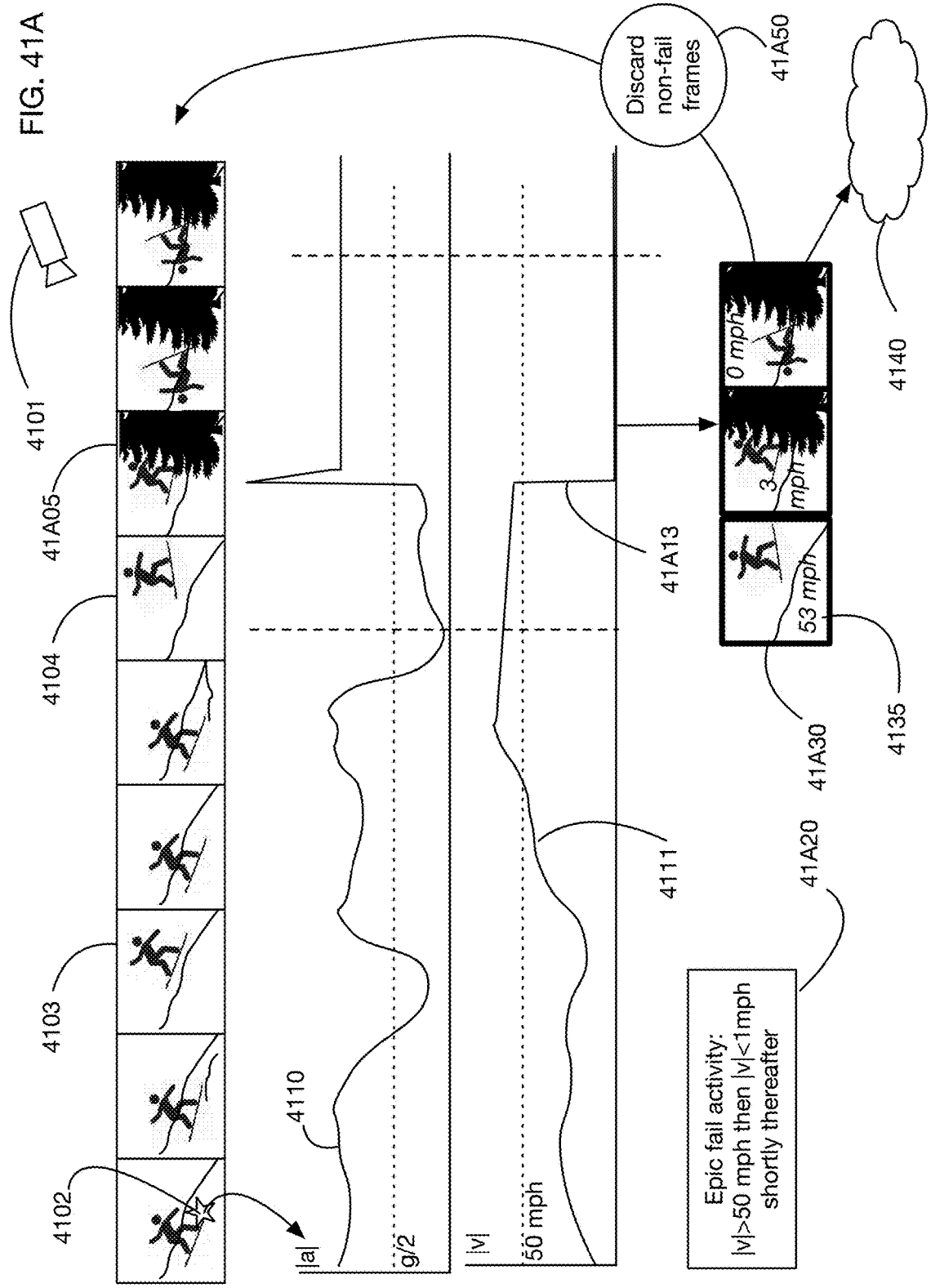
FIG. 41A illustrates an embodiment that uses sensor data to identify epic fail frames, displays these fail frames with motion metrics, and discards frames outside the fail timeframe.

With respect to highlight thresholds, the best events according to one or more metrics may be tagged, and in addition, the worst events or any other range of events may be tagged. The tagging of an event may indicate that the event may indicate that the respective event videos or motion data is to be associated with a given highlight reel, or fail reel. In one or more embodiments, metrics or activity signatures may be utilized to identify epic fails or other fails, for example where a user fails to execute a trick or makes a major mistake. FIG. 41A illustrates an example that is a variation of the snowboarder example of FIG. 41. A signature for 41A20 a fail is defined as having a high velocity, following shortly by having a very small or zero velocity; this signature characterizes a crash. At frame 4104 the snowboarder executes a jump, and then hits a tree at frame 41A05. Thus the velocity transitions quickly from a high speed to zero at 41A13. The epic fail frames 41A30 are selected to record the fail. As in FIG. 41, these fail frames may be overlaid with metric data 4135. The fail frames may be sent to other viewers or repositories 4140, and a message 41A50 may be sent to the camera to discard frames other than the selected fail frames. One or more embodiments may use multiple signatures for activities of interest to identify and capture various types of activities; for example, an embodiment may simultaneously use a highlight signature like signature 4120 in FIG. 41 as well as a fail signature like signature 41A20 in FIG. 41A. Any video characteristic or motion data may be utilized to specify a highlight or fail metric to create the respective reel.

One or more embodiments may generate highlight frames using the above techniques, and may then discard non-highlight frames in order to conserve storage space and bandwidth. One or more embodiments may also send messages to other systems, such as to the camera that initially captured the video, indicating that only the highlight frames should be retained and that other frames should be discarded. This is illustrated in FIG. 41 with discard message 4150 sent to camera 4101, telling the camera to discard all frames other than those selected as highlight frames.

Figure 42:
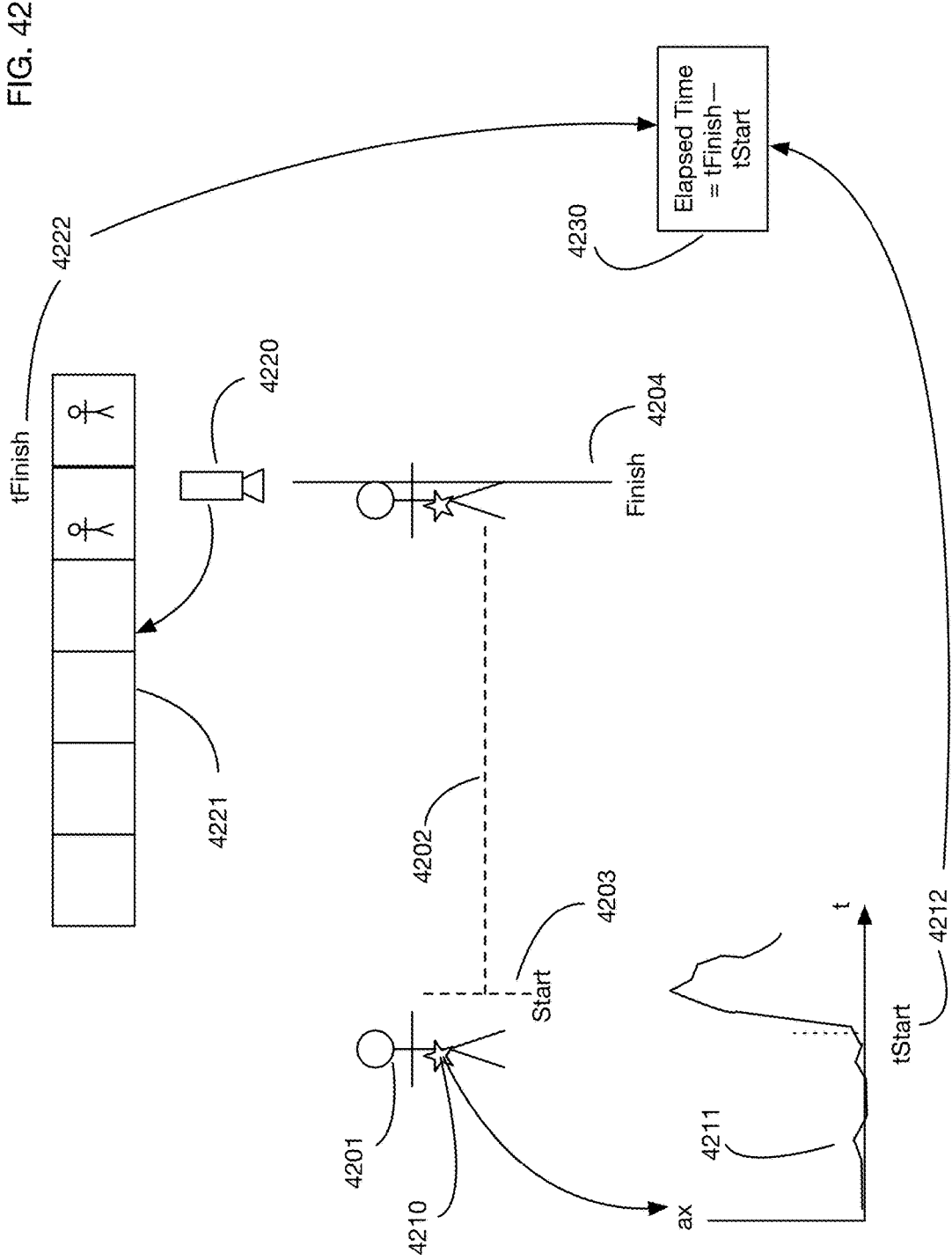
FIG. 42 illustrates an embodiment that calculates an elapsed time of an activity by using sensor data to detect the start time, and video analysis to detect the finish time.

In one or more embodiments, the motion metrics may include an elapsed time for an activity, and sensor data and video analysis may be combined to determine the starting time and the finish time for the activity. FIG. 42 illustrates an embodiment that uses a motion sensor to determine a starting time, and uses video analysis to determine a finish time. User 4201 is running a sprint, for example, between starting line 4203 and finish line 4204. Motion capture element 4210 is attached to the user, and it includes an accelerometer. The user is stationary prior to the sprint. The start of the sprint is detected when the acceleration 4211 in the horizontal (x) direction exceeds a threshold; this occurs at time 4212 (tStart). In this example, the sensor cannot determine directly when the user crosses the finish line, because the user continues to move forward after crossing the finish line. Therefore camera 4220 is positioned at the finish line. Video frames 4221 are monitored to detect when the user crosses the finish line. Using video frame analysis, which may for example use trajectory interpolation between frames to determine exact crossing time, the time of finish 4222 (tFinish) is determined. Thus the elapsed time 4230 for the spring may be calculated. This illustrative example uses a sensor for starting time and a camera for finish time. One or more embodiments may use various other combinations of sensors and cameras to determine starting times and finish times for activities; for example, a camera could be used to locate starting time by analyzing video for the signature of the start of forward motion.

Figure 43:
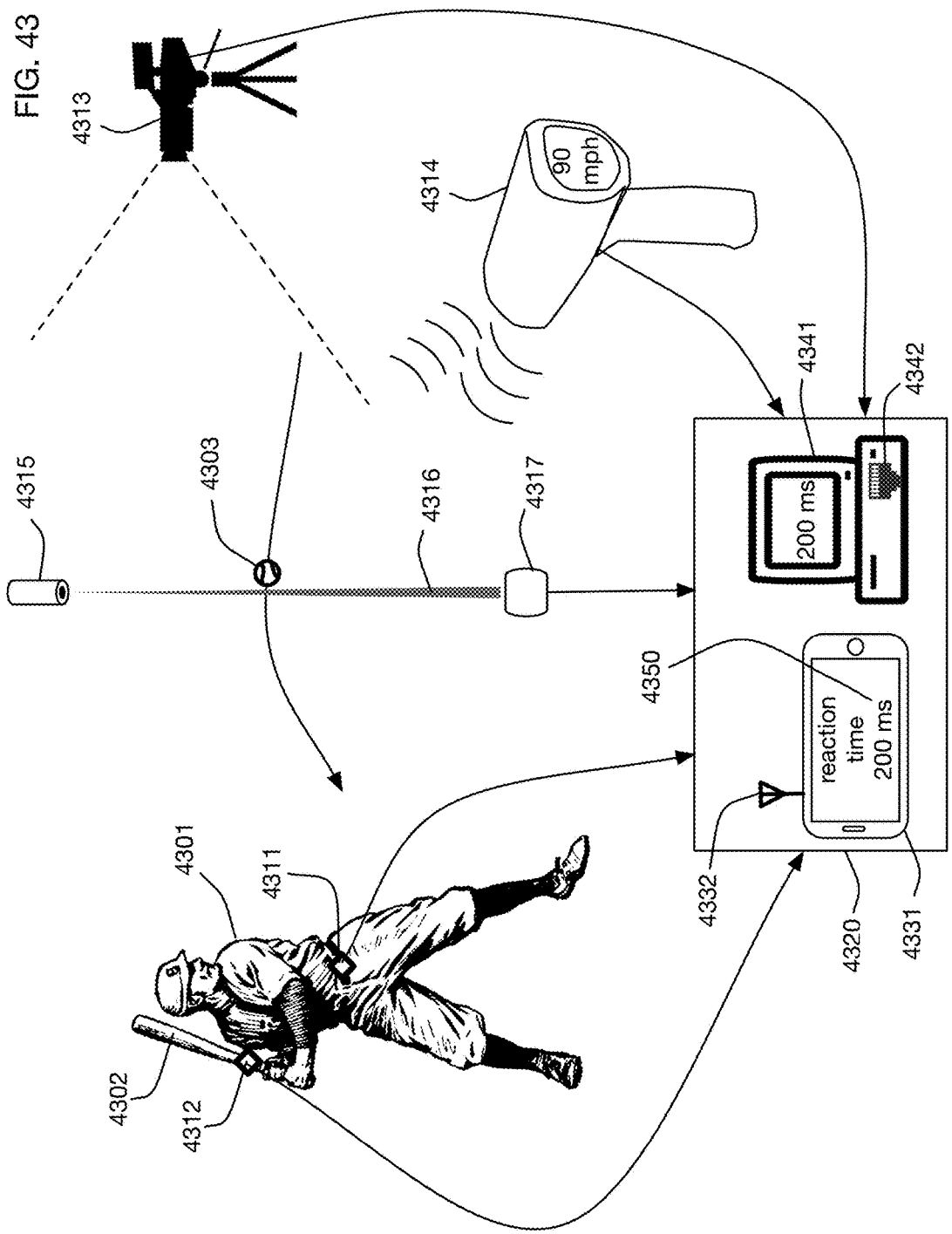
FIG. 43 illustrates an embodiment that uses different types of sensors to measure motions of a baseball player, a bat, and a baseball, and that analyzes events involving combinations of these items; sensors illustrated include inertial motion sensors, a video camera, a radar, and a light gate.

One or more embodiments of the invention may use multiple sensors, possibly of different types or modalities, to analyze events. FIG. 43 illustrates an embodiment with sensors that measure motions of baseball player 4301, baseball bat 4302, and baseball 4303. In one or more embodiments sensors may measure motion or other aspects of any player or players; of any piece or pieces of equipment used by, attached to, carried by, or worn by any player; or of any projectile such as for example a ball that may be contacted by a piece of equipment or used by a player. One or more embodiments may measure motion of any combinations or subsets of players, equipment, and projectiles. In some sports players may use equipment without projectiles, such as for example in skiing. In some sports players may use projectiles without specialized equipment to contact the projectile, such as for example in basketball. One or more embodiments may measure motion of any subset of the players, projectiles, or equipment that appear in or participate in any activity.

One or more embodiments may use different types of sensors to measure motion of the various items involved in an activity, such as the players, equipment, and projectiles. Sensors may be of different types or modalities, including for example, without limitation, inertial motion sensors, video cameras, radars, light gates, light curtains, GPS sensors, or ultrasonic or infrared location sensors. One or more embodiments may combine different types of sensors to obtain the advantages of each type of sensor in combination. For example, in one or more embodiments inertial sensors may provide highly accurate information on changes in velocity and position at a high sampling rate, while video cameras may provide information on location and orientation at a lower sampling rate. Combining data from multiple sensors and potentially from multiple types of sensors provides more accurate and more comprehensive information on the motion of the items involved in an activity or event.

In the illustrative embodiment shown in FIG. 43, an inertial motion sensor 4312 is attached to baseball bat 4302. This motion sensor may for example comprise any or all of an accelerometer, a rate gyro, or a magnetometer, each with any number of axes. Inertial sensor 4311 is attached to the player 4301, for example on a belt or an article of clothing. In one or more embodiments a sensor measuring motion of a player or of a piece of equipment may for example be embedded in a smart phone or a smart watch carried by or worn by the player or attached to the equipment. In baseball, success for example in hitting depends on the motion of the bat relative to the incoming motion of the baseball. In the embodiment of FIG. 43, three sensors are located in the vicinity of the activity to measure motion of the baseball 4303. Video camera 4313 records video of the ball's motion; the video may also record motion of bat 4302 and of player 4301. Radar 4314 measures motion of the ball 4303; the radar may also measure motion of bat 4302 and player 4301. A light gate sensor has emitter 4315 and receiver 4317; it provides a signal when an object such as ball 4303 interrupts beam 4316 between the emitter and the receiver. One or more embodiments may use multiple light gates to measure position of an object over time, and for example to calculate the object's speed. These sensors—inertial sensors 4312 and 4311, video camera 4313, radar 4314, and light gate 4315/4317 are illustrative; one or more embodiments may use any combination of sensors of any desired type or types to measure motion, position, orientation, or any other aspect of any or all of the objects such as the player 4301, the equipment 4302, and the projectile 4303.

In the embodiment shown in FIG. 43, data from the various sensors are transmitted to an event analysis and tagging system 4320. This system may analyze the sensor data, detect events, calculate metrics, and add tags to describe and classify the events. One or more embodiments of the event analysis and tagging system may use any processor or combination of processors to perform the analysis, event detection, and tagging; processors may include for example, without limitation, a microprocessor, a microcontroller, a mobile device, a smart phone, a smart watch, a tablet computer, a notebook computer, a laptop computer, a desktop computer, a server computer, or any combination or network of these processors. In the example of FIG. 43, the event analysis and tagging system 4320 includes one or both of a smart phone 4331 and a computer 4341. Data may be transmitted from the sensors to the processor or processors over any wired or wireless networks, and received by the appropriate network interface or network interfaces coupled to the processors. For example, processor 4331 has a wireless interface 4332 to receive wireless sensor data, and processor 4341 has wired interface 4342 to receive wired sensor data. The multiple sensors may contain any combination of wireless sensors and wired sensors. Some sensors may support both wireless and wired connections. The processors such as 4331 and 4341 may calculate one or more metrics associated with a detected event. For example, in FIG. 43, the processors may analyze motion data from the bat sensor 4312 and from the video 4313 tracking the ball (or from any of the other sensors such as 4314 and 4317) to determine a reaction time metric 4350 that measures how quickly the batter responds to a pitch. This reaction time may for example measure the time lag between when the ball 4303 leaves a pitcher and when the batter 4301 begins a forward swing of the bat 4302 in an attempt to hit the ball.

Figure 44:
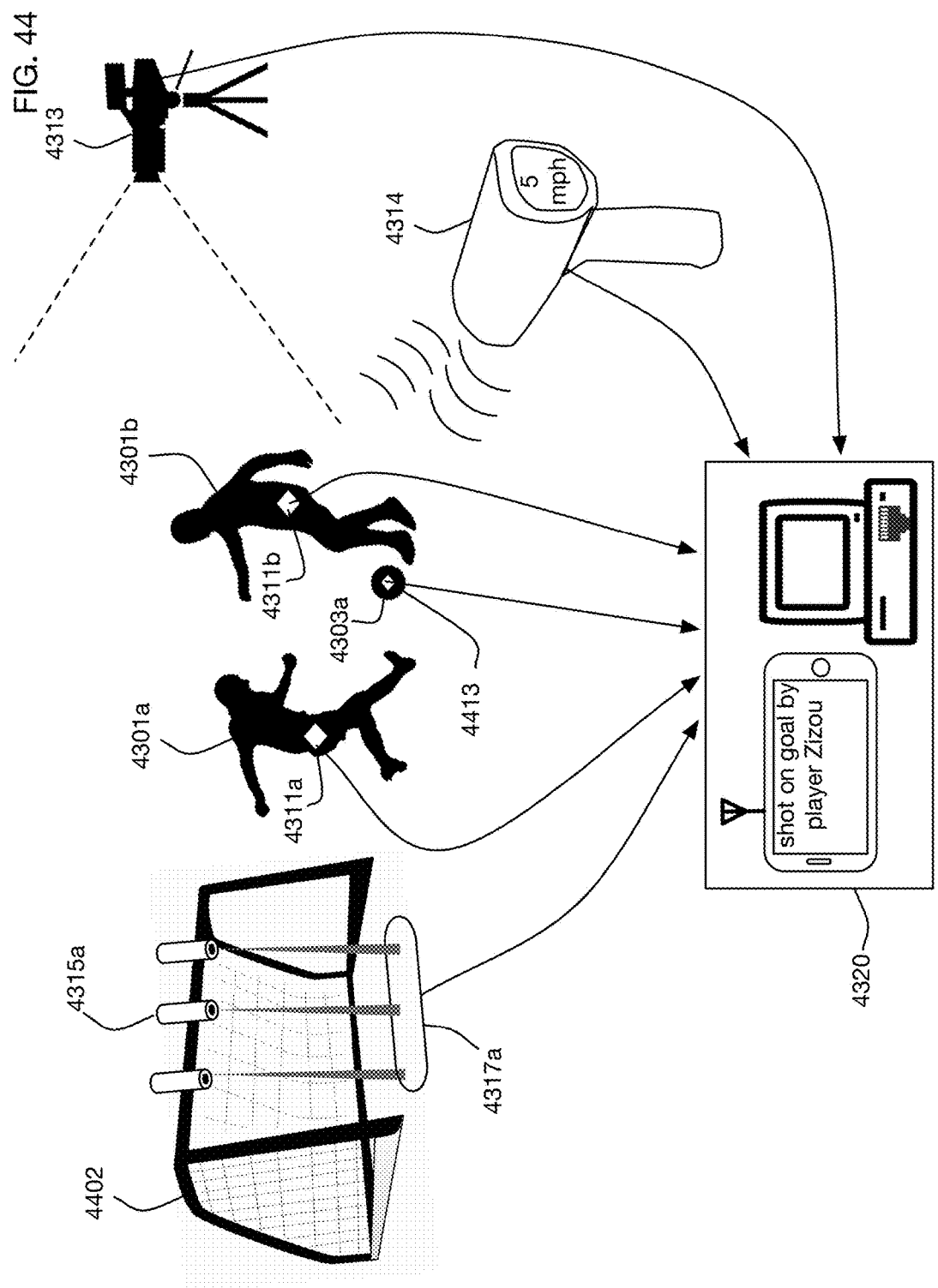
FIG. 44 illustrates an embodiment that uses different types of sensors to measure motion of multiple soccer players and of a soccer ball, and to detect scoring in soccer goal.

FIG. 44 shows another example of a system with multiple sensors of various types to analyze an event. Inertial sensors 4311*a* and 4311*b* are attached to soccer players 4301*a* and 4301*b* respectively. Inertial sensor 4413 is embedded in soccer ball 4303*a*. Video camera 4313 and radar 4314 record motion of the players and the ball. A light curtain with transmitters 4315*a* and receiver 4317*a* is positioned on the soccer goal 4402 to record when objects enter the goal. Data from all of these sensors is sent to event analysis and tagging system 4320, over either wireless or wired networks.

Figure 45:
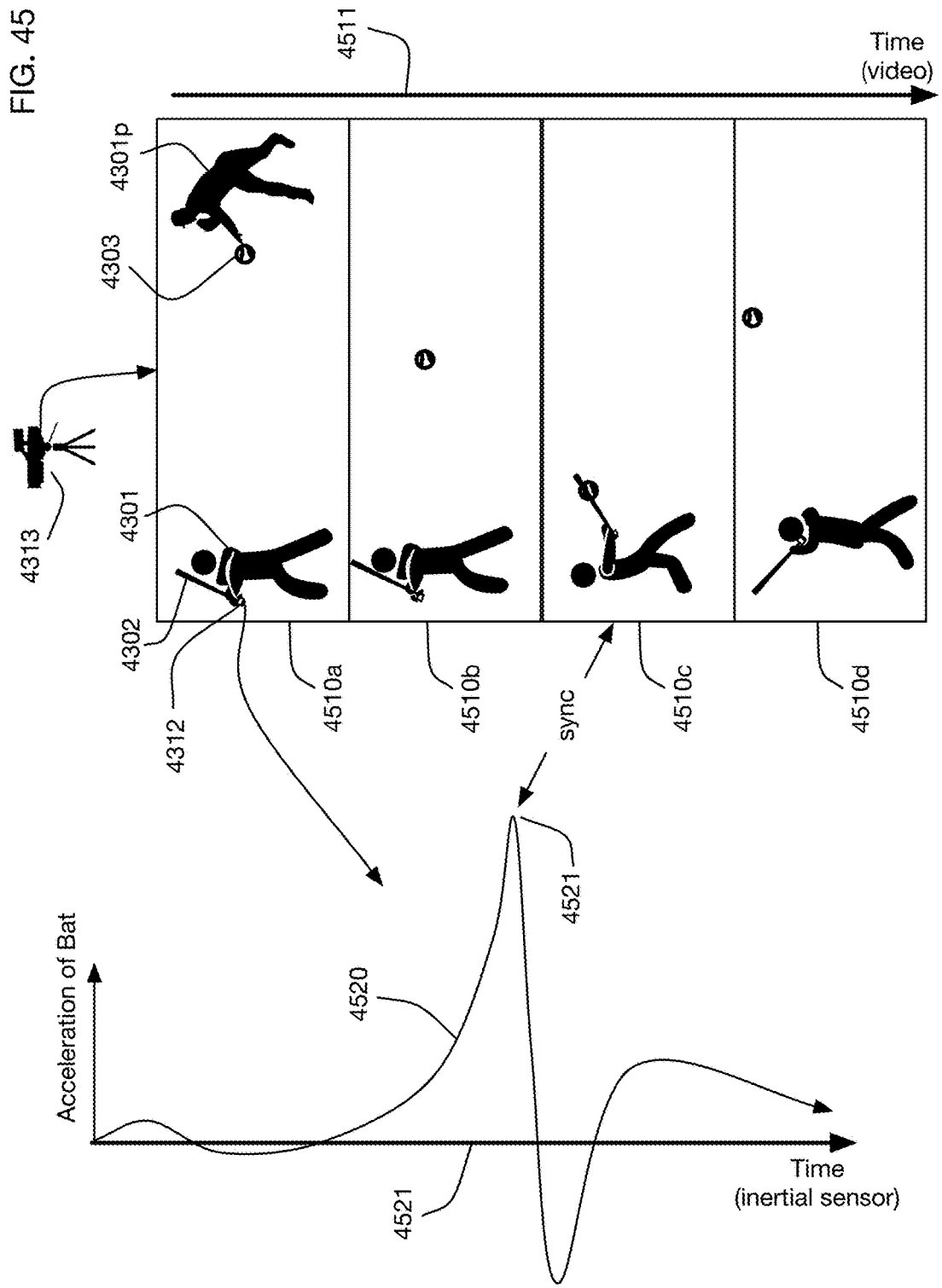
FIG. 45 illustrates time synchronization of data from different types of sensors; in this example video data is synchronized with inertial sensor motion data using an impact event as the point of synchronization.

One or more embodiments may synchronize data received from multiple sensors to a common time scale. In some embodiments sensors may have internal clocks that are synchronized, or that may be periodically synchronized to one another using a master clock or other time synchronization protocol. In some embodiments data may be synchronized by the event analysis and tagging system. FIG. 45 illustrates an example that synchronizes data based on detection of an event. Sensor data is captured from inertial sensor 4312 on baseball bat 4302, and from video camera 4313. Inertial sensor data 4520 is recorded on time axis 4521, which is not initially synchronized with the time axis 4511 for the video frames. The event analysis system detects an impact event when the bat 4302 hits the ball 4303. The impact signature in the inertial sensor data is a sharp discontinuity 4521 in the acceleration of the bat. The impact signature in the video data is proximity of the bat to the ball, which is detected in frame 4510*c*. The system therefore matches the frame 4510*c* with the acceleration discontinuity 4521 to synchronize time scales 4521 and 4511.

Figure 46:
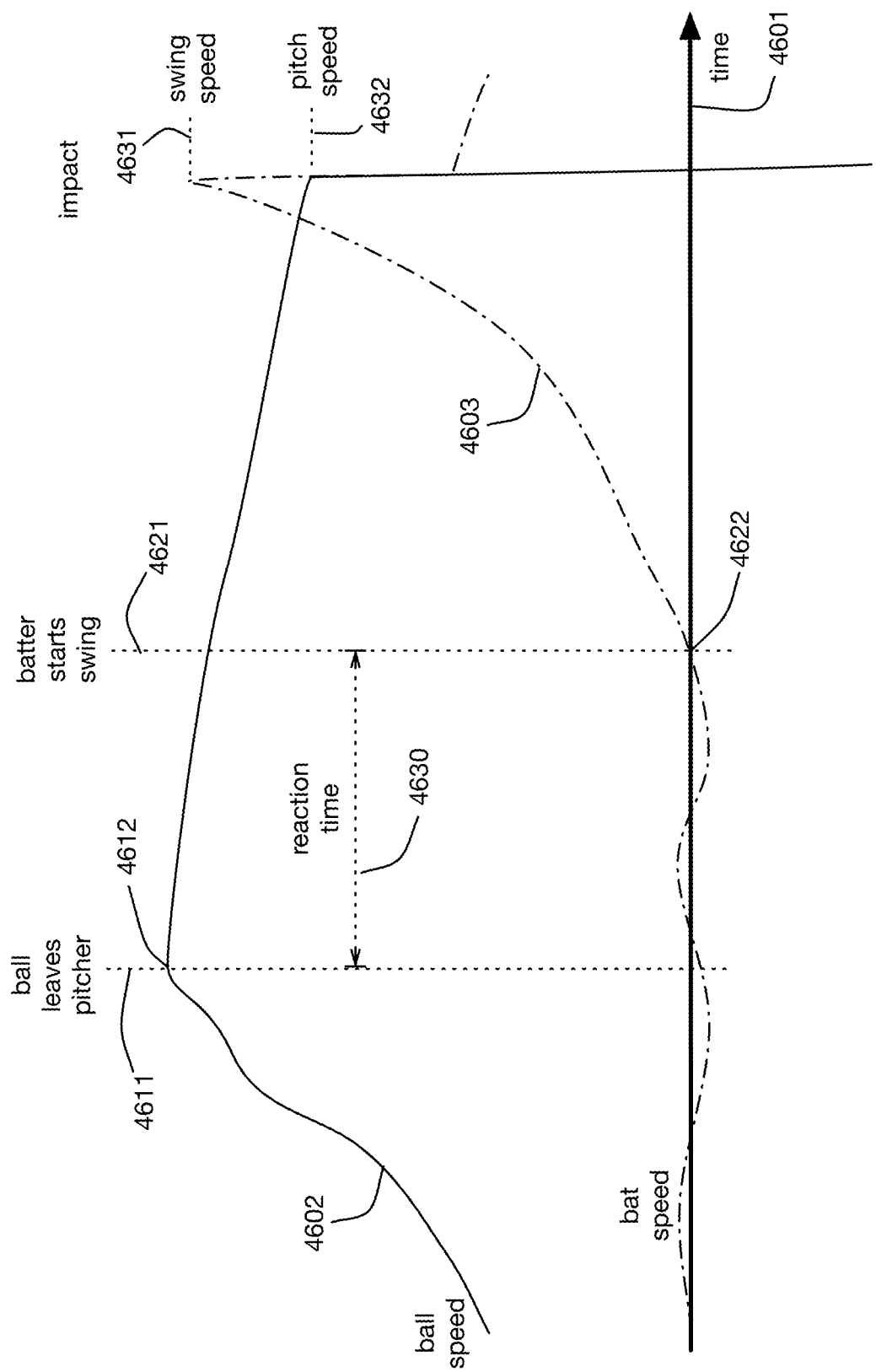
FIG. 46 shows illustrative metrics derived from the system shown in FIG. 45; for example, a batter's reaction time can be calculated by measuring ball travel time from a pitcher from video analysis, and by measuring the start of bat motion using an inertial sensor on the bat.

In the example illustrated in FIG. 45, the video camera 4313 tracks motion of the baseball 4303, and the inertial sensor 4312 tracks motion of the bat 4302. The event analysis and tagging system can therefore combine bat motion data and ball motion data to calculate metrics that correlate bat motion and ball motion. An illustrative metric is the "reaction time" of the batter, which measures how long it takes for the batter 4301 to begin a swing of bat 4302 after the ball 4303 leaves the pitcher 4301*p*, as seen in frame 4510*a*. FIG. 46 illustrates calculation of the reaction time from the combination of the video data and the inertial sensor data. Ball speed 4602 is calculated from analysis of the video data, which tracks the ball motion. Bat speed 4603 is calculated from the inertial sensor data from the inertial sensor on the bat. Bat and ball speed data are synchronized to a common time scale 4601. At time 4611 the ball leaves the pitcher. This time may be determined for example by analysis of the video frames to detect when the ball leaves the pitcher, or by locating the point 4612 of maximum ball speed. At time 4621 the batter begins a forward swing of the bat, as determined by the zero crossing 4622 of the bat speed. The difference 4630 between time 4621 and time 4611 is the reaction time metric. Additional metrics that may be calculated include the swing speed 4631 of the bat at impact, and the pitch speed 4632 of the ball at the time of impact. In one or more embodiments the ball speed 4602 may be calculated from sensors other than or in addition to a video camera, such as for example a radar, a light gate, or an inertial sensor embedded in the ball. Similarly, the bat speed 4603 may be determined using any sensor or combination of sensors.

Figure 47:
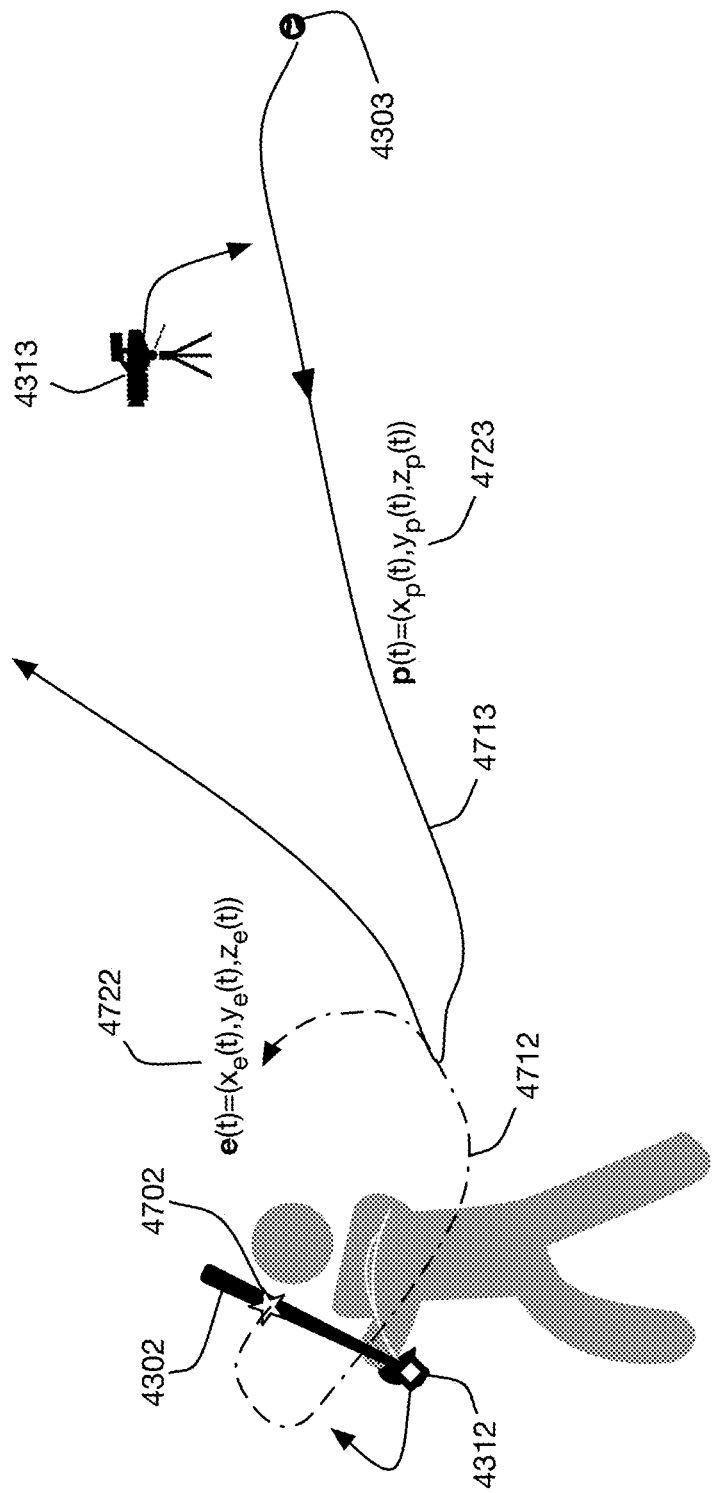
FIG. 47 illustrates an embodiment that calculates a trajectory over time of a baseball and of a baseball bat, using video analysis and inertial sensor analysis respectively for the ball and the bat.

Many activities involve a player executing a swing or other motion of a piece of equipment in an effort to contact or hit a projectile. Illustrative examples include baseball, softball, tennis, badminton, golf, hockey, and polo. In some cases, the projectile may be in motion, which increases the difficulty of contacting the projectile. An example of a projectile in motion is a baseball pitched by a pitcher. One or more embodiments may analyze the combined motion of a projectile and a piece of equipment by calculating the trajectories over time of the equipment and the projectile from sensor data. FIG. 47 illustrates this process using an example of a baseball swing. The player swings bat 4302 in an attempt to hit incoming baseball 4303. Bat motion may be tracked using for example inertial sensor 4312 on the bat; ball motion may be tracked using for example video camera 4313. The event analysis and tagging system may calculate trajectory 4712 of the bat over time, and may calculate trajectory 4713 of the ball over time. The system may then analyze these two trajectories to determine metrics associated with the swing. In general, the trajectories of the bat 4712 and of the ball 4713 are three-dimensional vector functions of time 4722 and 4723, respectively. We denote the equipment trajectory by e(t) (a vector function of time) and the projectile trajectory by p(t) (also a vector function of time). Because equipment and projectiles have size and shape, a definite trajectory is associated with an individual point on a piece of equipment or a projectile. In many applications a piece of equipment has a preferred location or locations for hitting a projectile, such as "sweet spot" 4702 of bat 4302. One or more embodiments may generate an equipment trajectory 4712 by tracking the location of this preferred hitting location on the equipment. Similarly, one or more embodiments may generate a projectile trajectory by tracking the location of a specific location on the projectile, such as for example its center of mass or a point on its surface.

Figure 48B:
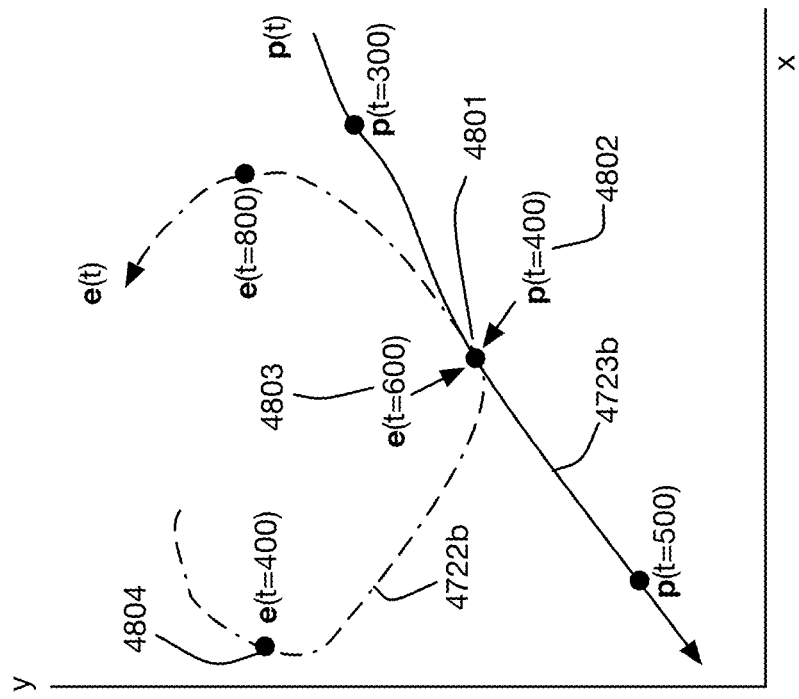
FIGS. 48A and 48B show illustrative trajectories (in two dimensions for simplicity) of a projectile (p) and a piece of equipment (e) that a player is swinging to hit the projectile.
Figure 48A:
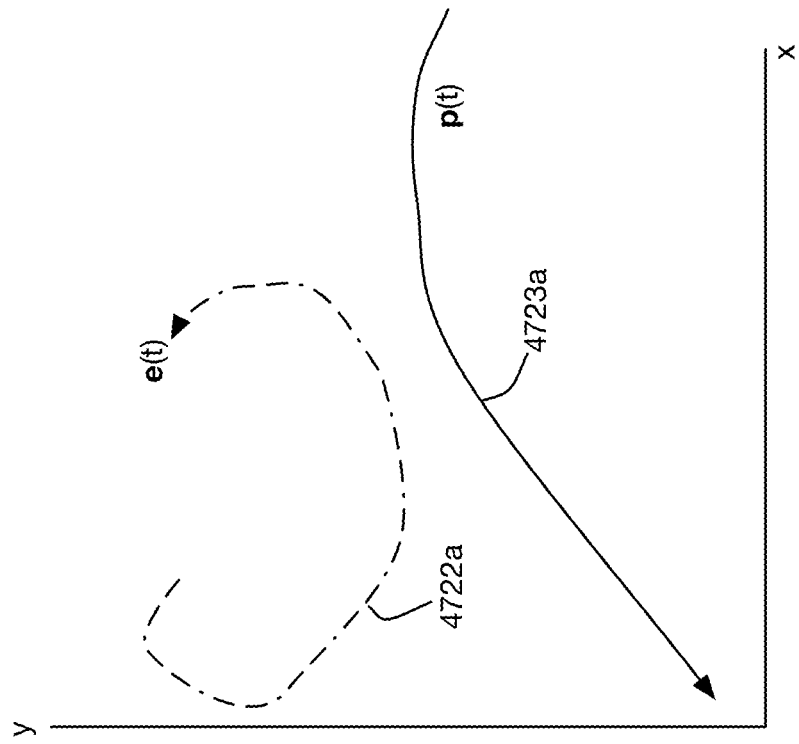

FIGS. 48A and 48B illustrate a simplified example of equipment and projectile trajectories in two dimensions only. This simplification is for ease of exposition only; in general, the trajectories are in three dimensions. FIGS. 48A and 48B illustrate that analysis of the combined equipment and projectile trajectories requires in general a consideration of both spatial and temporal coordinates. In FIG. 48A, the equipment misses the projectile, since equipment trajectory 4722*a* does not intersect projectile trajectory 4723*a* anywhere in space. In FIG. 48B, the equipment trajectory 4722*b* does intersect projectile trajectory 4723*b* at point 4801. However, the equipment and the projectile reach point 4801 at different times, therefore the swing still misses the projectile. Specifically, the projectile trajectory 4723*b* reaches point 4801 at time 4802 (t=400 milliseconds), and the equipment trajectory 4722*b* reaches point 4801 at time 4803 (t=600 milliseconds); the swing is too late to hit the projectile.

Figure 49:
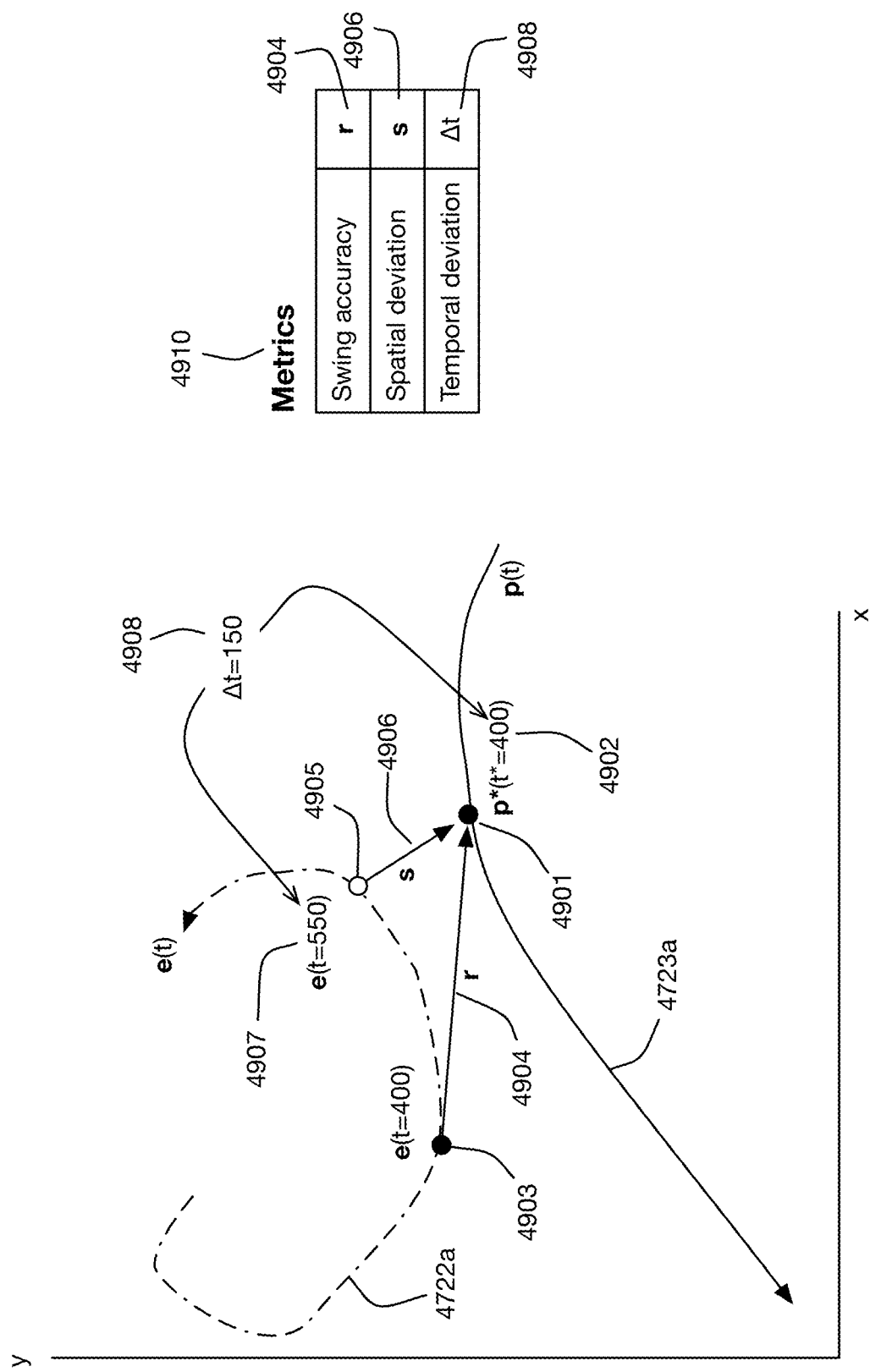
FIG. 49 shows illustrative metrics calculated from the trajectories of a projectile and a piece of equipment as shown in FIG. 48A.

One or more embodiments may use the relative spatial and temporal relationships between an equipment trajectory and a projectile trajectory to calculate one or more metrics for a swing. FIG. 49 shows illustrative metrics calculated for the trajectories of FIG. 48A. In one or more embodiments the event analysis system may analyze projectile trajectory 4723*a* to determine an optimal hitting point on the trajectory, where the equipment would contact the projectile for optimal effect. For example, in baseball the bat should typically contact the incoming ball just in front of the batter to hit fair and with maximum power. In one or more embodiments there may be multiple optimal hitting points or a range of optimal hitting points rather than a single point. For simplicity, FIG. 49 illustrates metrics 4910 with a single optimal hitting point 4901 (p*) on the projectile trajectory 4723*a*. The projectile reaches this point at an optimal hitting time

4902 (t*). A swing accuracy metric 4904 may be calculated for example from the vector difference between the optimal hitting point 4901 and the location 4903 of the equipment at the optimal hitting time. Other metrics may be derived from this vector; for example, the magnitude of the vector 4904 indicates how close the equipment was to the projectile at the optimal hitting time. If the accuracy metric is at (or near) zero, the equipment contacts the projectile at (or near) the optimal hitting point. Otherwise, as discussed above for FIGS. 48A and 48B, errors may result from either or both of spatial deviations or temporal deviations in the swing. A spatial deviation metric 4906 may be defined for example as the vector difference between the optimal hitting point 4901 and the closest approach 4905 of the equipment trajectory 4722a to this optimal hitting point. A temporal deviation metric 4908 may be defined for example as the time difference between the optimal hitting time 4902 and the time 4907 at which the equipment trajectory reaches the closest approach point 4905. In the trajectories of FIG. 48B, for example, the spatial deviation is zero, but the temporal deviation is 200 milliseconds; this indicates that the swing was spatially accurate but mistimed. These metrics are illustrative; one or more embodiments may calculate any metrics based on the equipment trajectory and the projectile trajectory.

In one or more embodiments the event analysis and tagging system may analyze sensor data to automatically generate or select one or more tags for an event. Event tags may for example group events into categories based on the type of activity involved in the event. For example, analysis of football events may categorize a play as a running play, a passing play, or a kicking play. For activities that occur in multiple stages (such as the four downs of a football possession, or the three outs of a baseball inning), tags may indicate the stage or stages at which the event occurs. For example, a football play could be tagged as occurring on third down in the fourth quarter. Tags may identify a scenario or context for an activity or event. For example, the context for a football play may include the yards remaining for first down; thus a play tag might indicate that it is a third down play with four yards to go ($3^{rd}$ and 4). Tags may identify one or more players associated with an event; they may also identify the role of each player in the event. Tags may identify the time or location an event. For example, tags for a football play may indicate the yard line the play starts from, and the clock time remaining in the game or quarter when the play begins. Tags may measure a performance level associated with an event, or success or failure of an activity. For example, a tag associated with a passing play in football may indicate a complete pass, incomplete, or an interception. Tags may indicate a result such as a score or a measurable advancement or setback. For example, a football play result tag might indicate the number of yards gained or lost, and the points scored (if any). Tags may be either qualitative or quantitative; they may have categorical, ordinal, interval, or ratio data. Tags may be generic or domain specific. A generic tag for example may tag a player motion with a maximum performance tag to indicate that this is the highest performance for that player over some time interval (for example "highest jump of the summer"). Domain specific tags may be based on the rules and activities of a particular sport. Thus for example result tags for a baseball swing might include baseball specific tags such as strike, ball, hit foul, hit out, or hit safe.

Figure 50:
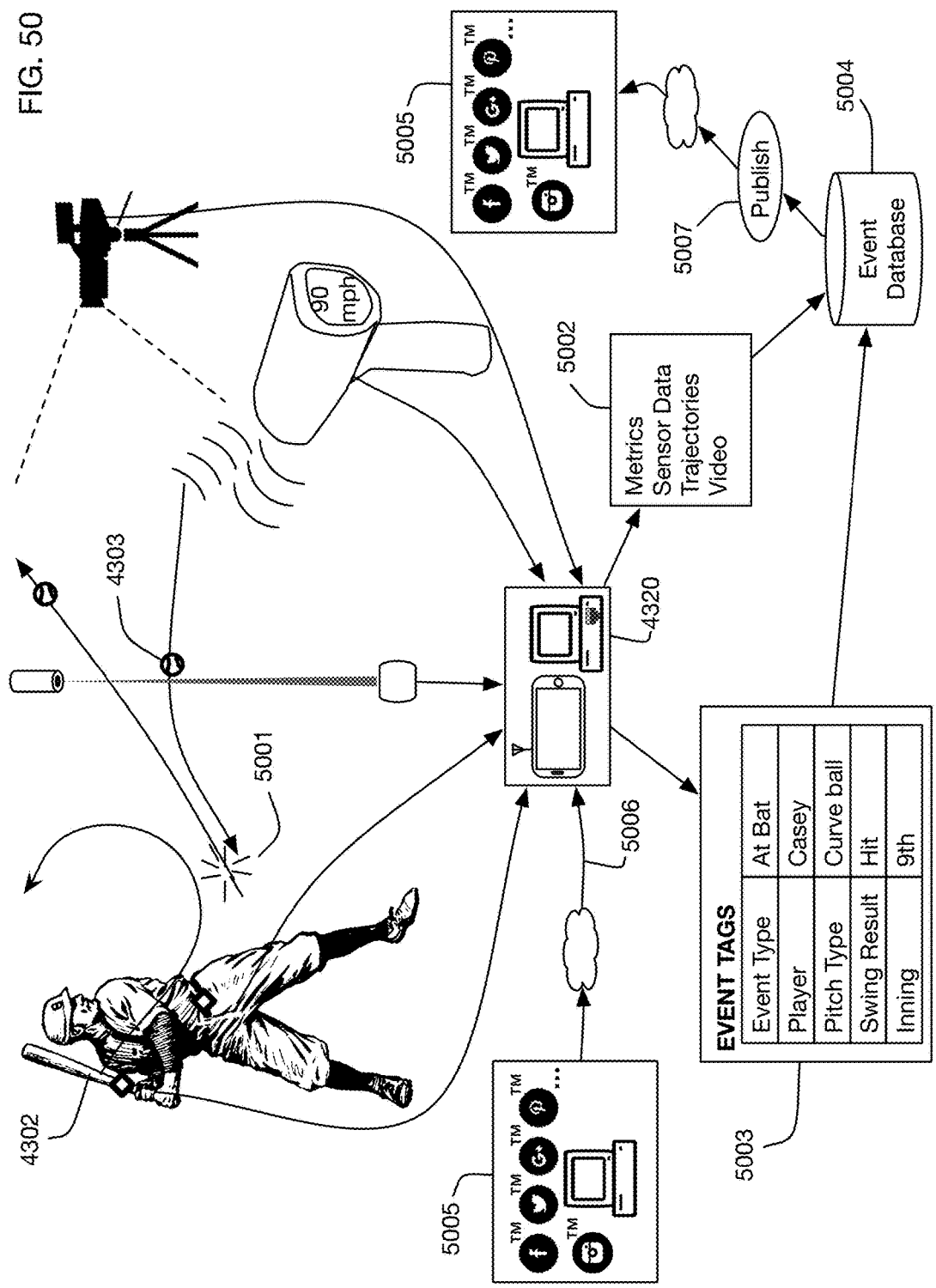
FIG. 50 illustrates an embodiment that automatically adds tags to an event based on analysis of sensor data, and stores the tags along with the metrics and sensor data for the event in an event database.

FIG. 50 illustrates an example in which event analysis and tagging system 4320 analyzes sensor data for a pitch and the corresponding baseball swing. Sensors may include for example inertial sensors, video cameras, radars, and light gates. The analysis system 4320 detects the swing, and then analyzes the sensor data to determine what tags to associate with the swing event. Tags 5003 identify for example the type of event (an at bat), the player making the swing (Casey), a classification for the type of pitch (curve ball, as determined from analysis of the shape of the ball trajectory), the result of the swing (a hit, as detected by observing the contact 5001 between the bat 4302 and the ball 4303), and a timestamp for the event ($9^{th}$ inning). These tags are illustrative; one or more embodiments may generate any tag or tags for any activity or event. The system may store the event tags 5003 in an event database 5004. Additional information 5002 for the event may also be stored in the event database, such as for example metrics, sensor data, trajectories, or video.

The event analysis and tagging system 4320 may also scan or analyze media from one or more servers or information sources to determine, confirm, or modify event tags 5003. Embodiments may obtain media data from any type or types of servers or information sources, including for example, without limitation, an email server, a social media site, a photo sharing site, a video sharing site, a blog, a wiki, a database, a newsgroup, an RSS server, a multimedia repository, a document repository, a text message server, and a Twitter® server. Media may include for example text, audio, images, or videos related to the event. For example, information on social media servers 5005 may be retrieved 5006 over the Internet or otherwise, and analyzed to determine, confirm, or modify event tags 5003. Events stored in the event database may also be published 5007 to social media sites 5005, or to any other servers or information systems. One or more embodiments may publish any or all data associated with an event, including for example metrics, sensor data, trajectories, and video 5002, and event tags 5003.

Figure 51:
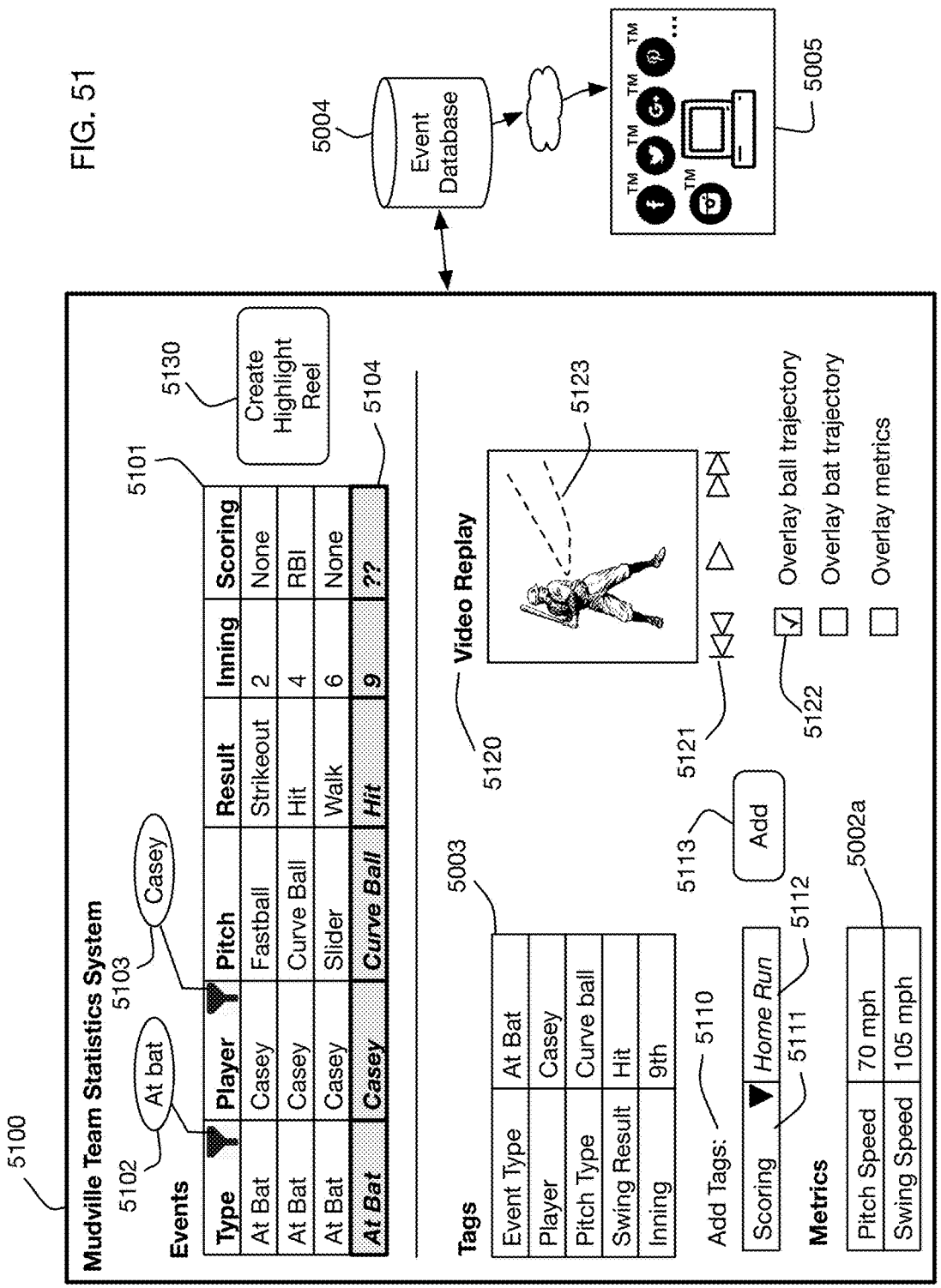
FIG. 51 shows an illustrative user interface that supports filtering of events by tag values, adding manually selected tags to events, and generation of a highlight reel containing video for a selected set of events.

One or more embodiments may provide capabilities for users to retrieve or filter events based on the event tags generated by the analysis system. FIG. 51 shows an illustrative user interface 5100 that may access event database 5004. A table of events 5101 may be shown, and it may provide options for querying or filtering based on event tags. For example, filters 5102 and 5103 are applied to select events associated with player "Casey" and event type "at bat." One or more embodiments may provide any type of event filtering, querying, or reporting. In FIG. 51 the user selects row 5104 to see details of this event. The user interface then displays the tags 5003 that were generated automatically by the system for this event. A manual tagging interface 5110 is provided to allow the user to add additional tags or to edit the tags generated by the system. For example, the user may select a tag name 5111 to define a scoring result associated with this event, presuming for example that the automatic analysis of sensor data is not able in this case to determine what the scoring result was. The user can then manually select or enter the scoring result 5112. The manually selected tags may then be added to the event record for this event in the event database 5004 when the user hits the Add button 5113 for the new tag or tags. The user interface may show other information associated with the selected event 5104, such as for example metrics 5002a and video 5120. It may provide a video playback feature with controls 5121, which may for example provide options such as 5122 to overlay a trajectory 5123 of a projectile or other object onto the video. One or more embodiments may provide a feature to generate a highlight reel for one or more events that correspond to selected event tags. For example, when a user presses the Create Highlight Reel button 5130, the system may retrieve video and related information for all of the events 5101 matching the current filters, and concatenate the video for all of these events into a single highlight video. In one or more embodiments the highlight reel may be automatically edited to show only the periods of time with the most important actions. In one or more embodiments the highlight reel may contain overlays showing the tags, metrics, or trajectories associated with the event. One or more embodiments may provide options for the generation or editing of the highlight reel; for example, users may have the option to order the events in the highlight reel chronologically, or by other tags or metrics. The highlight reel may be stored in event database 5004, and may be published to social media sites 5005.

Figure 52:
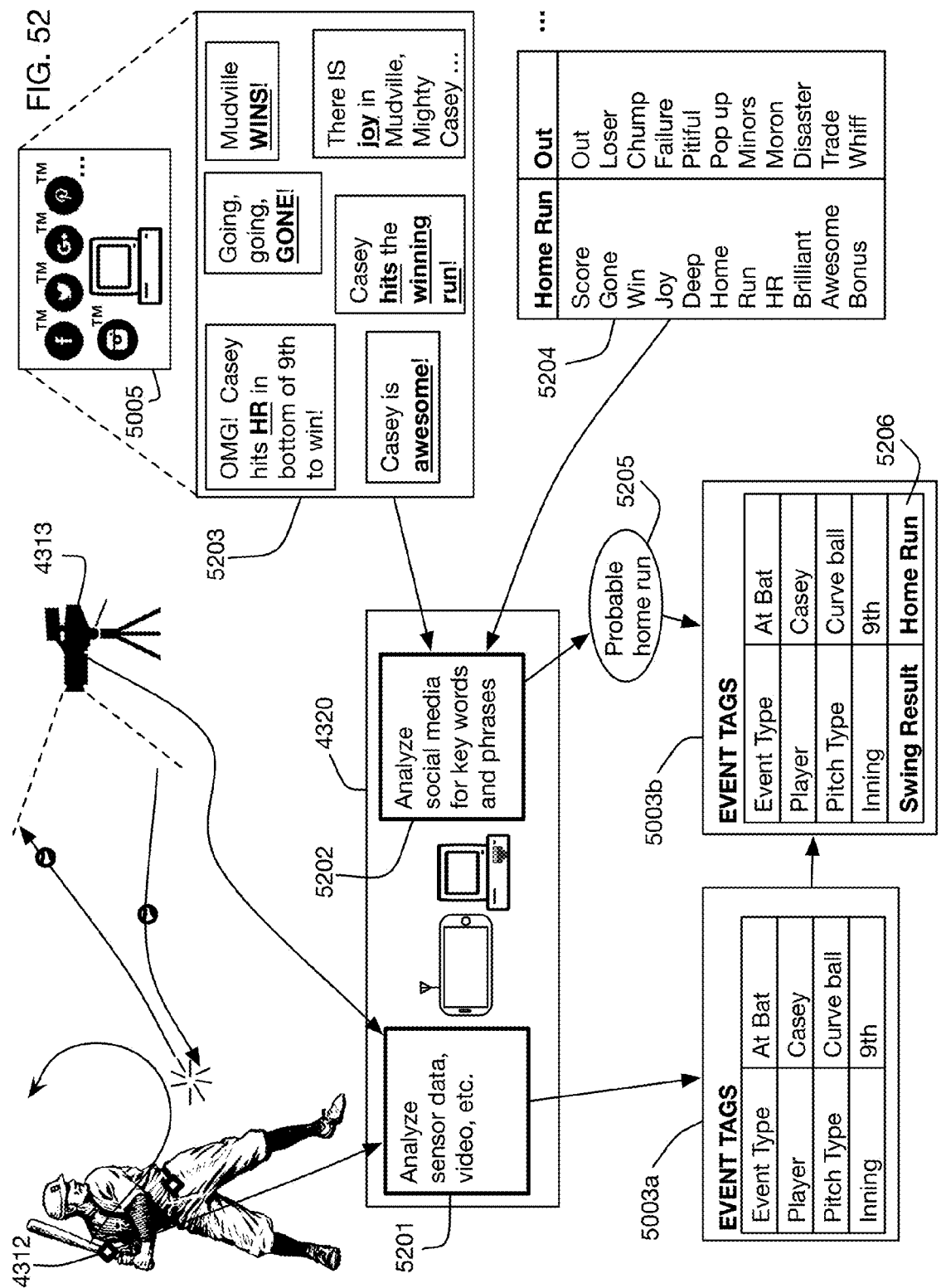
FIG. 52 illustrates an embodiment that analyzes social media postings to generate tags for an event.

FIG. 52 illustrates an embodiment that analyzes social media postings to augment tags for an event. Data from sensors such as inertial sensor 4312 and video camera 4313 is analyzed 5201 by the event analysis and tagging system 4320, resulting in initial event tags 5003a. In this illustrative example, the sensors 4312 and 4313 are able to detect that the player hit the ball, but are not able to determine the result of the hit. Therefore, event tags 5003a do not contain a "Swing Result" tag since the sensor data is insufficient to create this tag. (This example is illustrative; in one or more embodiments sensor data may be sufficient to determine a swing result or any other information.) The event analysis and tagging system 4320 accesses social media sites 5005 and analyzes postings related to the event. For example, the system may use the time and location of the event to filter social media postings from users near that location who posted near the time of the event. In this example, the system searches text postings for specific keywords 5204 to determine the result of the event. Although the sensors or video may be utilized to indicate that a hit has occurred, social media may be analyzed to determine what type of hit, i.e., event has actually occurred. For example, based on this text analysis 5202, the system determines that the result 5205, is a likely home run; therefore it adds tag 5206 to the event tags with this result. The augmented event tags 5003b may then be stored in the event database and published to social media sites. The keyword search shown in FIG. 52 is illustrative; one or more embodiments may use any method to analyze text or other media to determine, confirm, or modify event tags. For example, without limitation, one or more embodiments may use natural language processing, pattern matching, Bayesian networks, machine learning, neural networks, or topic models to analyze text or any other information. Embodiments of the system yield increased accuracy for event detection not possible or difficult to determine based on sensor or video data in general. Events may be published onto a social media site or saved in a database for later analysis, along with any event tags for example.

Figure 53:
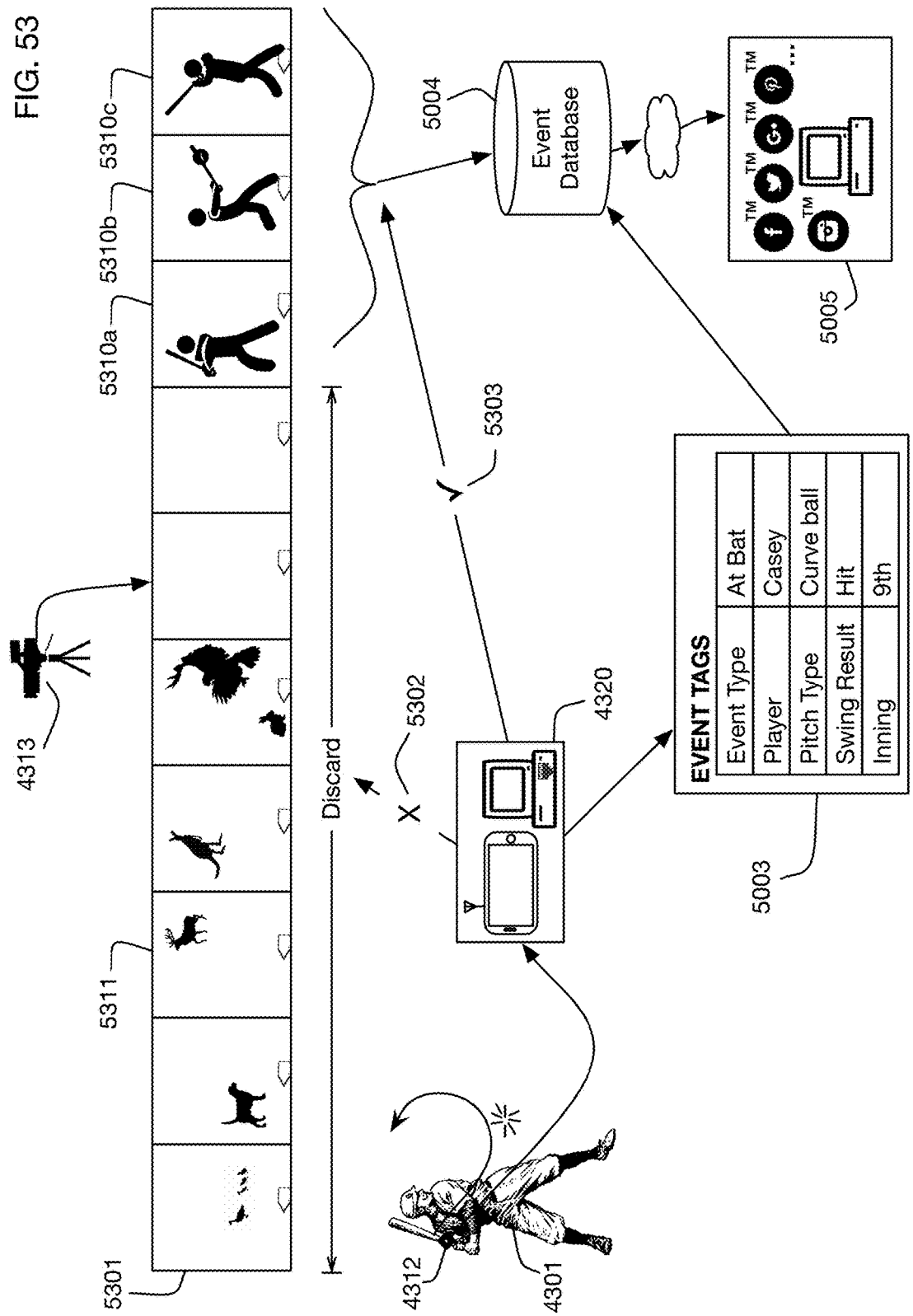
FIG. 53 illustrates an embodiment that discards a portion of a video capture not related to an event, and saves the relevant portion of the video along with the event and the event tags.

One or more embodiments may save or transfer or otherwise publish only a portion of a video capture, and discard the remaining frames. FIG. 53 illustrates an embodiment with video camera 4313 that captures video frames 5301. The video contains frames 5310a, 5301b, and 5310c related to an event of interest, which in this example is a hit performed by batter 4301. The bat is equipped with an inertial sensor 4312. Data from inertial sensor 4312 is analyzed by event analysis and tagging system 4320 to determine the time interval of interest for the hit event. This analysis indicates that only the video frames 5310a, 5310b, and 5310c are of interest, and that other frames such as frame 5311 should be discarded 5302. The system generates event tags 5003 and saves the tags and the selected video frames 5303 in event database 5004. This information, including the selected video frames, may be published for example to social media sites 5005, e.g., without transferring the non-event data. The discard operation 5302 may for example erase the discarded frames from memory, or may command camera 4313 to erase these frames. One or more embodiments may use any information to determine what portion of a video capture to keep and what portion to discard, including information from other sensors and information from social media sites or other servers.

While the invention herein disclosed has been described by means of specific embodiments and applications thereof, numerous modifications and variations could be made thereto by those skilled in the art without departing from the scope of the invention set forth in the claims.

What is claimed is:

1. A multi-sensor event analysis and tagging system comprising:
    a plurality of sensors comprising
        a first inertial sensor coupled to a player or a piece of equipment used by the player, and configured to measure one or more of a position, an orientation, a velocity, an angular velocity, an acceleration, and an angular acceleration of the player or said piece of equipment or both said player and said piece of equipment;
        a second sensor configured to measure motion of a projectile, wherein said second sensor comprises one or more of a video camera, a light gate, a radar, or a second inertial sensor coupled to said projectile; and,
    an event analysis and tagging system comprising
        a communications interface configured to receive sensor data from said plurality of sensors of a swing of said piece of equipment by the player in an attempt to contact said projectile;
        an event database;
        a processor coupled to said communications interface and configured to
            receive said sensor data from said communications interface;
            synchronize said sensor data to a common time scale, forming synchronized sensor data;
            analyze said synchronized sensor data to
                detect an event or confirm said event based on said sensor data received from said plurality of said sensors or analyze one or more of text, audio, image, and video from a computer or server, or any combination of said detect, said confirm or said analyze to
                determine one or more tags for said event and,
            calculate
                a projectile trajectory from said synchronized sensor data;
                a piece of equipment trajectory from said synchronized sensor data; and,
                one or more metrics for said event from the relative spatial and temporal relationships between said projectile trajectory and said piece of equipment trajectory;
            store one or both of said synchronized sensor data and said one or more metrics for said event in said event database;
            store said one or more tags in said event database with said event; and,
            publish said event and one or more of said one or more tags to a social media site.

2. The multi-sensor event analysis and tagging system of claim 1, wherein said projectile comprises one or more of a ball, a football, a rugby ball, an Australian rules football, a soccer ball, a volleyball, a water polo ball, a polo ball, a basketball, a lacrosse ball, a field hockey ball, a croquet ball, a billiard ball, a horseshoe, a shuffleboard disc, a tennis ball, a ping pong ball, a racquet ball, a hand ball, a bocce ball, a lawn dart, a squash ball, a shuttlecock, a baseball, a softball, a golf ball, a bowling ball, a hockey puck, a dodgeball, a kick ball, a Wiffle™ ball, a javelin, a shot put, a discus, a marble, a bullet, an arrow, a knife, a throwing star, a bolas, a grenade, a water balloon, a boomerang, a Frisbee™, a caber, and a curling stone.

3. The multi-sensor event analysis and tagging system of claim 1, wherein said piece of equipment comprises one or more of a bat, a racquet, a paddle, a golf club, a bow, a gun, a slingshot, a sabre, a quarterstaff, a lacrosse stick, a hockey stick, a field hockey stick, a polo mallet, a croquet mallet, a pool cue, a shuffleboard cue, a glove, a shoe, a belt, a watch, a helmet, a cap, a ski, a snowboard, a skateboard, a surfboard, an ice skate, a sled, a luge, a windsurfing board, a hang glider, a roller skate, a roller blade, a vehicle, a snowmobile, a jet ski, a bicycle, a tricycle, a unicycle, a motorcycle, a snowmobile, and a mechanical bull.

4. The multi-sensor event analysis and tagging system of claim 1, wherein
said piece of equipment is a bat;
said projectile is a ball; and,
said motion of said projectile is a pitch of said ball.

5. The multi-sensor event analysis and tagging system of claim 4, wherein said metrics comprise an elapsed time between a pitch start time when said ball leaves a pitcher and a swing start time when said player starts acceleration of said bat towards said ball for said swing.

6. The multi-sensor event analysis and tagging system of claim 1, wherein said piece of equipment trajectory is a trajectory of a preferred hitting location on said piece of equipment.

7. The multi-sensor event analysis and tagging system of claim 6, wherein
said piece of equipment is a bat;
said preferred hitting location is a sweet spot of said bat.

8. The multi-sensor event analysis and tagging system of claim 1, wherein
said processor is further configured to calculate an optimal hitting point on said projectile trajectory, said optimal hitting point comprising an optimal hitting time and an optimal hitting location;
said one or more metrics comprise one or more of
a swing accuracy metric calculated from a vector difference between said optimal hitting location and a location of said piece of equipment trajectory at said optimal hitting time;
a spatial deviation metric calculated from a vector difference between said optimal hitting location and a closest point on said piece of equipment trajectory to said optimal hitting location; and,
a temporal deviation metric calculated from a time difference between said optimal hitting time and a time at which said piece of equipment trajectory reaches said closest point on said piece of equipment trajectory to said optimal hitting location.

9. The multi-sensor event analysis and tagging system of claim 1, wherein said one or more of text, audio, image, and video comprise one or more of email messages, voice calls, voicemails, audio recordings, video calls, video messages, video recordings, text messages, chat messages, postings on social media sites, postings on blogs, or postings on wikis.

10. The multi-sensor event analysis and tagging system of claim 1, wherein said server comprises one or more of an email server, a social media site, a photo sharing site, a video sharing site, a blog, a wiki, a database, a newsgroup, an RSS server, a multimedia repository, a document repository, and a text message server.

11. The multi-sensor event analysis and tagging system of claim 1, wherein said analyzing one or more of text, audio, image, and video comprises searching said text for key words or key phrases related to said event.

12. The multi-sensor event analysis and tagging system of claim 1, wherein said one or more tags represent one or more of
an activity type of said event;
a location of said event;
a stage of an activity associated with said event;
a player identity associated with said event;
a performance level associated with said event; and,
a scoring result associated with said event.

13. The multi-sensor event analysis and tagging system of claim 1, further comprising:
a manual tagging interface configured to
present said event to a user;
accept one or more user selected tags for said event from said user; and,
store said one or more user selected tags in said event database with said event.

* * * * *

UNITED STATES PATENT AND TRADEMARK OFFICE
CERTIFICATE OF CORRECTION

PATENT NO. : 10,109,061 B2
APPLICATION NO. : 15/590398
DATED : October 23, 2018
INVENTOR(S) : Bhaskar Bose et al.

Page 1 of 1

It is certified that error appears in the above-identified patent and that said Letters Patent is hereby corrected as shown below:

On the Title Page

Item (54), in the title, replace "MULTI-SENSOR EVEN ANALYSIS AND TAGGING SYSTEM" with --MULTI-SENSOR EVENT ANALYSIS AND TAGGING SYSTEM--.

Signed and Sealed this
Twenty-second Day of January, 2019

Andrei Iancu
*Director of the United States Patent and Trademark Office*